United States Patent
Iwatsu et al.

(10) Patent No.: US 7,114,048 B2
(45) Date of Patent: Sep. 26, 2006

(54) RECORDING APPARATUS, RECORDING METHOD, STORAGE MEDIUM, PROGRAM AND COMMUNICATION APPARATUS

(75) Inventors: Takeshi Iwatsu, Saitama (JP); Masahiro Nobori, Kanagawa (JP); Tomohisa Takaoka, Kanagawa (JP); Akiko Tamura, Tokyo (JP)

(73) Assignee: Sony Corporation, Tokyo (JP)

( * ) Notice: Subject to any disclaimer, the term of this patent is extended or adjusted under 35 U.S.C. 154(b) by 513 days.

(21) Appl. No.: 10/363,810

(22) PCT Filed: Jul. 4, 2002

(86) PCT No.: PCT/JP02/06798

§ 371 (c)(1),
(2), (4) Date: Mar. 6, 2003

(87) PCT Pub. No.: WO03/005208

PCT Pub. Date: Jan. 16, 2003

(65) Prior Publication Data
US 2004/0024981 A1 Feb. 5, 2004

(30) Foreign Application Priority Data
Jul. 6, 2001 (JP) ............................. 2001-206399

(51) Int. Cl.
*G06F 12/00* (2006.01)
*G06F 13/00* (2006.01)

(52) U.S. Cl. .................. 711/165; 711/100; 711/159; 711/162

(58) Field of Classification Search ............... 711/100, 711/154, 161, 162, 165, 159; 707/1, 200
See application file for complete search history.

(56) References Cited

U.S. PATENT DOCUMENTS

| | | | | |
|---|---|---|---|---|
| 3,727,921 A | * | 4/1973 | Kato | 360/101 |
| 4,130,843 A | * | 12/1978 | Miyamoto et al. | 360/62 |
| 4,527,210 A | * | 7/1985 | Takamatsu | 360/251.1 |
| 5,742,792 A | * | 4/1998 | Yanai et al. | 711/162 |
| 6,009,502 A | * | 12/1999 | Boeuf | 711/170 |

(Continued)

FOREIGN PATENT DOCUMENTS

EP 1111530 A1 4/2000

(Continued)

OTHER PUBLICATIONS

Nikkei Electronics, Mar. 3, 1999, pp. 49-53.

*Primary Examiner*—Tuan V. Thai
(74) *Attorney, Agent, or Firm*—Wolf, Greenfield, & Sacks, P.C.

(57) ABSTRACT

The present invention relates to a recording apparatus and method as well as a communication apparatus suitable for use where stored contents data of, for example, music tunes are supplied to a semiconductor memory or a portable device. At step S391, a C IN/C OUT discriminates whether or not moveout history information is present. If it is discriminated that moveout history information is present, then the processing advances to step S392 in order to compensate for the interrupted moveout process. At step S392, the C IN/C OUT executes a moveout restoration process. At step S393, the C IN/C OUT discriminates whether or not movein history information is present. If it is discriminated that movein history information is present, then the processing advances to step S394 in order to compensate for the interrupted movein process. At step S394, the C IN/C OUT executes a movein restoration process. The present invention can be applied, for example, to an audio data server.

18 Claims, 94 Drawing Sheets

U.S. PATENT DOCUMENTS

| | | | |
|---|---|---|---|
| 6,044,444 A * | 3/2000 | Ofek | 711/162 |
| 6,115,781 A * | 9/2000 | Howard | 711/4 |
| 6,185,666 B1 * | 2/2001 | Murray et al. | 711/173 |
| 6,622,263 B1 * | 9/2003 | Stiffler et al. | 714/13 |
| 6,954,765 B1 * | 10/2005 | Spiegel | 707/200 |

FOREIGN PATENT DOCUMENTS

| | | |
|---|---|---|
| EP | 1069491 A2 | 1/2001 |
| JP | 4-3218 A | 1/1992 |
| JP | 2000-293589 A | 10/2000 |
| JP | 2000-339851 A | 12/2000 |
| JP | 2001-22647 A | 1/2001 |
| JP | 2001-84177 A | 3/2001 |
| WO | PCT/JP00/02290 A1 | 4/2000 |

* cited by examiner

F I G. 1
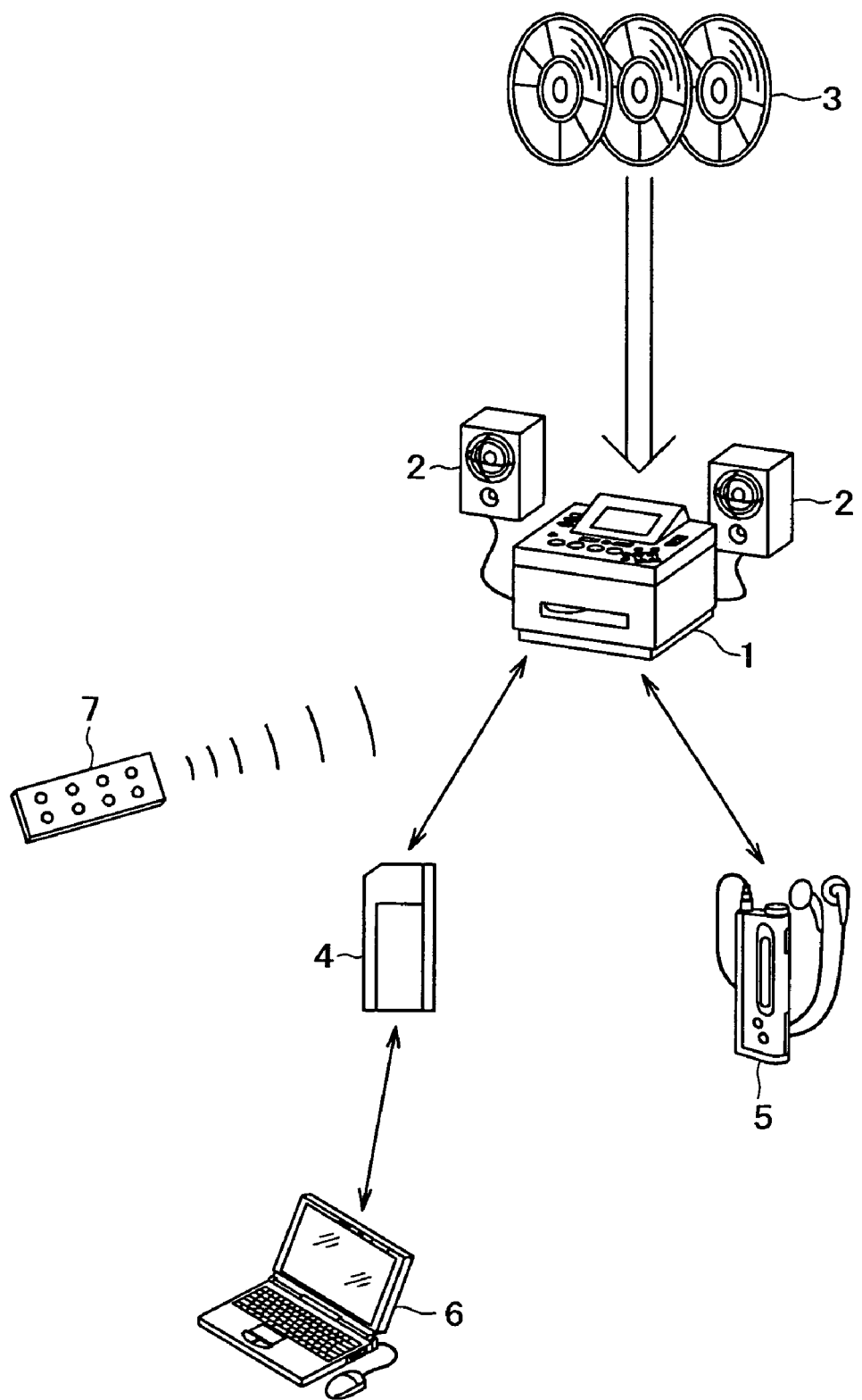

FIG. 9

| | | |
|---|---|---|
| BOOT SECTOR | SECTOR 0 | ~121 |
| FAT AREA | SECTOR 1 | |
| | SECTOR 2 | |
| | SECTOR 3 | |
| | SECTOR 4 | |
| | SECTOR 5 | |
| | SECTOR 6 | |
| | SECTOR 7 | |
| | SECTOR 8 | |
| | SECTOR 9 | |
| | SECTOR 10 | |
| | SECTOR 11 | |
| SYSTEM AREA | SECTOR 12 | |
| | SECTOR 13 | |
| | SECTOR 14 | |
| | SECTOR 15 | |
| | SECTOR 16 | |
| | SECTOR 17 | |
| | SECTOR 18 | |
| | SECTOR 19 | |
| CLUSTER 1 | SECTOR 20 | |
| | SECTOR 21 | |
| | SECTOR 22 | |
| | SECTOR 23 | |
| | SECTOR 24 | |
| | SECTOR 25 | |
| | SECTOR 26 | |
| | SECTOR 27 | |
| CLUSTER 2 | SECTOR 28 | |
| | SECTOR 29 | |
| | SECTOR 30 | |
| | SECTOR 31 | |
| | SECTOR 32 | |
| | SECTOR 33 | |
| | SECTOR 34 | |
| | SECTOR 35 | |
| CLUSTER 3 | | |
| ⋮ | ⋮ | |
| CLUSTER N | | |
| | SECTOR Z | |

F I G. 1 4
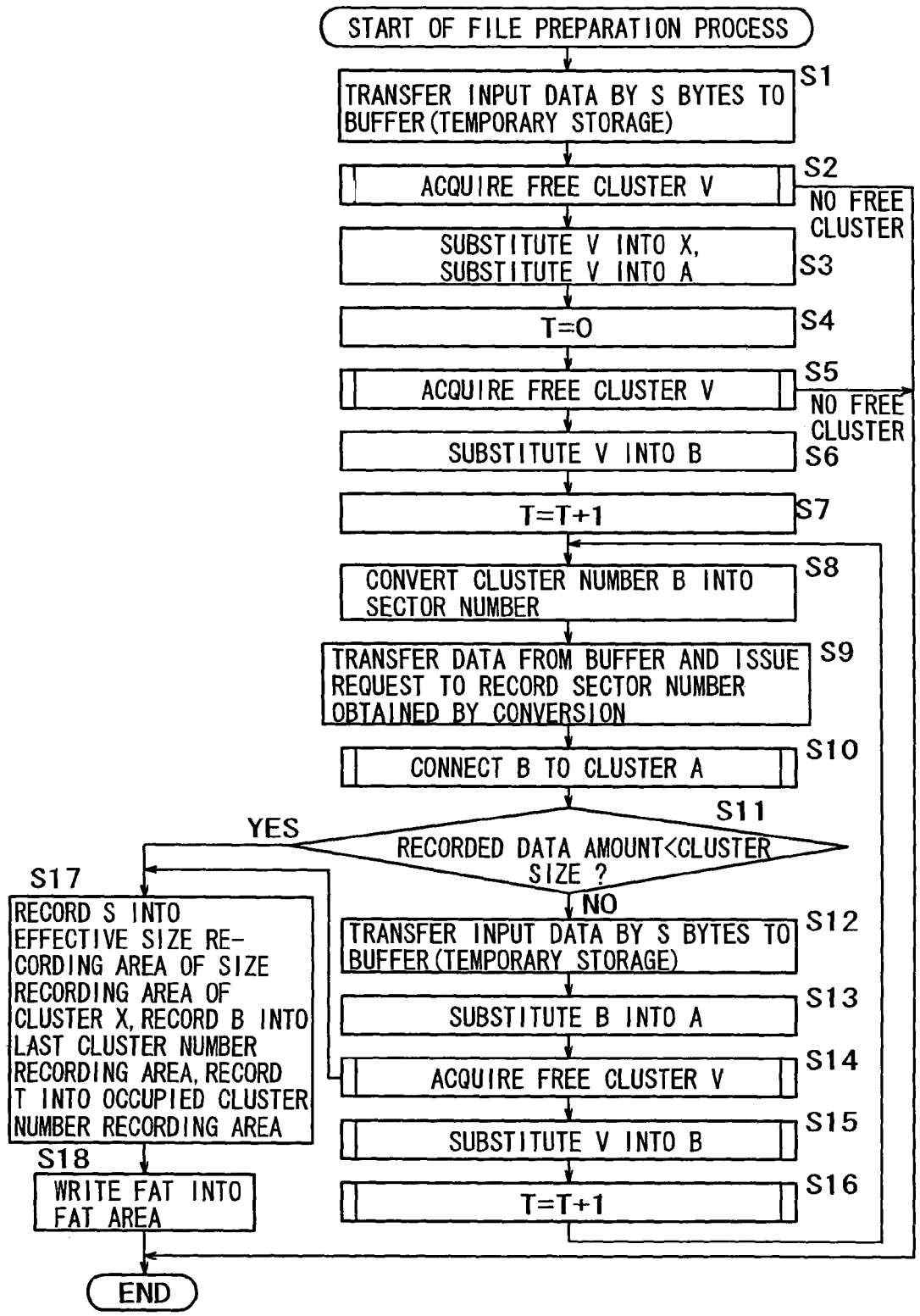

BASIC OBJECT FIRST TYPE

BASIC OBJECT SECOND TYPE

FIG. 39

FOLDER LIST OBJECT FORMAT

| NAME | SIZE | SIGNIFICANCE |
|---|---|---|
| OID | 4 BYTES | ID OF THIS OBJECT |
| MAX | 4 BYTES | MAXIMUM NUMBER OF FOLDERS (=100) |
| N | 4 BYTES | FOLDER NUMBER AT PRESENT |
| Folder (1-100) | 4*100 (400) BYTES | ARRAY OF IDs OF FOLDER OBJECT |
| Reserve | 612 BYTES | |

FIG. 40

| FOLDER OBJECT FORMAT | | |
|---|---|---|
| NAME | SIZE | SIGNIFICANCE |
| OID | 4 BYTES | ID OF THIS OBJECT |
| MAX | 4 BYTES | MAXIMUM NUMBER OF FOLDERS (=200) |
| N | 4 BYTES | ALBUM NUMBER AT PRESENT |
| Album(1-200) | 4*200(800) BYTES | ARRAY OF IDs OF ALBUM OBJECTS |
| Title | 36 BYTES | FOLDER NAME, CHARACTER CODE |
| Reserve | 176 BYTES | |

FIG. 41

| NAME | ALBUM OBJECT FORMAT | |
|---|---|---|
| | SIZE | SIGNIFICANCE |
| OID | 4 BYTES | ID OF THIS OBJECT |
| MAX | 4 BYTES | MAXIMUM NUMBER OF TRACKS (=400) |
| N | 4 BYTES | TRACK NUMBER IN ALBUM |
| Track(1-400) | 4*400 (1600) BYTES | ARRAY OF IDs OF TUNE OBJECT |
| Title | 516 BYTES | TITLE NAME, CHARACTER CODE |
| Artist | 260 BYTES | ARTIST NAME, CHARACTER CODE |
| CreationData | 8 BYTES | PREPARATION DATE |
| MEDIUM KEY | 32 BYTES | MEDIUM KEY OF CD |
| Reserve | 1660 BYTES | |

FIG. 42

| TRACK OBJECT FORMAT | | |
|---|---|---|
| NAME | SIZE | SIGNIFICANCE |
| OID | 4 BYTES | ID OF THIS OBJECT |
| SOID | 4 BYTES | FILE IDENTIFIER OF CONTENTS DATA TO BE LINKED |
| Title | 516 BYTES | TUNE TITLE, CHARACTER CODE |
| Artist | 260 BYTES | ARTIST NAME, CHARACTER CODE |
| Time | 8 BYTES | REPRODUCTION TIME |
| LastAccessDate | 8 BYTES | LAST ACCESS DATE AND HOUR |
| PC | 4 BYTES | REPRODUCTION TIME NUMBER COUNTER |
| CreationDate | 8 BYTES | PREPARATION DATE AND HOUR |
| Reserve | 980 BYTES | RESERVED (0x00 FIXED) |
| AC | 12544 BYTES | TUNE ATTRIBUTE AND REPRODUCTION CONTROL INFORMATION |

FIG. 43

| NAME | SIZE | AG SIGNIFICANCE |
|---|---|---|
| Ckey | 8 BYTES | CONTENTS KEY |
| Codec | 1 BYTE | CODEC IDENTIFICATION VALUE |
| CodecAttr | 1 BYTE | CODEC ATTRIBUTE |
| LT | 1 BYTE | REPRODUCTION LIMITATION INFORMATION |
| VLD | 1 BYTE | VALIDITY CHECKING FLAG |
| LCMLOGNUM | 1 BYTE | NUMBER OF CHECKOUT DESTINATIONS |
| Reserve | 7 BYTES | |
| CDI | 16 BYTES | CODEC DEPENDENCY INFORMATION |
| CID | 20 BYTES | CONTENTS SERIAL NUMBER |
| PBS | 8 BYTES | REPRODUCTION PERMISSION STARTING DATE AND HOUR |
| PBE | 8 BYTES | REPRODUCTION PERMISSION ENDING DATE AND HOUR |
| XCC | 1 BYTE | EXPANDED CC |
| CT | 1 BYTE | RESIDUAL OF REPRODUCTION TIME NUMBER |
| CC | 1 BYTE | CONTENTS CONTROL |
| CN | 1 BYTE | REMAINING TIME NUMBER OF CHECKOUT |
| SRC | 40 BYTES | SOURCE INFORMATION |
| LCMLOG | 48*256 BYTES | INFORMATION OF CHECKOUT DESTINATION |
| Reserve | 140 BYTES | |

FIG. 44

| NAME | SIZE | CONTENTS DATA FORMAT SIGNIFICANCE |
|---|---|---|
| AT3H | 16KB | ATARC3 HEADER |
| PRT | 16KB | ATARC3 PART |
| RSV | 32KB | RESERVED |
| AT3SU-1 | 16KB | SOUND UNIT STRING |
| AT3SU-2 | 16KB | SOUND UNIT STRING |
| ⋮ | ⋮ | ⋮ |
| AT3SU-N | 16KB | SOUND UNIT STRING |

FIG. 45

| CC OBJECT FORMAT | | |
|---|---|---|
| NAME | SIZE | SIGNIFICANCE |
| OID | 4 BYTES | ID OF THIS CC OBJECT |
| SOID | 4 BYTES | ID OF STREAM OBJECT TO BE LINKED |
| Reserved | 16 BYTES | |

FIG. 46

| CC DATA FORMAT | | |
|---|---|---|
| NAME | SIZE | SIGNIFICANCE |
| CatFolder | 10KB | CatFolder |
| CatAlbum | 200KB | CatAlbum |
| CatTrack | 600KB | CatTrack |

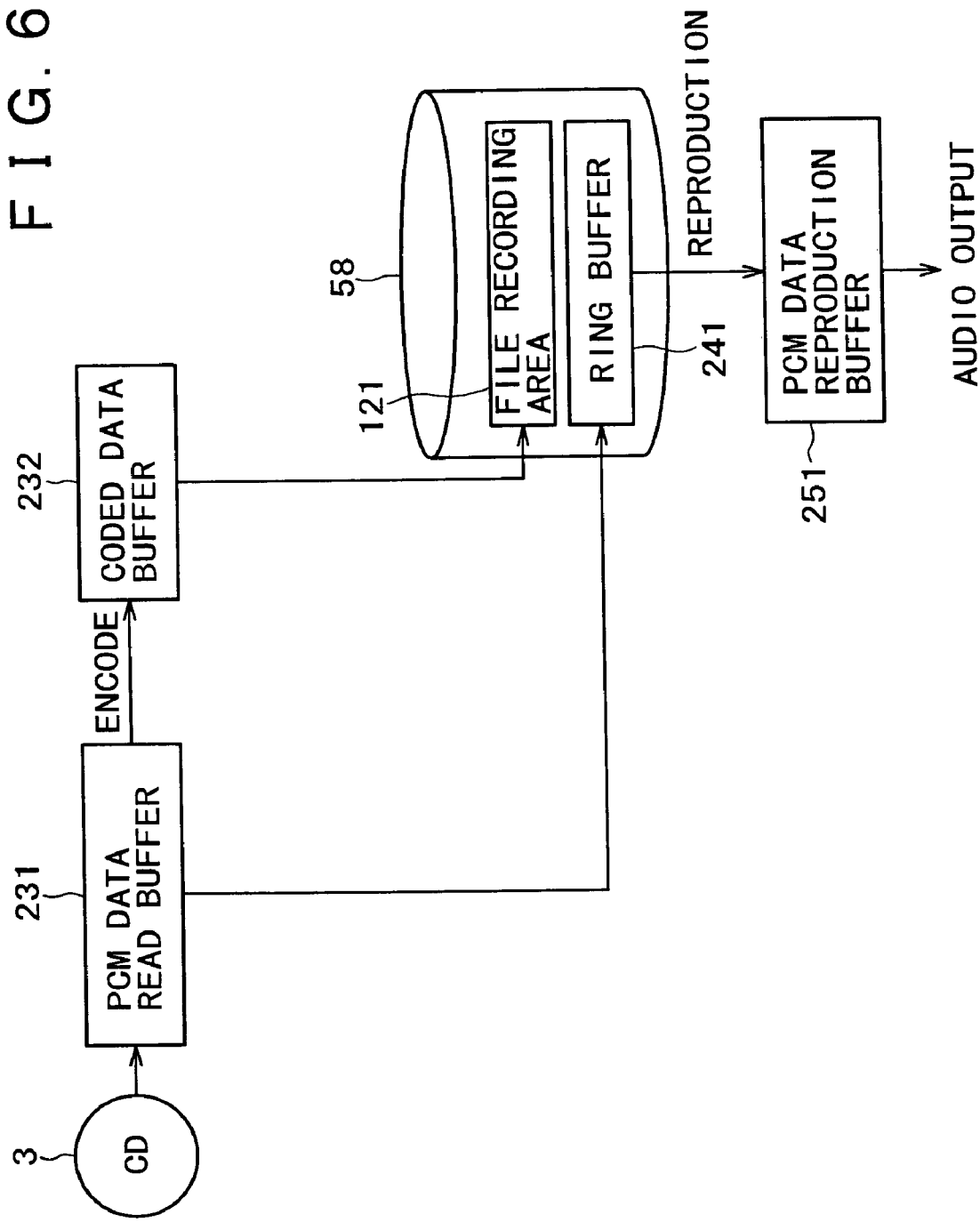

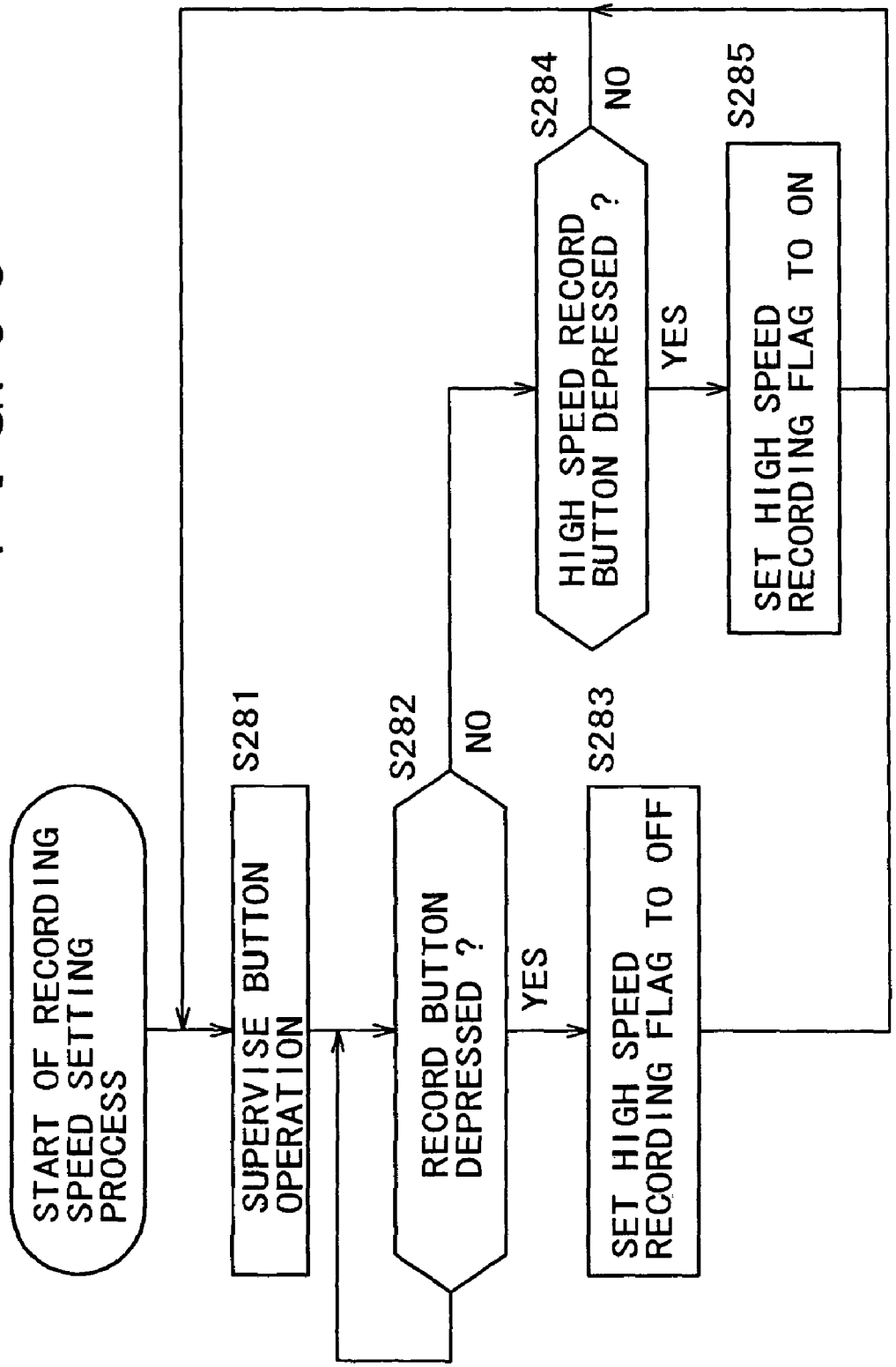

F I G. 6 4
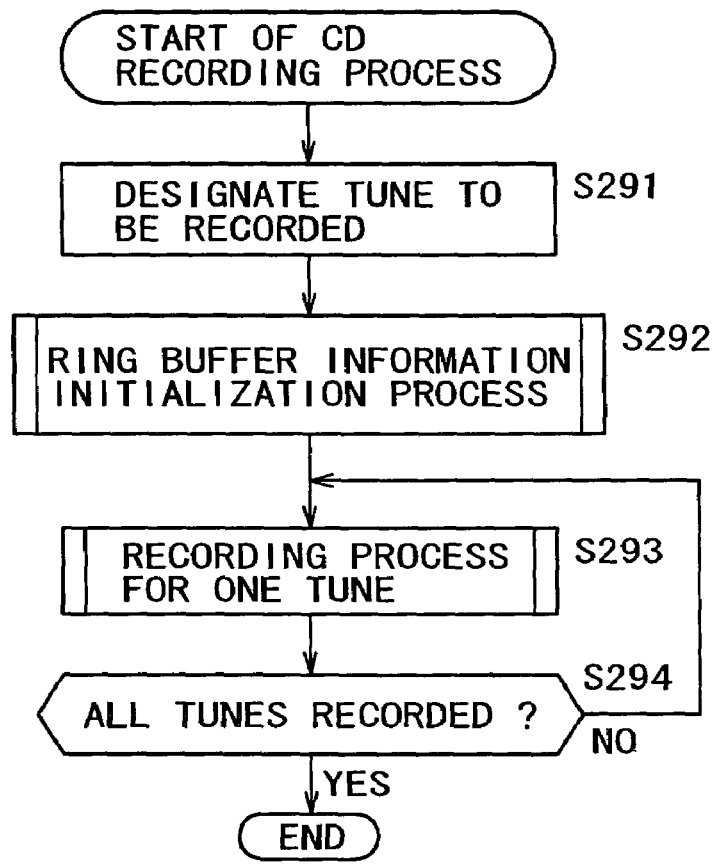
F I G. 6 5
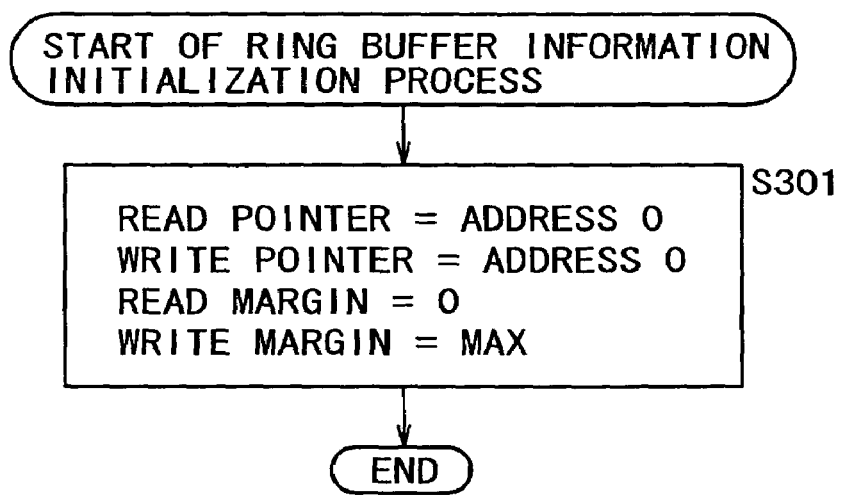

FIG. 72

| | FOLDER NUMBER | ALBUM NUMBER | TRACK NUMBER |
|---|---|---|---|
| ENTIRE HDD | F1 | A1 | T1 |
| | | | T2 |
| | | | ... |
| | | A2 | T1 |
| | | | T2 |
| | | | ... |
| | | | |
| | F2 | A1 | T1 |
| | | | T2 |
| | | | ... |
| | | | |
| | | | |
| | Fn | A1 | T1 |
| | | | T2 |
| | | | ... |
| | | | |
| | | Am | T1 |
| | | | T2 |
| | | | ... |

FIG. 73

| FOLDER NUMBER | ALBUM NUMBER | TRACK NUMBER |
|---|---|---|
| F1 | A1 | T1 |
| | | T2 |
| | | ... |
| | A2 | T1 |
| | | T2 |
| | | ... |
| | | |
| | Am | T1 |
| | | T2 |
| | | ... |

FIG. 74

| FOLDER NUMBER | ALBUM NUMBER | TRACK NUMBER |
|---|---|---|
| F1 | A1 | T1 |
| F1 | A1 | T2 |
| ⋮ | ⋮ | ⋮ |
| F1 | A1 | Tn |

FIG. 75

| FOLDER NUMBER | ALBUM NUMBER | TRACK NUMBER |
|---|---|---|
| F2 | A1 | T1 |

F I G. 7 8
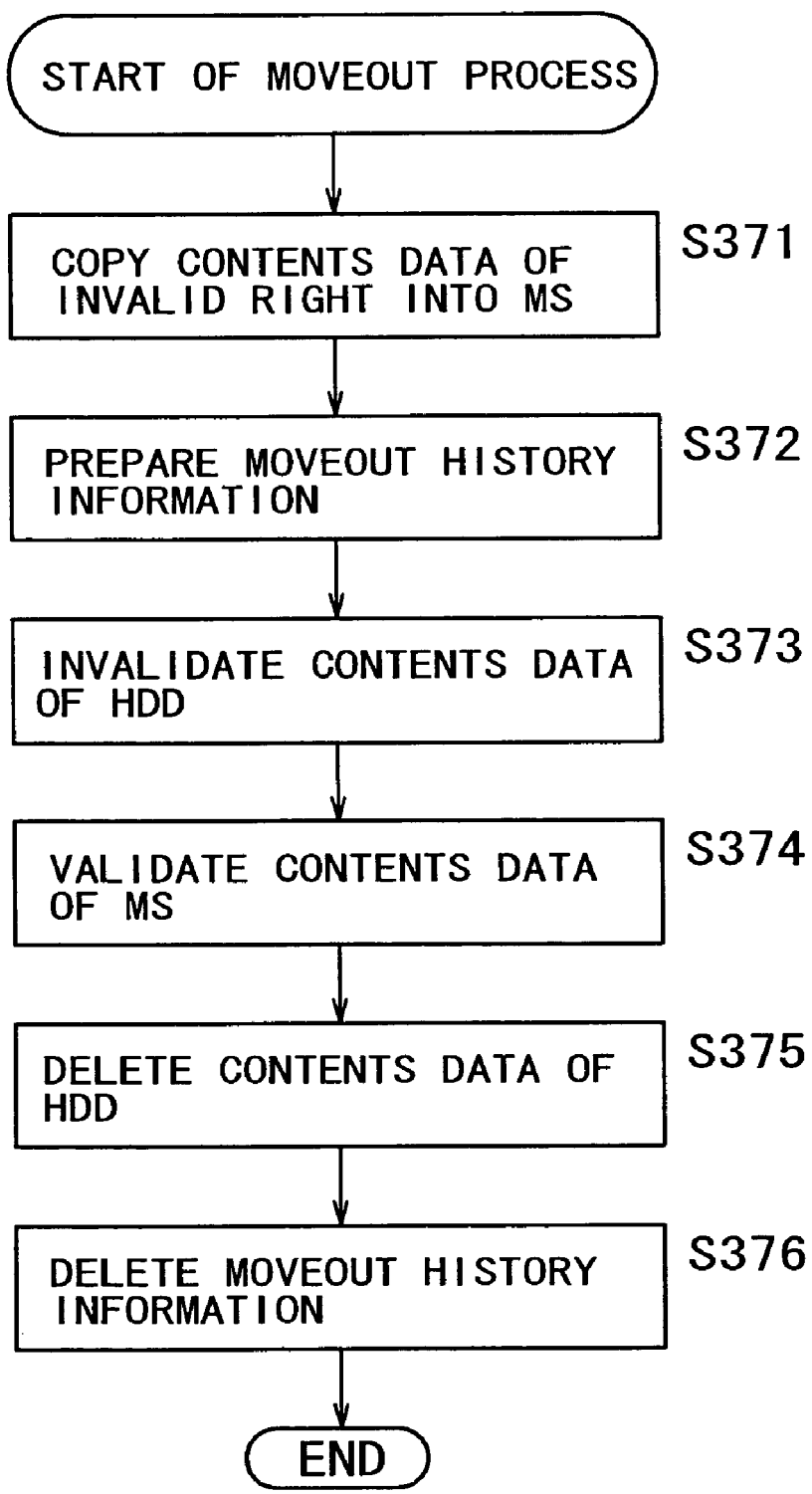

FIG. 79

| MEDIUM | HDD → | MS |
|---|---|---|
| STATE 1 | ● | |
| STATE 2 | ● | ○ |
| STATE 3 | ○ | ○ |
| STATE 4 | ○ | ● |
| STATE 5 | | ○ |

FIG. 80

```
  ◉ IMPRESSIONS
▶ ♫ 001 STOP THE QUARREL     04:34
  ♫ 004 ME TOMORROW/TAKE     04:54
  ♫ 006 MERSEY BEAT          03:22
  ♫ 007 Forever F            04:24
  ⌕  MOVEOUT            ♫ 000
```

FIG. 81

```
              MOVEOUT LIST
292 — ✓ ♫ 004 NO GOOD/NAGA
      ✓ ♫ 010 OnoricoFlow
      ▶ ♫ 012 WHEN YOU VELIE
291 —    MOVEOUT          ♫ 002/003
                                  |
                                 293
```

FIG. 83

| MEDIUM | HDD | ← | MS |
|---|---|---|---|
| STATE 11 | | | ○ |
| STATE 12 | ○ | | ○ |
| STATE 13 | ○ | | ○ |
| STATE 14 | ○ | | ○ |
| STATE 15 | ○ | | |

FIG. 84

```
┌─────────────────────────────────────────┐
│ ▮      ⊙ MEMORY STICK                   │
├─────────────────────────────────────────┤
│ ▶♪ 001  SWEETHEA        ▮  04:23        │
│  ♪ 004  MY ALL/M        ▮  04:52        │
│  ♪ 006  ALWAYS B        ▮  04:19        │
│  ♪ 007  ONE SWEE        ▮  04:42        │
├─────────────────────────────────────────┤
│ ⊘ MOVEIN                      ♪ 000     │
└─────────────────────────────────────────┘
```

FIG. 85

```
┌─────────────────────────────────────────┐
│ ▮         MOVEIN LIST                   │
├─────────────────────────────────────────┤
│ ∨♪ 001  SWEETHEART/Mar                  │
│ ∨♪ 006  ALWAYS BE MY B                  │
│ ▶♪ 012  ONE SWEET DAY/                  │
│                                         │
├─────────────────────────────────────────┤
│    MOVEOUT                  ♪ 002/003   │
└─────────────────────────────────────────┘
```

302 → (checkmarks at 001, 006)
301 → MOVEOUT
303 → 002/003

F I G. 9 2
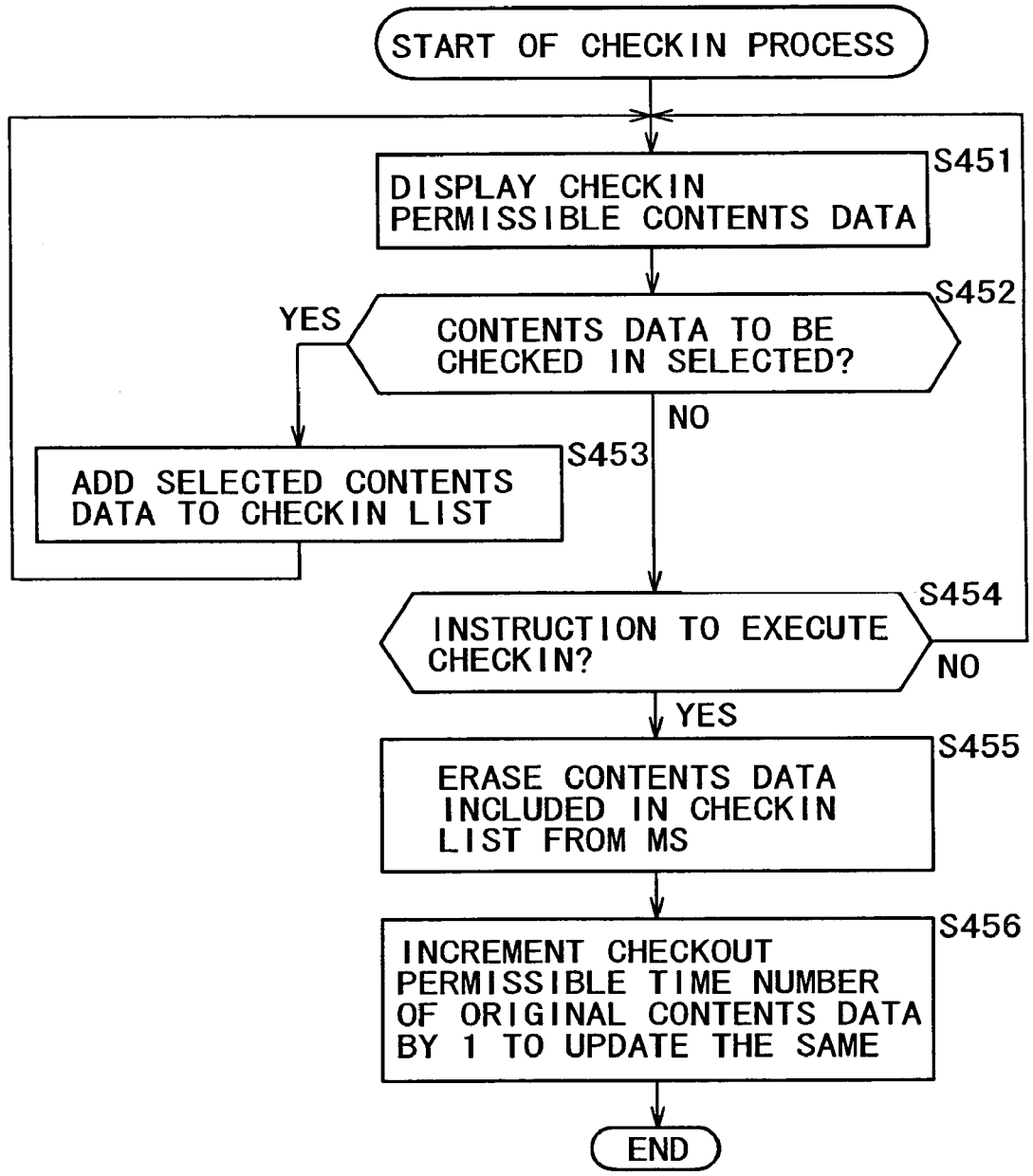

FIG. 95

```
381 ──┐  ┌──────── NOW CHECKIN ────────┐── 382
383 ──── × ♪ 001 Forever Friend
384 ──── ✓ ♪ 002 THE STORM OF LOVE/TAKEUCHI,MARIA
385 ──── ▶ ♪ 003 Please Again/TAKE
         ♪ 004 FANTASY/MARIH
         ├─────────────────────────────┤
         │ SKIP NO 001        ♪ 002/020 │
```

FIG. 96

```
391 ──┐  ┌──────── NOW CHECKOUT ───────┐── 392
         ✓ ♪ 001 STOP THE QUARREL/TAKEUCHI
         ✓ ♪ 002 THE STORM OF LOVE/TAKEUCHI,MARIA
         × ♪ 003 IN MERSEY BEAT/TAKE
         ▶ ♪ 004 FANTASY/MARIH
         ├─────────────────────────────┤
         │ SKIP NO 003        ♪ 003/015 │
```

FIG. 97

```
         ┌──────── CHECKOUT ───────────┐
         ✓ ♪ 012 THE PURE LOVE RHAPSODY/TAKEUCH,MA
         ✓ ♪ 013 LINDA/TAKEUCHI,MARIA
         × ♪ 014 LET'S GO HOME/TAKEUCHI,MARIA
         ✓ ♪ 015 STATION/TAKEUCHI,MARIA
         ├─────────────────────────────┤
401 ──── │ COMPLETE!          ♪ 013/015 │
```

FIG. 99

| DIRECTORY (FILE NAME) | APPLICATION |
|---|---|
| MEMSTICK.ind | FILE INDICATING THAT THE PERTAINING RECORDING MEDIUM IS A MEMORY STICK |
| DCIM | STILL PICTURE FILE STORAGE DIRECTORY |
| VOICE | VOICE FILE STORAGE DIRECTORY |
| HIFI | AUDIO FILE STORAGE DIRECTORY |
| CONTROL | CONTROL INFORMATION STORAGE DIRECTORY |
| TEL | TELEPHONE AND FACSIMILE INFORMATION FILE STORAGE DIRECTORY |
| OPEN-R | ENTERTAINMENT ROBOT INFORMATION FILE STORAGE DIRECTORY |
| POSITION | POSITION INFORMATION FILE STORAGE DIRECTORY |
| PALM | Palm OS DATA FILE STORAGE DIRECTORY |
| MP3 | MP3 FILE STORAGE DIRECTORY |
| MSXXXXXX | VENDOR PECULIAR INFORMATION FILE STORAGE DIRECTORY |

| | | | |
|---|---|---|---|
| 541 | | RESTORE LIST | 542 |
| | ▣ 001 | 2001/01/12 | 12MB — 543 |
| 544 | ▶▣ 002 | 2001/08/11 | 8MB |
| | 🗨 003 | 2001/09 | 1MB |
| | 🗨 004 | 2001/09/09 | 6MB |

RECORDING APPARATUS, RECORDING METHOD, STORAGE MEDIUM, PROGRAM AND COMMUNICATION APPARATUS

TECHNICAL FIELD

The present invention relates to a recording apparatus and method as well as a communication apparatus, and more particularly to a recording apparatus and method as well as a communication apparatus suitable for use where stored contents data of, for example, music tunes are supplied to a semiconductor memory or a portable device.

BACKGROUND ART

Contents data of music and so forth are present with regard to which the number of duplicates that can be produced is limited from the point of view of protection of the copyright.

If disconnection of power supply or removal of a recording medium occurs during a process of movement of such contents data between different recording media, the contents data may possibly remain in both of the movement source side recording medium and the movement destination side recording medium. Accordingly, there is a subject that, if an ill-minded user intentionally causes disconnection of power supply or removal of a recording medium to occur, then there is the possibility that a copy of the contents data may be produced illegally.

DISCLOSURE OF THE INVENTION

The present invention has been made taking such a situation as described above into consideration, and it is an object of the present invention to make it possible to prevent production of an illegal duplicate of contents data by intentional disconnection of power supply or intentional removal of a recording medium.

A first recording apparatus of the present invention is characterized in that it includes instruction means for issuing an instruction to move contents data from a first information storage medium to a second information storage medium, moving means for copying, in response to the instruction from the instruction means, the contents data recorded on the first information storage medium onto the second information storage medium and deleting the contents data recorded on the first information storage medium, and restoration means, operable when the series of processes by the moving means is interrupted, for substantially restoring the state before the series of processes by the moving means is executed or substantially completing the series of interrupted processes by the moving means.

The first information storage medium may be a built-in storage medium, and the second information storage medium may be an external storage medium.

The moving means may include copying means for copying the contents data which are recorded on the first information storage medium and whose reproduction is permitted as contents data whose reproduction is not permitted onto the second information storage medium, production means for producing history information which indicates a start of the series of processes after the copying by the copying means is completed, first changing means for changing the contents data recorded on the first information storage medium into contents data whose reproduction is not permitted, second changing means for changing the contents data copied on the second information storage medium by the copying means into contents data whose reproduction is permitted, erasure means for erasing the contents data recorded on the first information storage medium, and deletion means for deleting the history information produced by the production means.

Where the first information storage medium is the built-in storage medium, the restoration means may substantially restore, if the series of processes by the moving means is interrupted before the process of the first changing means is completed, the state before the series of processes by the moving means is executed, but the restoration means may complete, if the series of processes by the moving means is interrupted after the process of the second changing means is completed, the series of interrupted processes by the moving means.

When the process of the first changing means is completed and the process of the second changing means is not completed, the restoration means may delete the contents data recorded on the first information storage medium.

The first information storage medium may be an external storage medium, and the second information storage medium may be a built-in storage medium.

The moving means may include production means for producing history information which indicates a start of the series of processes, copying means for copying, after the history information is produced by the production means, the contents data which are recorded on the first information storage medium and whose reproduction is permitted as contents data whose reproduction is not permitted onto the second information storage medium, first changing means for changing the contents data recorded on the first information storage medium into contents data whose reproduction is not permitted, second changing means for changing the contents data copied on the second information storage medium by the copying means into contents data whose reproduction is permitted, erasure means for erasing the contents data recorded on the first information storage medium, and deletion means for deleting the history information produced by the production means.

Where the second information storage medium is the built-in storage medium, the restoration means may restore, if the series of processes by the moving means is interrupted before the process of the first changing means is completed, the state before the series of processes by the moving means is executed, but the restoration means may substantially complete, if the series of processes by the moving means is interrupted after the process of the second changing means is completed, the series of interrupted processes of the moving means.

When the process of the first changing means is completed and the process of the second changing means is not completed, the restoration means may delete the contents data recorded on the second information storage medium.

A first recording method of the present invention is characterized in that it includes an instruction step of issuing an instruction to move contents data from a first information storage medium to a second information storage medium, a moving step of copying, in response to the instruction issued by the process in the instruction step, the contents data recorded on the first information storage medium onto the second information storage medium and deleting the contents data recorded on the first information storage medium, and a restoration step of substantially restoring, when the process at the moving step is interrupted, the state before the process at the moving step is executed or substantially completing the interrupted process at the moving step.

A program of a first storage medium of the present invention is characterized in that it includes an instruction step of issuing an instruction to move contents data from a first information storage medium to a second information storage medium, a moving step of copying, in response to the instruction issued by the process at the instruction step, the contents data recorded on the first information storage medium onto the second information storage medium and deleting the contents data recorded on the first information storage medium, and a restoration step of substantially restoring, when the process at the moving step is interrupted, the state before the process at the moving step is executed or substantially completing the interrupted process at the moving step.

A first program of the present invention is characterized in that it causes a computer to execute an instruction step of issuing an instruction to move contents data from a first information storage medium to a second information storage medium, a moving step of copying, in response to the instruction issued by the process at the instruction step, the contents data recorded on the first information storage medium onto the second information storage medium and deleting the contents data recorded on the first information storage medium, and a restoration step of substantially restoring, when the process at the moving step is interrupted, the state before the process at the moving step is executed or substantially completing the interrupted process at the moving step.

A second recording apparatus of the present invention is characterized in that it includes instruction means for issuing an instruction to move contents data from a first information storage medium to a second information storage medium, moving means for copying, in response to the instruction from the instruction means, the contents data recorded on the first information storage medium onto the second information storage medium and deleting the contents data recorded on the first information storage medium, and restoration means, operable when the series of processes by the moving means is interrupted, for substantially restoring the state before the series of processes by the moving means is executed or substantially completing the series of interrupted processes by the moving means, and that the moving means includes copying means for copying the contents data which are recorded on the first information storage medium and whose reproduction is permitted as contents data whose reproduction is not permitted onto the second information storage medium, production means for producing history information which indicates a start of the series of processes after the copying by the copying means is completed, first changing means for changing the contents data recorded on the first information storage medium into contents data whose reproduction is not permitted, second changing means for changing the contents data copied on the second information storage medium by the copying means into contents data whose reproduction is permitted, erasure means for erasing the contents data recorded on the first information storage medium, and deletion means for deleting the history information produced by the production means.

The first information storage medium may be a built-in hard disk drive, and the second information storage medium may be a removable memory or a memory mounted in an electronic apparatus connected to the recording apparatus.

Where the first information storage medium is the hard disk, the restoration means may substantially restore, if the series of processes by the moving means is interrupted before the process of the first changing means is completed, the state before the series of processes by the moving means is executed, but the restoration means may complete, if the series of processes by the moving means is interrupted after the process of the second changing means is completed, the series of interrupted processes by the moving means.

When the process of the first changing means is completed and the process of the second changing means is not completed, the restoration means may delete the contents data recorded on the first information storage medium.

A third recording apparatus of the present invention is characterized in that it includes instruction means for issuing an instruction to move contents data from a first information storage medium to a second information storage medium, moving means for copying, in response to the instruction from the instruction means, the contents data recorded on the first information storage medium onto the second information storage medium and deleting the contents data recorded on the first information storage medium, and restoration means, operable when the series of processes by the moving means is interrupted, for substantially restoring the state before the series of processes by the moving means is executed or substantially completing the series of interrupted processes by the moving means, and that the moving means includes production means for producing history information which indicates a start of the series of processes, copying means for copying, after the history information is produced by the production means, the contents data which are recorded on the first information storage medium and whose reproduction is permitted as contents data whose reproduction is not permitted onto the second information storage medium, first changing means for changing the contents data recorded on the first information storage medium into contents data whose reproduction is not permitted, second changing means for changing the contents data copied on the second information storage medium by the copying means into contents data whose reproduction is permitted, erasure means for erasing the contents data recorded on the first information storage medium, and deletion means for deleting the history information produced by the production means.

The first information storage medium may be a removable memory or a memory mounted in an electronic apparatus connected to the recording apparatus, and the second information storage medium may be a built-in hard disk drive.

Where the second information storage medium is the hard disk, the restoration means may substantially restore, if the series of processes by the moving means is interrupted before the process of the first changing means is completed, the state before the series of processes by the moving means is executed, but the restoration means may complete, if the series of processes by the moving means is interrupted after the process of the second changing means is completed, the series of interrupted processes by the moving means.

When the process of the first changing means is completed and the process of the second changing means is not completed, the restoration means may delete the contents data recorded on the second information storage medium.

A fourth recording apparatus of the present invention is characterized in that it includes an instruction section for issuing an instruction to move contents data from a first information storage medium to a second information storage medium, a movement control section for copying, in response to the instruction from the instruction section, the contents data recorded on the first information storage medium onto the second information storage medium and deleting the contents data recorded on the first information storage medium, and a restoration control section operable, when the series of processes by the movement control section is interrupted, for substantially restoring the state before the series of processes by the movement control section is executed or substantially completing the series of interrupted processes by the movement control section.

The moving means may include a copy control section for copying the contents data which are recorded on the first information storage medium and whose reproduction is permitted as contents data whose reproduction is not permitted onto the second information storage medium, a production section for producing history information which indicates a start of the series of processes after the copying by the copy control section is completed, a first change control section for changing the contents data recorded on the first information storage medium into contents data whose reproduction is not permitted, a second change control section for changing the contents data copied on the second information storage medium by the copy control section into contents data whose reproduction is permitted, an erasure control section for erasing the contents data recorded on the first information storage medium, and a deletion control section for deleting the history information produced by the production section.

Where the first information storage medium is a built-in hard disk, the restoration control section may substantially restore, if the series of processes by the movement control section is interrupted before the process of the first change control section is completed, the state before the series of processes by the movement control section is executed, but the restoration control section may complete, if the series of processes by the movement control section is interrupted after the process of the second change control section is completed, the series of interrupted processes by the movement control section.

When the process of the first change control section is completed and the process of the second change control section is not completed, the restoration control section may delete the contents data recorded on the first information storage medium.

The moving means may include a production section for producing history information which indicates a start of the series of processes, a copy control section for copying, after the history information is produced by the production section, the contents data which are recorded on the first information storage medium and whose reproduction is permitted as contents data whose reproduction is not permitted onto the second information storage medium, a first change control section for changing the contents data recorded on the first information storage medium into contents data whose reproduction is not permitted, a second change control section for changing the contents data copied on the second information storage medium by the copy control section into contents data whose reproduction is permitted, an erasure control section for erasing the contents data recorded on the first information storage medium, and a deletion control section for deleting the history information produced by the production section.

Where the second information storage medium is a built-in hard disk drive, the restoration control section may restore, if the series of processes by the movement control section is interrupted before the process of the first change control section is completed, the state before the series of processes by the movement control section is executed, but the restoration control section may substantially complete, if the series of processes by the movement control section is interrupted after the process of the second change control section is completed, the series of interrupted processes of the movement control section.

When the process of the first change control section is completed and the process of the second change control section is not completed, the restoration control section may delete the contents data recorded on the second information storage medium.

A first communication apparatus of the present invention is characterized in that it includes a storage section capable of storing data therein, an attribute information storage section for storing attribute information of the data stored in the storage section, an instruction section for issuing an instruction to move the data stored in the storage section to the information storage medium, a movement control section, operable in response to the instruction, for transferring the data of the storage section and the attribute information corresponding to the data and including an invalidated reproduction permission flag to the information storage medium, registering history information indicating that the data are being moved, changing the reproduction permission flag of the attribute information corresponding to the data of the storage section from valid to invalid, changing the reproduction permission flag of the attribute information corresponding to the data of the information storage medium from invalid to valid, deleting the data of the storage section, and deleting the registered history information, and a restoration control section, operable when the moving process of the data by the movement control section is interrupted, for substantially returning the data of the storage section and the data of the information storage medium to those in a state before the movement control or after completion of the movement by the movement control section.

A second communication apparatus of the present invention is characterized in that it includes a storage section capable of storing data therein, an attribute information storage section for storing attribute information of the data stored in the storage section, an instruction section for issuing an instruction to move the data stored in the information storage medium to the storage section, a movement control section, operable in response to the instruction, for registering history information indicating that the data are being moved, transferring the data of the information storage medium and the attribute information corresponding to the data and including an invalidated reproduction permission flag to the storage section, changing the reproduction permission flag of the attribute information corresponding to the data of the information storage medium from valid to invalid, changing the reproduction permission flag of the attribute information corresponding to the data of the storage section from invalid to valid, deleting the data of the storage medium, and deleting the registered history information, and a restoration control section, operable when the moving process of the data by the movement control section is interrupted, for substantially returning the data of the storage section and the data of the information storage medium to those in a state before the movement control or after completion of the movement by the movement control section.

In the first recording apparatus and method as well as the program, in response to an instruction to move contents data from the first information storage medium to the second information storage medium, the contents data recorded in the first information storage medium are copied onto the second information storage medium, and then the contents data recorded on the first information storage medium are erased. If the moving process is interrupted, then either the state before the moving process is executed is restored substantially or the interrupted moving process is completed substantially.

In the second recording apparatus of the present invention, in response to an instruction to move contents data from the first information storage medium to the second information storage medium, the contents data recorded on the first information storage medium are copied onto the second information storage medium, and then the contents data recorded on the first information storage medium are erased. If the series of moving processes is interrupted, then either the state before the series of moving processes is executed is restored substantially or the series of interrupted moving processes is completed substantially. In the moving process, the contents data which are recorded on the first information storage medium and whose reproduction is permitted are copied as contents data whose reproduction is not permitted onto the second information storage medium, and then, after the copying is completed, history information which indicates a start of the series of processes is produced. Then, the contents data recorded on the first information storage medium are changed into contents data whose reproduction is not permitted, and the contents data copied on the second information storage medium is changed into contents data whose reproduction is permitted. Thereafter, the contents data recorded on the first information storage medium are erased, and the history information produced is deleted.

In the third recording apparatus of the present invention, in response to an instruction to move contents data from the first information storage medium to the second information storage medium, the contents data recorded on the first information storage medium are copied onto the second information storage medium, and then the contents data recorded on the first information storage medium are erased. If the series of moving processes is interrupted, then either the state before the series of moving processes is executed is restored substantially or the series of interrupted moving processes is completed substantially. In the moving process, history information which indicates a start of the series of processes is produced, and the contents data which are recorded on the first information storage medium and whose reproduction is permitted are copied as contents data whose reproduction is not permitted onto the second information storage medium. Then, the contents data recorded on the first information storage medium are changed into contents data whose reproduction is not permitted, and the contents data copied on the second information storage medium are changed into contents data whose reproduction is permitted. Further, the contents data recorded on the first information storage medium are erased, and the history information produced is deleted.

In the fourth recording apparatus of the present invention, in response to an instruction to move contents data from the first information storage medium to the second information storage medium, the contents data recorded on the first information storage medium are copied onto the second information storage medium, and then the contents data recorded on the first information storage medium are erased. If the series of moving processes is interrupted, then either the state before the series of moving processes is executed is restored substantially or the series of interrupted moving processes is completed substantially.

In the first communication apparatus of the present invention, in response to an instruction to move data stored in the storage section to the information storage medium, the data of the storage section and the attribute information corresponding to the data and including an invalidated reproduction permission flag are transferred to the information storage medium, and history information indicating that the data are being moved is registered. Then, the reproduction permission flag of the attribute information corresponding to the data of the storage section is changed from valid to invalid, and the reproduction permission flag of the attribute information corresponding to the data of the information storage medium is changed from invalid to valid. Thereafter, the data of the storage section are deleted, and the registered history information is deleted. When the series of data moving processes is interrupted, the data of the storage section and the data of the information storage medium are returned substantially to those in a state before the movement control or after completion of the movement.

In the second communication apparatus of the present invention, in response to an instruction to move data stored in the information storage medium to the storage section, history information indicating that the data are being moved is registered, and the data of the information storage medium and attribute information corresponding to the data and including an invalidated reproduction permission flag is transferred to the storage section. Then, the reproduction permission flag of the attribute information corresponding to the data of the information storage medium is changed from valid to invalid, and the reproduction permission flag of the attribute information corresponding to the data of the storage section is changed from invalid to valid. Thereafter, the data of the storage medium are deleted, and the registered history information is deleted. When the series of moving processes of the data is interrupted, the data of the storage section and the data of the information storage medium are returned substantially to those in a state before the movement control or after completion of the movement.

BRIEF DESCRIPTION OF DRAWINGS

FIG. 1 is a view showing an outline of an audio server 1 according to an embodiment of the present invention;

FIG. 9 is a view showing a logic structure of a file recording area 121;

FIG. 14 is a flow chart illustrating a file preparation process;

FIG. 39 is a view showing a format of a folder list object;

FIG. 40 is a view showing a format of a folder object;

FIG. 41 is a view showing a format of an album object;

FIG. 42 is a view showing a format of a track object;

FIG. 43 is a view showing details of an AC of the track object;

FIG. 44 is a view showing a format of contents data;

FIG. 45 is a view showing a format of a CC object;

FIG. 46 is a view showing a format of CC data;

FIG. 62 is a view illustrating a flow of data between the buffers upon CD ripping;

FIG. 63 is a flow chart illustrating a recording speed setting process;

FIG. 64 is a flow chart illustrating a CD recording process;

FIG. 65 is a flow chart illustrating a ring buffer information initialization process;

FIG. 72 is a view showing an example of a play list;

FIG. 73 is a view showing another example of the play list;

FIG. 74 is a view showing further example of the play list;

FIG. 75 is a view showing a still further example of the play list;

FIG. 78 is a flow chart illustrating a moveout process;

FIG. 79 is a view showing a state transition of the moveout process;

FIG. 80 is a view showing an example of display of the display unit 15 in the moveout process;

FIG. 81 is a view showing another example of display of the display unit 15 in the moveout process;

FIG. 83 is a view showing a state transition of the movein process;

FIG. 84 is a view showing an example of display of the display unit 15 in the movein process;

FIG. 85 is a view showing another example of display of the display unit 15 in the movein process;

FIG. 92 is a flow chart illustrating a checkin process;

FIG. 95 is a view showing an example of display of the display unit 15 in the exchange process;

FIG. 96 is a view showing another example of display of the display unit 15 in the exchange process;

FIG. 97 is a view showing a further example of display of the display unit 15 in the exchange process;

FIG. 99 is a view showing types of directories and files recorded in an MS 4;

BEST MODE FOR CARRYING OUT THE INVENTION

Figure 2:
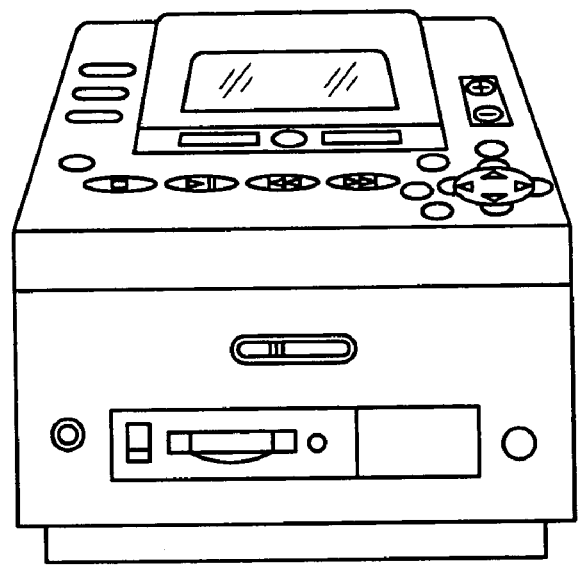
FIG. 2 is a view showing an appearance of the audio server 1.

In the following, an outline of an audio server according to an embodiment of the present invention is described with reference to FIG. 1. The audio server 1 reads out PCM (Pulse Code Modulation) data recorded on a music CD 3, and encodes the read out data in accordance with the ATRAC (Adaptive Transform Acoustic Coding) 3 system. The audio server 1 records the encoded data obtained by the process into a hard disk drive 58 (FIG. 6), and manages the recorded encoded data in a matched relationship with objects which form a hierarchical structure including a folder list, a folder, an album, a track and so forth from the higher hierarchy side.

A folder list can include a plurality of folders positioned in a hierarchy lower by one. A folder can include a plurality of albums positioned in a hierarchy lower by one. An album can include a plurality of tracks positioned in a hierarchy lower by one. A track positioned in the lowest hierarchy of the hierarchical structure corresponds in a one-by-one relationship to the encoded data for one tune.

The encoded data is hereinafter referred to also as contents data. Each of the folder list, folders, albums and tracks is hereinafter referred to also as object. The user designates an object and issues several commands. It is to be noted that details of the hierarchical structure of the objects are hereinafter described with reference to FIG. 38.

Further, the audio server 1 reproduces the music CD 3 or decodes encoded data recorded in the hard disk drive (hereinafter referred to as HDD) 58 and outputs a resulting sound signal from a speaker 2.

Further, the audio server 1 records coded data recorded in the HDD 58 into a memory stick (trademark) (hereinafter referred to as MS) 4 ready for a magic gate (trademark) inserted in an MS slot 45 (FIG. 5) or a portable device (hereinafter referred to as PD) 5 such as a network walkman (trademark) connected to a connector 43 (FIG. 5) by a checkout process or a moveout process, and records coded data recorded in the MS 4 or the PD 5 into the HDD 58 by a checkin process, a movein process or an import process.

Here, the magic gate is a technique for protecting the copyright of data with two techniques which are encryption of data to be recorded into the MS 4 ready for the magic gate and mutual authentication of the audio server 1 used with the MS 4 inserted therein, and can prevent illegal copying, illegal reproduction and illegal falsification of digital audio data. The magic gate conforms with the SDMI (Secure Digital Music Initiative) standard.

It is to be noted that the checkout process, checkin process, moveout process, movein process and import process between the audio server 1 and the MS 4 or the PD 5 are hereinafter described.

The MS 4 in which coded data are recorded is removed from the audio server 1 and loaded into, for example, a personal computer 6, by which the coded data recorded thereon are read out and decoded.

The PD 5 in which the encoded data are recorded decodes the coded data and outputs a resulting sound signal from a headphone.

A remote controller 7 receives an operation from the user and transmits a corresponding control signal to the audio server 1.

Figure 3:
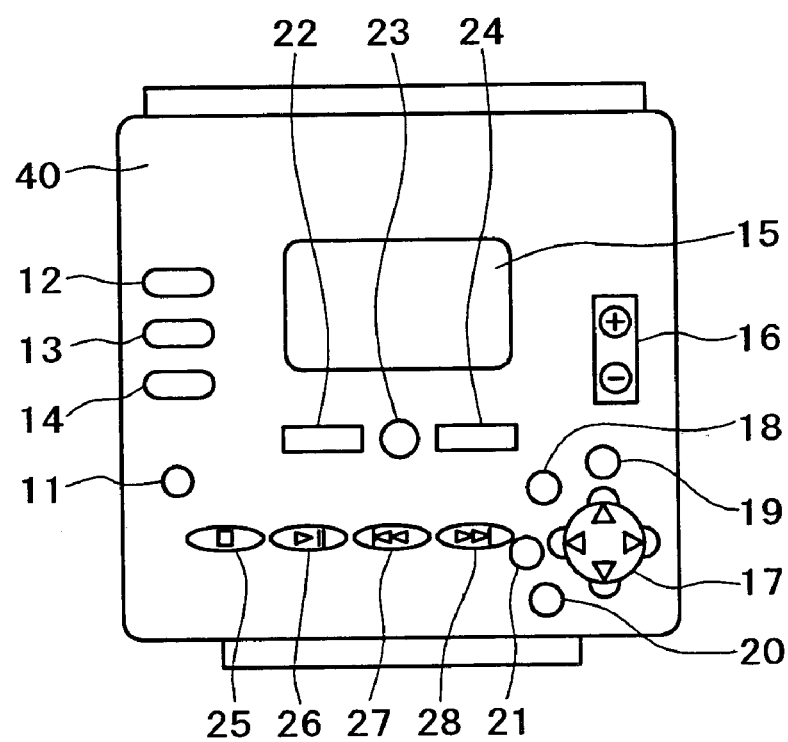
FIG. 3 is a top plan view of the audio server 1.
Figure 4:
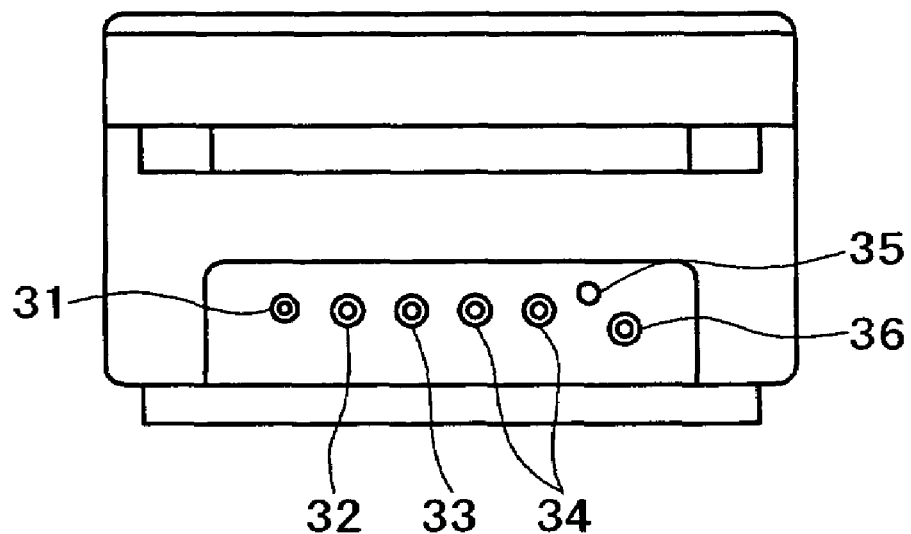
FIG. 4 is a rear elevational view of the audio server 1.
Figure 5:
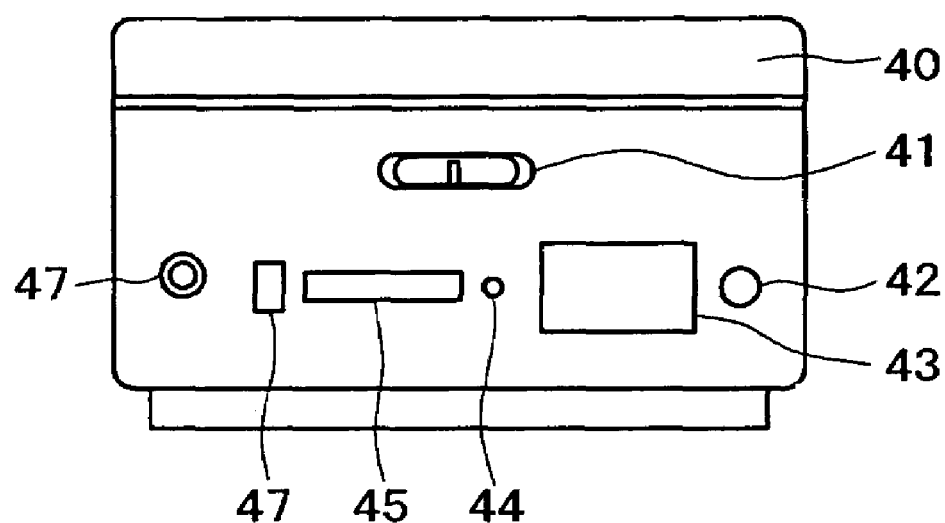
FIG. 5 is a front elevational view of the audio server 1.

Now, an appearance of the audio server 1 is described with reference to FIGS. 2 to 5. FIG. 2 is a view of an appearance of the audio server 1 as viewed from a front upward position. FIG. 3 is a top plan view of the audio server 1. FIG. 4 is a rear elevational view of the audio server 1. FIG. 5 is a front elevational view of the audio server 1.

A lid 40 for a CD tray (not shown) for receiving a CD is provided on a top face of the audio server 1. As shown in FIG. 3, not only buttons such as a power button 11 but also a display unit 15 for displaying several kinds of information are disposed on the lid 40. The power (POWER) button 11 is operated to switch on/off the power supply to the audio server 1. A function (FUNCTION) button 12 is operated to select any one of the music CD 3, the HDD 58, an AUX input terminal 31, the MS 4 and the PD 5 as a sound source.

A play mode (PLAY MODE) button 13 is operated to change a reproduction mode to normal reproduction wherein all tracks included in a reproduction area are reproduced successively once, all tune repeat reproduction wherein all tracks included in the reproduction area are repeatedly reproduced successively, one tune repeat reproduction wherein only one track is reproduced repeatedly, random repeat reproduction wherein random selection and reproduction are performed repeatedly from among all tracks included in the reproduction area, or slot machine reproduction wherein display of an animation which indicates a manner wherein a track is selected at random from among all tracks included in the entire HDD and reproduction of the selected track are repeated. It is to be noted that the reproduction area is hereinafter described with reference to FIG. 71.

A display (DISPLAY) button 14 is operated to change display contents of the display unit 15. The display unit 15 formed from an LCD (Liquid Crystal Display) unit displays information relating to an operation situation or audio data.

A volume (VOLUME) button 16 is operated to increase or decrease the volume of sound to be outputted. A cursor button 17 is operated to move a cursor displayed on the display unit 15. A select (SELECT) button 18 is operated to select an object or the like indicated on the display unit 15 by the cursor displayed thereon and to change over the ascending order or the descending order upon searching. An erase (ERASE) button 19 is operated to erase an object such as a track.

An enter (ENTER) button 20 is operated to determine an object such as a displayed menu, a selected track or the like. A menu/cancel (MENU/CANCEL) button 21 is operated to display several kinds of operation menus provided hierarchically or cancel the display. An exchange (EXCHANGE) button 22 is operated to automatically perform a checkin process or a checkout process for the MS 4 or the PD 5.

A record (RECORD) button 23 is operated to record audio data of the music CD 3 into the HDD 58 while it is reproduced. A high speed record (HI SPEED RECORD) button 24 is operated to record audio data of the music CD 3 at a high-speed into the HDD 58. It is to be noted that, also in this case, sound of the audio data to be recorded is outputted from the speaker 2.

A stop button 25 is operated to stop reproduction or recording being executed. A reproduction/pause button 26 is operated to issue an instruction for starting of reproduction, reproduction pause or cancellation of such reproduction pause. A head search button 27 is operated to issue an instruction for a head search of a current track or a preceding track or an instruction for reverse reproduction. Another head search button 28 is operated to issue an instruction for a head search of a succeeding track or an instruction for fast reproduction.

It is to be noted that, though not shown, buttons having functions equivalent to the buttons such as the power button 11 disposed on the lid 40 are disposed on the remote controller 7.

As shown in FIG. 4, an AUX-in terminal 31, a lineout terminal 32, a sub woofer terminal 33, speaker (L, R) terminals 34, a reset button 35 and a DC-in terminal 36 are disposed on the rear face of the audio server 1.

The AUX-in terminal 31 allows connection thereto of an audio output apparatus (not shown) such that digital audio data or an analog sound signal can be received from the audio output apparatus connected thereto. The lineout terminal 32 allows connection thereto of an amplifier (not shown) or the like such that an analog sound signal can be outputted to the amplifier connected thereto. The sub woofer terminal 33 allows connection thereto of a sub woofer (not shown) such that a low-frequency component of a reproduced sound signal can be outputted to the sub woofer. The speaker (L, R) terminals 34 allow connection thereto of the speakers 2 such that reproduced sound signals can be outputted to the speakers 2 connected thereto. The reset button 35 is operated to reset the audio server 1. DC power from an AC power adapter (not shown) is supplied to the DC input terminal 36.

As shown in FIG. 5, an open lever 41, a light reception section 42, a connector 43, an access lamp 44, the MS slot 45, an ejection lever 46 and a headphone terminal 47 are disposed on the front face of the audio server 1. The open lever 41 is slidably operated to open the lid 40. The light reception section 42 receives a control signal transmitted from the remote controller 7. A USB (Universal Serial Bus) terminal is provided on the connector 43 such that the PD 5, an external HDD, a keyboard or the like can be connected to the connector 43 through an USB cable.

It is to be noted that an IEEE 1394 terminal may be provided on the connector 43 such that the PD 5 or the like may be connected to the connector 43 through an IEEE 1394 cable. Alternatively, a terminal for the Bluetooth (trademark) or the IEEE 802.11b (that is, a radio LAN) may be provided such that the PD 5 or the like may be connected by radio communication.

The access lamp 44 blinks when readout or writing of data is performed for the MS 4 inserted in the MS slot 45 or the PD 5 connected to the connector 43. The MS 4 is inserted into the MS slot 45. The ejection lever 46 is operated to eject the MS 4 inserted in the MS slot 45. A headphone can be connected to the headphone terminal 47 such that a reproduced sound signal can be outputted to the connected headphone.

Figure 6:
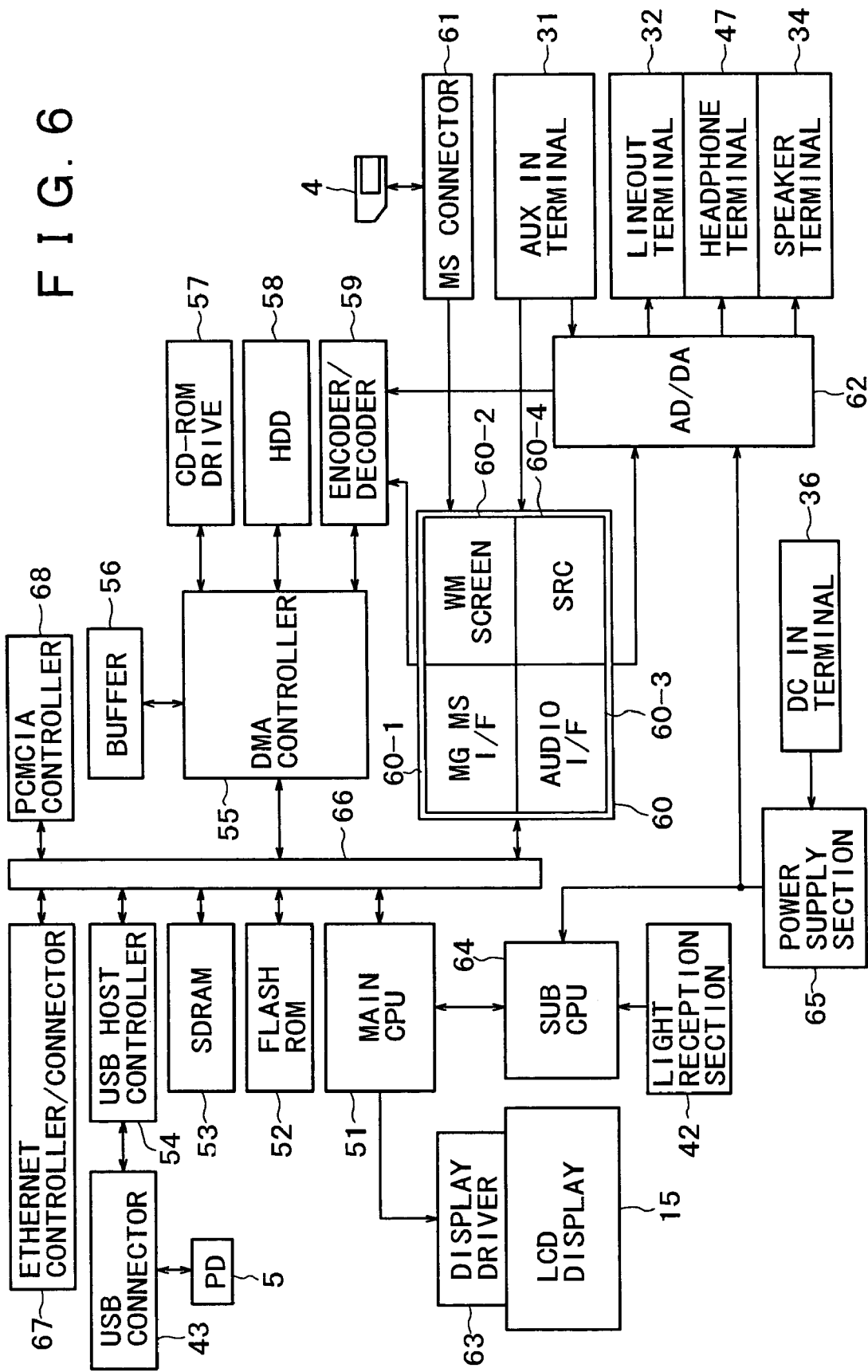
FIG. 6 is a block diagram showing an example of a hardware configuration of the audio server 1.

Now, an example of a hardware configuration of the audio server 1 is described with reference to FIG. 6. The audio server 1 has a built-in main CPU (Central Processing Unit) 51 for controlling the entire audio server 1. A flash ROM 52, an SDRAM 53, a USB host controller 54, a DMA controller 55, a signal processing section 60, an Ethernet (registered trademark) controller/connector 67 and a PCMCIA controller 68 are connected to the main CPU 51 through a bus 66.

An RTOS (Real Time Operating System) 71 (FIG. 7) with which, if the power supply is switched on, then startup is completed immediately by the main CPU 51, firmware (Firmware, hereinafter described with reference to FIG. 7) executed on the RTOS 71 in order to implement several kinds of functions, an apparatus ID, a cryptographic key and so forth are stored in the flash ROM 52.

The SDRAM (Synchronous Dynamic Random Access Memory) 53 temporarily stores predetermined data and programs when the main CPU 51 performs several kinds of processes. The USB host controller 54 controls data communication between the audio server 1 and the PD 5 or the like connected through the connector 43.

The DMA controller (Direct Memory Access) 55 controls data transfer between a buffer 56, a CD-ROM drive 57, the HDD 58 and an encoder/decoder 59. The buffer 56 formed from an SDRAM or the like temporarily buffers data whose transfer is controlled by the DMA controller 55. The CD-ROM drive 57 reads out audio data recorded on the music CD 3 at a CAV eightfold speed. The HDD 58 stores coded data produced by the encoder/decoder 59 and so forth.

The encoder/decoder 59 encodes PCM data read out by the CD-ROM drive 57 or audio data inputted from the AUX-in terminal 31 at a maximum eightfold speed, at an average fivefold speed, using the ATRAC 3 system of the 132 Kbps mode, 105 Kbps mode or 66 b Kbps mode to produce coded data. Further, the encoder/decoder 59 decodes coded data stored in the HDD 58. Furthermore, the encoder/decoder 59 has a DES (Data Encryption Standard) engine and encrypts coded data using a cryptographic key produced based on the apparatus ID of a predetermined part of the audio server 1 and the time.

For example, if the HDD 58 has a capacity of 9 gigabytes and the encoder/decoder 59 encodes in accordance with the ATRAC 3 system of the 105 Kbps mode, approximately 100 music CDs 3 (60 minutes/CD) can be recorded on the HDD 58.

The signal processing section 60 includes a magic gate memory stick interface (hereinafter referred to as MG MS I/F) 60-1, a watermark screen (hereinafter referred to as WM screen) 60-2, an audio I/F 60-3, and a sampling rate converter (hereinafter referred to as SRC) 60-4.

The MG MS I/F 60-1 performs mutual authentication with the MS 4 inserted in the MS slot 45 through an MS connector 61, and executes encryption of the data based on a result of the mutual authentication and decryption of encrypted data. The WM screen 60-2 detects a watermark (electronic watermark, information representative of permission or inhibition of copying or the like) of the SDMI standards embedded in audio data which pass the signal processing section 60.

The audio I/F 60-3 acquires digital audio data through the AUX-in terminal 31 and supplies the digital audio data to the SRC 60-4. Further, the audio I/F 60-3 suitably buffers digital audio data transferred thereto from the buffer 56 or the like into a buffer 251 (FIG. 62) built therein, and then outputs the buffered digital audio data to an AD/DA 62.

The SRC 60-4 converts the sampling rate of digital audio data from the audio I/F 60-3 into 44.1 KHz and outputs resulting data to the encoder/decoder 59.

It is to be noted that, though not shown, the signal processing section 60 further includes a built-in encoder/decoder of the ATRAC3 system which operates at an equal speed.

The MS connector 61 relays data communication between the MS 4 inserted and the MG MS I/F 60-1. The AD/DA 62 converts digital audio data inputted from the audio I/F 60-3 of the signal processing section 60 into an analog sound signal and outputs the analog sound signal to the lineout terminal 32, speaker terminals 34 or headphone terminal 47. Further, the AD/DA 62 converts an analog sound signal inputted thereto from the AUX-in terminal 31 into a digital signal and outputs the digital signal to the encoder/decoder 59.

The Ethernet controller/connector 67 controls data communication with some other electronic apparatus through an Ethernet (trademark). A PCMCIA (Personal Computer Memory Card International Association) controller 68 is equipped with an IC card interface of the PCMCIA standards.

A display driver 63 and a sub CPU 64 are connected to the main CPU 51. The display driver 63 controls display of the display unit 15. The sub CPU 64 executes control of a power supply section 65, reset control of the body, counting of a built-in clock, detection of an operation of the power button 11 or the like, control of the light reception section 42, control of the AD/DA 62 and so forth, especially when the power supply is off. The power supply section 65 converts a DC voltage supplied thereto from the DC-in terminal 36 into a predetermined voltage and supplies the predetermined voltage to the entire audio server 1.

Now, firmware which is read out from the flash ROM 52 and executed by the main CPU 51 in order to actually perform functions of the audio server 1 described below is described with reference to FIG. 7. It is to be noted that, while the functions of the audio server 1 include CD ripping, CD recording, HD recording (digital input), HD recording (analog input), HD play, CD play, MS play, checkout/checkin, import, moveout/movein and so forth, details of them and correspondence of them to the firmware are hereinafter described with reference to FIGS. 47 to 56.

The firmware includes four layers, that is, an application layer (APP) 72, an upper middleware layer (UMW) 73, a lower middleware layer (LMW) 74 and a device driver layer (DD) 75.

The application layer 72 includes modules of a main application (hereinafter referred to as main APP) 76, a hard disk application (hereinafter referred to as HD APP) 77, a CD application (hereinafter referred to as CD APP) 78, a memory stick application (hereinafter referred to as MS APP) 79, a portable device application (hereinafter referred to as PD APP) 80, and a kana-to-kanji conversion application (hereinafter referred to as FEP (Front End Processor)) 81.

Each of the modules of the application layer 72 issues, in response to an operation of the user which relates to a function that can be executed by the audio server 1, a request for a process to a corresponding module of the upper middleware layer 73 and controls the display of a situation of the processing to provide a user interface.

The main APP 76 controls the modules of the application layer 72. For example, upon startup, the main APP 76 prepares a startup screen and starts up the modules. The main APP 76 accepts an operation of the user conveyed from input middleware 97 and notifies a corresponding module of the operation. The main APP 76 supplies display data from the modules to a display device driver 105. The main APP 76 executes changeover of each module. The main APP 76 notifies audio IO middleware (AIO) 94 in response to an operation for changing the sound volume from the user. The main APP 76 notifies the modules of a set value in response to a setup operation from the user. The main APP 76 retains setting information (a play mode and forth) common to the modules. The main APP 76 ends the modules in response to an operation for switching off the power supply, and issues a power supply switching off request to system control middleware (SYSTEM) 98.

The HD APP 77 accepts an operation for driving the HDD 58 and notifies hard disk middleware 82 of the operation, and acquires an operation state of the hard disk middleware 82 and prepares display data.

The CD APP 78 accepts an operation for driving the CD-ROM drive 57 and notifies CD middleware 88 of the operation, and acquires an operation state of the CD middleware 88 and prepares display data.

The MS APP 79 accepts an operation regarding the MS 4 inserted in the MS slot 45 and notifies MS middleware 89 of the operation, and acquires an operation state of the MS middleware 89 and prepares display data.

The PD APP 80 accepts an operation regarding the PD 5 connected to the connector 43 and notifies PD middleware 90 of the operation, and acquires an operation state of the PD middleware 90 and prepares display data.

The FEP 81 executes kana-to-kanji conversion when the title of the music CD 3 to be recorded is inputted.

The upper middleware layer 73 includes the following modules formed by modeling the functions of the audio server 1 and mounted. In particular, the upper middleware layer 73 includes the hard disk middleware (hereinafter referred to as HD MW) 82, the CD middleware (hereinafter referred to as CD MW) 88, the MS middleware (hereinafter referred to as MS MW) 89, and the PD middleware (hereinafter referred to as PD MW) 90.

The HD MW 82 includes HDCC 83 for managing coded data stored in the HDD 58, CD RIPPING 84 for cooperating with the CD MW 88 to compress and encrypt audio data of the music CD 3 and recording resulting data into the HDD 58, HD PLAY 85 for cooperating with the audio IO middleware 94 to decode and decompress coded data recorded in the HDD 58, HD REC 86 for cooperating with the audio IO middleware 94 to compress and encrypt audio data inputted from the AUX-in terminal 31 and recording resulting data into the HDD 58, and C IN/C OUT 87 for cooperating with the MS MW 89 or the PD MW 90 to control checkin or checkout with the MS 4 or the PD 5.

The CD MW 88 causes a CD device driver 102 to control the CD-ROM drive 57 to implement functions as a CD player. The MS MW 89 cooperates with the audio IO middleware 94 and MS file system middleware 95 to implement functions as an MS player. The PD MW 90 cooperates with USB host middleware 96 and a USB host device driver 104 to control the PD 5.

The lower middleware layer 74 includes the following modules formed by modeling functions which can be used commonly by the modules of the upper middleware layer 73 and mounted. That is, the lower middleware layer 74 includes hard disk object database middleware (hereinafter referred to as HD DB) 91, hard disk file system middleware (hereinafter referred to as HD FS) 92, MGR middleware (MGR) 93, the audio IO middleware (AIO) 94, the memory stick file system middleware (MS FS) 95, the USB host middleware (USB) 96, input handle middleware (INPUT) 97, and the system control middleware (SYSTEM) 98. The modules included in the lower middleware layer 74 are called from the modules which form the upper middleware layer 73.

The device driver layer (DD) 75 includes the following modules obtained by modeling the hardware devices, that is, a hard disk device driver 99, a decoder/encoder device driver 100, a DMA device driver 101, the CD device driver 102, a signal processing section device driver 103, the USB host device driver 104, the display device driver 105, an audio device driver 106, a key device driver 107, a power device driver 108 and a clock device driver 109. It is to be noted that, in FIG. 7, the modules from the audio device driver 106 to the clock device driver 109 surrounded by a broken line are executed by the sub CPU 64. Each of the modules is principally formed from a library and has an API (Application Program Interface) which is called from a module included in the upper middleware layer 73 or the lower middleware layer 74.

Figure 8:
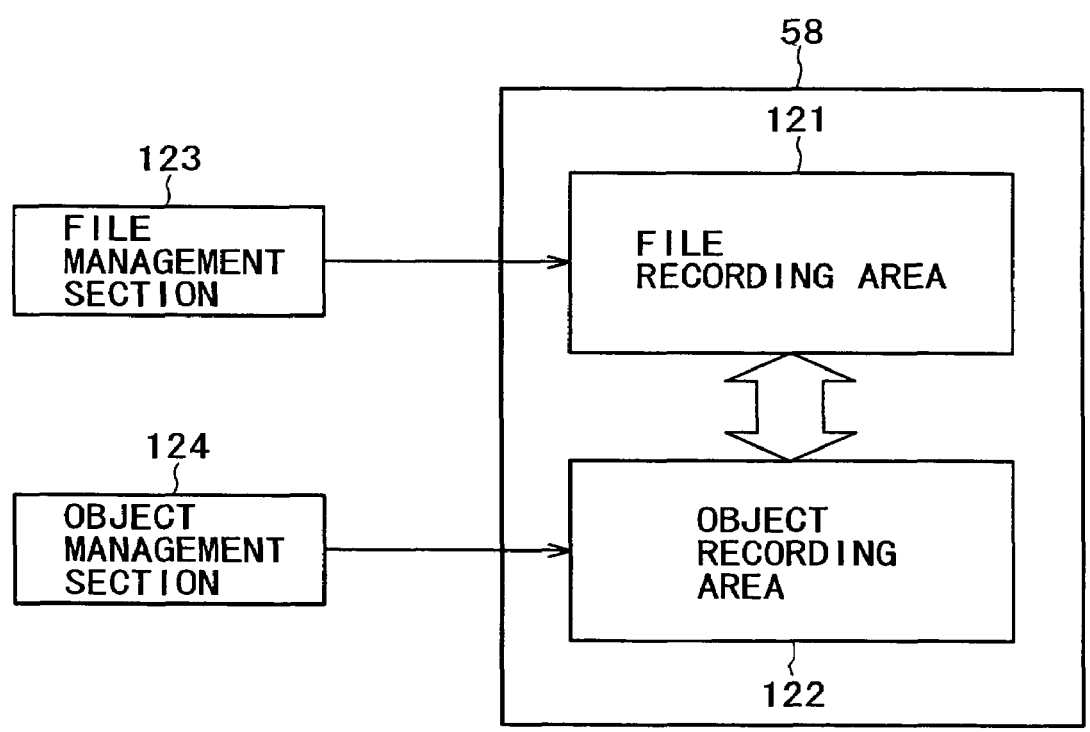
FIG. 8 is a view illustrating an FAT type file system (data format) applied to an HDD 58.

Now, an FAT (File Allocation Table) type file system (data format) applied to the HDD 58 is described with reference to FIGS. 8 to 20. As shown in FIG. 8, the HDD 58 includes a file recording area 121 for recording coded data (contents data) as a file, and an object recording area 122 into which an object including information for specifying the position of the contents data which are recorded in the file recording area 121.

A file management section 123 executes all processes relating a file such as preparation of a file, issuance of an ID for a file to be prepared newly, writing, reading out and deletion with regard to the file recording area 121, and so forth. The file management section 123 corresponds to the HD FS 92 included in the lower middleware layer 74.

An object management section 124 recognizes the physical position of an object in the object recording area 122 and executes writing, reading out, deletion and so forth of the object. The object management section 124 corresponds to the HD DB 91 included in the lower middleware layer 74. It is to be noted that management of an object based on a database is hereinafter described with reference to FIGS. 21 to 37.

FIG. 9 shows a logical structure of the file recording area 121. The file recording area 121 is partitioned into sectors of a predetermined capacity which makes a minimum unit in writing and reading out into and from the file recording area 121. All sectors have consecutive sector numbers applied thereto. The file recording area 121 is formed from an FAT area, a system area, and a plurality of clusters each composed of a predetermined number of sectors. Each cluster has a cluster number of a fixed length applied thereto. A file recorded in the file recording area 121 is formed from a plurality of clusters coupled to each other.

Figure 10:
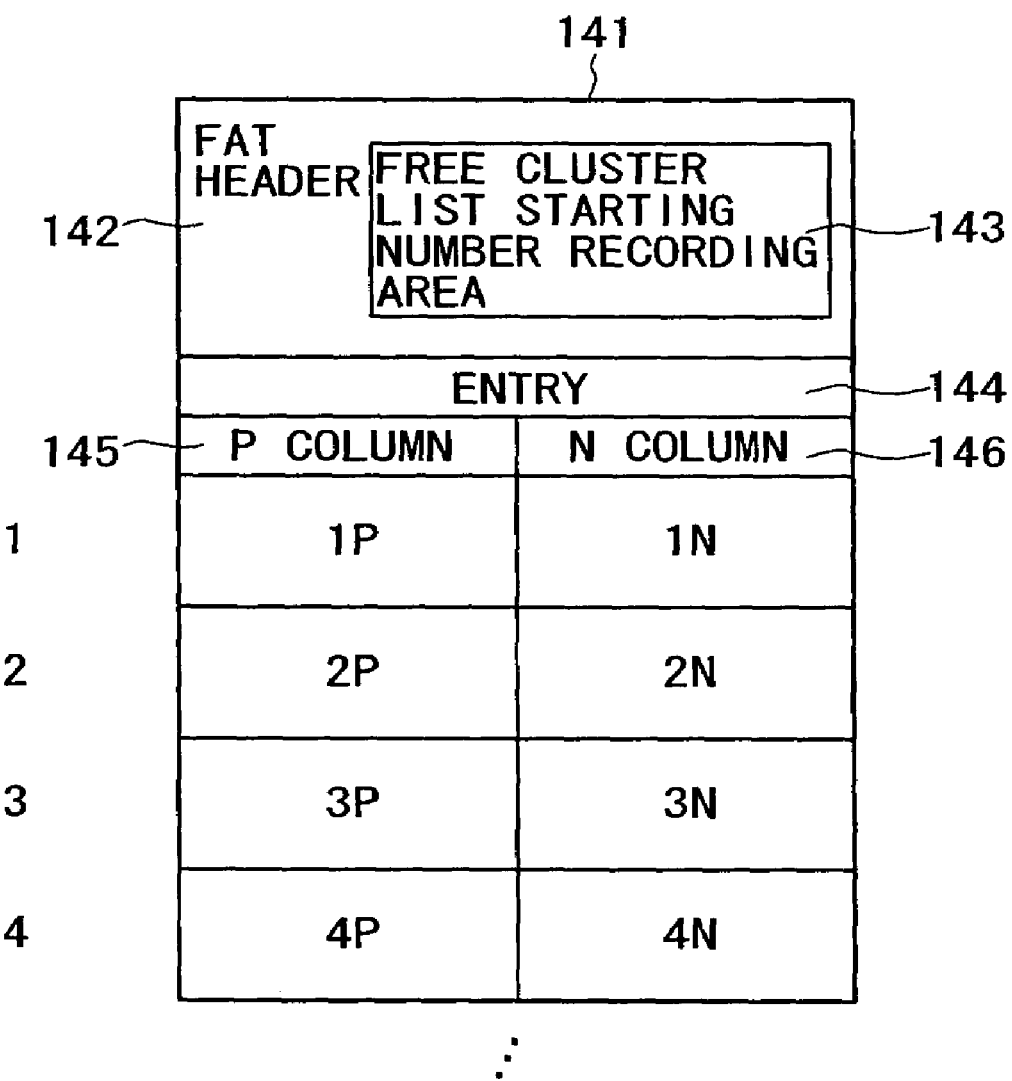
FIG. 10 is a view showing a configuration of an FAT 141.

A coupled state of a plurality of clusters is recorded in a table called FAT 141 (FIG. 10). While the FAT 141 is recorded in the FAT area of the file recording area 121, it is transferred also to the SDRAM 53 when the file management section 123 operates.

FIG. 10 shows a structure of the FAT 141. The FAT 141 is formed from an FAT header 142, and a plurality of FAT entries 144 each corresponding to a cluster. The FAT header 142 includes a free cluster list starting number recording area 143. In the free cluster list starting number recording area 143, the cluster number of a top one of a series of free clusters in which no data is recorded is recorded. If no free cluster is present, then −1=0xFFFFFFFF is recorded in the free cluster list starting number recording area 143.

To each of the FAT entries 144, an entry number same as the cluster number applied to a corresponding one of the clusters is applied. For example, to an FAT entry corresponding to the cluster number 1, the entry number 1 is applied. In the following description, the FAT entry of the entry number 1 is referred to also as FAT entry E(1). Each of the FAT entries 144 is partitioned into a P column 145 and an N column 146.

In the P column 145 of each FAT entries 144, the cluster number applied to a cluster connected to the front side of a corresponding one of the clusters is recorded. If a cluster which is connected to the front side is not present, that is, when the corresponding cluster is the top of the file, then 0xFFFFFFFF is recorded in the P column 145.

In the N column 146 of each of the FAT entries 144, the cluster number applied to a cluster connected to the rear side of the corresponding cluster is recorded. If a cluster which is connected to the rear side is not present, that is, when the corresponding cluster is the tail of the file, 0xFFFFFFFF is recorded in the N column 146.

Figure 11:
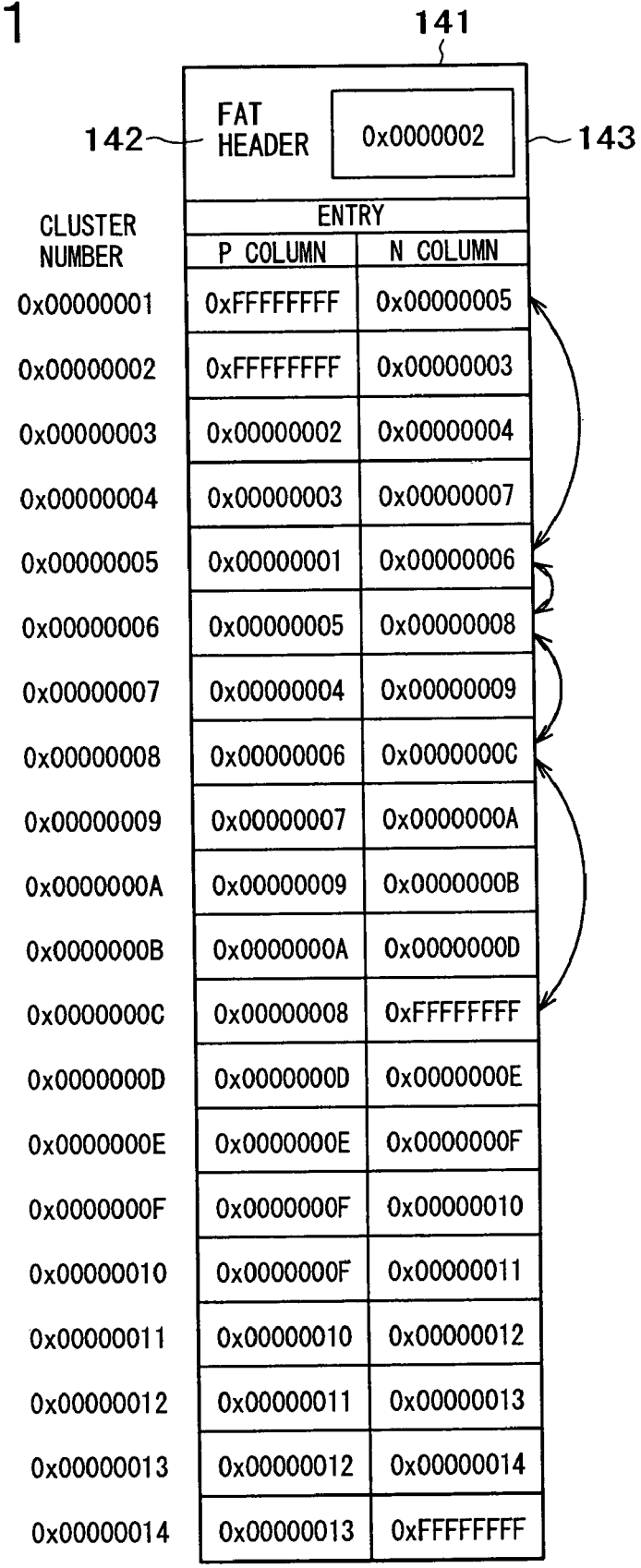
FIG. 11 is a view showing an example of the FAT 141.

For example, where only one file is recorded in five clusters having the cluster numbers 1, 5, 6, 8 and 12 applied thereto in the file recording area 121, 0xFFFFFFFF representing that a cluster connected to the front side is not present is recorded in the P column of the FAT entry E(1) of the entry number 1 (0x00000001), and the cluster number 5 (0xFFFFFFFF) applied to the cluster connected to the rear side is recorded in the N column as seen in FIG. 11 In the P column of the FAT entry E(5) of the entry number 5 (0x00000005), the cluster number 1 (0x00000001) applied to the cluster connected to the front side is recorded, and in the N column, the cluster number 6 (0x00000006) applied to the cluster connected to the rear side is recorded.

Also the FAT entries E(6) and E(8) of the entry numbers 6 and 8 have cluster numbers recorded therein similarly.

In the P column of the FAT entry E(12) of the entry number 12 (0x0000000C), the cluster number 8 (0x00000008) applied to the cluster connected to the front side is recorded, and in the N column, 0xFFFFFFFF representing that a cluster connected to the rear side is not present is recorded.

In the free cluster list starting number recording area 143, since, in the present case, a series of clusters from the cluster of the cluster number (0x00000002) to the cluster of the cluster number (0x00000014) are free clusters, the cluster number (0x00000002) representative of the top of the series of clusters is recorded.

Figure 12:
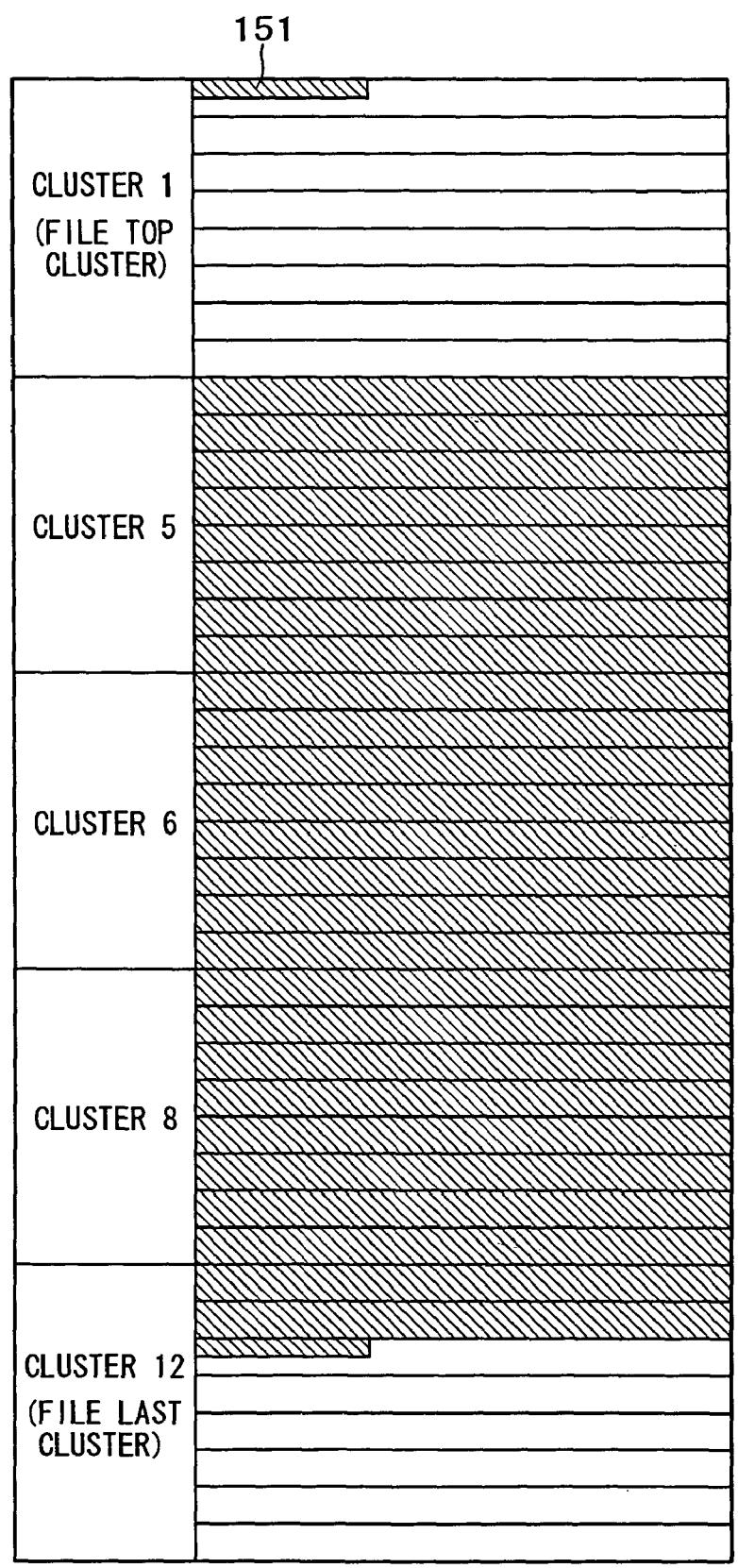
FIG. 12 is a view showing an example of recording of the file recording area 121.

FIG. 12 illustrates a manner wherein one file is recorded in the five clusters to which the cluster numbers 1, 5, 6, 8 and 12 are applied. In the top cluster (in the present case, the cluster 1) of the file, a size recording area 151 for recording information regarding the size of the file is provided. Data of the file are recorded in the second cluster (in the present case, the cluster 5) and succeeding clusters. It is to be noted that the size recording area 151 may otherwise be provided in the last cluster (in the present case, the cluster 12) of the file.

Figure 13:
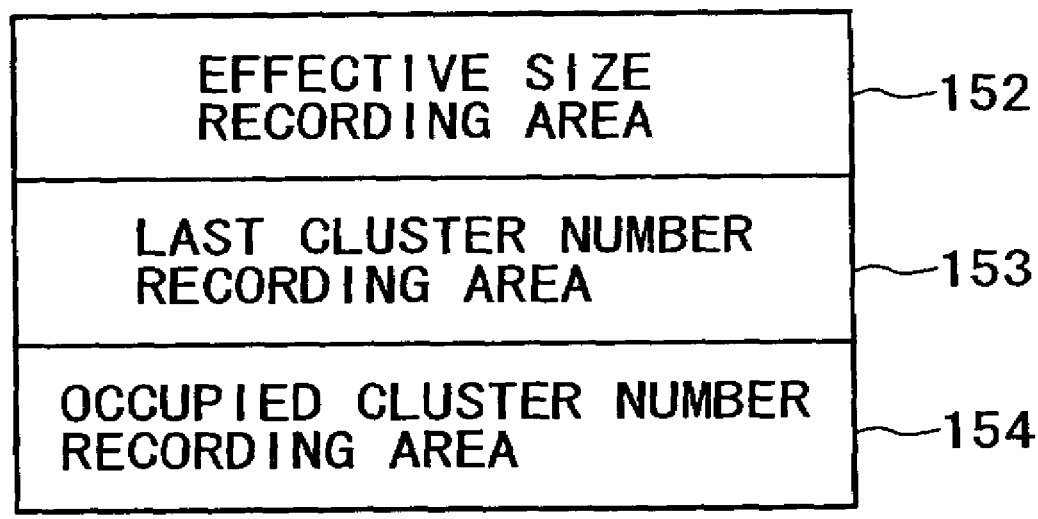
FIG. 13 is a view showing a configuration of a size recording area 151.

FIG. 13 shows an example of a configuration of the size recording area 151. The size recording area 151 includes an effective size recording area 152, a last cluster number recording area 153 and an occupied cluster number recording area 154. In the effective size recording area 152, the effective byte number of the last cluster (in the present case, the cluster 12) is recorded. Usually, the value of the effective byte number is greater than 1, and a value smaller than the cluster size is recorded. In the last cluster number recording area 153, the cluster number (in the present case, 0x0000000C) of the last cluster (in the present case, the cluster 12) is recorded. In the occupied cluster number recording area 154, the number (in the present case, 4) of clusters which form the data recording portion of the file is recorded.

Subsequently, a file preparation process (that is, contents data recording process) in which an FAT is utilized, a file reading out process and a file reverse reading out process (a reading out process of contents in the reverse direction) are described with reference to flow charts of FIGS. 14 to 20. It is to be noted that those processes are controlled by the file management section 123, that is, the HD FS 92 which belongs to the lower middleware layer 74 of the firmware.

First, the file preparation process is described with reference to a flow chart of FIG. 14. At step S1, the HD FS 92 causes contents data, which are to be recorded into the HDD 58, to be transferred from the CD-ROM drive 57 or the like to the buffer 56 for each cluster size (it is assumed that the amount of data thus transferred is S bytes). At step S2, the HD FS 92 searches for and acquires (secures) free clusters of the file recording area 121.

Figure 15:
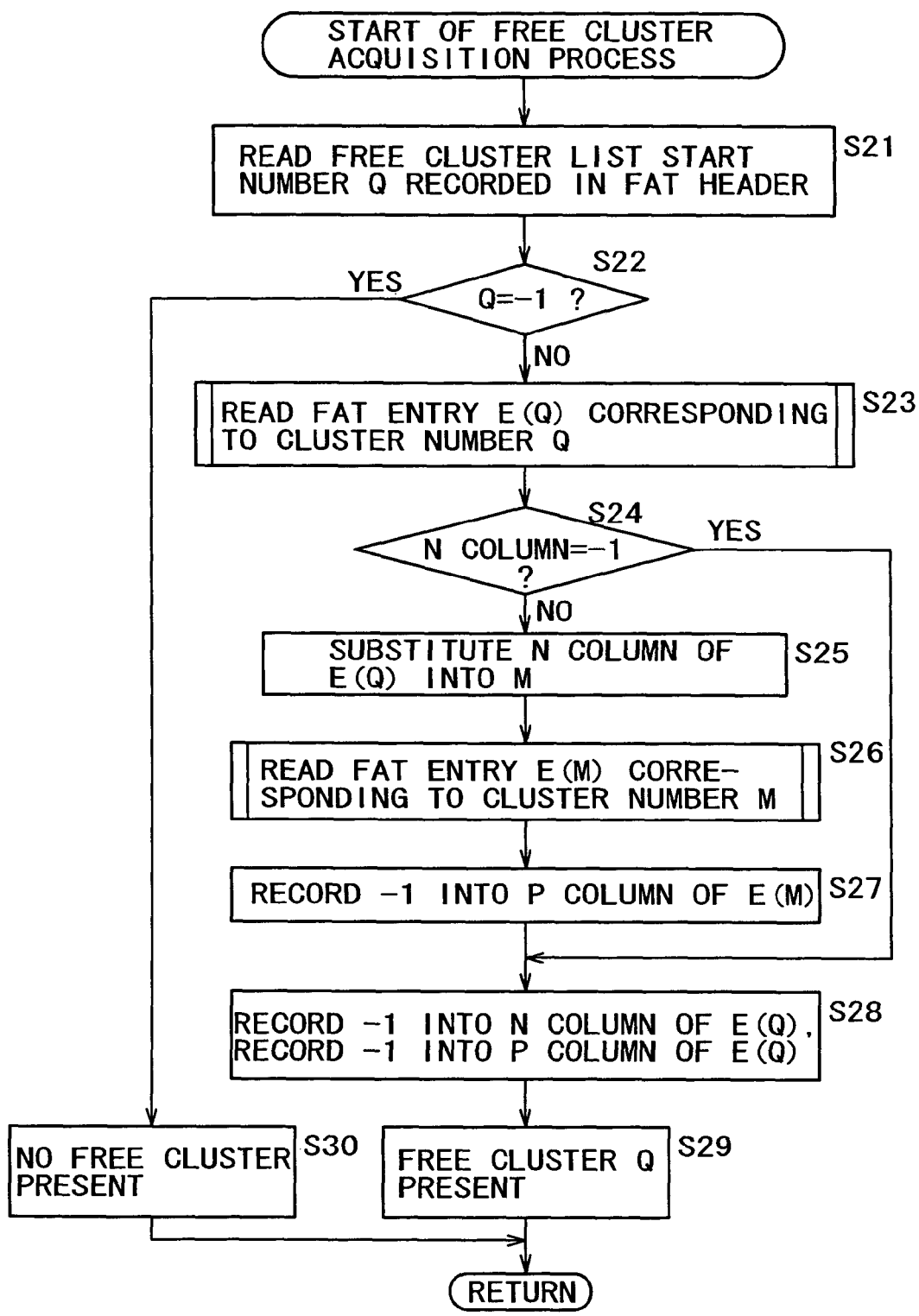
FIG. 15 is a flow chart illustrating a free cluster acquisition process.

The free cluster acquisition process is described with reference to a flow chart of FIG. 15. At step S21, the HD FS 92 reads a value Q recorded in the free cluster list starting number recording area 143 recorded in the FAT header 141. At step S22, the HD FS 92 discriminates whether or not the value Q is −1, that is, whether or not there exists a free cluster. If it is discriminated that the value Q is not −1, that is, there exists a free cluster, then the processing advances to step S23. At step S23, the HD FS 92 reads the FAT entry E(Q) corresponding to the value Q (cluster number of the free cluster).

Figure 16:
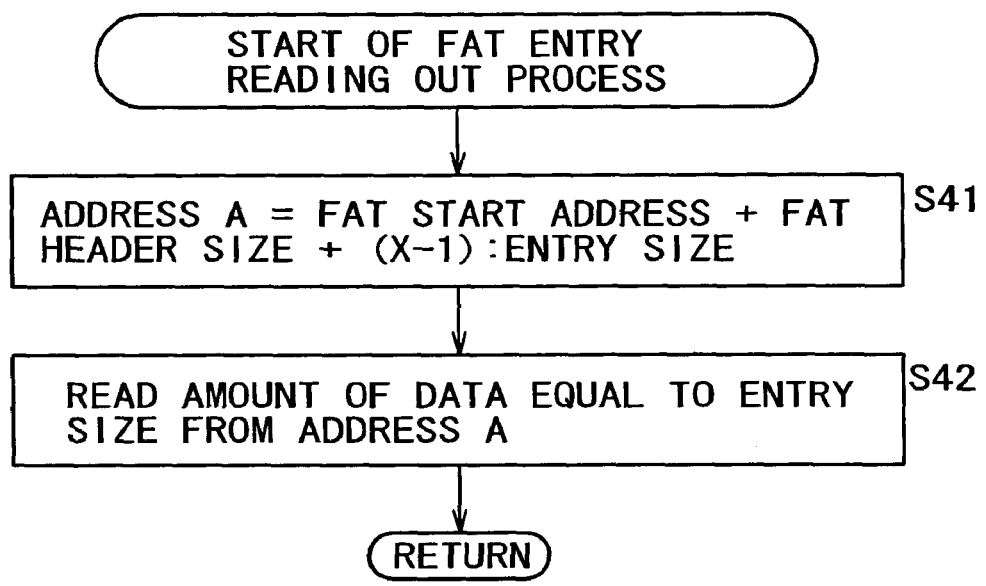
FIG. 16 is a flow chart illustrating an FAT entry reading out process.
Figure 17:
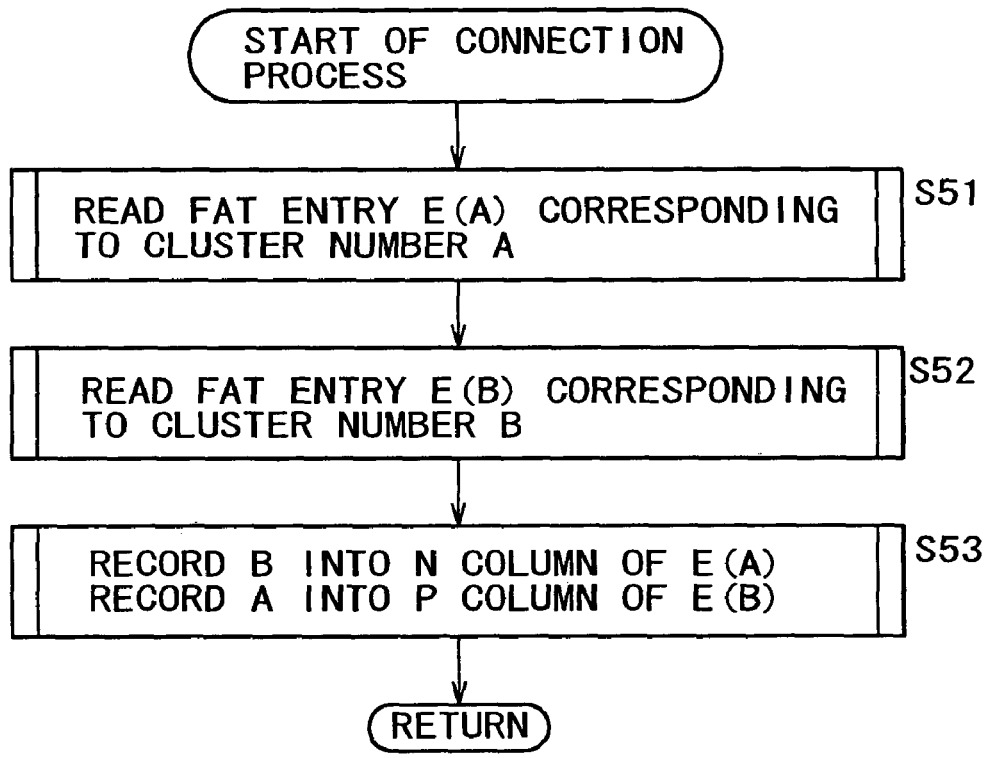
FIG. 17 is a flow chart illustrating a connection process.

A process of reading an FAT entry E(X) corresponding to an arbitrary cluster number X in the process of reading out the FAT entry E(Q) is described with reference to a flow chart of FIG. 16. At step S41, the HD FS 92 adds a known FAT header size to a known FAT entry start address and adds, to the sum, the product obtained by multiplication of a value (X−1) obtained by subtracting 1 from the value X by a known entry size to calculate an address A. At step S42, the HD FS 92 reads out an amount of data equal to the size of one entry beginning with the address A. The description of the process of reading out an FAT entry E(X) corresponding to an arbitrary cluster number X is ended therewith.

Referring back to FIG. 15, at step S24, the HD FS 92 discriminates whether or not the value of the N column of the FAT entry E(Q) is −1 (0xFFFFFFFF). If it is discriminated that the value of the N column of the FAT entry E(Q) is not −1, then the processing advances to step S25.

At step S25, the HD FS 92 substitutes the value of the N column of the FAT entry E(Q) into a variable M. At step S26, the HD FS 92 reads the FAT entry E(M) corresponding to the cluster number M. At step S27, the HD FS 92 records −1 (0xFFFFFFFF) into the P column of the FAT entry E(M).

At step S28, the HD FS 92 records −1 (0xFFFFFFFF) into the N column of the FAT entry E(Q) and records −1 (0xFFFFFFFF) into the P column of the FAT entry E(Q). At step S29, the HD FS 92 determines that a free cluster of the cluster number Q is present, and returns the processing to FIG. 14. The description of the free cluster acquisition process is ended therewith.

It is to be noted that, when it is discriminated at step S24 that the value of the N column of the FAT entry E(Q) is −1, the processes at steps S25 to S27 are skipped.

Further, if it is discriminated at step S22 that the value Q recorded in the free cluster list starting number recording area 143 is −1, then the processing advances to step S30. At step S30, the HD FS 92 determines that there exists no free cluster, and returns the processing to FIG. 14. However, when there exists no free cluster, it is determined that the HDD 58 is recorded fully, and the file preparation process of FIG. 14 is ended.

In the following, the description is continued but reading the free cluster of the acquired cluster number Q as a free cluster of the cluster number V. At step S3, the HD FS 92 substitutes the cluster number V of the free cluster into the variable X and another variable A. At step S4, the HD FS 92 substitutes 0 into an occupied cluster number T. At step S5, the HD FS 92 newly acquires a free cluster similarly as in the process at step S2 described hereinabove. The cluster number of the acquired free cluster is represented by V. Here, if a free cluster cannot be acquired newly, then the file preparation process is ended.

At step S6, the HD FS 92 substitutes the value V into a variable B. At step S7, the HD FS 92 increments the occupied cluster number T by 1. At step S8, the HD FS 92 converts the cluster number B into sector numbers (for example, where the sectors and the clusters are matched in such a manner as illustrated in FIG. 9, the cluster number 2 is converted into sector numbers 28 to 35). The sector numbers corresponding to the cluster number B are discriminated.) At step S9, the HD FS 92 records the contents data buffered at step S1 into the sector numbers of the file recording area 121 obtained by the conversion.

After the recording of the buffered contents data is ended, the HD FS 92 connects, at step S10, the cluster of the cluster number B to the cluster of the cluster number A (at this point of time, this cluster is a free cluster). The connection process is described with reference to a flow chart of FIG. 17.

Similarly as in the process described hereinabove with reference to FIG. 16, the HD FS 92 reads, at step S51, the FAT entry E(A) corresponding to the cluster number A, and reads, at step S52, the FAT entry E(B) corresponding to the cluster number B. At step S53, the HD FS 92 records the cluster number B into the N column of the FAT entry E(A) and records the cluster number A into the P column of the FAT entry E(B). It is to be noted that the process at step S53 is executed for the FAT 141 expanded in the SDRAM 53. The connection process between the cluster of the cluster number A and the cluster of the cluster number B is ended therewith.

Referring back to FIG. 14, at step S11, the HD FS 92 discriminates whether or not the data amount S of the contents recorded at step S9 is equal to the cluster size. If it is discriminated that the data amount S of the contents recorded at step S9 is equal to the cluster size, then since the recording of the contents data to be recorded is not completed as yet, the processing advances to step S12.

At step S12, continuing part of the contents data recorded formerly is transferred by an amount equal to the cluster size to the buffer 56. At step S13, the cluster number B is substituted into the variable A. At step S14, the HF FS 92 acquires a free cluster newly similarly as in the process at step S2 described hereinabove. The cluster number of the acquired free cluster is represented by V. It is to be noted that, if a free cluster cannot be acquired newly at step S14, then the processing advances to step S17. At step S15, the HD FS 92 substitutes the value V into the variable B. At step S16, the HD FS 92 increments the occupied cluster number T by 1.

Thereafter, the processing returns to step S8 so that the processing at the steps beginning with step S8 is repeated. Then, if it is discriminated at step S11 that the data amount S of the contents recorded at step S9 is not equal to the cluster size, then since the recording of the contents data to be recorded is completed, the processing advances to step S17.

At step S17, the HD FS 92 forms a size recording area 151 in the free cluster of the cluster number X acquired at step S2, records the data amount S recorded in the last cluster into the effective size recording area 152 of the size recording area 151, records the value of the variable B into the last cluster number recording area 153, and records the value of the variable T into the occupied cluster number recording area 154.

At step S18, the HD FS 92 updates the FAT 141 recorded in the FAT area of the file recording area 121 with the FAT 141 rewritten by the process at step S10. A file is prepared newly in such a manner as described above. It is to be noted that a file identifier having a value equal to the cluster number of the top one of the series of clusters into which the contents data have been recorded is issued to the prepared file.

Figure 18:
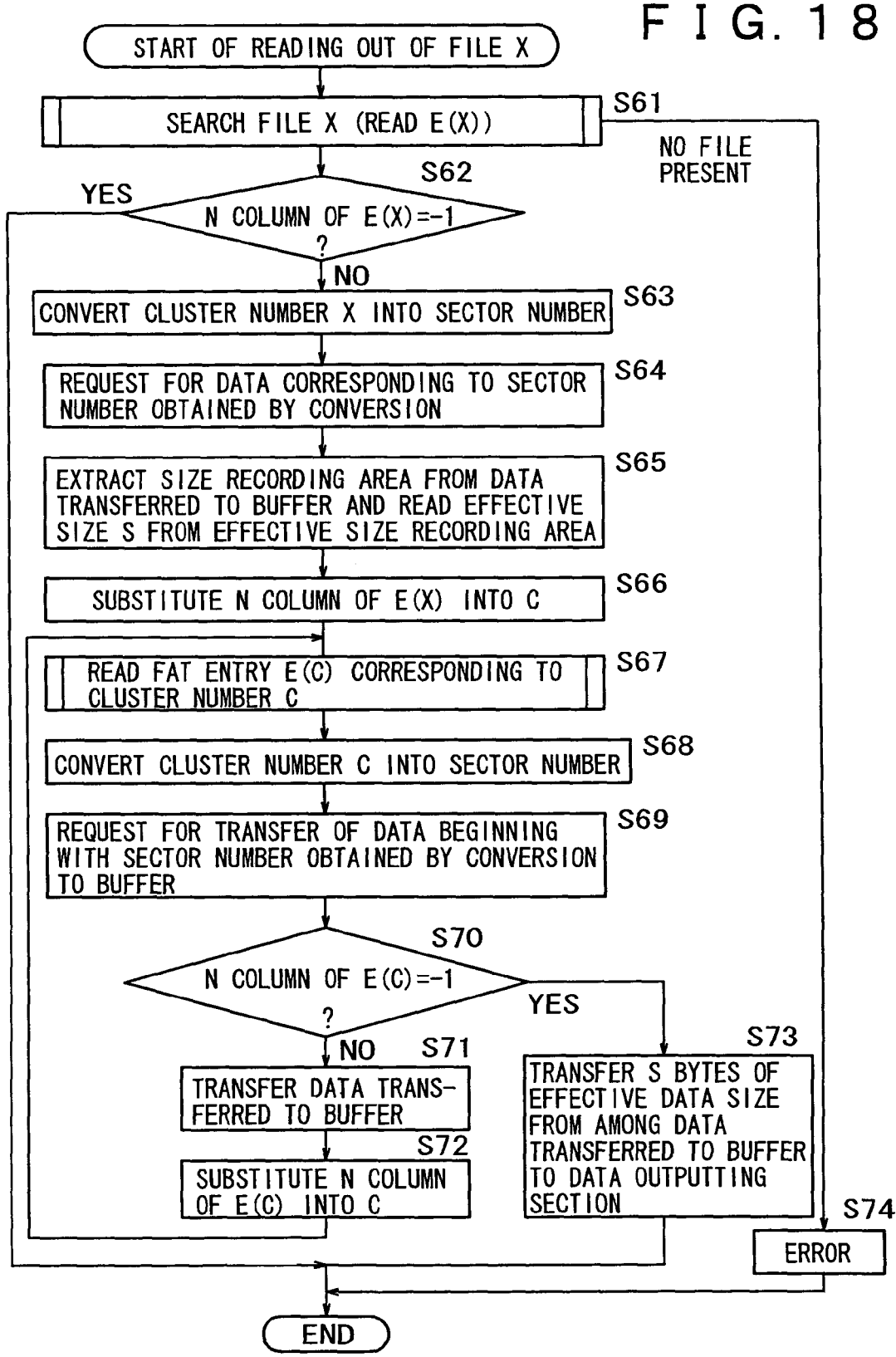
FIG. 18 is a flow chart illustrating a reading out process of a file X.

Subsequently, the reading out process for a file (hereinafter referred to as file X) whose file identifier is X is described with reference to a flow chart of FIG. 18. At step S61, the HD FS 92 executes a search process for discriminating whether or not the file X is present.

Figure 19:
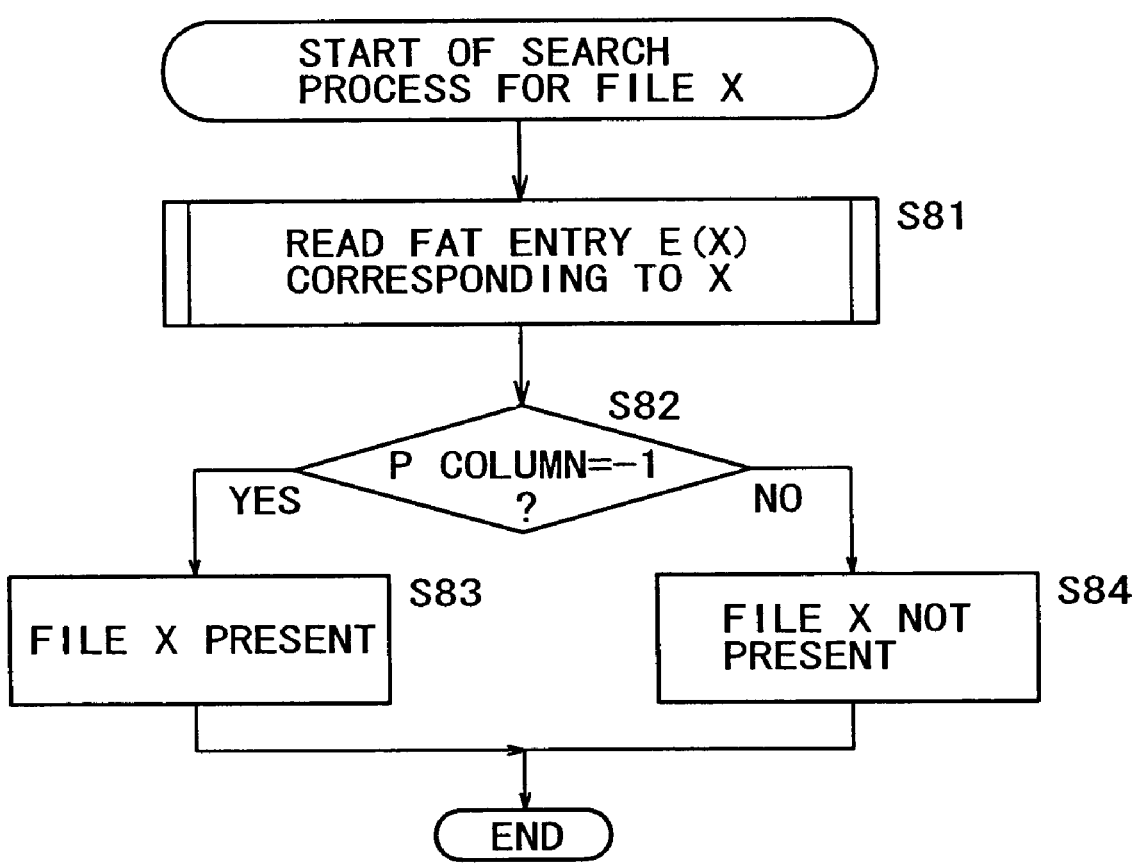
FIG. 19 is a flow chart illustrating a search process of the file X.

The search process for the file X is described with reference to a flow chart of FIG. 19. At step S81, the HD FS 92 acquires the FAT entry E(x) corresponding to the entry number X. At step S82, the HD FS 92 discriminates whether or not the value of the P column of the FAT entry E(X) is −1 (0xFFFFFFFF). If it is discriminated that the value of the P column of the FAT entry E(X) is −1, then the processing advances to step S83. At step S83, the HD FS 92 discriminates that the file X is present because the cluster of the entry number X (=cluster number X) is the top cluster of the series of clusters in which the file is recorded, and returns the processing to the file reading out process of FIG. 18.

On the contrary, if it is discriminated at step S82 that the value of the P column of the FAT entry E(X) is not −1, then the processing advances to step S84. At step S84, the HD FS 92 discriminates that the file X is not present because the cluster of the entry number X (=cluster number X) is not the top cluster of the series of clusters in which the file is recorded, and returns the processing to the file reading out process of FIG. 18. The description of the search process for the file X is ended therewith.

In the following, the description is continued assuming that it is discriminated in the file search process that the file X is present. At step S62, the HD FS 92 discriminates whether or not the value of the N column of the FAT entry E(X) is −1 (0xFFFFFFFF). If it is discriminated that the value of the N column of the FAT entry E(X) is −1, then since the file X does not include data, the reading out process is ended.

If the value of the N column of the FAT entry E(X) is not −1 at step S62, then the processing advances to step S63. At step S63, the HD FS 92 converts the cluster number X (top cluster) into sector numbers. At step S64, the HD FS 92 controls the DMA controller 55 to read out the size recording area 151 recorded in the sectors of the sector numbers obtained by the conversion so that the size recording area 151 is buffered by the buffer 56. At step S64, the HD FS 92 reads the effective size S recorded in the effective size recording area 152 of the size recording area 151 buffered at step S63 (the amount of data recorded in the last cluster in the series of clusters in which the file X is recorded).

At step S66, the HD FS 92 substitutes the value of the N column of the FAT entry E(X) into a variable C. At step S67, the HD FS 92 reads the FAT entry E(C) corresponding to the cluster number C, that is, the second cluster, similarly as in the process described hereinabove with reference to FIG. 16. At step S68, the HD FS 92 converts the cluster number into sector numbers. At step S69, the HD FS 92 controls the DMA controller 55 to read out contents data for one cluster recorded in the sectors of the sector numbers obtained by the conversion so that the contents data are buffered by the buffer 56.

At step S70, the HD FS 92 discriminates whether or not the value of the N column of the FAT entry E(C) is −1 (0xFFFFFFFF). If it is discriminated that the value of the N column of the FAT entry E(C) is not −1, then the processing advances to step S71. At step S71, the HD FS 92 controls the DMA controller 55 to output all of the data buffered in the buffer 56 to the encoder/decoder 59 and so forth. Since all of the contents data of the file X have not been read out as yet, the processing advances to step S72. At step S72, the HD FS 92 substitutes the value of the N column of the FAT entry E(C) into the variable C. The processing returns to step S67 so that the processing at the steps beginning with step S67 is repeated.

Thereafter, if it is discriminated at step S70 that the value of the N column of the FAT entry E(C) is −1, then since reading out from the last cluster in which the contents data of the file X are recorded is completed, the processing advances to step S73. At step S73, the HD FS 92 controls the DMA controller 55 to output the data for the effective data size S at the last end of the contents data buffered by the buffer 56 to be outputted to the encoder/decoder 59 and so forth.

It is to be noted that, if it is discriminated in the file search process at step S61 that the file X is not present, then the processing advances to step S74, at which an error determination is performed and the file reading out process for the file X is ended. The description of the reading out process for the file X is ended therewith.

Figure 20:
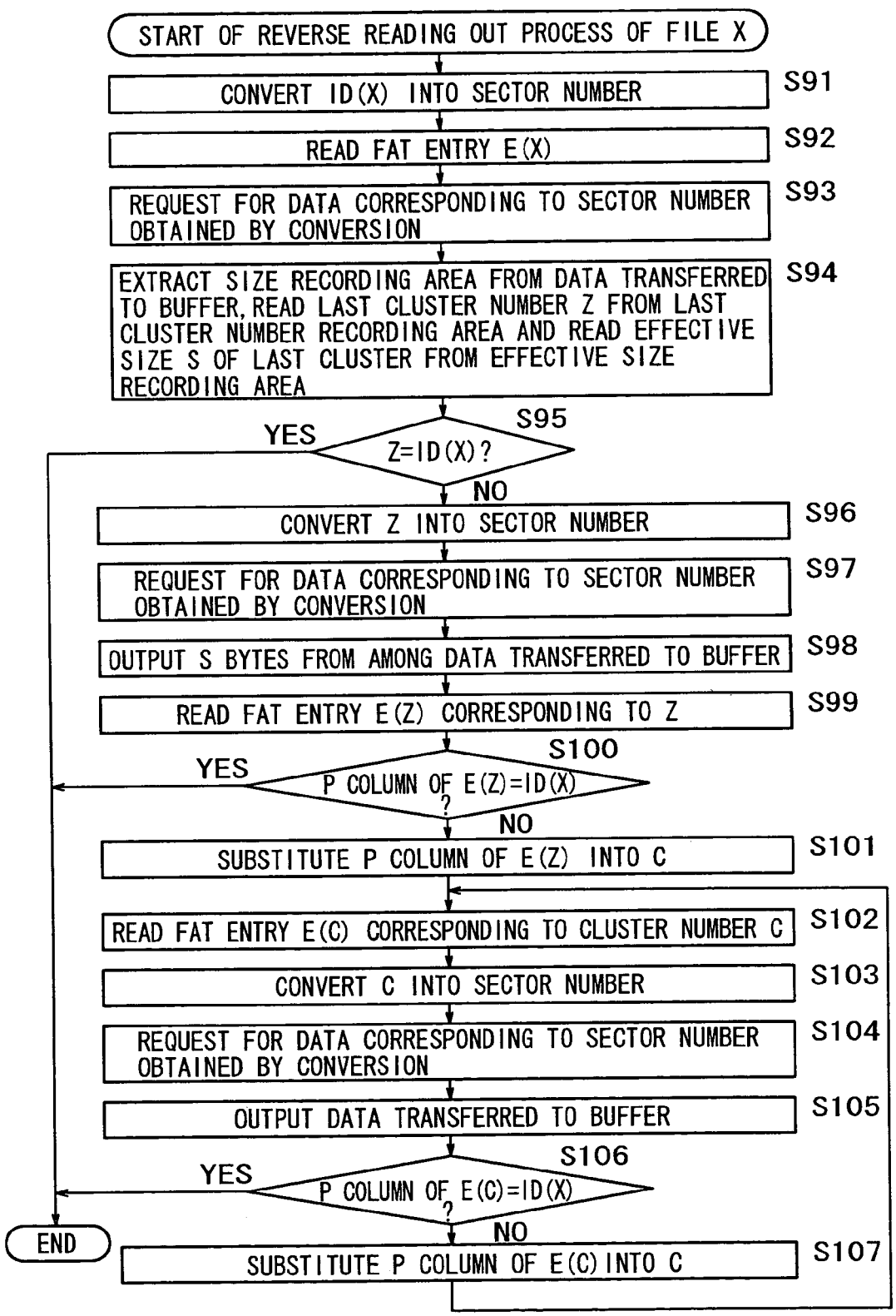
FIG. 20 is a flow chart illustrating a reverse reading out process of the file X.

Now, a reverse reading out process of the file X is described with reference to a flow chart of FIG. 20. Here, the reverse reading out process is a process which can be used in order to reproduce contents data retroactively for each several seconds such that contents data whose reproduction time is 100 seconds are first reproduced for a period of time of approximately 100 milliseconds from the data at the 90th second and then produced for approximately 100 milliseconds from the data at the 80th second, and then produced for approximately 100 milliseconds from the data at the 70th second.

At step S91, the HD FS 92 converts the file identifier (=X, hereinafter referred to as ID(X)) of the file X into a sector number. It is to be noted, however, that the ID(X) is same as the cluster number of the top cluster from within the series of clusters in which the file X is recorded.

At step S92, the HD FS 92 reads the FAT entry E(X) corresponding to the cluster X. At step S93, the HD FS 92 controls the DMA controller 55 to read out the size recording area 151 recorded in the sectors of the sector numbers obtained by the conversion at step S91 so that the size recording area 151 is buffered by the buffer 56. At step S94, the HD FS 92 reads the effective size S from the effective size recording area 152 of the size recording area 151 buffered at step S93 and reads the last cluster number Z from the last cluster number recording area 153.

At step S95, the HD FS 92 discriminates whether or not the last cluster number Z and the ID(X) are same as each other. If the last cluster number Z and the ID(X) are same as each other, then since the file X does not include contents data, the reverse reading out process is ended.

If it is discriminated that the last cluster number Z and the ID(X) are not same as each other, then the processing advances to step S96. At step S96, the HD FS 92 converts the last cluster number Z into sector numbers. At step S97, the HD FS 92 controls the DMA controller 55 to read out the data including the last portion of the contents data recorded in the sectors of the sector numbers obtained by the conversion at step S96 so that the data are buffered by the buffer 56. At step S98, the HD FS 92 controls the DMA controller 55 to output S bytes from within the data buffered in the buffer 56, that is, the last portion of the contents data, to the encoder/decoder 59 and so forth.

At step S99, the HD FS 92 reads the FAT entry E(Z) corresponding to the last cluster number Z. At step S100, the HD FS 92 discriminates whether or not the value of the P column of the FAT entry E(Z) is equal to the ID(X). If it is discriminated that the value of the P column of the FAT entry E(Z) is equal to the ID(X), then since this signifies that only the last one cluster of the contents data of the file X has been recorded, the reverse reading out process is ended.

If it is discriminated that the value of the P column of the FAT entry E(Z) is not equal to the ID(X), then the processing advances to step S101 in order to read out the contents data retroactively only by one cluster from the last side. At step S101, the HD FS 92 substitutes the value of the P column of the FAT entry E(Z) into the variable C.

At step S102, the HD FS 92 reads the FAT entry E(C) corresponding to the cluster number C. At step S103, the HD FS 92 converts the cluster number C into sector numbers. At step S104, the HD FS 92 controls the DMA controller 55 to read out the contents data recorded in the sector numbers obtained by the conversion at step S103 so that the contents data are buffered by the buffer 56. At step S105, the HD FS 92 controls the DMA controller 55 to output the contents data for one cluster buffered in the buffer 56 to the encoder/decoder 59 and so forth.

At step S106, the HD FS 92 discriminates whether or not the value of the P column of the FAT entry E(C) corresponding to the cluster number C is equal to the ID(X). If it is discriminated that the value of the P column of the FAT entry E(C) is not equal to the ID(X), since this signifies that all of the file X have not been read out as yet, the processing advances to step S107 in order to read out the file X retroactively by one cluster. At step S107, the HD FS 92 substitutes the value of the P column of the FAT entry E(C) into the variable C. The processing returns to step S102 so that the processing at the steps beginning with step S102 forth is repeated.

Thereafter, if it is discriminated at step S106 that the value of the P column of the FAT entry E(C) is equal to the ID(X), since this signifies that all of the file X are read out up to the top thereof, the reverse reading out process is ended. The description of the reverse reading out process of the file X is ended.

As described above, with the HD FS 92 of the audio server 1, since the cluster number of the top cluster of an area in which a file is recorded and which has a value of a fixed length is applied as a filter identifier for specifying the file, the recorded position of the file can be specified readily. Consequently, when compared with an alternative case wherein the file name does not have a fixed length, the search time for a file can be reduced significantly.

Further, since the file identifier has a fixed length, the time required for search of a file can be uniformed.

Further, with the HD FS 92 of the audio server 1, since there is no limitation to the size of a file to be recorded, not only audio data but also data of a greater size such as video data can be recorded as a file.

Furthermore, with the HD FS 92 of the audio server 1, where one file is recorded over a plurality of clusters, since clusters are utilized in a forward direction, seeking upon recording or reproduction is performed in a fixed direction. Consequently, occurrence of a miss of recording upon recording or a miss of sound upon reproduction is prevented.

Figure 21:
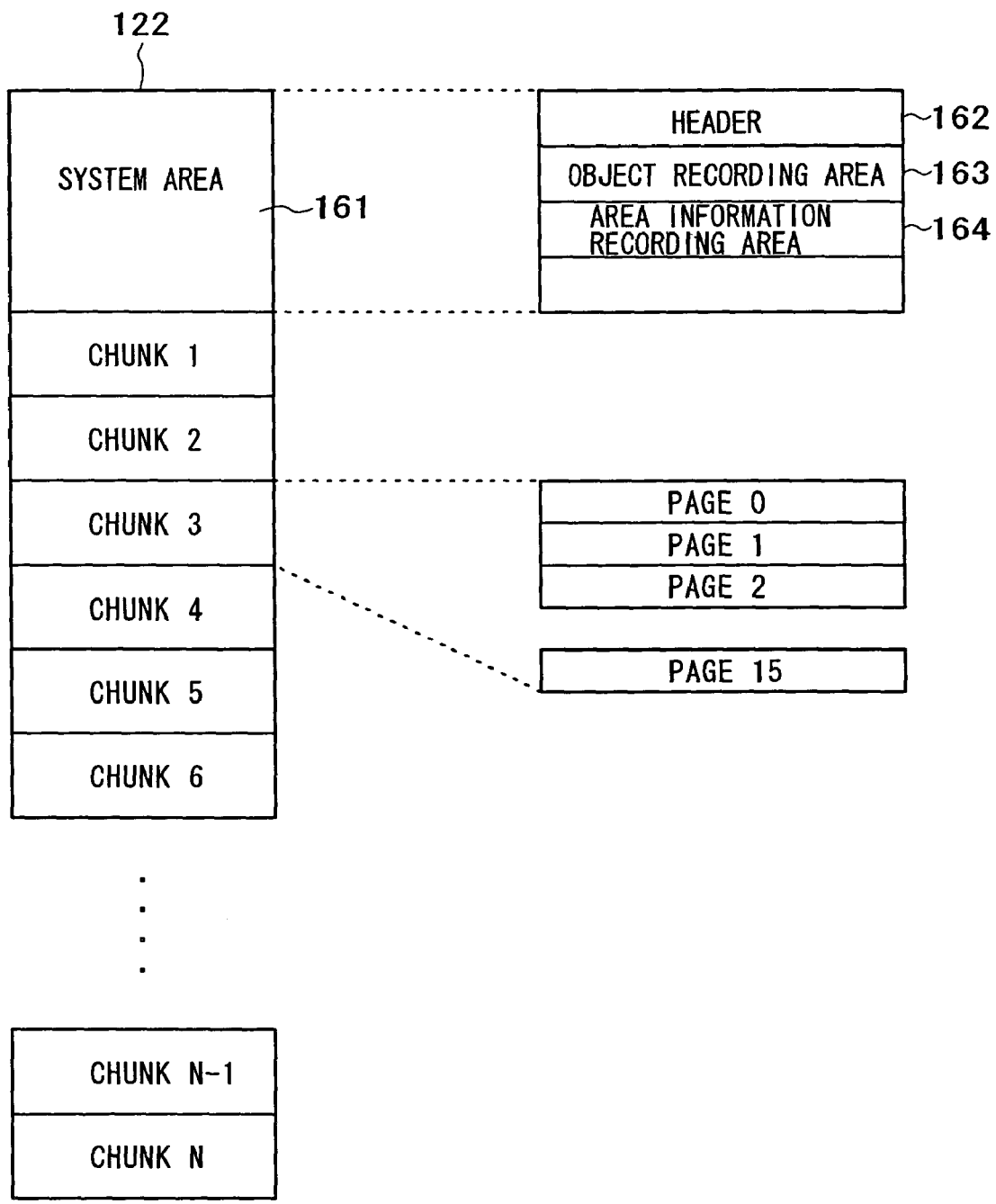
FIG. 21 is a view showing a logic structure of an object recording area 122.

Now, an object corresponding to a folder, an album or a track is described with reference to FIGS. 21 to 27. FIG. 21 shows a logical structure of the object recording area 122 into which an object is to be recorded. The object recording area 122 includes a system area 161, and a plurality of chunks partitioned so as to have a predetermined capacity. An object is recorded into such chunks.

The system area 161 includes a header 162, an object type recording area 163 and an area information recording area 164. To the plurality of chunks, serial numbers beginning with 1 are applied in order from the top one of them. In the following description, for example, the chunk to which the number 1 is applied is referred to as chunk 1, the chunk to which the number 2 is applied is referred to as chunk 2, and so forth.

Each of the chunks is further partitioned into pages of a predetermined capacity. To the pages which form each chunk, serial numbers beginning with 0 are applied in order from the top one of them. In the following description, for example, the page to which the number 0 is applied is referred to as page 0, the page to which the number 1 is applied is referred to as page 0, and so forth.

Figure 22:
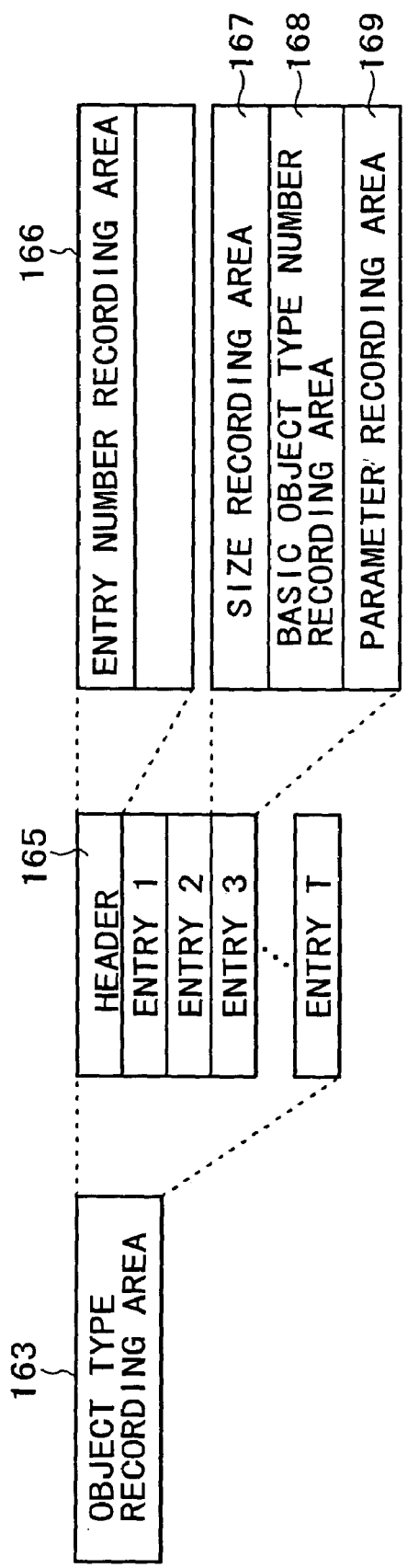
FIG. 22 is a view showing a configuration of an object type recording area 163.

FIG. 22 shows a structure of the object type recording area 163 of the system area 161. The object type recording area 163 is formed from a header 165 and T entries. T is a constant set in advance. The header 165 includes an entry number recording area 166. The number of entries registered at present (the maximum number of the entry number is T) is recorded in the entry number recording area 166.

Each of the entries of the object type recording area 163 includes a size recording area 167, a basic object type number recording area 168, and a parameter recording area 169. For example, in the entry t, information regarding the object type number t is recorded. In particular, the size of the object of the object type number t is recorded in the size recording area 167 of the entry t. The basic object type number representative of the basic object type to which the object of the object type number t belongs is recorded in the basic object type number recording area 168 of the entry t. Information regarding the size where the size of the object of the object type number t is a variable length is recorded in the parameter recording area 169 of the entry t.

Figure 23:
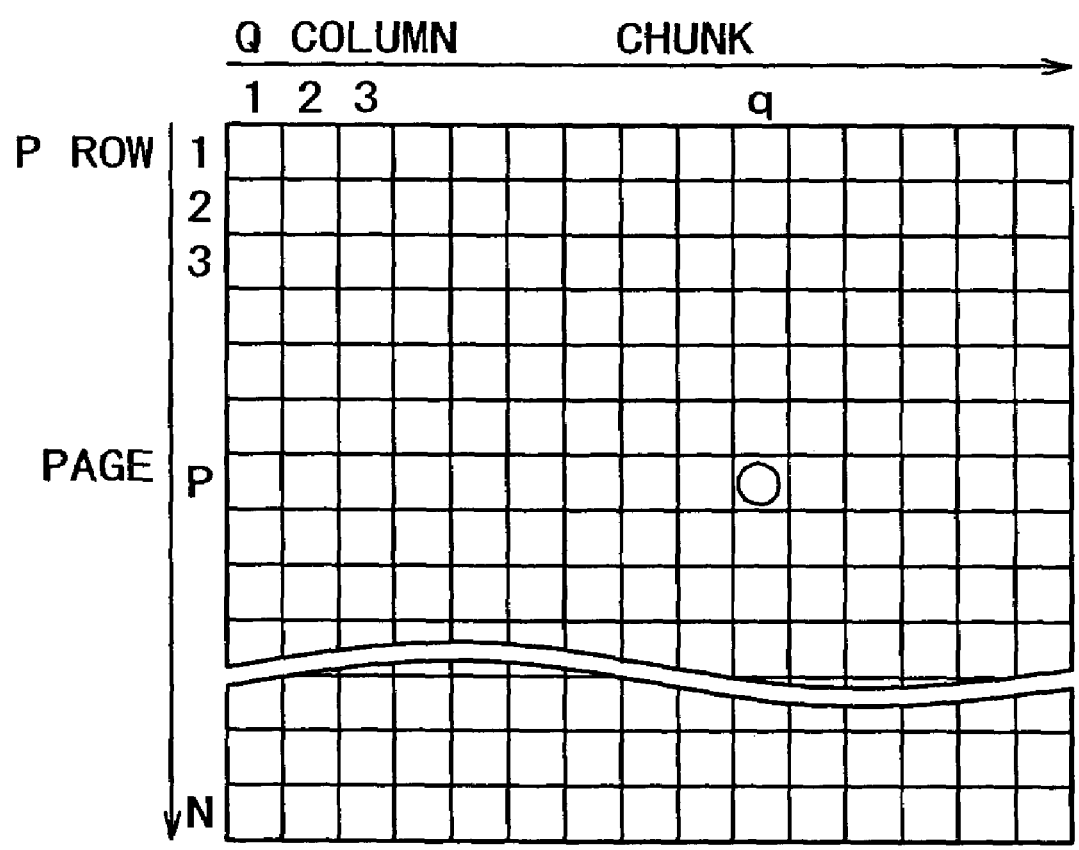
FIG. 23 is a view illustrating an area information recording area 164.

FIG. 23 shows the area information recording area 164 of the system area 161. The area information recording area 164 is formed from a bit train of the total page number of the object recording area 122 (a value obtained by multiplying the total number of chunks by the number of pages which form one chunk). It is to be noted that FIG. 23 shows the area information recording area 164 using a matrix of (total number of chunks) columns×(number of pages which form one chunk) rows for the convenience of description. For example, in FIG. 23, the bit indicated by "o" in the qth column of the pth row corresponds to the page p of the chunk q, and where the page p of the chunk q is in use, 1 is recorded in the bit indicated by "o". On the contrary, where the page p of the chunk q is not in use, 0 is recorded in the bit indicated by "o".

Figure 24:
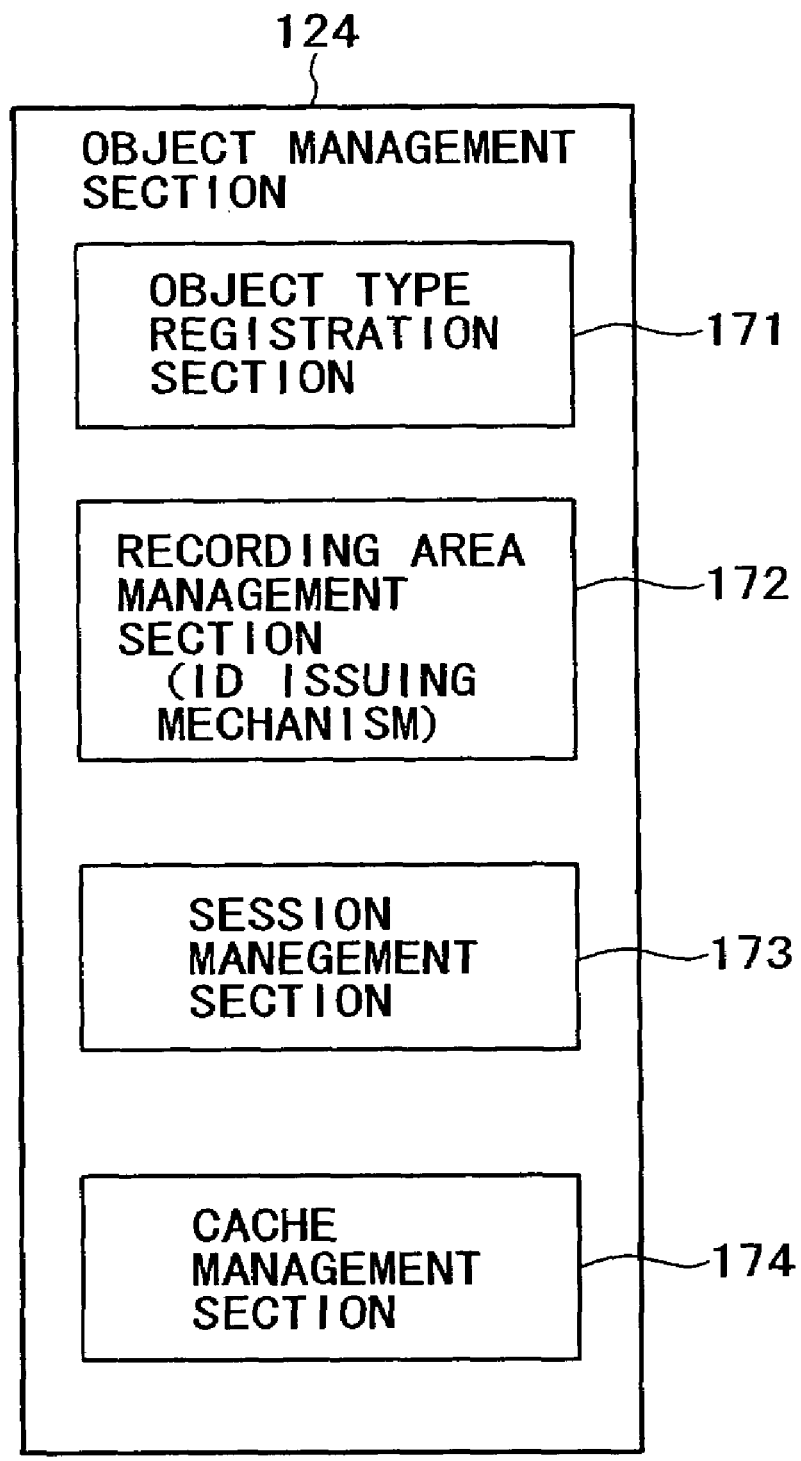
FIG. 24 is a view showing a configuration of an object management section 124.

FIG. 24 shows an example of a configuration of the object management section 124 which corresponds to the HD DB 91 included in the lower middleware layer 74. The object management section 124 includes an object type registration section 171, a storage area management section 172, a session management section 173 and a cache management section 174.

The object type registration section 171 performs registration of an object type (writing into the object type recording area 163). Further, the object type registration section 171 performs response to an inquiry for an object type (reading out from the object type recording area 163).

The storage area management section 172 inverts a predetermined bit in the area information recording area 164. The storage area management section 172 reads out a bit of the area information recording area 164 to search for a non-used area of a predetermined number of successive pages. Further, the storage area management section 172 issues an identifier to each object.

Figure 25:
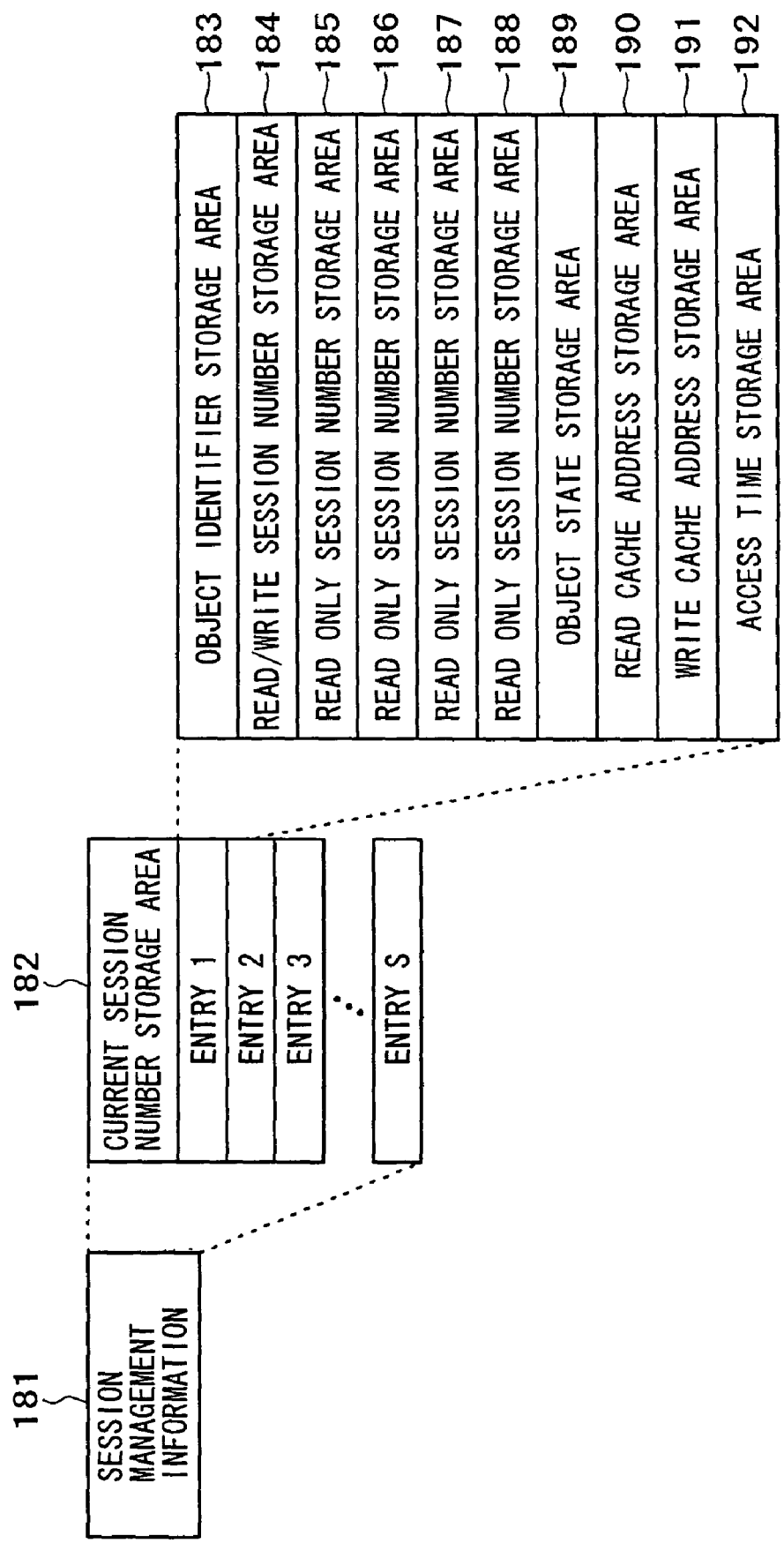
FIG. 25 is a view showing a configuration of session management information 181.

The session management section 173 issues a session number to a session being currently executed and manages session management information 181 (FIG. 25). Here, the session is a term representative of a process for controlling writing or reading out of data or the like.

FIG. 25 shows an example of a configuration of the session management information 181. The session management information 181 includes a current session number storage area 182 in which the number of sessions which are currently open (the number is hereinafter referred to as current session number) is stored, and S entries which individually correspond to objects and in each of which information of a session having the access right to the object is recorded. The maximum value of the current session number and the value S are set in advance.

Each of the entries of the session management information 181 includes an object identifier storage area 183, a read/write session number storage area 184, read only session number storage areas 185 to 188, an object state storage area 189, a read cache address storage area 190, a write cache address storage area 191, and an access time storage area 192.

The object identifier storage area 183 has an object identifier (FIG. 27) of a corresponding object stored therein. In the read/write session number storage area 184, the session number of a session which has the writing right for a corresponding object is stored. In the read only session number storage areas 185 to 188, the session numbers of sessions which have the reading right for a corresponding object are stored. It is to be noted that a plurality of sessions which have the reading right for an object may be present simultaneously, and FIG. 25 shows a case wherein up to four sessions have the reading right and only one session has the writing right and the reading right.

In the object state storage area 189, information representative of a state of a corresponding object ("CREATE" representative of preparation, "UPDATE" representative of updating or "REMOVE" representative of deletion") is stored. In the read cache address storage area 190, the address of the read cache into which an object read out is temporarily stored is stored. In the write cache address storage area 191, the address of the write cache into which an object to be written is temporarily stored is stored. In the access time storage area 192, the last access time to a corresponding object is stored.

It is to be noted that, where there exists no information to be stored into the areas from the object identifier storage area 183 to the access time storage area 192, 0 is stored.

Figure 26A:
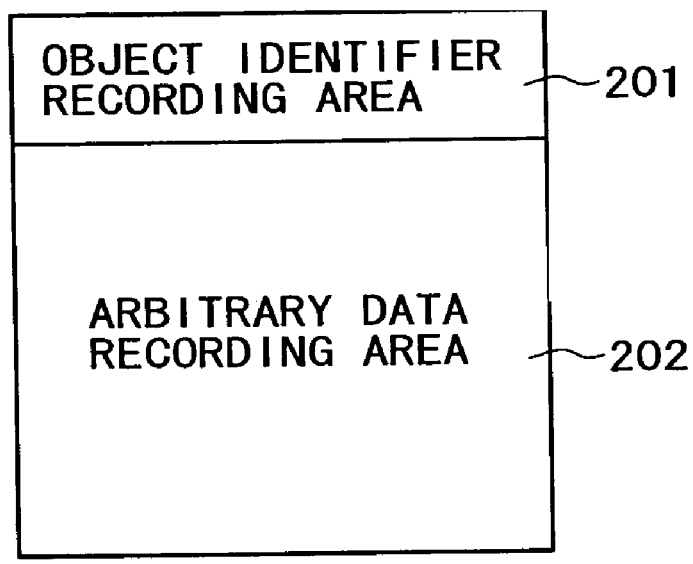
FIG. 26A is a view showing a basic object first type.
Figure 26B:
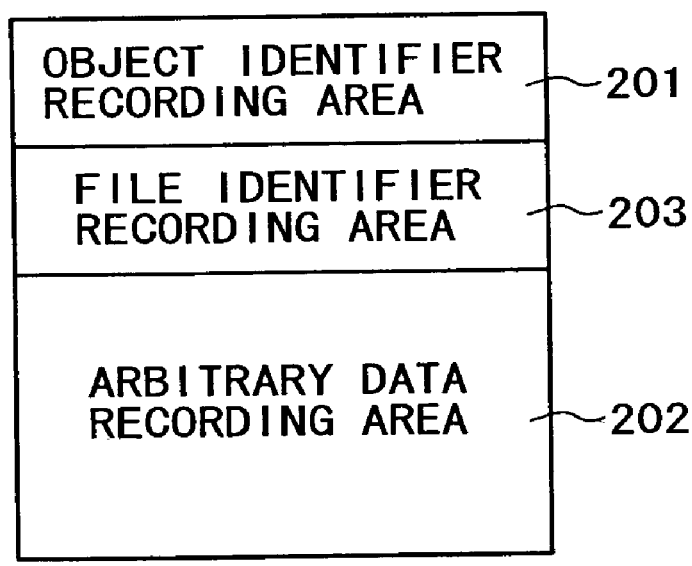
FIG. 26B is a view showing a basic object second type.

FIGS. 26A and 26B show an example of a configuration of a basic object first type and a basic object second type which are two different basic object types of objects to be recorded into chunks, respectively.

As shown in FIG. 26A, the basic object first type includes an object identifier recording area 201 in which the object identifier of the object itself is stored and an arbitrary data recording area 202 in which arbitrary data (for example, data of the name of the object set by the user) is recorded. The basic object first type includes objects of a folder list, a folder and an album.

The basic object second type includes, as shown in FIG. 26B, the object identifier recording area 201 in which the object identifier of the object itself is recorded, the arbitrary data recording area 202 in which arbitrary data are recorded, and a file identifier recording area 203 in which the file identifier of a file corresponding to the object itself (object) is recorded. The basic object second type includes an object of a track.

Figure 27:
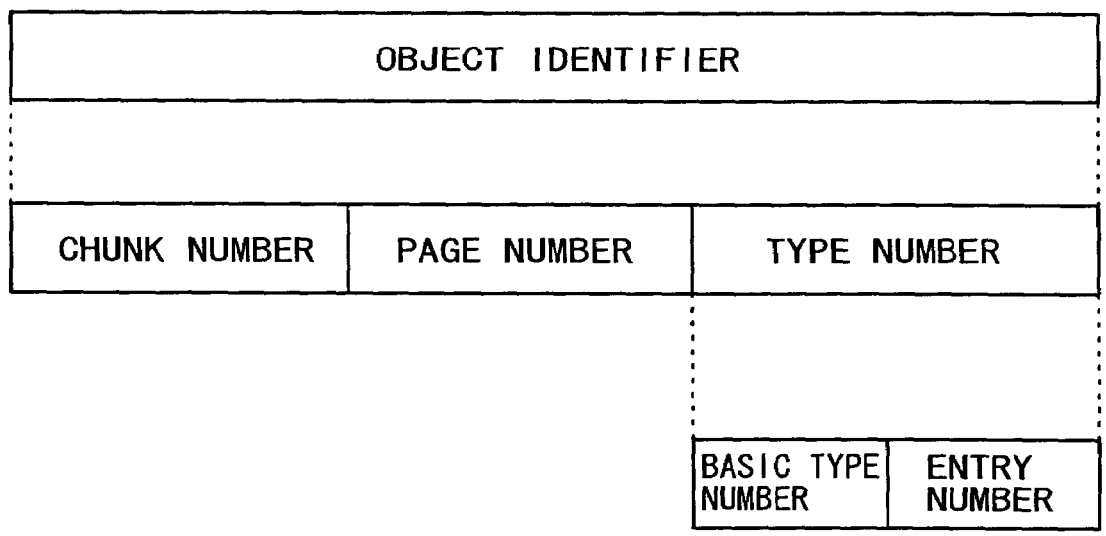
FIG. 27 is a view showing a configuration of an object identifier.

The object identifier recorded in the object identifier recording area 201 includes, as shown in FIG. 27, a chunk number and a page number representative of the top of the series of pages in which the corresponding object is stored, and a type number. The type number includes the basic object type number (one of the basic object first type and the basic object second type) to which the corresponding object belongs, and the entry number of the object type recording area 163 in which the type of the corresponding object is registered.

Now, an object preparation process, an object search process, an object updating process, a stream object preparation process and a stream object search process are described with reference to flow charts of FIGS. 28 to 37. Here, the stream object is a term which particularly signifies an object corresponding in a one-by-one corresponding relationship to contents data recorded in the file recording area 121, that is, a track. The stream object belongs to the basic object second type (FIG. 26B). Accordingly, an object which is not a stream object is an object of a folder or an album and belongs to the basic object first type.

It is to be noted that the processes mentioned are controlled by the object management section 124, that is, by the HD DB 91 which belongs to the lower middleware layer 74 of the firmware.

First, a preparation process of an object which is not a stream object is described with reference to a flow chart of FIG. 28 taking a case wherein an object of the object type number t is to be prepared as an example. It is to be noted that the object type number t includes a basic type number (in the present case, the basic object first type) and an entry number as shown in FIG. 27.

At step S121, the HD DB 91 opens a write session. The process of opening a write session is described with reference to a flow chart of FIG. 29. At step S141, the HD DB 91 reads out the current session number stored in the current session number storage area 182 of the session management information 181 and discriminates whether or not the current session number read out is smaller than a maximum value set in advance. If it is discriminated that the current session number is smaller than the maximum value set in advance, then the processing advances to step S142.

At step S142, the HD DB 91 increments the current session number stored in the current session number storage area 182 of the session management information 181 by 1. At step S143, the HD DB 91 opens a write session and issues a session number Z using, for example, a random number. The processing returns to FIG. 28.

It is to be noted that, if it is discriminated at step S141 that the current session number is not smaller than the maximum value set in advance, since it is impossible to open another session, the processing advances to step S144, at which the HD DB 91 makes a determination of an error. The session opening process is ended, and the object preparation process of FIG. 28 is interrupted.

Figure 28:
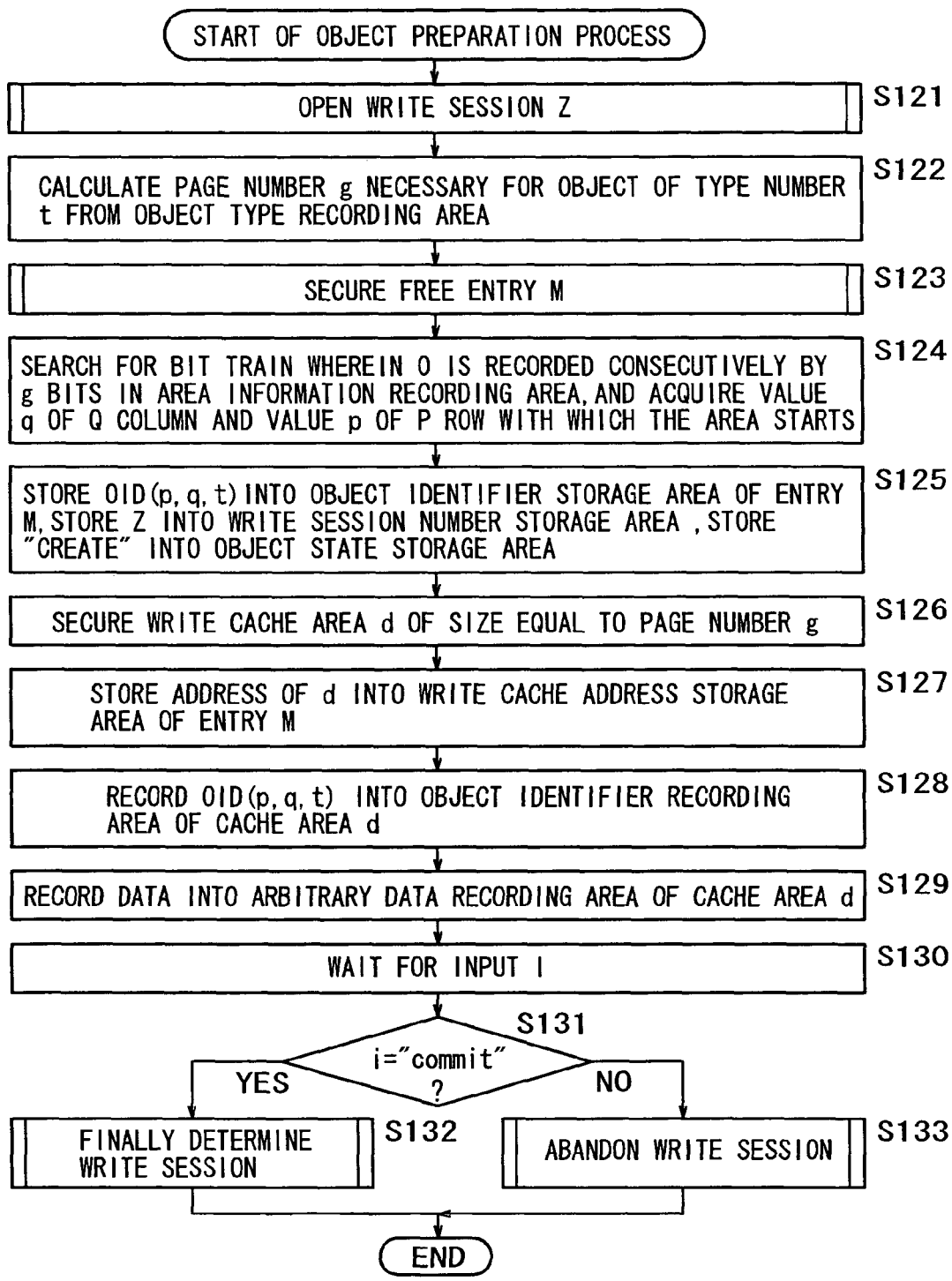
FIG. 28 is a flow chart illustrating an object preparation process.

At step S122 of FIG. 28, the HD DB 91 reads out, in order to secure a page of a chunk into which the object of the object type number t is to be recorded, the size of the object of the object type number t from the size recording area 167 of the entry t of the object type recording area 163 and calculates the number of pages of the chunk which corresponds to the size. The page number calculated is represented by g.

At step S123, the HD DB 91 secures a free entry from among a plurality of entries which form the session management information 181. The process of securing a free entry is described with reference to a flow chart of FIG. 30.

At step S151, the HD DB 91 initializes a variable M to 1. At step S152, the HD DB 91 discriminates whether or not the variable M is equal to or smaller than the number S of entries which form the session management information 181. If it is discriminated that the variable M is equal to or smaller than the number S of entries, then the processing advances to step S153. At step S153, the HD DB 91 reads out the value of the object identifier storage area 183 of the entry M which form the session management information 181. At step S154, the HD DB 91 discriminates whether or not the value of the object identifier storage area 183 of the entry M read out is 0. If it is discriminated that the value of the object identifier storage area 183 of the entry M is 0, then since it can be determined that the entry M is a free entry, the entry M is secured, and the processing returns to FIG. 28.

If it is discriminated at step S154 that the value of the object identifier storage area 183 of the entry M is not 0, then the processing advances to step S155. At step S155, the HD DB 91 increments the variable M by 1. The processing returns to step S152 so that the processes at the steps beginning with step S152 forth are repeated. Thereafter, if it is discriminated at step S152 that the variable M is not equal to or smaller than the number S of entries while it is not discriminated at step S154 that the value of the object identifier storage area 183 of the entry M is 0, then since there currently exists no free entry, the processing advances to step S156 in order to create a free entry.

At step S156, the HD DB 91 discriminates whether or not the entries which form the session management information 181 include an entry wherein the values of the read/write session number storage area 184 and the read only session number storage areas 185 to 188 are all equal to 0. If it is discriminated that there exists such an entry, then the processing advances to step S157. At step S157, the HD DB 91 extracts, from among those entries wherein the values of the read/write session number storage area 184 and the read only session number storage areas 185 to 188 are all equal to 0, that entry whose access time storage area 192 exhibits the lowest value (that is, that entry which has the oldest access time).

At step S158, the HD DB 91 clears the values of the areas from the object identifier storage area 182 to the access time storage area 192 of the extracted entry to 0 and secures the entry as a free entry M. The processing returns to FIG. 28.

It is to be noted that, if it is discriminated at step S156 that the entries which form the session management information 181 do not include an entry wherein the values of the read/write session number storage area 184 and the read only session number storage areas 185 to 188 are all equal to 0, since a free entry cannot be secured, the processing advances to step S159. At step S159, the HD DB 91 makes a determination of an error. The free entry securing process is ended, and the object preparation process of FIG. 28 is interrupted.

Referring back to FIG. 28, at step S124, the HD DB 91 searches the bit train of the area information recording area 164 for a bit train wherein 0 is recorded successively for g bits. The top position of the searched out bit train wherein 0 is recorded successively for g bits is the pth row of the qth column. At step S125, the HD DB 91 stores an object identifier OID(q, p, t) which includes the chunk number q, page number p and object type number t as shown in FIG. 27 into the secured object identifier storage area 183 of the entry M. Further, the HD DB 91 stores the session number Z into the read/write session number storage area 184 of the entry M of the session management information 181 and further records "CREATE" representative of preparation into the object state storage area 189.

At step S126, the HD DB 91 secures a write cache area d equal to the page number g which is the size of the object in the buffer 56. At step S127, the HD DB 91 stores the address of the secured write cache area d of the buffer 56 into the write cache address storage area 191 of the entry M of the session management information 181.

At step S128, the HD DB 91 starts recording of the object X of the object basic first type shown in FIG. 26A into the write cache area d secured in the buffer 56. In this instance, the HD DB 91 first records the object identifier OID(q, p, t) into the object identifier recording area 201 of the write cache area d. At step S129, the HD DB 91 records arbitrary data (for example, the name of the object to be prepared or the like) of the object to be prepared into the arbitrary data recording area 202 of the write cache area d.

At step S130, the HD DB 91 waits for inputting of a signal I corresponding to an operation of a user. At step S131, the HD DB 91 discriminates whether or not the signal I represents "commit", that is, final determination of preparation of a session. If it is discriminated that the signal I represents "commit", the processing advances to step S132, at which the write session Z is finally determined. On the contrary, if it is discriminated that the signal I does not represent "commit", then the processing advances to step S133, at which the write session Z is abandoned.

Figure 31:
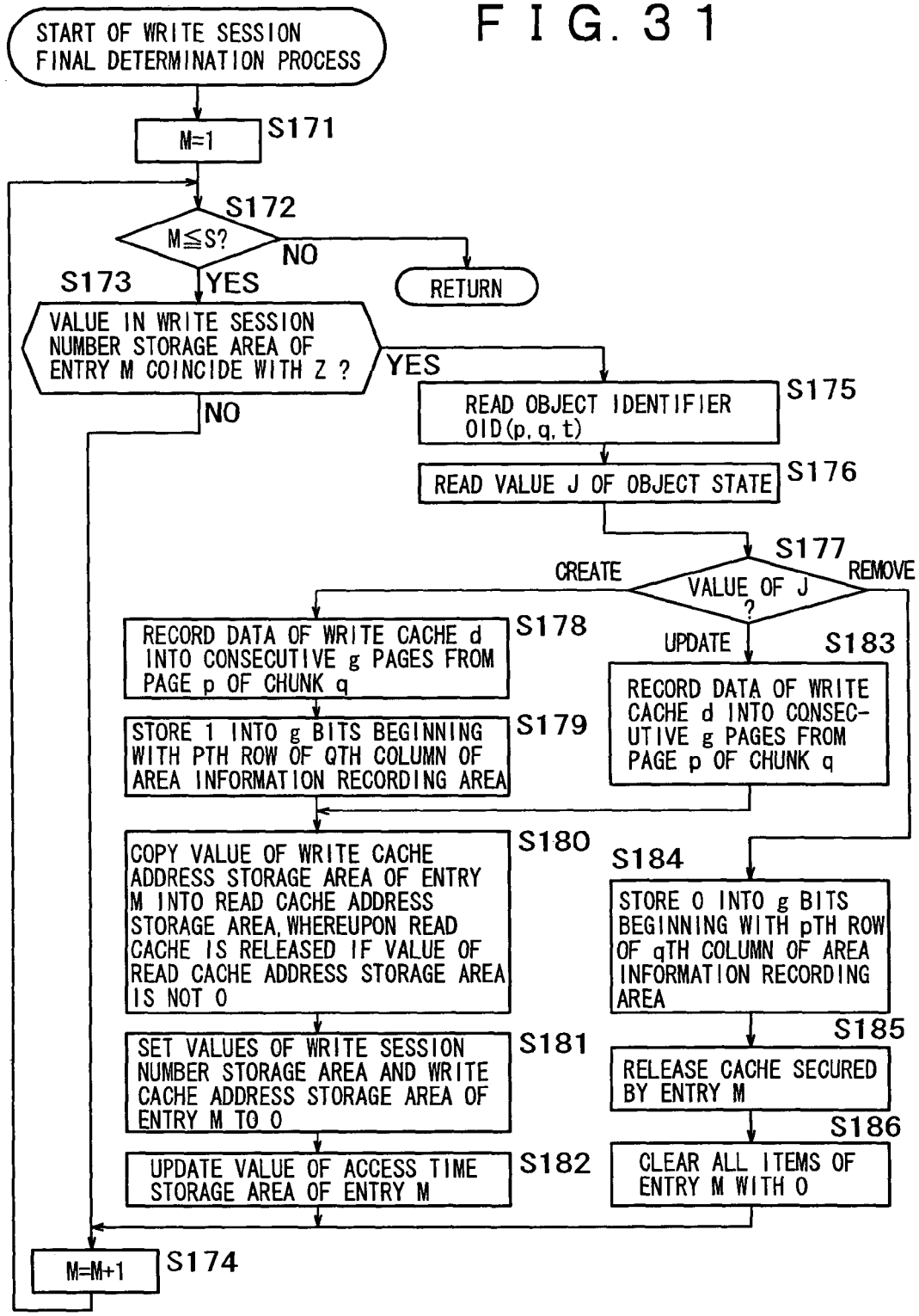
FIG. 31 is a flow chart illustrating a write session final determination process.

The process of finally determining a write session at step S132 is described with reference to a flow chart of FIG. 31. It is to be noted that to finally determine a session signifies to reflect recording of the object recording area 122 upon preparation, updating, movement or the like of the object performed after the session is opened to finally determine the same.

At step S171, the HD DB 91 initializes the variable M to 1. At step S172, the HD DB 91 discriminates whether or not the variable M is equal to or smaller than the number S of entries which form the session management information 181. If it is discriminated that the variable M is equal to or smaller than the number S of entries, then the processing advances to step S173. At step S173, the HD DB 91 reads out the value of the read/write session number storage area 184 of the entry M which forms the session management information 181, and discriminates whether or not the value read out is equal to the session number Z. If it is discriminated that the value of the read/write session number storage area 184 of the entry M and the session number Z are not equal to each other, then the processing advances to step S174 in order to search for an entry whose session number Z is equal to the value of the read/write session number storage area 184 of the entry M.

At step S174, the HD DB 91 increments the variable M by 1. The processing returns to step S172 so that the processes at the steps beginning with step S172 are repeated. If it is discriminated at step S173 that the value of the read/write session number storage area 184 of the variable M and the session number Z are equal to each other, then the processing advances to step S175. In particular, only an entry whose session number Z is stored in the read/write session number storage area 184 is extracted, and the processing at the steps beginning with step S175 is performed for the extracted entry.

At step S175, the HD DB 91 reads out the object identifier from the object identifier storage area 183 of the entry M whose session number Z is stored in the read/write session number storage area 184. At step S176, the HD DB 91 reads out information J representative of an object state from the object state storage area 189 of the entry M whose session number Z is stored in the read/write session number storage area 184. At step S176, the HD DB 91 discriminates which one of "CREATE", "UPDATE" and "REMOVE" the information J representative of an object state is.

If it is discriminated at step S177 that the information J representative of an object state is "CREATE", then the processing advances to step S178. At step S178, the HD DB 91 records the object recorded in the write cache area d secured in the buffer 56 into pages beginning with the page q of the chunk p of the object recording area 122. At step S179, the HD DB 91 records 1 into g bits beginning with the pth row of the qth column of the area information recording area 164.

At step S180, the HD DB 91 copies the values of the write cache address storage area 191 of the entry M into the read cache address storage area 190. At this time, if any other value than 0 is stored in the read cache address storage area 190, then the read cache area in which the buffer 56 indicated by the value is released.

At step S181, the HD DB 91 stores 0 into the read/write session number storage area 184 of the entry M and the write cache address storage area 191. At step S182, the HD DB 91 updates the value of the access time storage area 192 of the entry M with the time at present.

If it is discriminated at step S177 that the information J representative of an object state is "UPDATE", then the processing advances to step S183. At step S183, the HD DB 91 records the object recorded in the write cache area d secured in the buffer 56 into pages beginning with the page q of the chunk p of the object recording area 122. The processing advances to step S180.

If it is discriminated at step S177 that the information J representative of an object state is "REMOVE", then the processing advances to step S184. At step S184, the HD DB 91 records 0 into g bits beginning with the pth row of the qth column of the area information recording area 164. At step S185, the HD DB 91 releases the write cache and the read cache secured in the buffer 56 by the entry M. At step S186, the HD DB 91 stores 0 into the areas from the object identifier storage area 183 to the access time storage area 192 of the entry M. The processing advances to step S174.

Thereafter, the processes described above are repeated until after it is discriminated at step S172 that the variable M is not equal to or lower than the number S of entries. If it is discriminated that the variable M is not equal to or lower than the number S of entries, then the processing of finally determining the write session is completed.

Figure 32:
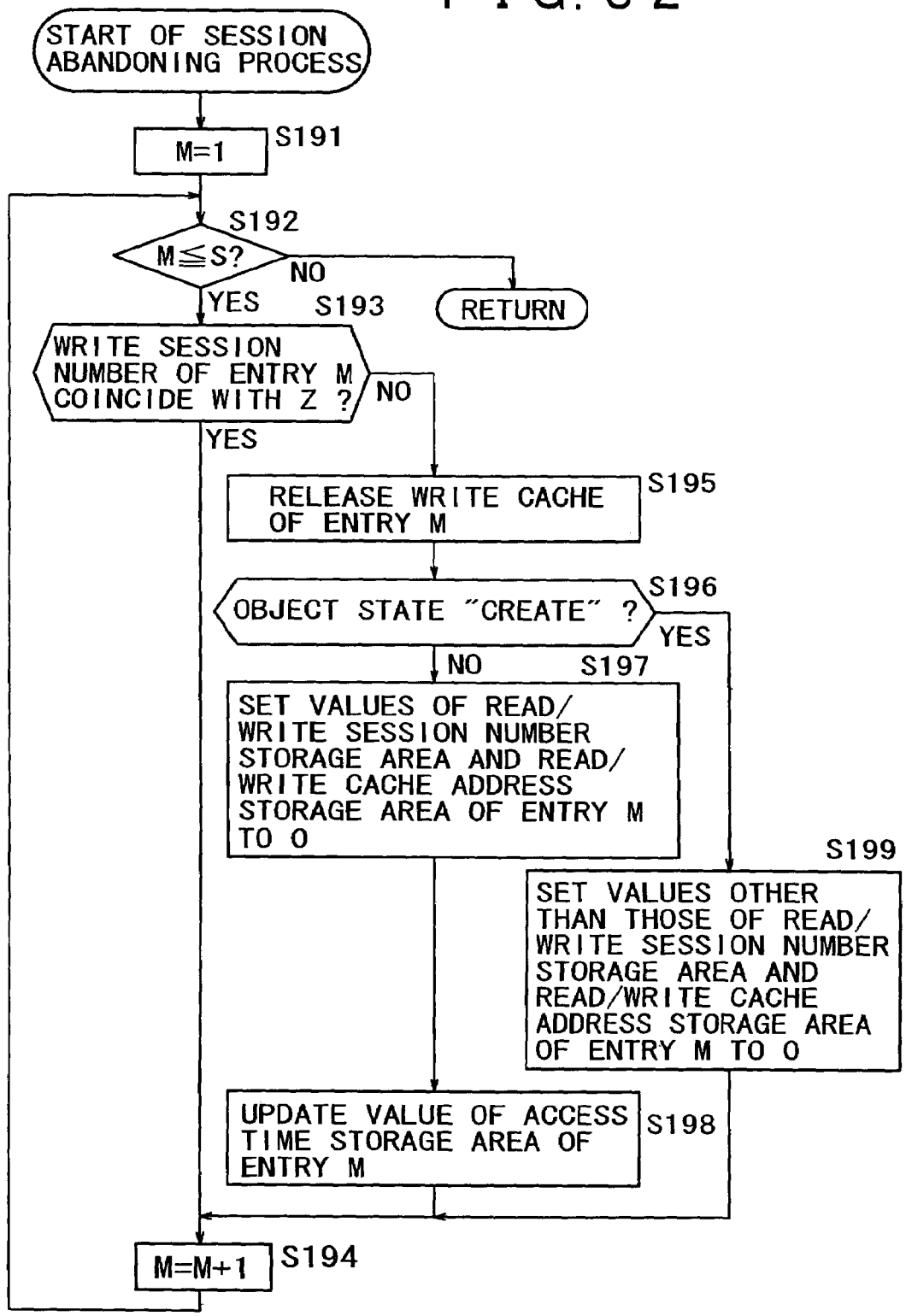
FIG. 32 is a flow chart illustrating a session abandoning process.

The process at step S133 of FIG. 28, that is, the process of abandoning a write session, is described with reference to a flow chart of FIG. 32. At step S191, the HD DB 91 initializes the variable M to 1. At step S192, the HD DB 91 discriminates whether or not the variable M is equal to or lower than the number S of entries which form the session management information 181. If it is discriminated that the variable M is equal to or lower than the number S of entries, then the processing advances to step S193.

At step S193, the HD DB 91 reads out the value of the read/write session number storage area 184 of the entry M which forms the session management information 181, and discriminates whether or not the value is equal to the session number Z. If it is discriminated that the value of the read/write session number storage area 184 of the entry M and the session number Z are not equal to each other, then the processing advances to step S194 in order to search for an entry whose session number Z is equal to the value of the read/write session number storage area 184 of the entry M. At step S194, the HD DB 91 increments the variable M by 1. The processing returns to step S192 so that the processes at the steps beginning with step S192 are repeated.

If it is discriminated at step S193 that the value of the read/write session number storage area 184 of the entry M and the session number Z are equal to each other, then the processing advances to step S195. In other words, only an entry whose session number Z is stored in the read/write session number storage area 184 is extracted, and the processes at the steps beginning with step S195 are performed for the entry.

At step S195, the HD DB 91 releases the write cache area secured in the buffer 56 by the entry M. At step S196, the HD DB 91 discriminates whether or not the object state stored in the object state storage area 189 of the entry M is "CREATE". If it is discriminated that the object state is not "CREATE", then the processing advances to step S197.

At step S197, the HD DB 91 stores 0 into the read/write session number storage area 184 of the entry M and the write cache address storage area 191. At step S198, the HD DB 91 updates the value of the access time storage area 192 of the entry M with the time at present. The processing advances to step S194.

It is to be noted that, if it is discriminated at step S196 that the object state stored in the object state storage area 189 of the entry M is "CREATE", then the processing advances to step S199. At step S199, the HD DB 91 stores 0 into the areas of the entry M other than the read/write session number storage area 184 and the write cache address storage area 191, that is, into the object identifier storage area 183, read only session number storage areas 185 to 188, object state storage area 189, read cache address storage area 190 and access time storage area 192. The processing advances to step S194.

Thereafter, the processes at the steps described above following the step S192 are repeated until after it is discriminated at step S192 that the variable M is not equal to or lower than the number S of entries. If it is discriminated that the variable M is not equal to or lower than the number S of entries, then the processing of abandoning the write session is completed.

Figure 33:
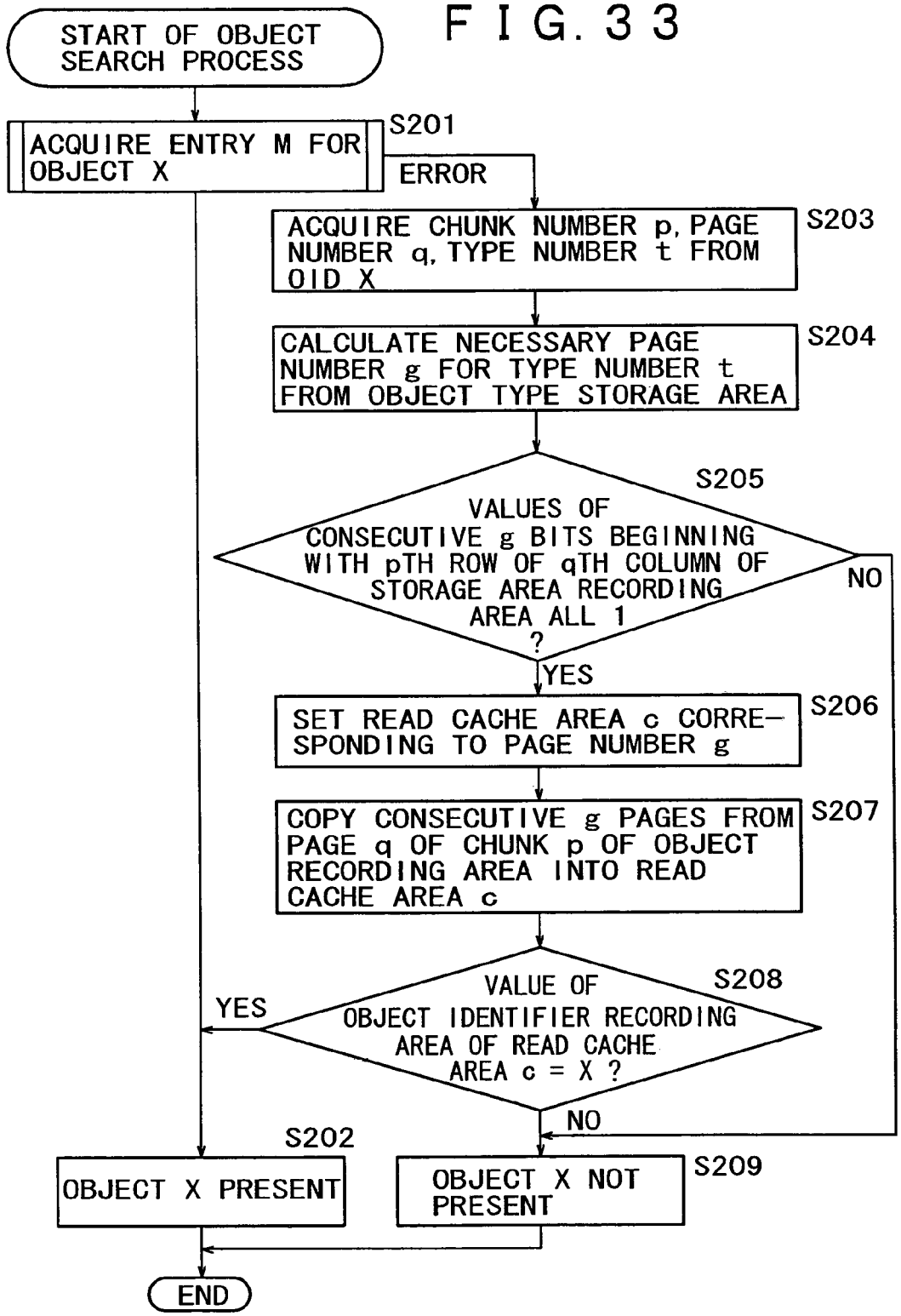
FIG. 33 is a flow chart illustrating an object search process.
Figure 34:
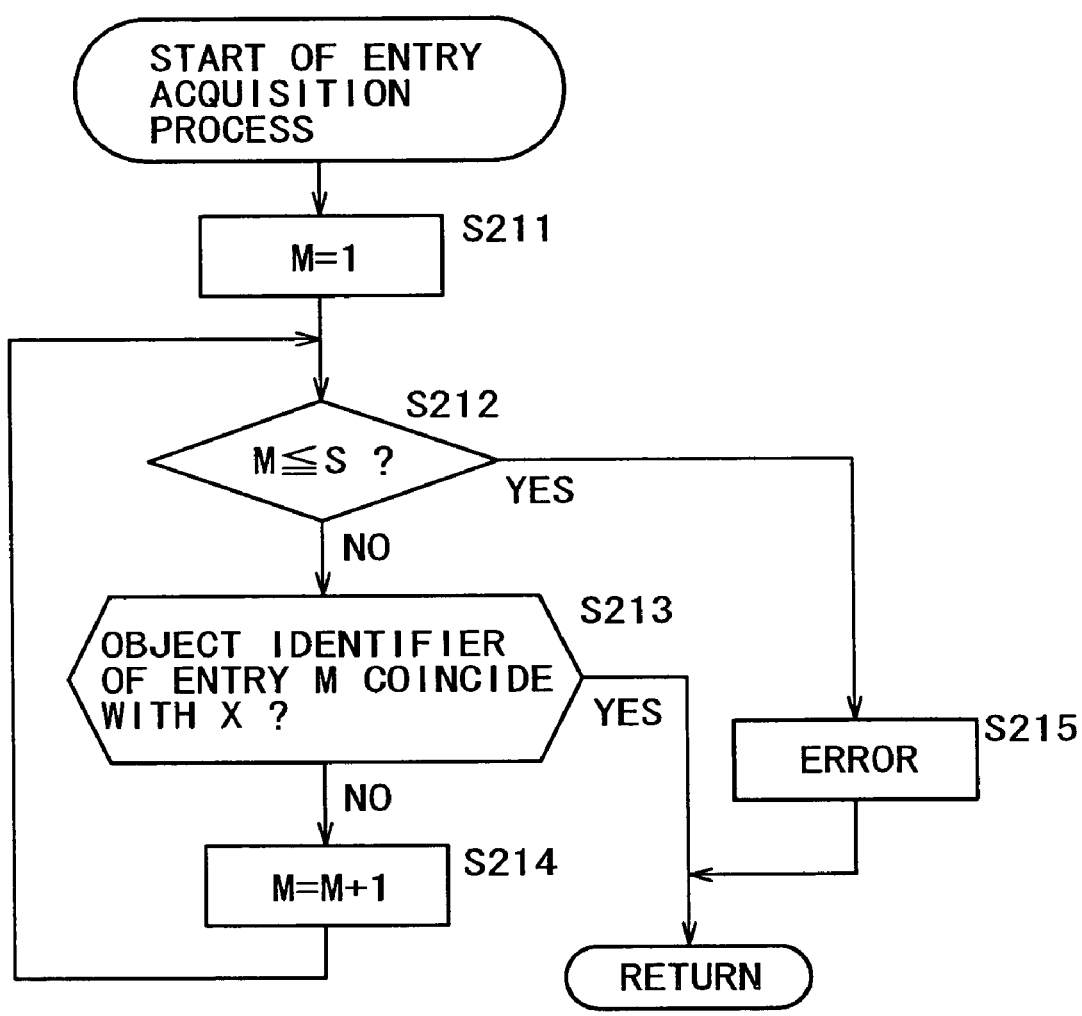
FIG. 34 is a flow chart illustrating an entry acquisition process.

Now, the object search process is described with reference to a flow chart of FIG. 33 taking a case wherein an object whose object identifier OID is X (the object is hereinafter referred to as object X) is searched for as an example. It is assumed that a session has already been opened.

At step S201, the HD DB 91 acquires an entry M corresponding to the object X. A process of acquiring an entry corresponding to the object X is described with reference to a flow chart of FIG. 34.

At step S211, the HD DB 91 initializes the variable M to 1. At step S212, the HD DB 91 discriminates whether or not the variable M is equal to or smaller than the number S of entries which form the session management information 181. If it is discriminated that the variable M is equal to or lower than the number S of entries, then the processing advances to step S213.

At step S213, the HD DB 91 reads out the value of the object identifier storage area 183 of the entry M which forms the session management information 181, and discriminates whether or not the value is equal to the object identifier OID=X of the object X. If the value of the object identifier storage area 183 of the entry M and the object identifier OID=X of the object X are not equal to each other, then the processing advances to step S214 in order to search for an entry wherein the value of the object identifier storage area 183 and the object identifier OID=X of the object X are equal to each other.

At step S214, the HD DB 91 increments the variable M by 1. The processing returns to step S212 so that the processes at the steps beginning with step S212 are repeated. If it is discriminated at step S213 that the value of the object identifier storage area 183 of the entry M and the object identifier OID=X of the object X are equal to each other, then since an entry M which corresponds to the object X has been acquired successfully, the present process is ended, and the processing is returns to FIG. 33.

It is to be noted that, if the case wherein it is discriminated at step S213 that the value of the object identifier storage area 183 of the entry M and the object identifier OID=X of the object X are not equal to each other continues and then it is discriminated at step S212 that the variable M is not equal to or smaller than the number S of entries, the processing advances to step S215. At step S215, the HD DB 91 discriminates that an error has occurred, that is, an entry M which corresponds to the object X has not been acquired successfully, and ends the present process. The processing returns to FIG. 33.

Referring back to FIG. 33, when an entry M corresponding to the object X has been acquired successfully through the process at step S201, the processing advances to step S202. At step S202, the HD DB 91 discriminates that the object X is present in the buffer 56 because an entry M corresponding to the object X has been acquired successfully, and ends the process.

On the contrary, if an entry M which corresponds to the object X has not been acquired successfully through the process at step S201, the processing advances to step S203. At step S203, the HD DB 91 decomposes the object identifier OID=X of the object X to acquire a chunk number and a page number of the object recording area 122 in which the object is recorded and the object type number t of the object X.

At step S204, the HD DB 91 reads out the value of the size recording area 167 of an entry which corresponds to the object type number t from the object type recording area 163, and calculates a page number g necessary to record the object X based on the read out value.

At step S205, the HD DB 91 refers to the area information recording area 164 to discriminate whether or not the g bits beginning with the pth column of the qth row of the area information recording area 164 are 1. If it is discriminated that the g bits beginning with the pth column of the qth row of the area information recording area 164 are 1, then the processing advances to step S206. At step S206, the HD DB 91 sets a read cache area c corresponding to the page number g in the buffer 56. At step S207, the HD DB 91 copies the data recorded in the g pages beginning with the page p of the chunk q of the object recording area 122 into the read cache area c of the buffer 56.

At step S208, the HD DB 91 discriminates whether or not the object identifier recorded at a portion of the data copied in the read cache area c which corresponds to the object identifier recording area 201 and the object identifier X coincide with each other. If it is discriminated that they coincide with each other, then since the data cached in the read cache area c are the object X, the processing advances to step S202.

If it is discriminated at step S208 that the object identifier recorded at a portion of the data copied in the read cache area c which corresponds to the object identifier recording area 201 and the object identifier X do not coincide with each other, then the processing advances to step S209. At step S209, the HD DB 91 determines that the object X is not present in the object recording area 122 either, and ends the processing.

Figure 35:
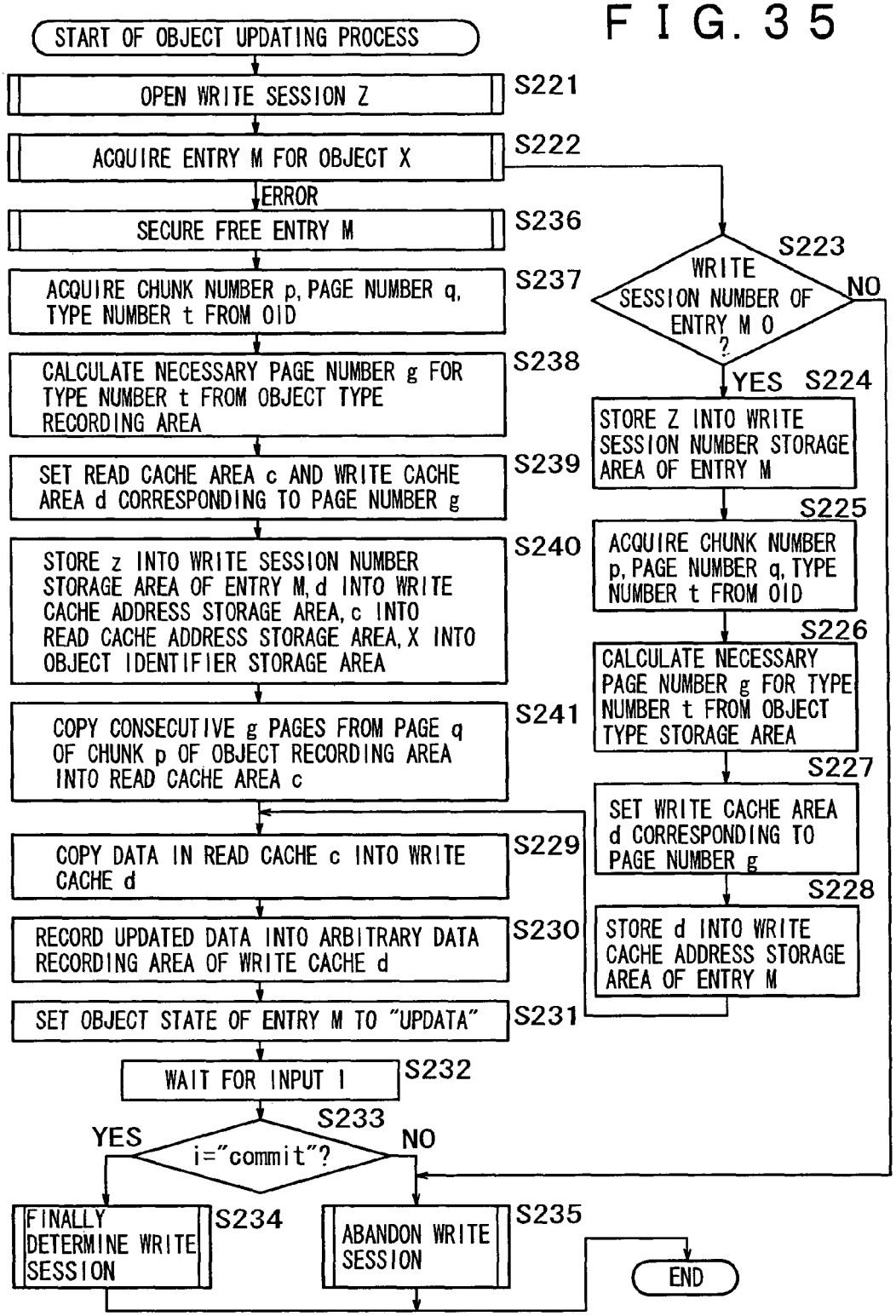
FIG. 35 is a flow chart illustrating an object updating process.

Now, the updating process of the object X is described with reference to a flow chart of FIG. 35. Here, the updating process of the object X is a process of rewriting arbitrary data of the object X.

Figure 29:
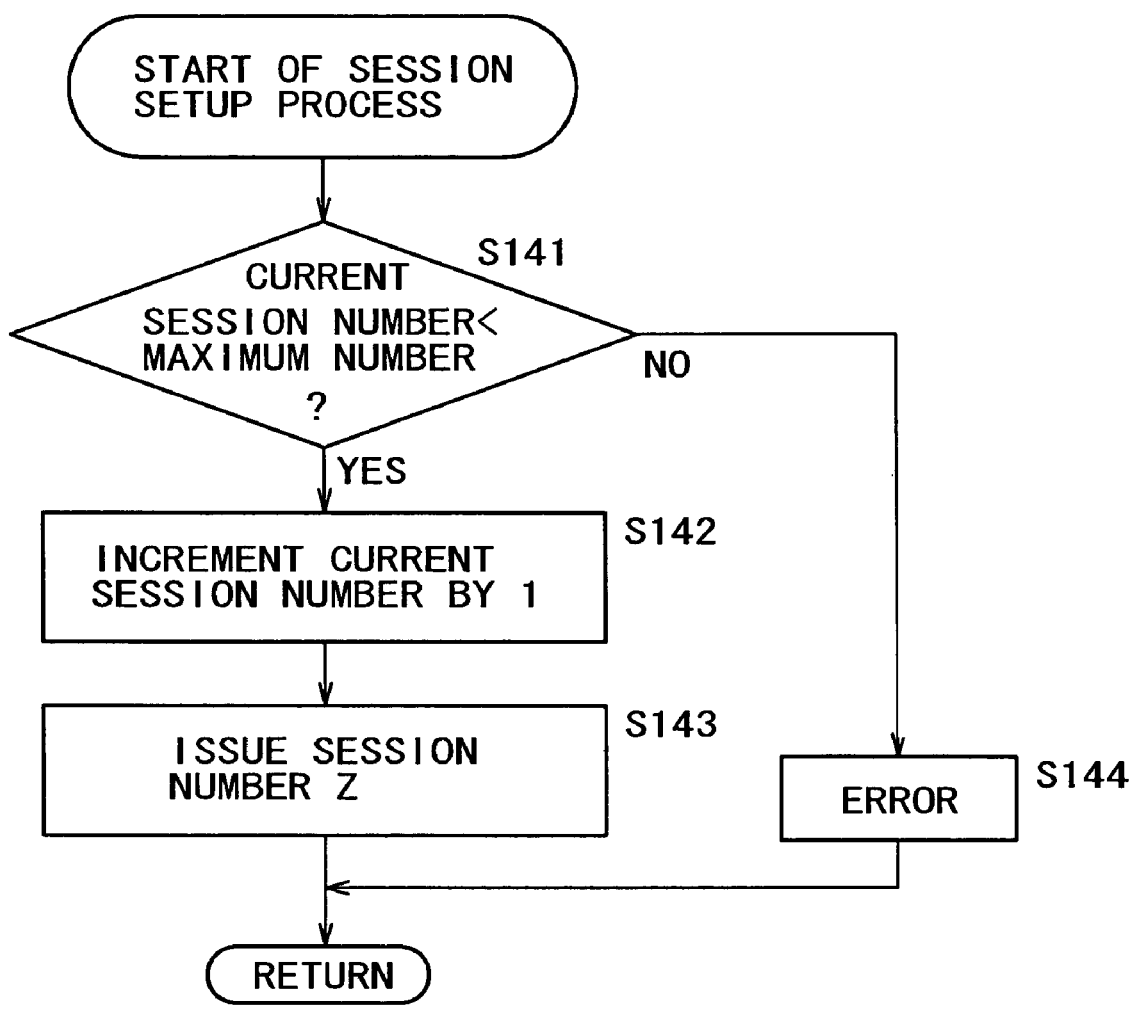
FIG. 29 is a flow chart illustrating a session opening process.

At step S221, the HD DB 91 opens a write session Z similarly as in the process at step S121 described hereinabove with reference to FIG. 29. At step S222, the HD DB 91 acquires an entry M corresponding to the object X similarly as in the process at step S201 described hereinabove with reference to FIG. 34.

If an entry M corresponding to the object X is acquired successfully through the process at step S222, then the HD DB 91 determines that the object X is cached in the read cache area c set in the buffer 56, and advances the processing to step S223. At step S223, the HD DB 91 discriminates whether or not the value of the read/write session number storage area 184 of the entry M is 0. If it is discriminated that the value of the read/write session number storage area 184 of the entry M is 0, then the processing advances to step S224.

At step S224, the HD DB 91 stores the session number Z of the write session opened at step S221 into the read/write session number storage area 184 of the entry M. At step S225, the HD DB 91 decomposes the object identifier OID=X of the object X to acquire a chunk number and a page number of the object recording area 122 in which the object is recorded and the type number t of the object X.

At step S226, the HD DB 91 reads out the value of the size recording area 167 of the entry corresponding to the type number t from the object type recording area 163, and calculates a page number g necessary to record the object X based on the read out value. At step S227, the HD DB 91 sets a write cache area d which corresponds to the page number g in the buffer 56. At step S228, the HD DB 91 stores the address of the write cache area d into the write cache address storage area 191 of the entry M.

At step S229, the HD DB 91 copies the data in the read cache area c of the buffer 56 into the write cache area d. At step S230, the HD DB 91 records arbitrary data for updating of the object X into the arbitrary data recording area 202 of the object X copied in the write cache area d. At step S231, the HD DB 91 stores the information "UPDATE" representative of updating into the object state storage area 189 of the entry M.

At step S232, the HD DB 91 waits for inputting of a signal I corresponding to an operation of the user. At step S233, the HD DB 91 discriminates whether or not the signal I represents "commit", that is, final determination of updating of the session. If the signal I represents "commit", then the processing advances to step S234. At step S234, the HD DB 91 finally determines the write session Z similarly as in the process at step S132 described hereinabove with reference to FIG. 31. On the contrary if it is discriminated that the signal I does not represent "commit", then the processing advances to step S235. At step S235, the HD DB 91 abandons the write session Z similarly as in the process at step S133 described hereinabove with reference to FIG. 32.

It is to be noted that, if it is discriminated at step S223 that the value of the read/write session number storage area 184 of the entry M is not 0, then since it can be determined that the object X is being updated by some other session than the session Z, the processing advances to step S235.

Figure 30:
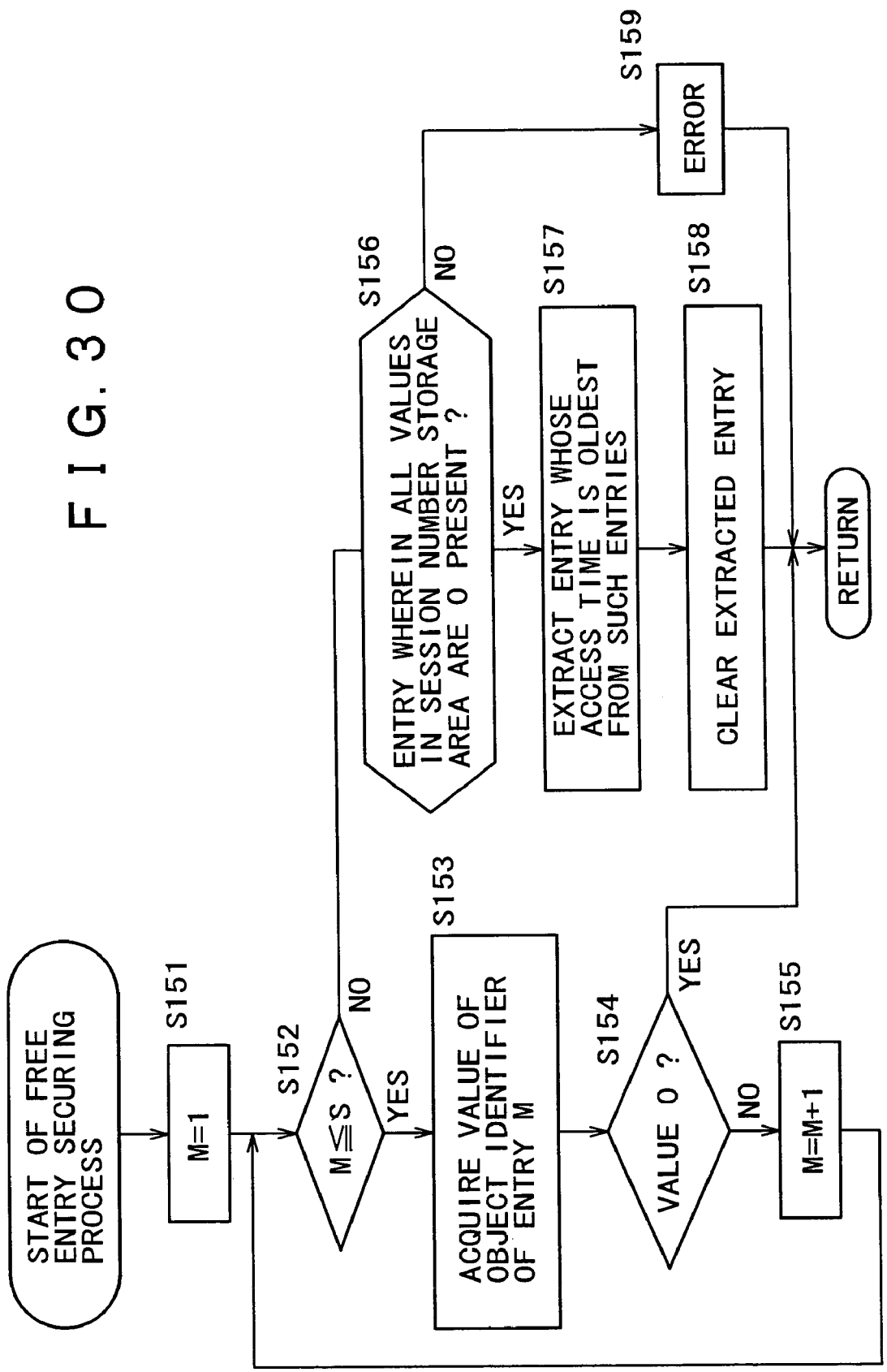
FIG. 30 is a flow chart illustrating a free entry securing process.

If an entry M corresponding to the object X is not acquired successfully through the process at step S222, then the processing advances to step S236, at which the HD DB 91 secures a free entry M similarly as in the process at step S123 described hereinabove with reference to FIG. 30.

At step S237, the HD DB 91 decomposes the object identifier OID=X of the object X to acquire a chunk number and a page number of the object recording area 122 in which the object is recorded and the type number t of the object X. At step S238, the HD DB 91 reads out the value of the size recording area 167 of the entry corresponding to the type number t from the object type recording area 163 and calculates a page number g necessary to record the object X based on the read out value. At step S239, the HD DB 91 sets a read cache area c and a write cache area d corresponding to the page number g in the buffer 56.

At step S240, the HD DB 91 stores the address of the read cache area c into the read cache address storage area 190 of the entry M, stores the address of the write cache area d into the write cache address storage area 191 of the entry M, and stores the object identifier OID=X of the object X into the object identifier storage area 183 of the entry M.

At step S241, the HD DB 91 copies the data of the object X recorded in the g pages beginning with the page p of the chunk q of the object recording area 122 into the read cache area c of the buffer 56. The processing advances to step S229.

As described above, in the updating process of the file X, the data of the file X are copied from the read cache area c into the write cache area d and the data of the file X cached in the write cache area d are rewritten, and a result of the rewriting is recorded into the object recording area 122 by the process of finally determining the session.

Figure 36:
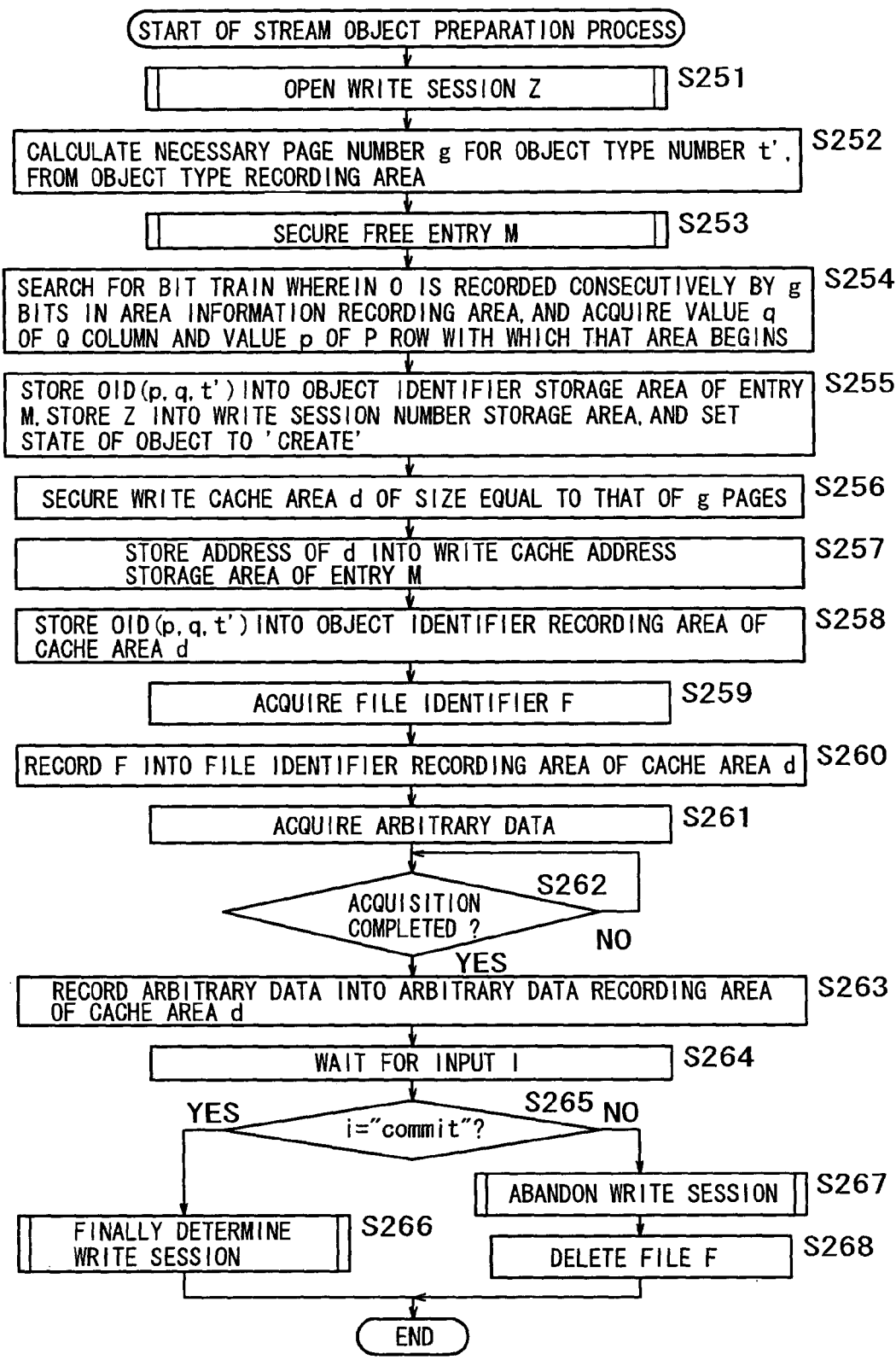
FIG. 36 is a flow chart illustrating a stream object preparation process.

Now, a process of preparing an object of tracks which correspond in a one-by-one corresponding relationship to contents data to be recorded into the file recording area 121, that is, a stream object of the object type number t', is described with reference to a flow chart of FIG. 36. It is to be noted that the object type number t' includes a basic type number (in the present case, the basic object second type) and an entry number as shown in FIG. 27.

At step S251, the HD DB 91 opens a write session similarly as in the process at step S121 described hereinabove with reference to the flow chart of FIG. 29. At step S252, the HD DB 91 reads out, in order to secure pages of a chunk into which the stream object of the object type number t' is to be recorded, the size of the object of the object type number t' from the size recording area 167 of the object type number t' of the object type recording area 163 and calculates the number of pages of a chunk corresponding to the size. The page number calculated is represented by g.

At step S253, the HD DB 91 secures a free entry M from among a plurality of entries which form the session management information 181 similarly as in the process at step S123 described hereinabove with reference to the flow chart of FIG. 30. At step S254, the HD DB 91 searches for a bit train wherein 0 is recorded successively for g bits from within the bit train of the area information recording area 164. The position of the top of the searched out bit train wherein 0 is recorded successively for g bits is represented by the p row of the q column. At step S255, the HD DB 91 stores an object identifier OID(q, p, t') including the chunk number q, page number p and object type number t' as shown in FIG. 27 into the object identifier storage area 183 of the secured entry M. Further, the HD DB 91 stores the session number Z into the read/write session number storage area 184 of the entry M of the session management information 181 and further records "CREATE" representative of preparation into the object state storage area 189.

At step S256, the HD DB 91 secures a write cache area d equal to the page number g which is the size of the stream object in the buffer 56. At step S257, the HD DB 91 stores the address of the secured write cache area d in the buffer 56 into the write cache address storage area 191 of the entry M of the session management information 181.

At step S258, the HD DB 91 starts recording of the stream object X of the object basic second type shown in FIG. 26B into the write cache area d secured in the buffer 56. In this instance, the HD DB 91 first records the object identifier OID(q, p, t') into the object identifier recording area 201 of the write cache area d. At step S259, the HD DB 91 acquires the file identifier F of contents data to be prepared by the HD FS 92 corresponding to the stream object (the file identifier has a value same as the cluster number of the top one of the series of clusters in which the contents data are recorded). At step S260, the HD DB 91 records the file identifier F into the file identifier recording area 103 of the write cache area d.

At step S261, the HD DB 91 starts acquisition of arbitrary data of a stream object to be prepared (for example, the name of a stream object to be prepared). At step S262, the HD DB 91 waits until the acquisition of arbitrary data is completed. It is to be noted that, between the processes at steps S261 and S262, the HD FS 92 prepares a file of contents data of the file identifier F corresponding to the stream object and records the file into the file recording area 121.

At step S263, the HD DB 91 records the acquired arbitrary data into the arbitrary data recording area 202 of the write cache area d.

At step S264, the HD DB 91 waits for inputting of a signal I corresponding to an operation of the user. At step S265, the HD DB 91 discriminates whether or not the signal I represents "commit", that is, final determination of preparation of a session. If it is discriminated that the signal I represents "commit", then the processing advances to step S266. At step S266, the HD DB 91 finally determines the write session Z similarly as in the process at step S132 described hereinabove with reference to FIG. 31.

On the contrary, if it is discriminated at step S265 that the signal I does not represent "commit", then the processing advances to step S267. At step S267, the HD DB 91 abandons the write session Z similarly as in the process at step S133 described hereinabove with reference to FIG. 32. At step S268, the HD DB 91 issues a request for deletion of the file F to the HD FS 92. The description of the preparation process of the stream object is ended therewith.

Figure 37:
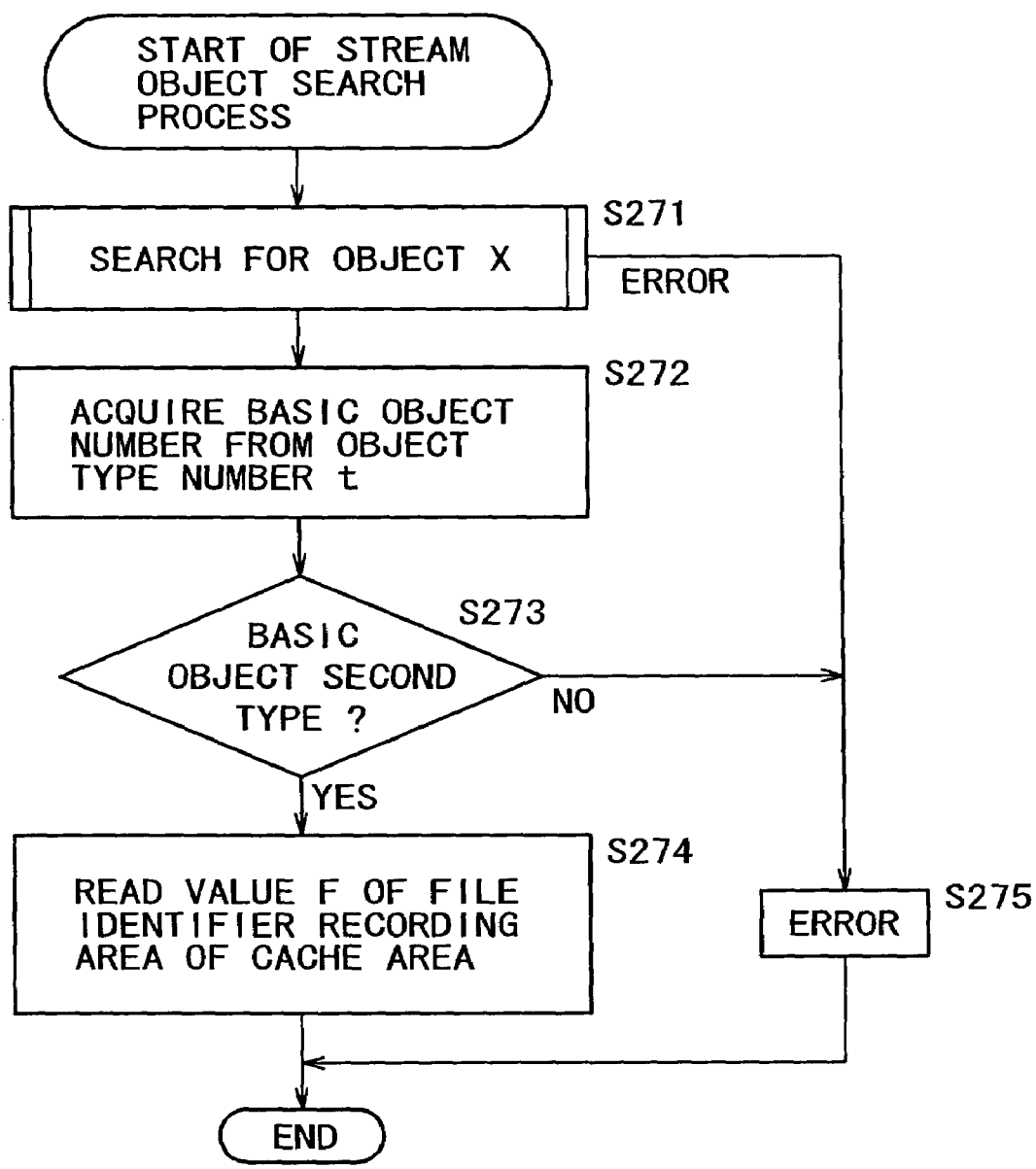
FIG. 37 is a flow chart illustrating a stream object search process.

Subsequently, a process of searching for a stream object (hereinafter referred to as stream object X) whose object identifier OID is X is described with reference to a flow chart of FIG. 37. It is assumed that a session has been opened already.

At step S271, the HD DB 91 executes a process similar to the search process for an object X described hereinabove with reference to FIG. 33. At step S272, the HD DB 91 acquires the object type number included in the object identifier OID=X of the object X searched out through the process at step S271. The object type number acquired is represented by t. Further, the HD DB 91 acquires the object basic type number included in the object type number t.

At step S273, the HD DB 91 discriminates whether or not the basic object type number of the object X searched out is the basic object second type. If it is discriminated that the basic object type number of the object X searched out is the basic object second type, then since the object X searched out is a stream object, the processing advances to step S274. At step S274, the HD DB 91 reads the file identifier from the file identifier recording area 203 of the stream object X searched out and supplies the file identifier to the HD FS 92.

It is to be noted that, if an object of the object identifier OID=X is not searched out successfully at step S271, then the processing advances to step S275. Also when it is discriminated at step S273 that the basic object type number of the object X searched out is not the basic object second type, the processing advances to step S275. At step S275, the HD DB 91 makes a determination of an error, that is, determines that the stream object X does not exist, and ends the stream object search process.

Figure 38:
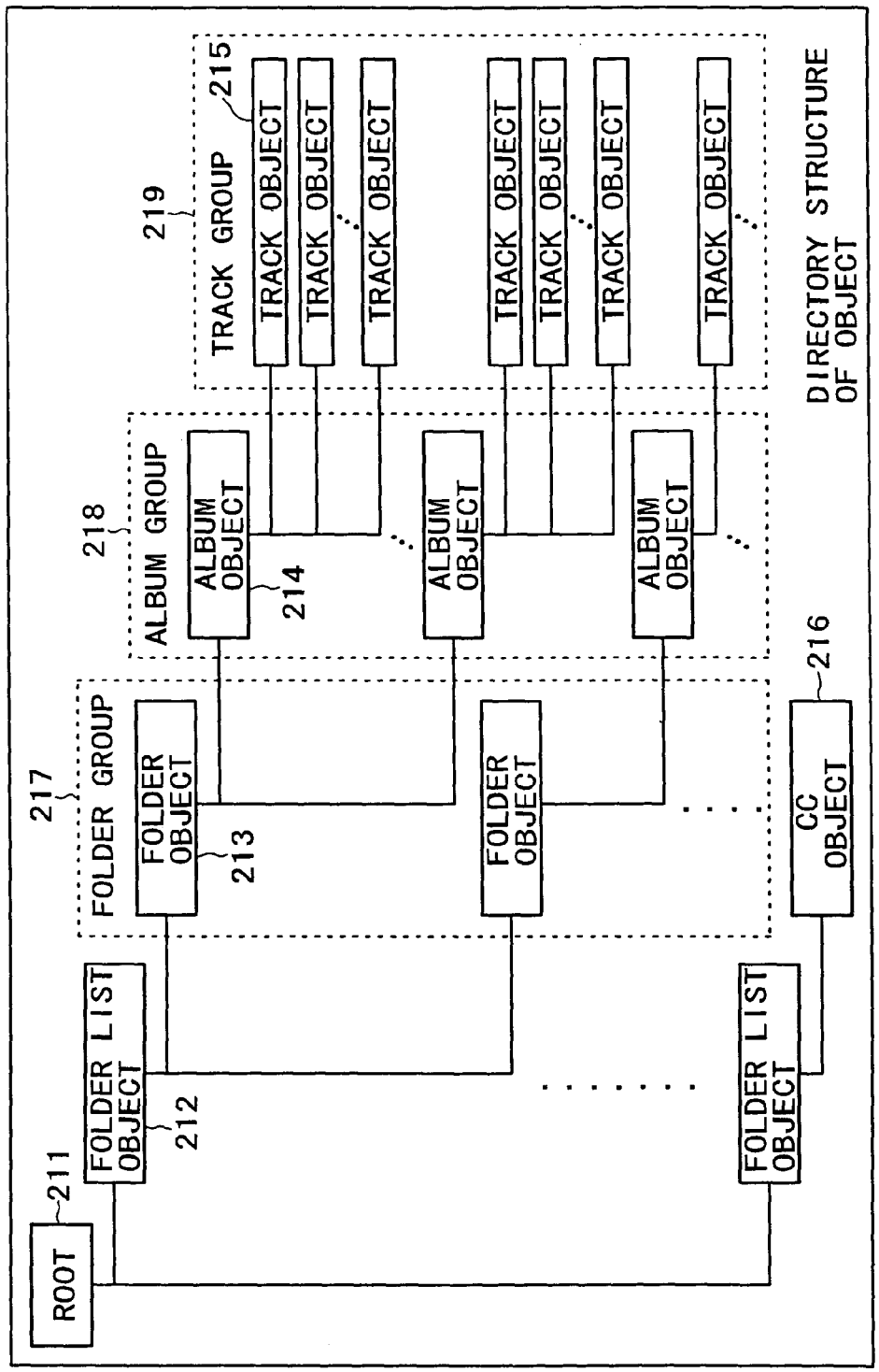
FIG. 38 is a view showing a directory structure of an object.

FIG. 38 shows a directory structure of an object recorded in the object recording area 122. In the object recording area 122, a folder list object 212, a folder object 213, an album object 214 and a track object 215 form a hierarchical structure under a root 211.

The HD DB 91 can prepare a plurality of folder objects 213 under the folder list object 212. A plurality of album objects 214 can be prepared under each of the folder objects 213. A plurality of track objects 215 can be prepared under each of the album object 214. Each of the track objects 215 corresponds to contents data for one tune.

The folder objects 213, album objects 214 and track objects 215 are objects presented to the user when a tune to be reproduced is to be selected. The HD DB 91 can prepare an object of some other information which is not an object to be presented to the user (such as a CC (Content Control) object 216) under any of the root 211, folder list objects 212 and folder objects 213.

Further, the HD DB 91 inhibits, when it prepares a folder object 213 under a folder list object 212, any other object than the folder object 213 under the same folder list object 212. Furthermore, when an album object 214 is prepared under a folder object 213, preparation of any other object than the album object 214 under the same folder object 213 is inhibited. Still further, preparation of any other object than a track object 215 under an album object 214 is inhibited.

Since each object is recorded in accordance with the rules described above, a folder group 217, an album group 218 and a track group 219 are constructed in the object recording area 122.

Now, the data format of each object is described.

FIG. 39 shows the data format of the folder list object 212. Since the folder list object 212 belongs to the basic object first type shown in FIG. 26A, it includes the object identifier recording area 201 and the arbitrary data recording area 202. In the object identifier recording area 201 of the folder list object 212, the object identifier OID of 4 bytes is recorded.

In the arbitrary data recording area 202 of the folder list object 212, a maximum value MAX (4 bytes) of the number of folder objects 213 which can be prepared under the folder list object 212, the number N (4 bytes) of folder objects 213 prepared under the folder list object 212, and the Folder of 4×100 bytes representative of an array of the IDs of the folder objects 213 prepared under the folder list object 212 are recorded. In the arbitrary data recording area 202 of the folder list object 212, Reserve of 612 bytes is provided.

FIG. 40 shows the data format of the folder object 213. Since the folder object 213 belongs to the basic object first type shown in FIG. 26A, it includes the object identifier recording area 201 and the arbitrary data recording area 202. In the object identifier recording area 201 of the folder object 213, the object identifier OID of 4 bytes is recorded.

In the arbitrary data recording area 202 of the folder object 213, a maximum value MAX (4 bytes) of album objects 214 which can be prepared under the folder object 213, the number N (4 bytes) of album objects 214 prepared under the folder object 213, the Album of 4×200 bytes representative of an array of the IDs of the album objects 214 prepared under the folder object 213, and the Title of 36 bytes representative of the folder name of the folder object 213. In the arbitrary data recording area 202 of the folder object 213, Reserve of 176 bytes is provided.

FIG. 41 shows the data format of the album object 214. Since the album object 214 belongs to the basic object first type shown in FIG. 26A, it includes the object identifier recording area 201 and the arbitrary data recording area 202. In the object identifier recording area 201 of the album object 214, the object identifier OID of 4 bytes is recorded.

In the arbitrary data recording area 202 of the album object 214, a maximum value MAX (4 bytes) of track objects 215 which can be prepared under the album object 214, the number N (4 bytes) of track objects 215 prepared under the album object 214, the Track of 4×400 bytes representative of an array of the IDs of the track objects 215 prepared under the album object 214, the Title of 516 bytes representative of the title of the album object 214, the Artist of 260 bytes representative of the artist name of the album object 214, the Creation Date of 8 bytes representative of the date and hour of preparation of the album object 214, and the medium key of 32 bytes representative of a medium key of the music CD 3 which is the source of the album object 214 are recorded. In the arbitrary data recording area 202 of the album object 214, Reserve of 1,660 bytes is provided.

FIG. 42 shows the data format of the track object 215. Since the track object 215 belongs to the basic object second type shown in FIG. 26B, it includes the object identifier recording area 201, the arbitrary data recording area 202, and the file identifier recording area 203. In the object identifier recording area 201 of the track object 215, the object identifier OID of 4 bytes is recorded. In the file identifier recording area 203 of the track object 215, the SOID of 4 bytes representative of the file identifier of contents data (recorded in the file recording area 121) which individually correspond in a one-by-one corresponding relationship to the file identifiers is recorded.

In the arbitrary data recording area 202 of the track object 215, the Title of 516 bytes representative of the tune name of the track object 215, the Artist of 260 bytes representative of the artist name of the track object 215, the Time of 8 bytes representative of the period of time of reproduction of the album object 214, the Last Access Date of 8 bytes representative of the date and hour of last accessing to the track object 215, the play counter (PC) of 4 bytes representative of the number of times of reproduction of the track object 215, the Creation Date of 8 bytes representative of the date and hour of preparation of the track object 215, and the AC of 12,544 bytes representative of the tune attribute and reproduction control information (information for the protection of the copyright) of the contents data corresponding to the track object 215. In the arbitrary data recording area 202 of the track object 215, Reserve of 980 bytes is provided.

FIG. 43 shows details of the AC of 1,255 bytes recorded in the arbitrary data recording area 202 of the track object 215. Recorded in the AC are Ckey of 8 bytes representative of a contents key, Codec of 1 byte representative of the codec identification value, Codec Attr of 1 byte representative of the codec attribute, LT of 1 byte representative of reproduction limitation information, VLD of 1 byte representative of a validity checking flag, LCMLOGNUM of 1 byte representative of the number of checkout destinations, CDI of 16 bytes representative of codec dependency information, CID of 20 bytes representative of a contents serial number, PBS of 8 bytes representative of the starting date and hour of reproduction permission, PBE of 8 bytes representative of the ending date and hour of reproduction permission, XCC of 1 byte representative of an expanded CC, CT of 1 byte representative of the remaining number of times of reproduction, CC of 1 byte representative of contents control information, CN of 1 byte representative of the remaining number of times of checkout, SRC of 40 bytes representative of source information, and LCMLOG of 48×256 bytes representative of information including the apparatus IDs of the checkout destinations and flags.

Particularly of the CC of 1 byte representative of contents control information, the first bit from the MSB (Most Significant Bit) side represents presence or absence of the copyright (0: present, 1: absent); the second bit from the MSB side represents the generation (0: original, 1: other than the original); and the third and fourth bits from the MSB side are not used.

The information represented by the fifth to seventh bits from the MSB side of the CC is such as follows. In particular, where 010 is recorded in the fifth to seventh bits of the CC from the MSB side, this represents checkout permission (edit is permitted). If 011 is recorded in the fifth to seventh bits of the CC from the MSB side, this represents move permission (edit by the PD 5 is inhibited). If 100 is recorded in the fifth to seventh bits of the CC from the MSB side, this represents import permission (edit by the PD 5 is permitted). If 110 is recorded in the fifth to seventh bits of the CC from the MSB side, this represents import permission (edit by the PD 5 is inhibited).

FIG. 44 shows the data format of contents data which correspond in a one-by-one corresponding relationship to the track objects 215. The contents data include AT3H of 16 kilobytes representative of an ATRAC3header, PRT of 16 kilobytes representative of an ATRAC3 part, and AT3SU-1 to AT3SU-N of 16 kilobytes each representative of sound unit strings.

FIG. 45 shows the data format of the CC object 216. The CC object 216 belongs to the basic object second type shown in FIG. 26B. Consequently, the CC object 216 includes the object identifier recording area 201 and the arbitrary data recording area 202. In the object identifier recording area 201 of the CC object 216, the object identifier OID of 4 bytes is recorded.

In the arbitrary data recording area 202 of the CC object 216, Reserve of 16 bytes is provided. In the file identifier recording area 203 of the CC object 216, SOID of 4 bytes representative of the file identifier of the corresponding CC data (recorded in the file recording area 121) is recorded.

FIG. 46 shows the format of the CC data recorded in the file recording area 121. The CC data include CatFolder of 10 kilobytes, CatAlbum of 200 kilobytes and CatTrack of 600 kilobytes. In the CatFolder, information representative of the object identifier OID of a folder object 213 corresponding to a folder selected by the user is recorded. In the CatAlbum, information representative of the object identifier OID of an album object 214 which corresponds to an album selected by the user is recorded. In the CatTrack, information representative of the object identifier OID of a track object 215 corresponding to a track selected by the user is recorded.

Accordingly, for example, if the user selects, upon reproduction, a track to be reproduced, then the object identifier OID of a track object 215 which corresponds to the selected track is discriminated based on the CatTrack of the CC data, and a corresponding file identifier is acquired from the discriminated track object 215 and the contents data are read out and reproduced.

Now, a flow of data when each function of the audio server 1 is executed and matching thereof with the firmware are described with reference to FIGS. 47 to 56.

Figure 47:
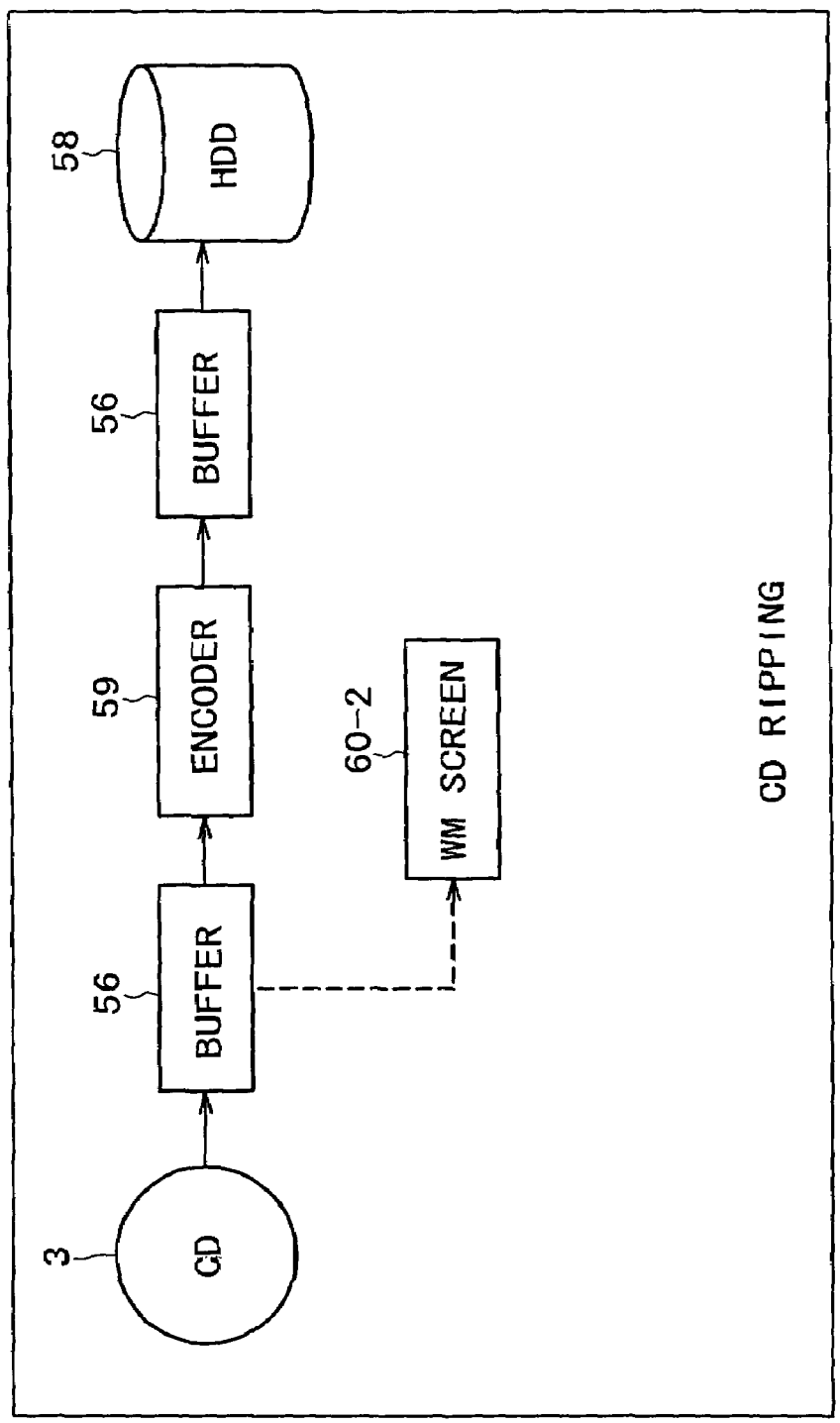
FIG. 47 is a view showing a flow of data when CD ripping is performed.

FIG. 47 shows a flow of data when CD ripping is executed. In CD ripping wherein the music CD 3 is recorded at a high speed, the digital audio data of the music CD 3 is read out at the CAV eightfold speed by the CD-ROM drive 57 and buffered into the buffer 56 under the control of the CD MW 88. Further, under the control of the HD MW 82, digital audio data buffered in the buffer 56 are inputted to the WM screen 60-2, by which a watermark is detected. Then, under the control of the HD MW 82, the digital audio data buffered in the buffer 56 are encoded and encrypted in accordance with the ATRAC 3 system at an average fivefold speed by the encoder 59, and resulting coded data are buffered by the buffer 56 and then transferred to and recorded into the HDD 58. It is to be noted that, though not shown, during CD ripping, sound corresponding to the digital audio data recorded is outputted from the speakers 2.

Figure 48:
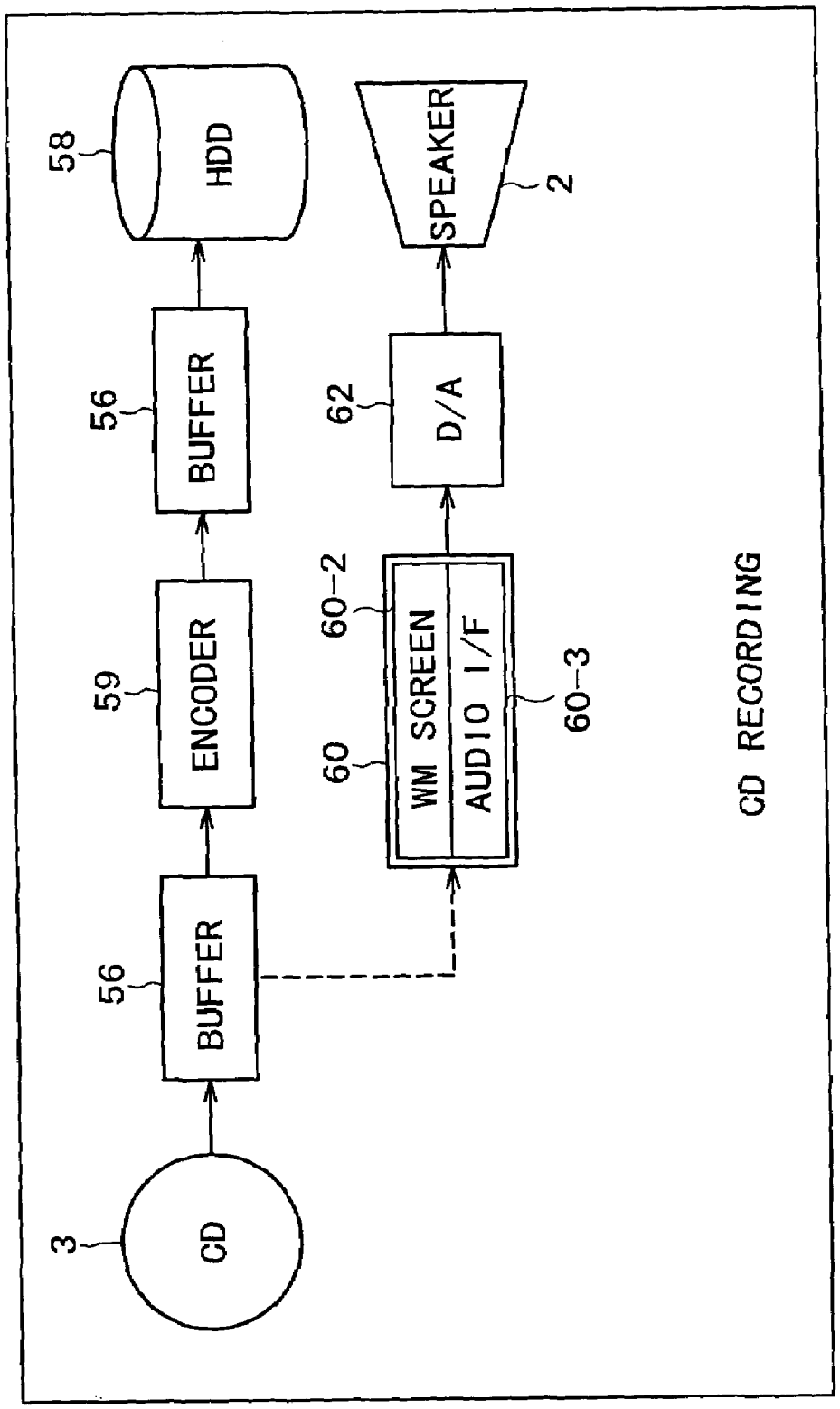
FIG. 48 is a view showing a flow of data when CD recording is performed.

FIG. 48 illustrates a flow of data when CD recording is executed. In CD recording wherein the music CD 3 is reproduced and the reproduced sound is recorded, digital audio data of the music CD 3 are read out at a CAV eightfold speed by the CD-ROM drive 57 and buffered by the buffer 56 under the control of the CD MW 88. Then, under the control of the HD MW 82, the digital audio data buffered in the buffer 56 are encoded and encrypted in accordance with the ATRAC 3 system at an average fivefold speed by the encoder 59, and resulting coded data are buffered by the buffer 56 and then transferred to and recorded into the HDD 58. Further, under the control of the HD MW 82, the audio data buffered in the buffer 56 are supplied to the WM screen 60-2, by which a watermark is detected.

Meanwhile, the digital audio data buffered for monitor sound are temporarily recorded into a ring buffer 241 (FIG. 61) provided in the HDD 58 and then read out and inputted to the audio I/F 60-3 under the control of the HD MW 82. Then, under the control of the AIO MW 94, the digital audio data are transferred to and converted into analog data by the D/A 62, and corresponding sound is outputted from the speakers 2.

It is to be noted that details of CD ripping and CD recording are hereinafter described with reference to FIGS. 57 to 70B.

Figure 49:
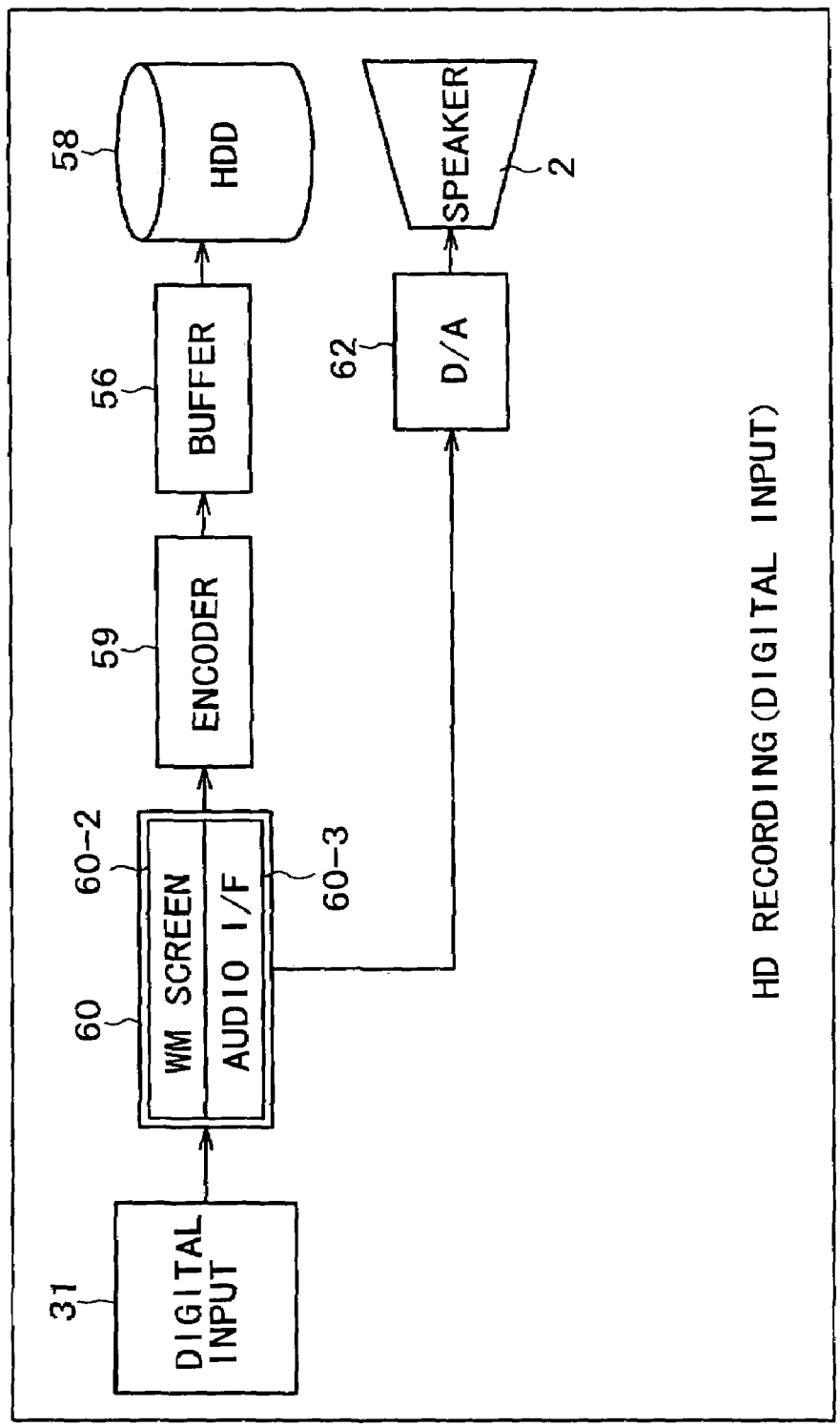
FIG. 49 is a view showing a flow of data when HD recording for a digital input is performed.

FIG. 49 illustrates a flow of data when HD recording of a digital input is executed. In HD recording wherein a digital input is encoded and recorded into the HDD 58, digital audio data inputted from the AUX-in terminal 31 are supplied to the encoder 59 through the signal processing section 60 under the control of the AIO MW 94. Then, under the control of the HD MW 82, the digital audio data are encoded and encrypted in accordance with the ATRAC3 system by the encoder/decoder 59, and resulting coded data are transferred first to the buffer 56 and then transferred to and recorded into the HDD 58. Further, under the control of the HD MW 82, a watermark is detected by the WM screen 60-2 of the signal processing section 60. Furthermore, under the control of the AIO MW 94, the digital audio data are transferred through the audio I/F 60-3 of the signal processing section 60 to and converted into analog data by the D/A 62 and then outputted from the speakers 2.

Figure 50:
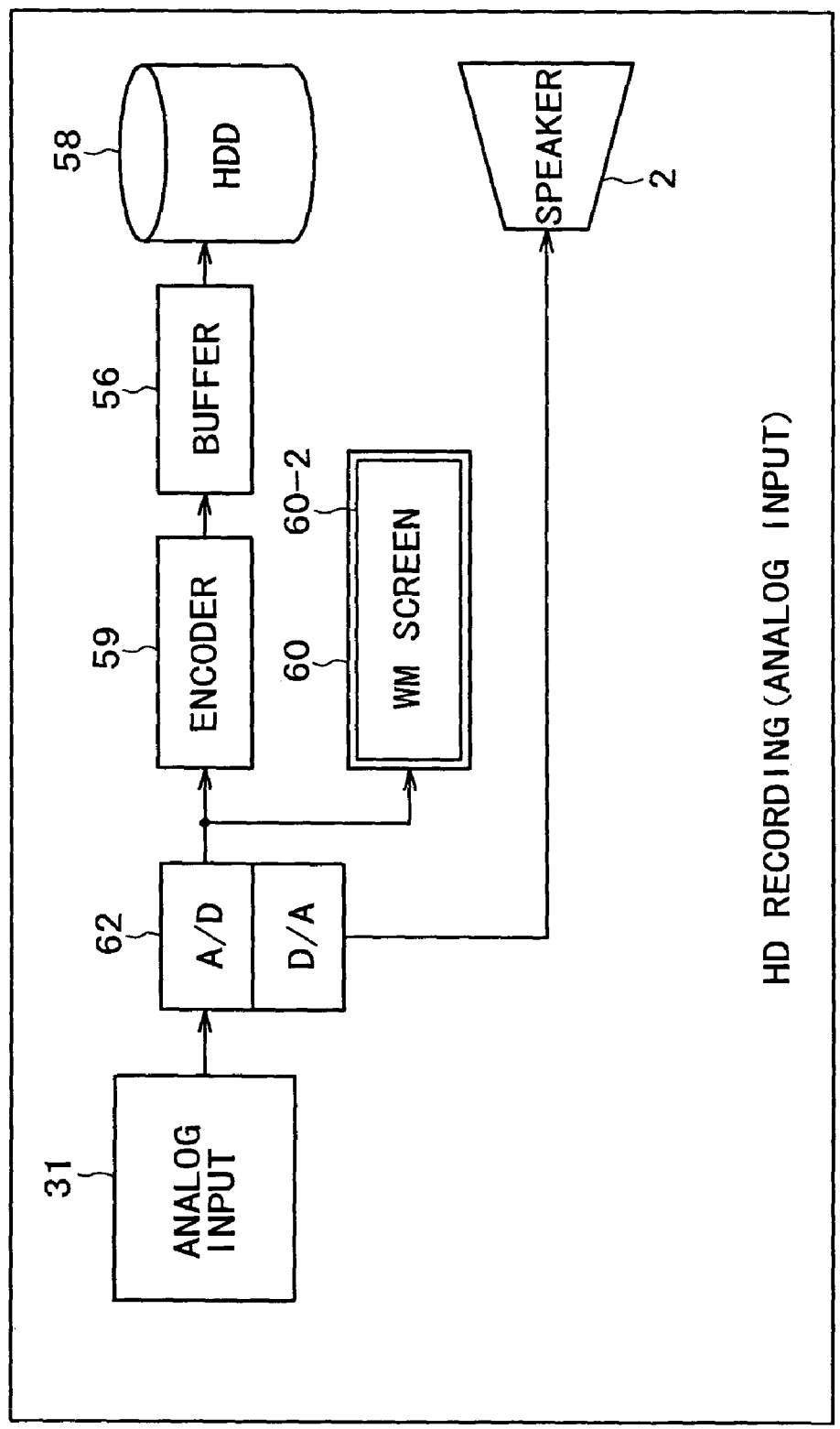
FIG. 50 is a view showing a flow of data when HD recording for an analog input is performed.

FIG. 50 illustrates a flow of data when HD recording of an analog input is executed. In HD recording wherein an analog input is encoded and recorded into the HDD 58, analog audio data inputted from the AUX-in terminal 31 are digitized by the A/D 62 and supplied to the encoder 59 under the control of the AIO MW 94. Then, under the control of the HD MW 82, the digital audio data are encoded and encrypted in accordance with the ATRAC 3 system by the encoder 59, and resulting coded data are transferred first to the buffer 56 and then transferred to and recorded into the HDD 58. Further, under the control of the HD MW 82, a watermark is detected from the digital output of the A/D 62 by the WM screen 60-2. Furthermore, under the control of the AIO MW 94, the analog audio data inputted from the AUX-in terminal 31 are outputted from the speakers 2.

Figure 51:
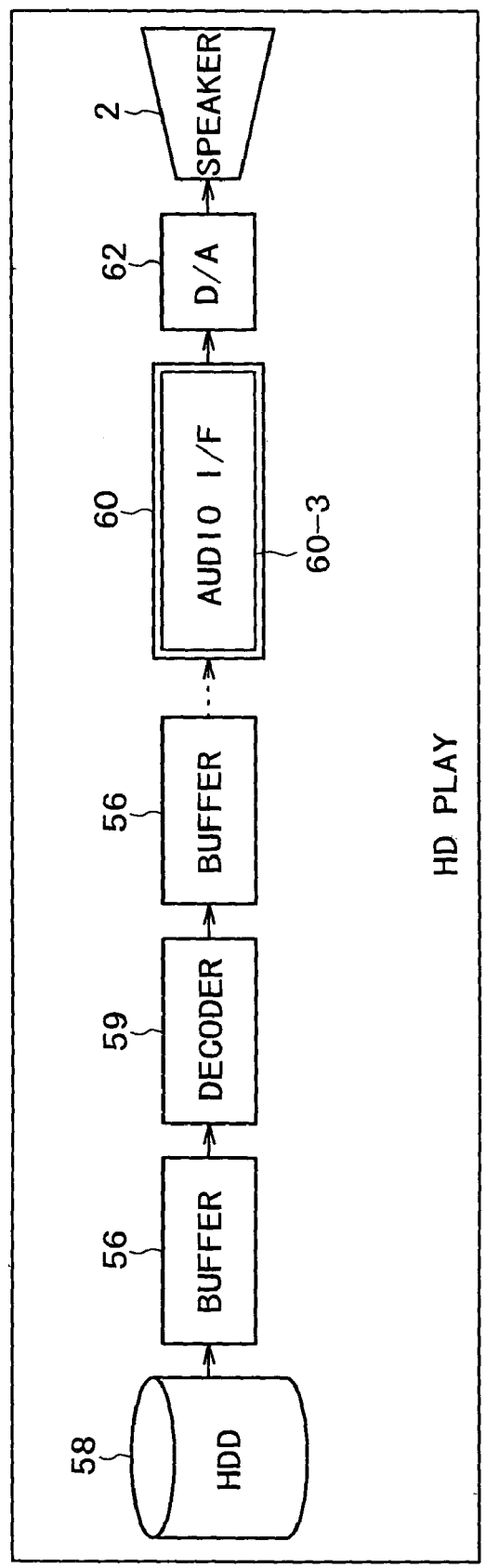
FIG. 51 is a view showing a flow of data when HD play is performed.

FIG. 51 illustrates a flow of data when HD play is executed. In HD play wherein coded data of the HDD 58 are reproduced, the coded data read out from the HDD 58 are buffered by the buffer 56 and then decrypted and decoded by the decoder 59 under the control of the HD MW 82. Resulting digital audio data are buffered by the buffer 56 once and then transferred to the audio I/F 60-3. Then, under the control of the AIO MW 94, the digital audio data are transferred through the audio I/F 60-3 to and converted into analog data by the D/A 62 and outputted from the speakers 2.

Figure 52:
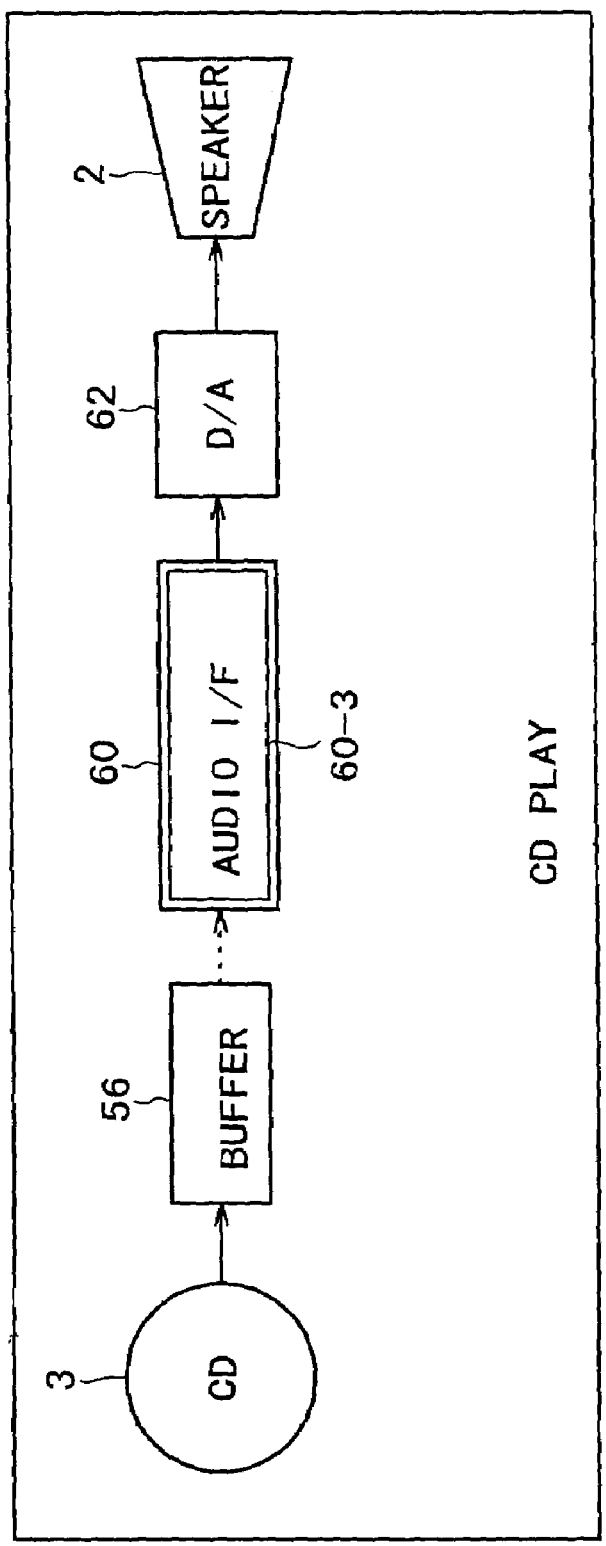
FIG. 52 is a view showing a flow of data when CD play is performed.

FIG. 52 illustrates a flow of data when CD play is executed. In CD play wherein the music CD 3 is reproduced, digital audio data of the music CD 3 are read out by the CD-ROM drive 57 and buffered by the buffer 56 and then transferred to the audio I/F 60-3 under the control of the CD MW 88. Then, under the control of the AIO MW 94, the digital audio data are transferred through the audio I/F 60-3 to and converted into analog data by the D/A 62 and then outputted from the speakers 2.

Figure 53A:
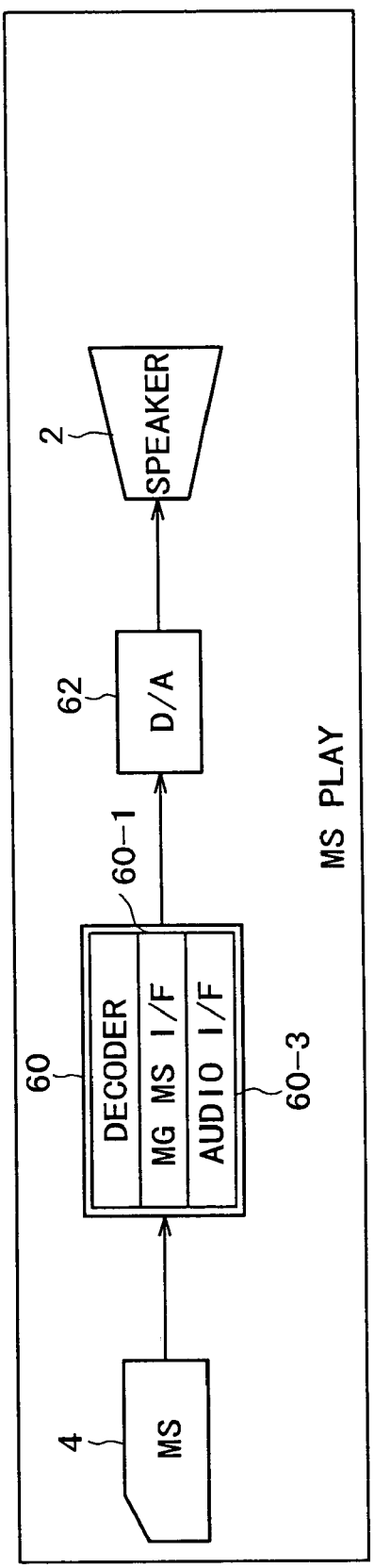
FIG. 53A is a view showing a flow of data when MS play is performed.
Figure 53B:
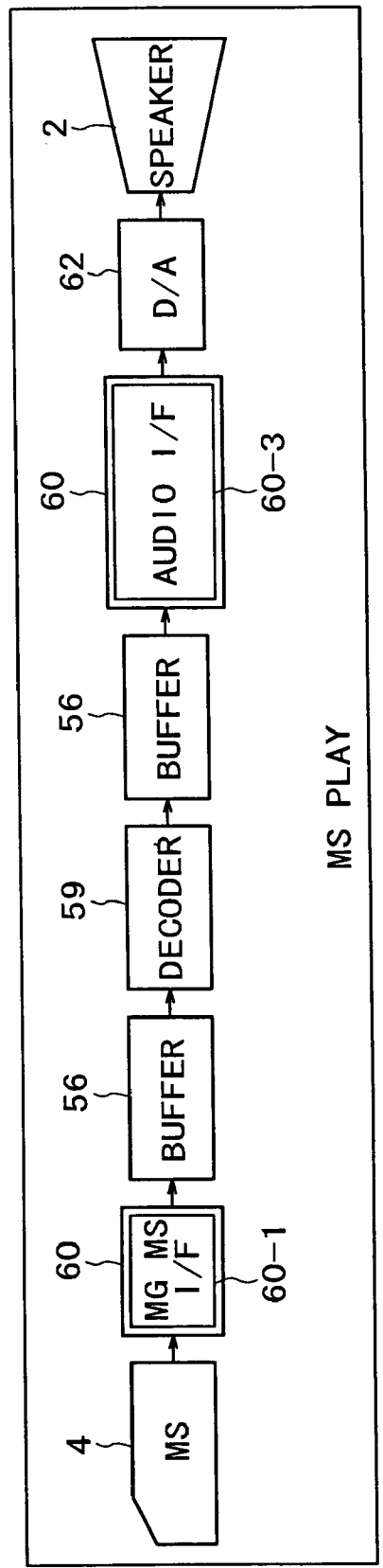
FIG. 53B is a view showing a flow of data when the MS play is performed.

FIGS. 53A and 53B illustrate flows of data when MS play is executed. In MS play wherein coded data of the MS 4 are reproduced, as shown in FIG. 53A, coded data of the MS 4 are supplied to the MG MS I/F 60-1 under the control of the MS MW 89, and after mutual authentication by the MG MS I/F 60-1, the coded data are decrypted and then decoded by a decoder built in the signal processing section 60. Then, under the control of the AIO MW 94, the digital audio data obtained by the decoding by the audio I/F 60-3 are transferred to and converted into analog data by the D/A 62 and then outputted from the speakers 2.

Or else, as shown in FIG. 53B, under the control of the MS MW 89, coded data are read out from the MS 4 and supplied to the MG MS I/F 60-1, and then decrypted by the MG MS I/F 60-1 after mutual authentication. The decrypted data are buffered by the buffer 56 and decoded by the decoder 59, and resulting digital audio data are outputted to the D/A 62 through the buffer 56. Thereafter, under the control of the AIO MW 94, the audio data after conversion into analog data by the D/A 62 are outputted from the speakers 2.

Figure 54:
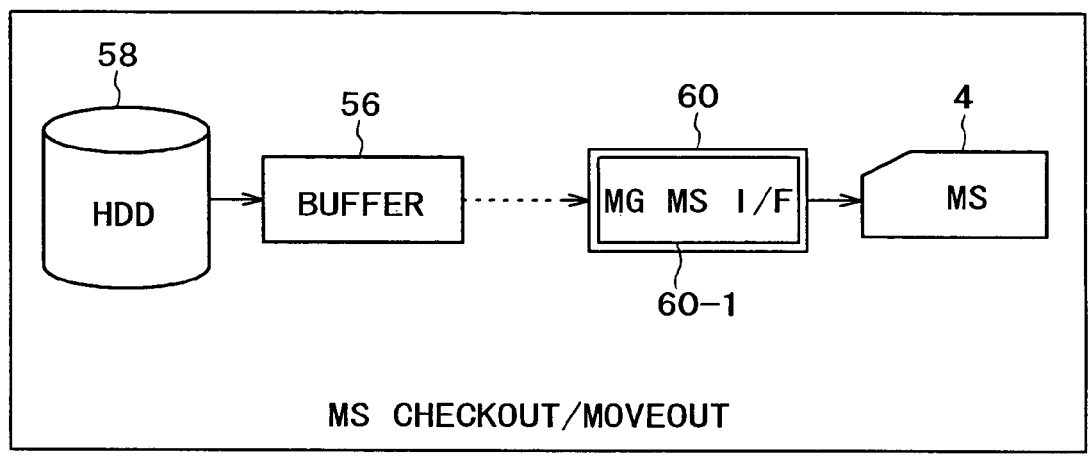
FIG. 54 is a view showing a flow of data when an MS checkout/moveout is performed.

FIG. 54 illustrates a flow of data when MS checkout/moveout is executed. In MS checkout wherein coded data of the HDD 58 are copied into the MS 4 and moveout wherein coded data of the HDD 58 are moved to the MS 4, coded data read out from the HDD 58 are buffered by the buffer 56 under the control of the HD MW 82. Then, the buffered coded data are transferred to the MG MS I/F 60-1 and recorded into the MS 4 under the control of the MS MW 89. It is to be noted that the checkout and the moveout are hereinafter described in detail.

Figure 55:
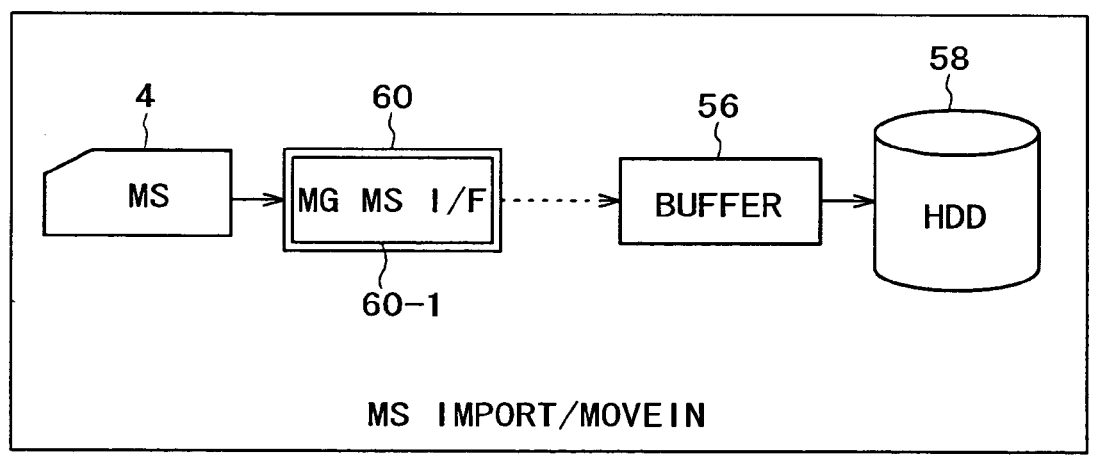
FIG. 55 is a view showing a flow of data when an MS import/movein is performed.

FIG. 55 illustrates a flow of data when MS import/movein is executed. In the MS import/movein wherein coded data of the MS 4 are moved to the HDD 58, coded data of the MS 4 are transferred to the buffer 56 through the MG MS I/F 60-1 under the control of the MS MW 89. Then, under the control of the HD MW 82, the buffered coded data are transferred to and recorded into the HDD 58. It is to be noted that the import/movein are hereinafter described in detail.

Figure 56:
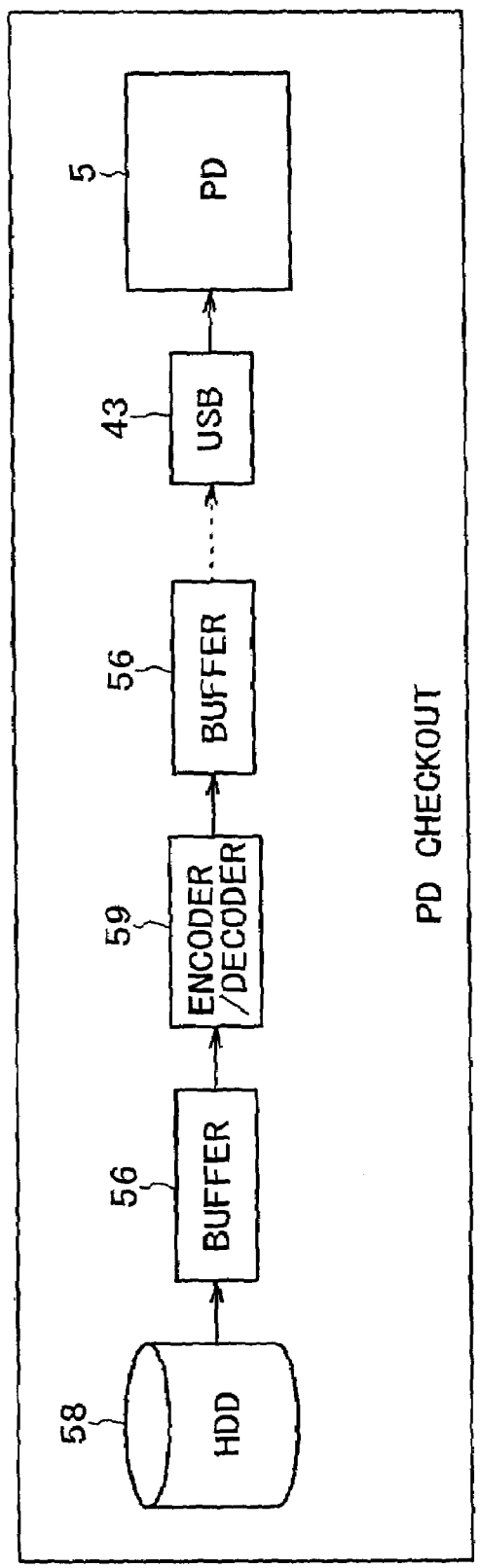
FIG. 56 is a view showing a flow of data when PD checkout is performed.

FIG. 56 illustrates a flow of data when PD checkout is performed. In PD checkout wherein coded data of the HDD 58 are copied into the PD 5, coded data read out from the HDD 58 are buffered by the buffer 56, decoded by the encoder/decoder 59 and encrypted back into data for the PD 5, and buffered by the buffer 56 under the control of the HD MW 82. Then, under the control of the PD MW 90, the buffered coded data are recorded into the PD 5 through the USB controller 54 and the USB connector 43.

Subsequently, details of CD ripping and CD recording are described with reference to FIGS. 57 to 70B. The process of the CD ripping is a process executed when the high speed recording button 24 is depressed by the user. The process of the CD recording is a process executed when the recording button 23 is depressed by the user.

Figure 57:
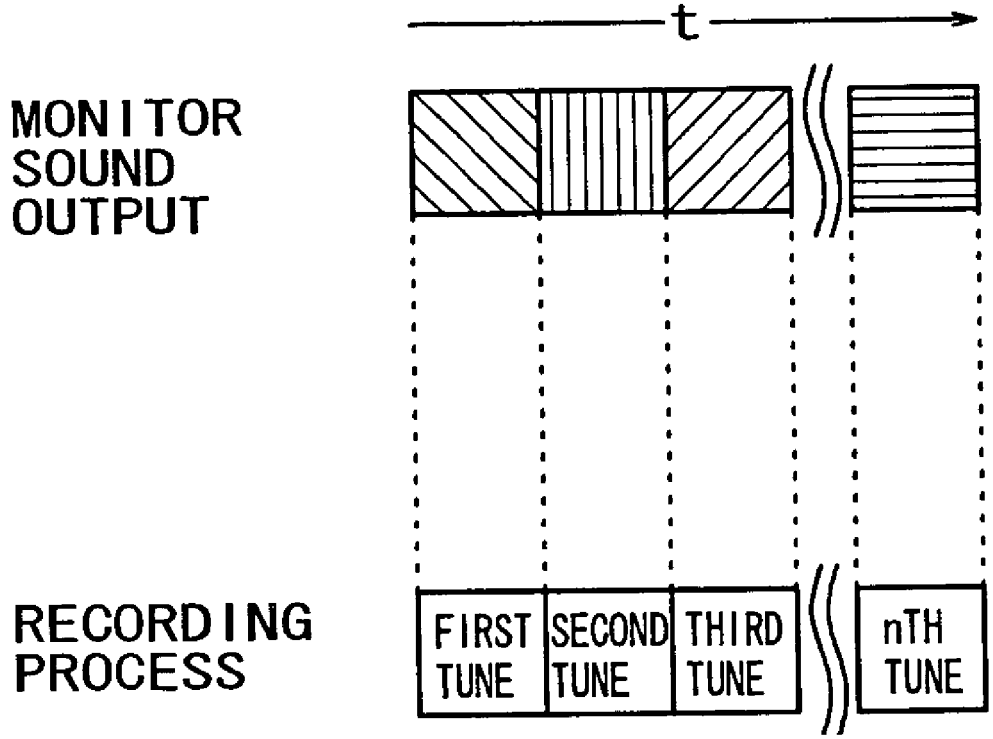
FIG. 57 is a view illustrating the CD ripping.

Differences between the CD ripping and the CD recording are described with reference to FIGS. 57 and 58. The upper stage of FIG. 57 illustrates periods of a monitor sound output in the CD ripping. The lower stage of FIG. 57 illustrates periods of a recording process in the CD ripping (a process of encoding and recording). The upper stage of FIG. 58 illustrates periods of a monitor sound output in the CD recording, and the lower stage of FIG. 58 illustrates periods of recording process in the CD recording (a process of encoding and recording).

Figure 58:
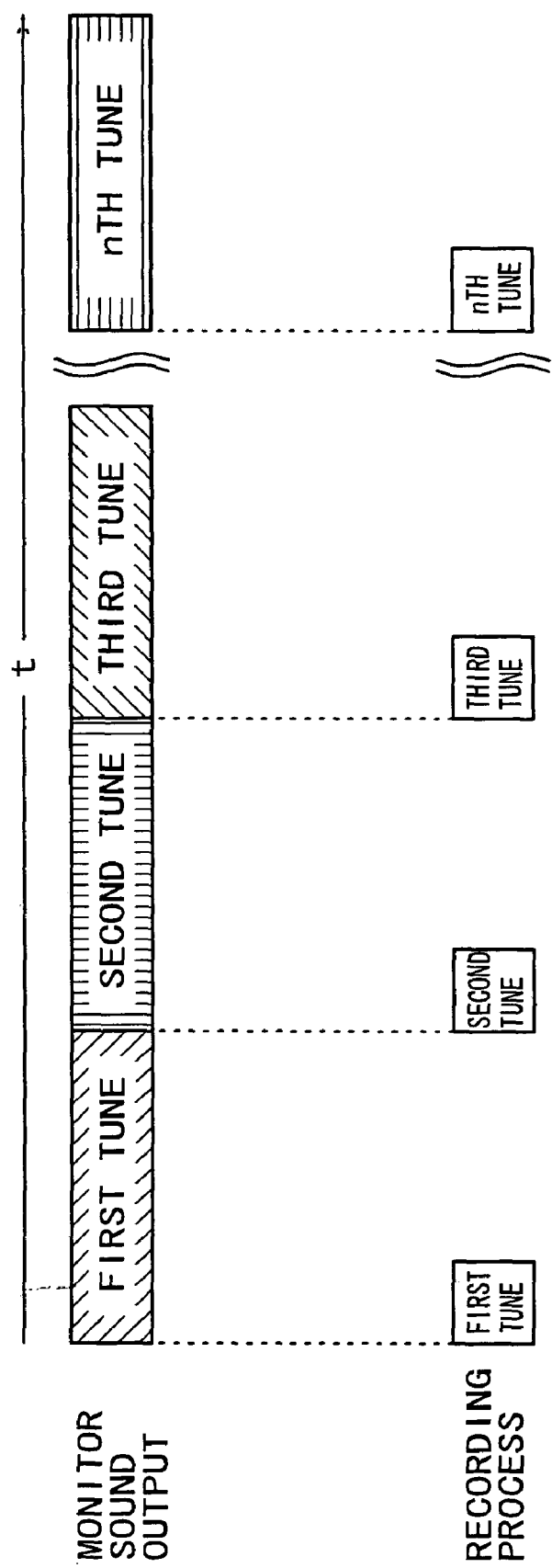
FIG. 58 is a view illustrating the CD recording.

As can be apparently seen from comparison between FIGS. 57 and 58, the total period of time required for the recording process is equal between the CD ripping and the CD recording. In particular, the process of encoding audio data (PCM data) of the music CD 3 in accordance with the ATRAC 3 system and recording the coded data into the HDD 58 is performed at an average fivefold speed with respect to the reproduction speed of audio data.

For example, when the music CD 3 wherein six tunes each of which requires a reproduction period of time of 10 minutes are recorded and the total reproduction time period of the six tunes is 60 minutes is recorded by CD ripping or CD recording, the tunes are successively recorded while approximately two minutes are required for each tune.

The difference between the CD ripping and the CD recording is the period of a monitor music output.

In the CD ripping, monitor sound is outputted only for a period of time for which recording processing of corresponding audio data is performed. In the case of the music CD 3 described above, sound for approximately 2 minutes is outputted at the normal reproduction speed beginning with the top of the first tune, and then, sound for approximately 2 minutes is outputted at the normal reproduction speed beginning with the top of the second tune, whereafter sound for approximately 2 minutes is outputted at the normal speed beginning with each of the successive tunes. Accordingly, also the monitor sound output is ended simultaneously with the end of the recording process.

In the CD recording, monitor sound is outputted independently of the proceeding situation of the recording process of corresponding audio data. In the case of the music CD 3 described above, all sound of the first tune is outputted at the normal reproduction speed, and then all sound of the second tune is outputted at the normal speed, whereafter all sound of each of the successive tunes is outputted at the normal speed. Accordingly, even if the recording process is ended, the monitor sound output of the corresponding audio data is continued till the end of the last sixth tune.

It is to be noted that the CD ripping and the CD recording allow suitable changeover therebetween in the course of the respective processing.

Figure 59:
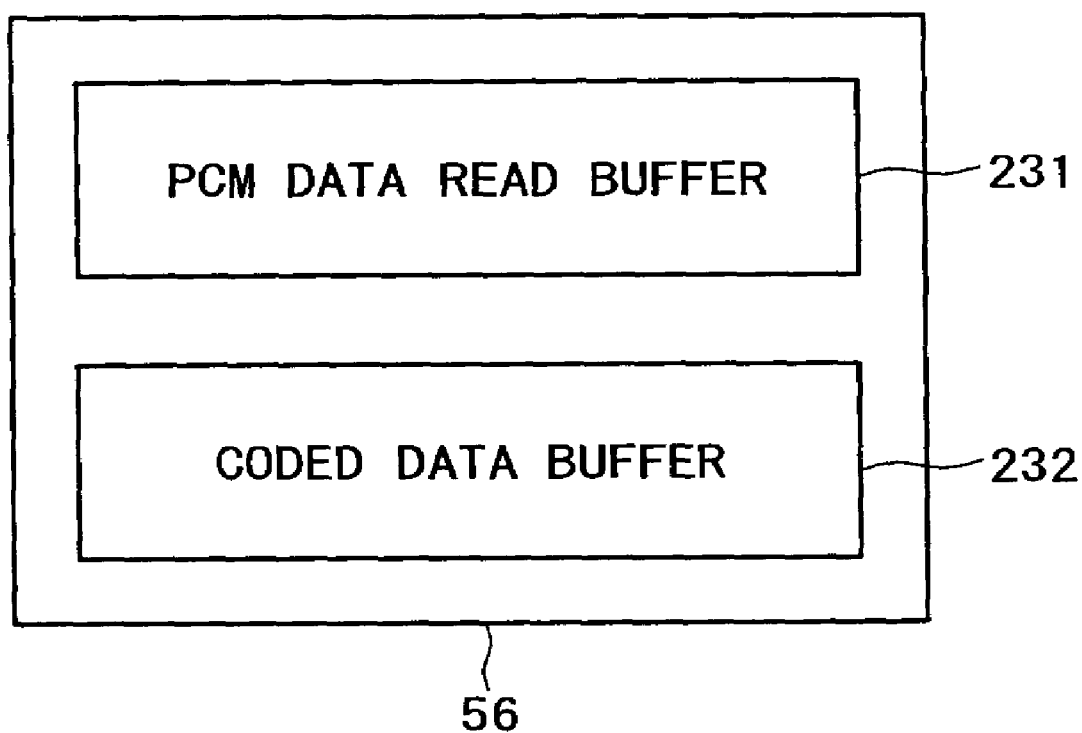
FIG. 59 is a view illustrating partition of a buffer 56 in the CD ripping or the CD recording.

FIG. 59 illustrates a state of the buffer 56 when CD ripping or CD recording is performed. The buffer 56 includes a PCM data read buffer 231 for buffering audio data (PCM data) read out from the music CD 3 and not encoded as yet, and a coded data buffer 232 for buffering coded data encoded and encrypted by the encoder/decoder 59.

Figure 60:
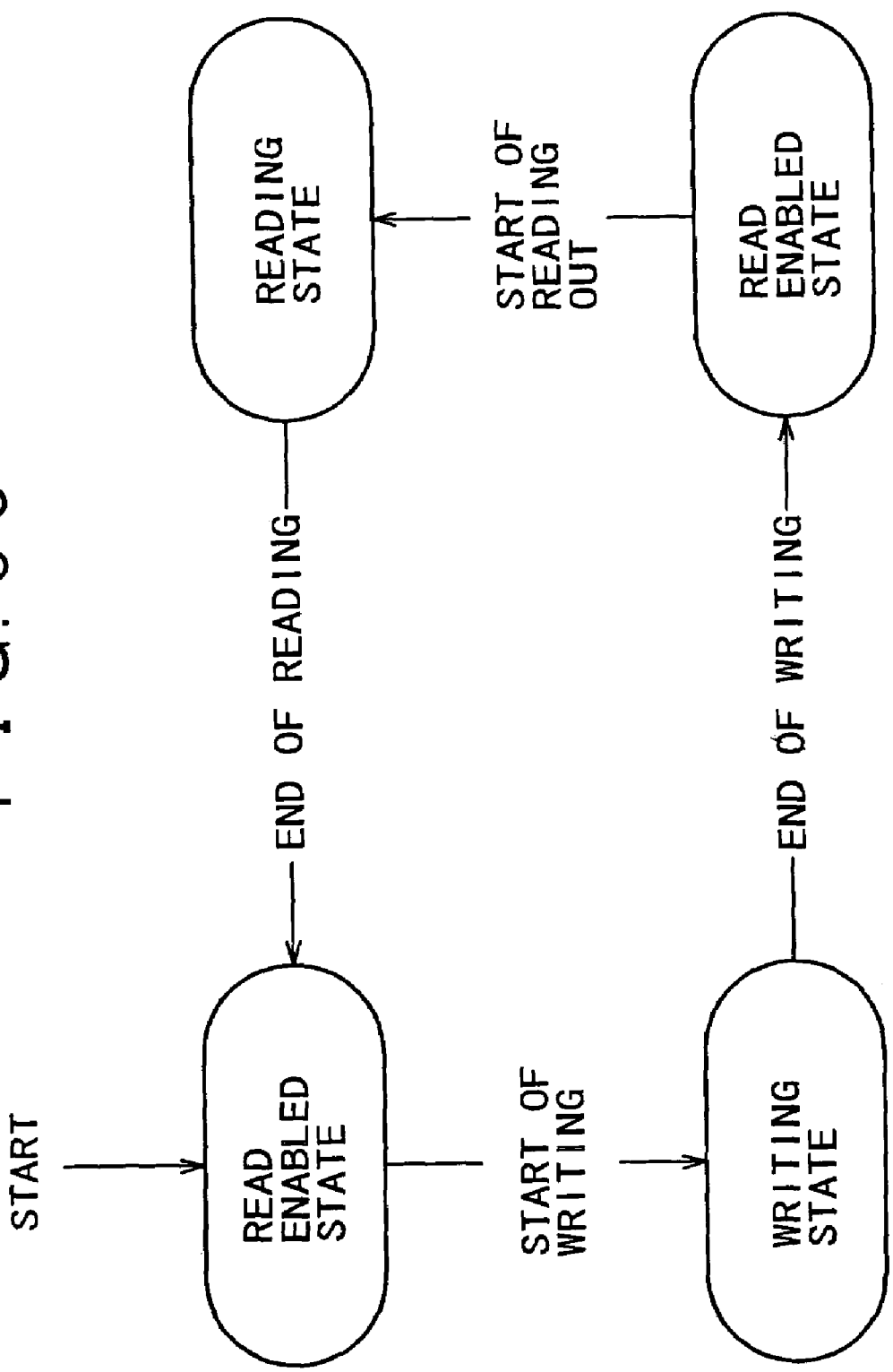
FIG. 60 is a view showing a state transition of each buffer.

FIG. 60 illustrates a state transition of the PCM data read buffer 231 and the coded data buffer 232 provided in the buffer 56 and a PCM data reproduction buffer 251 built in the audio I/F 60-3. Each of the PCM data read buffer 231, coded data buffer 232 and PCM data reproduction buffer 251 is in one of an initial write enabled state, a writing state which is entered when writing of data is started, a read enabled state which is entered after the writing of data is ended, and a reading state which is entered when readout of data is started. It is to be noted that, after the readout of data is ended in the reading state, the write enabled state is restored.

Figure 61:
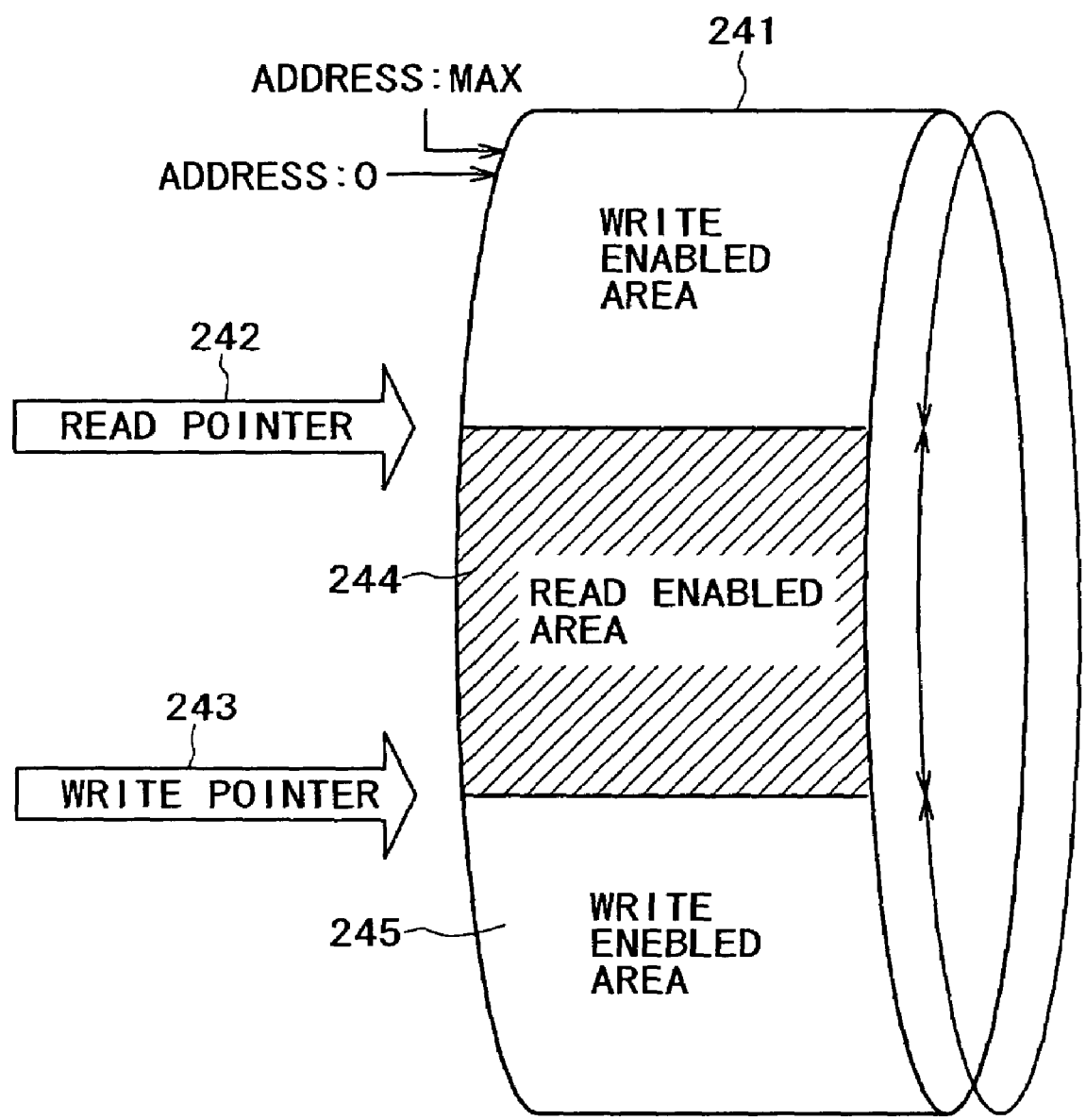
FIG. 61 is a view showing a ring buffer 241 provided on the HDD 58.
Figure 66:
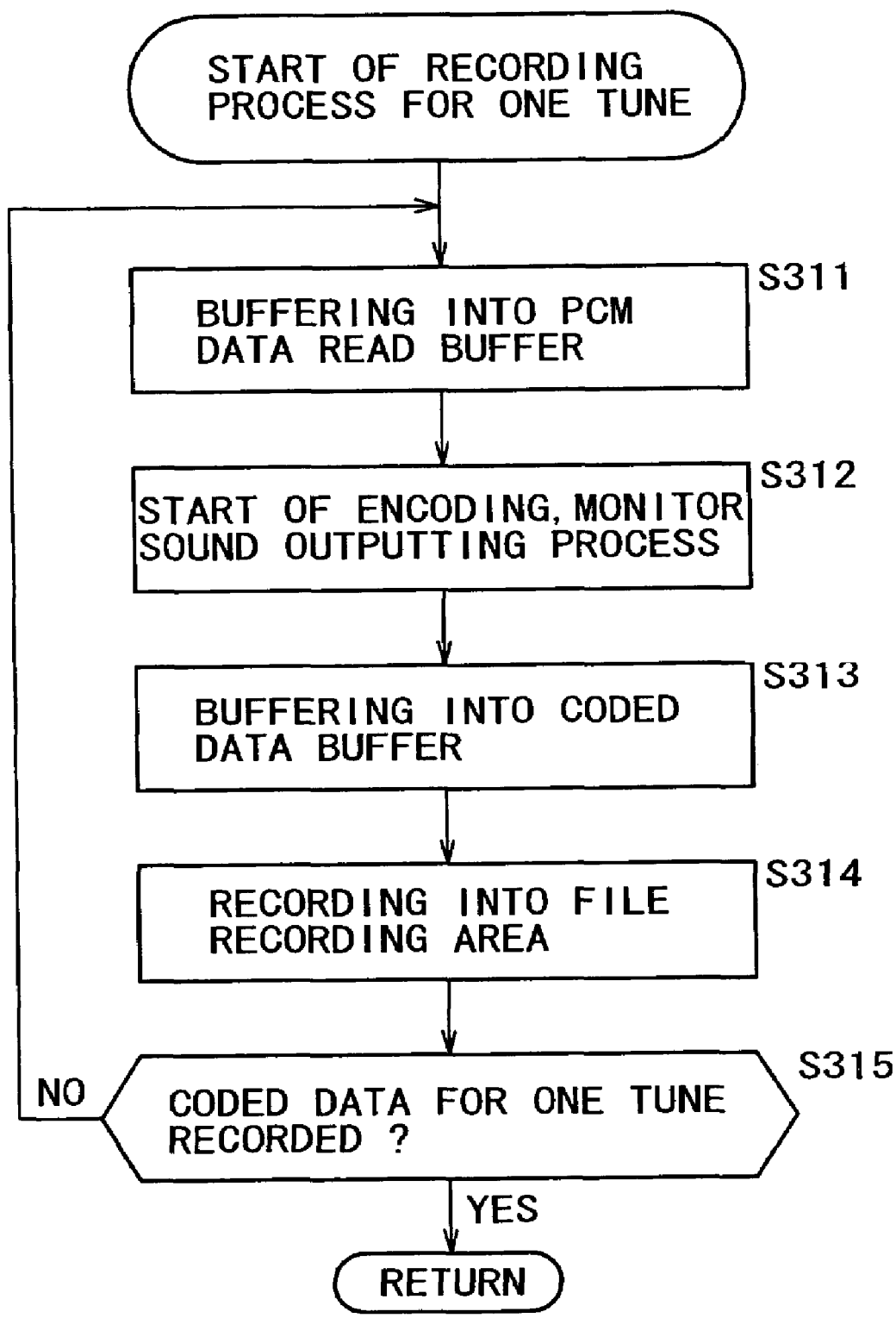
FIG. 66 is a flow chart illustrating a recording process for one tune.

FIG. 61 shows a structure of the ring buffer 241 provided in the HDD 58 in order to buffer PCM data for a monitor sound output when CD ripping or CD recording is executed.

To the ring buffer 241 having a predetermined capacity (for the convenience of description, from the address 0 to address max), a read pointer 242 indicative of a readout start address and a write pointer 243 indicative of a write start address are set. The ring buffer 241 is partitioned into a read enabled area 244 from the address indicated by the read pointer 242 to the address indicated by the write pointer 243 in the forward direction, and a write enabled area 245 from the address indicated by the write pointer 243 to the address indicated by the read pointer 242 in the forward direction. The capacity of the read enabled area 244 is referred to as read margin. The capacity of the write enabled area 245 is referred to as write margin.

FIG. 62 illustrates a flow of data between buffers in CD ripping and CD recording. PCM data of the music CD 3 are read out by the CD-ROM drive 57 and buffered by the PCM data read buffer 231 provided in the buffer 56. The PCM data buffered in the PCM data read buffer 231 are transferred to and encoded and encrypted by the encoder/decoder 59. Resulting coded data are buffered by the coded data buffer 232 provided in the buffer 56. The coded data buffered in the coded data buffer 232 are transferred to the HDD 58 and recorded into the file recording area 121.

Meanwhile, the PCM data buffered in the PCM data read buffer 231 are transferred to the HDD 58 and buffered by the ring buffer 241 provided in the HDD 58. The PCM data buffered in the ring buffer 241 are transferred to and buffered by the PCM data reproduction buffer 251 built in the audio I/F 60-3, and converted into analog data by the AD/DA 62 and then outputted from the speakers 2.

Now, a recording speed setting process regarding CD ripping and CD recording is described with reference to a flow chart of FIG. 63. The recording speed setting process is executed repetitively while the music CD 3 is selected as a sound source, that is, while the music CD 3 is loaded in the CD-ROM drive 57 and the CD is selected by the function button 12.

At step S281, the input handle middleware 97 starts supervision for an operation of various buttons by the user. At step S282, the input handle middleware 97 waits until an operation by the user is performed for the various buttons, and if it is discriminated that an operation by the user is performed for the various buttons, then the information is conveyed to the main APP 76. The main APP 76 discriminates whether or not the operation is an operation for the recording button 23. If it is discriminated that the operation is an operation for the recording button 23, then the processing advances to step S283.

At step S283, the main APP 76 issues to the HD APP 77 a notification that the recording button 23 is operated. The HD APP 77 notifies the CD RIPPING 84 of the HD MW 82 that the recording button 23 is operated. The CD RIPPING 84 sets a high speed recording flag provided in the SDRAM 53 of the CD RIPPING 84 itself or the like to an off state. The processing returns to step S281.

If it is discriminated at step S282 that an operation by the user is performed for the various buttons and it is discriminated that the operation is not an operation for the recording button 23, then the processing advances to step S284. At step S284, the main APP 76 discriminates whether or not the operation is an operation for the high speed recording button 24. If it is discriminated that the operation is an operation for the high speed recording button 24, then the processing advances to step S285.

At step S285, the main APP 76 notifies the HD APP 77 that the high speed recording button 24 is operated. The HD APP 77 notifies the CD RIPPING 84 of the HD MW 82 that the high speed recording button 24 is operated. The CD RIPPING 84 sets the high speed recording flag to an on state. The processing returns to step S281.

If it is discriminated at step S284 that the operation is not an operation for the high speed recording button 24, the processing returns to step S281.

Through the recording speed setting process described above, if the high speed recording button 24 is operated to set the high speed recording flag to an on state, then such CD ripping as illustrated in FIG. 57 is executed. On the contrary, if the recording button 23 is operated to set the high speed recording flag to an off state, then such CD recording as seen in FIG. 58 is executed. It is to be noted that changeover from CD ripping to CD recording or reverse changeover from CD recording to CD ripping can be performed at an arbitrary timing in response to an operation of a button by the user.

Now, a CD recording process is described with reference to a flow chart of FIG. 64. The CD recording process is a process controlled by the CD RIPPING 84 included in the HD MW 82 and is started when the music CD 3 is loaded and the function button 12 is operated to set the sound source to the CD and then the recording button 23 or the high speed recording button 24 is operated.

At step S291, the user selects a tune to be recorded from the music CD 3 while the system is in a recording pause state as a result of an operation of the recording button 23 or the high speed recording button 24. More particularly, the user operates the cursor button 17 to select one of the tunes recorded on the music CD 3 and operates the enter button 20 to finally determine the tune selection. By repeating the series of operations, all tunes to be recorded are selected. It is to be noted that, particularly if a tune selection operation is not performed, then this signifies that all of the tunes recorded on the music CD 3 are selected.

The user operates the reproduction/pause button 26 when the tune selection is completed. The processing advances to step S292.

At step S292, the CD RIPPING 84 initializes ring buffer information including information of a read start address indicated by the read pointer 242 set for the ring buffer 241 and so forth. The ring buffer information initialization process is described with reference to a flow chart of FIG. 65. At step S301, the CD RIPPING 84 sets the read start address indicated by the read pointer 242 and the write start address indicated by the write pointer 243 to the address 0 of the ring buffer 241. Further, the CD RIPPING 84 sets the read margin of the ring buffer 241 to 0 and sets the write margin to the maximum value max. The description of the ring buffer initialization process is ended therewith.

Referring back to FIG. 64, at step S293, the CD RIPPING 84 successively selects one of the tunes selected at step S291 to execute a recording process for one tune. The recording process for one tune is described with reference to a flow chart of FIG. 66. At step S311, the CD RIPPING 84 requests the CD MW 88 to buffer the PCM data of the tune of the music CD 3, which is to be recorded, successively by each predetermined data amount (for example, a data amount for two seconds) into the PCM data read buffer 231 which is in a write enabled state. When writing (buffering) of the predetermined amount of the PCM data is ended, the state of the PCM data read buffer 231 is changed to the read enabled state.

At step S312, the CD RIPPING 84 controls the encoder/decoder 59 to encode (encode and encrypt) the predetermined amount of PCM data buffered in the PCM data read buffer 231. When the reading out of the predetermined amount of PCM data from the PCM data read buffer 231 is ended, the state of the PCM data read buffer 231 changes to the write enabled state.

Further, the CD RIPPING 84 starts a monitor sound outputting process. The monitor sound outputting process is described with reference to FIG. 67.

At step S313, the CD RIPPING 84 causes a predetermined amount of coded data obtained by encoding to be buffered into the coded data buffer 232 of the buffer 56 which is in a write enabled state. When the writing (buffering) of the predetermined amount of coded data (for example, for two seconds) is ended, the state of the coded data buffer 232 changes to a read enabled state.

At step S314, the CD RIPPING 84 causes the predetermined amount of coded data buffered in the coded data buffer 232 to be recorded into the file recording area 121 of the HDD 58. It is to be noted that the process of recording coded data successively by a predetermined data amount into the file recording area 121 corresponds to the file preparation process described hereinabove with reference to FIG. 14. Also the object preparation process described hereinabove with reference to FIG. 28 is performed.

At step S315, the CD RIPPING 84 discriminates whether or not coded data for one tune are recorded. If it is discriminated that coded data for one tune are not recorded as yet, then the processing returns to step S311 so that the processes at the steps beginning with step S311 are repeated. Thereafter, if it is discriminated at step S315 that coded data for one tune are recorded, then the recording process for one tune is ended.

After the recording process for one tune is executed in such a manner as described above, the processing returns to step S294 of FIG. 64. At step S294, the CD RIPPING 84 discriminates whether or not all of the tunes selected at step S291 are recorded already. If it is discriminated that all of the selected tunes are not recorded as yet, then the processing returns to step S293, at which the recording process for one tune with regard to the next tune is performed.

Thereafter, if it is discriminated at step S294 that all of the selected tunes are recorded, then the CD recording process is ended.

Figure 67:
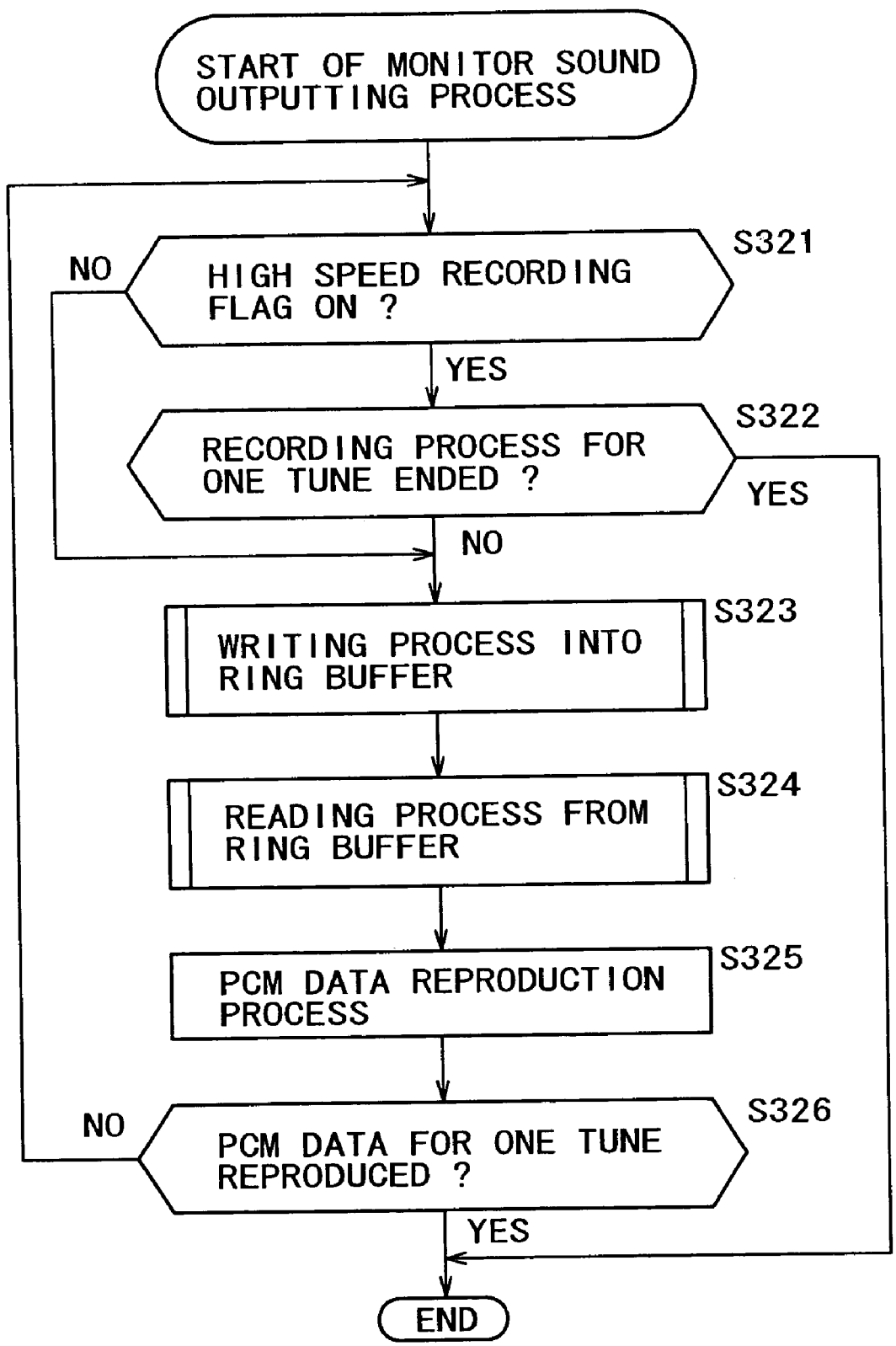
FIG. 67 is a flow chart illustrating a monitor sound outputting process.

Here, the monitor sound outputting process started at step S312 is described with reference to FIG. 67. At step S321, the CD RIPPING 84 discriminates whether or not the high speed recording flag is on. If it is discriminated that the high speed recording flag is on, then the processing advances to step S322.

At step S322, the CD RIPPING 84 discriminates whether or not the recording process for one tune for the corresponding PCM data is ended. If it is discriminated that the recording process for one tune for the corresponding PCM data is not ended, then the processing advances to step S323 in order to output monitor sound of the PCM data whose recording process for one tune is proceeding.

At step S323, the CD RIPPING 84 starts a writing process of the PCM data buffered in the PCM data read buffer 231 into the ring buffer 241. Without waiting the end of the process at step S323, the CD RIPPING 84 starts a reading process of the PCM data recorded in the ring buffer 241 at step S324.

Figure 68:
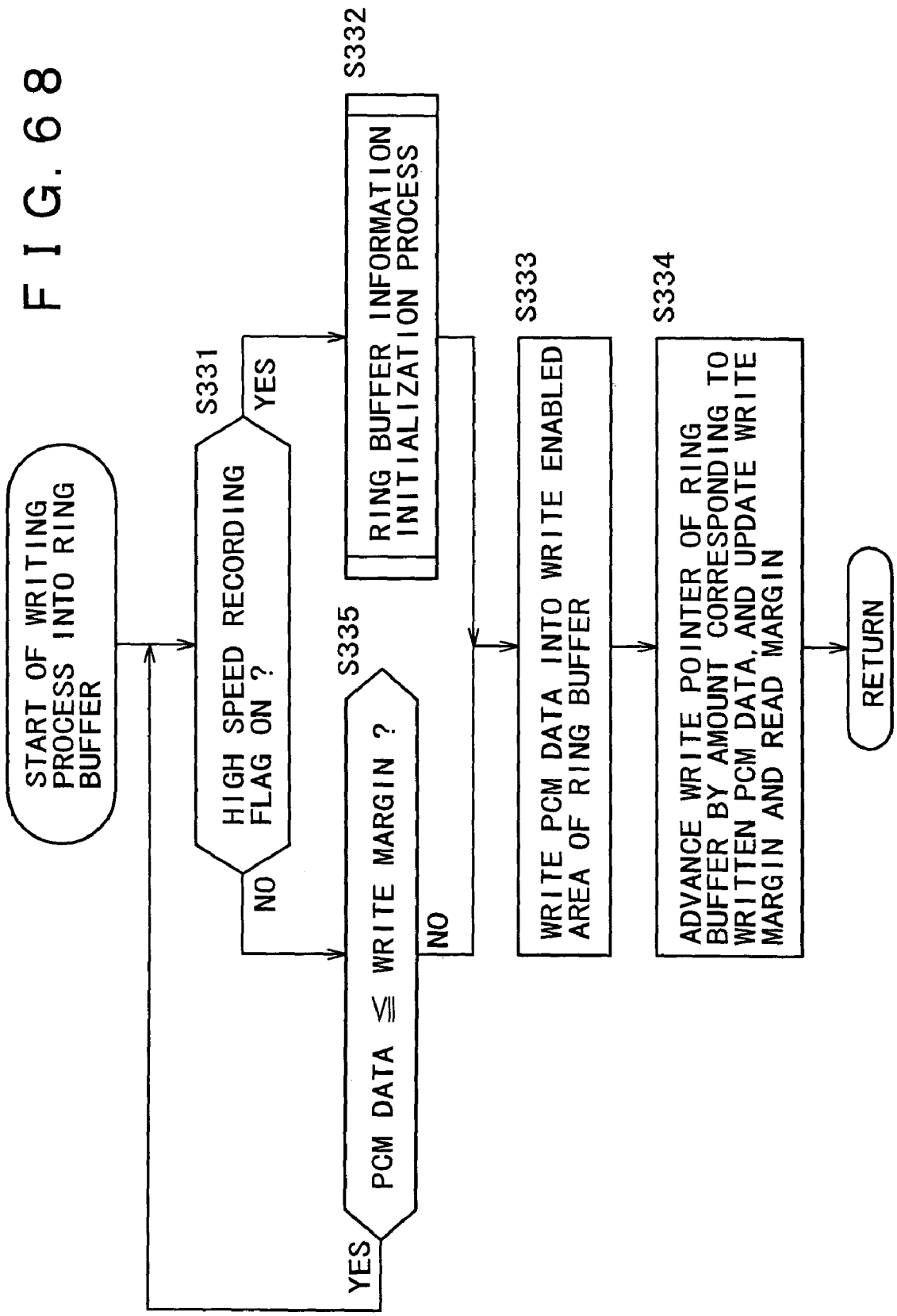
FIG. 68 is a flow chart illustrating a writing process for the ring buffer.

The writing process into the ring buffer 241 at step S323 is described with reference to a flow chart of FIG. 68.

At step S331, the CD RIPPING 84 discriminates whether or not the high speed recording flag is on. If it is discriminated that the high speed recording flag is on, then the processing advances to step S332. At step S332, the CD RIPPING 84 executes the ring buffer information initialization process described hereinabove with reference to FIG. 65.

At step S333, the CD RIPPING 84 starts writing of the PCM data recorded in the PCM data read buffer 231 into the write enabled area 245 beginning with the writing start address of the ring buffer information indicated by the write pointer 243. At step S334, the CD RIPPING 84 advances the value of the writing start address indicated by the write pointer 243 included in the ring buffer information in the forward direction by an amount corresponding to the PCM data written at step S333, and updates the values of the write margin and the read margin in a corresponding relationship.

It is to be noted that, if it is discriminated at step S331 that the high speed recording flag is not on, then the processing advances to step S335. At step S335, the CD RIPPING 84 refers to the ring buffer information to discriminate whether or not the size of the PCM data recorded in the PCM data read buffer 231 is equal to or smaller than the write margin of the ring buffer 241. If the size of the PCM data recorded in the PCM data read buffer 231 is equal to or smaller than the write margin of the ring buffer 241, then the processing advances to step S333.

It is to be noted that, if it is discriminated at step S335 that the size of the PCM data recorded in the PCM data read buffer 231 is not equal to or smaller than the write margin of the ring buffer 241, then the processing returns to step S331. Consequently, the processes at step S331 and step S335 are repeated until after it is discriminated at step S331 that the high speed recording flag is on as a result of a change of the setting of the recording speed by the user or it is discriminated at step S335 that the size of the PCM data recorded in the PCM data read buffer 231 is not equal to or smaller than the write margin of the ring buffer 241 as a result of an increase of the write margin of the ring buffer 241. The description of the writing process into the ring buffer 241 is ended therewith.

Figure 69:
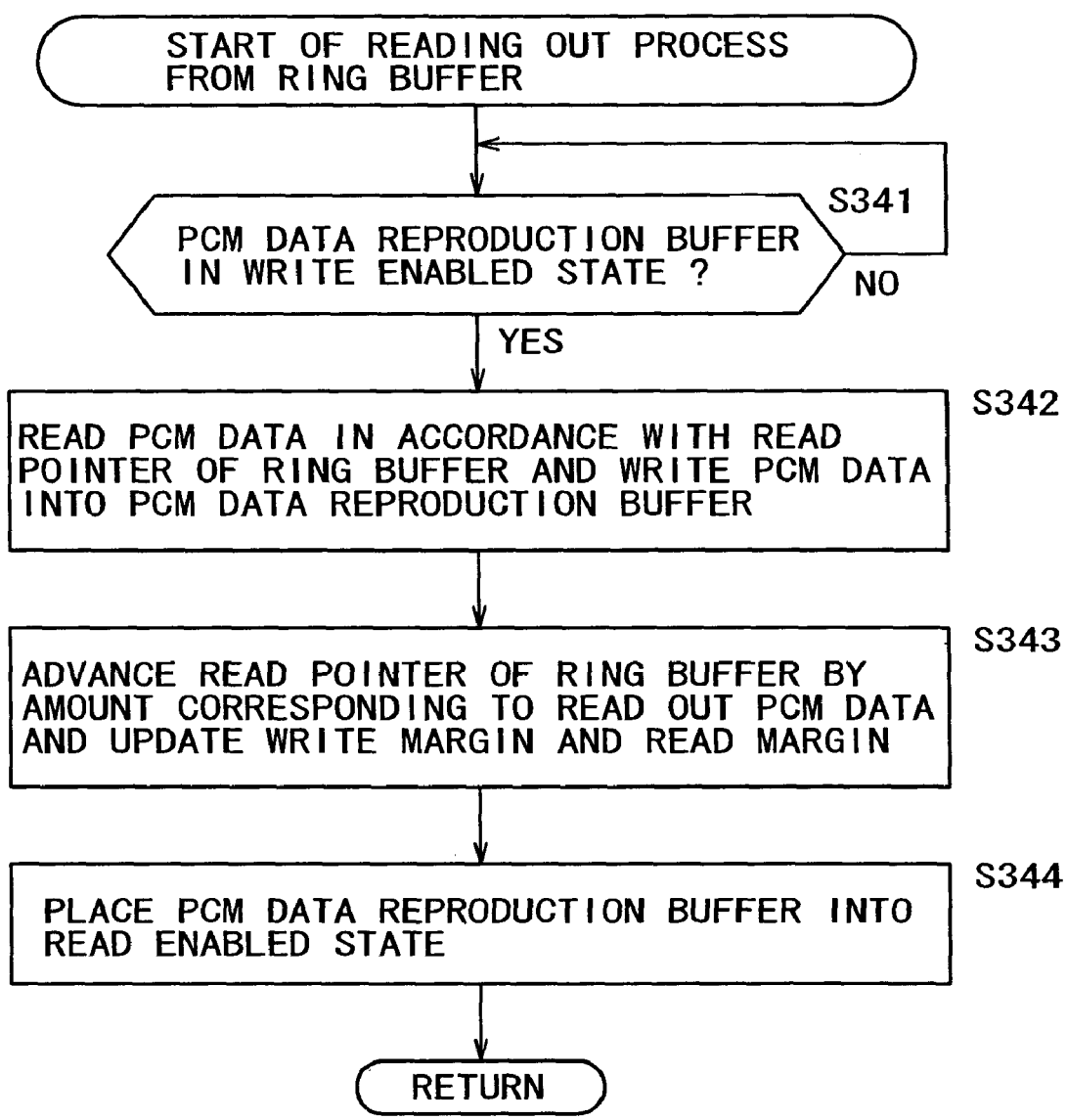
FIG. 69 is a flow chart illustrating a reading out process for the ring buffer.

The reading out process from the ring buffer 241 at step S324 is described with reference to a flow chart of FIG. 69. At step S341, the CD RIPPING 84 discriminates whether or not the PCM data reproduction buffer 251 built in the audio I/F 60-3 is in a write enabled state, and waits until it is discriminated that the PCM data reproduction buffer is in a write enabled state. If it is discriminated that the PCM data reproduction buffer is in a write enabled state, then the processing advances to step S342.

At step S342, the CD RIPPING 84 reads out the PCM data recorded in the read enabled area 244 of the ring buffer 241 in accordance with the readout start address indicated by the read pointer 242 for the ring buffer 241, and writes the PCM data into the PCM data reproduction buffer 251.

At step S343, the CD RIPPING 84 advances the value of the readout start address indicated by the read pointer 242 included in the ring buffer information in the forward direction by an amount corresponding to the PCM data read out at step S342, and updates the write margin and the read margin in a corresponding relationship.

At step S344, the CD RIPPING 84 changes the PCM data reproduction buffer 251 into a read enabled state. The description of the reading out process from the ring buffer 241 is ended therewith.

Referring back to FIG. 67, at step S325, the AIO MW 94 causes the PCM data reproduction buffer 251 to output the PCM data buffered therein to the AD/DA 62. The AD/DA 62 starts reproduction of the PCM data inputted thereto so that corresponding sound is outputted from the speakers 2.

At step S326, the CD RIPPING 84 discriminates whether or not the reproduction of the PCM data for one tune is ended. If it is discriminated that the reproduction of the PCM data for one tune is not ended, then the processing returns to step S321 so that the processes at the steps beginning with step S321 are repeated. Then, if it is discriminated at step S326 that the reproduction of the PCM data for one tune is not ended, then the monitor sound outputting process is ended.

It is to be noted that, if it is discriminated at step S322 that the recording process for one tune with regard to the corresponding PCM data is ended, the monitor sound outputting process is stopped immediately. The description of the CD recording process is ended therewith.

It is to be noted that, in the course of the CD recording process, a changeover from CD ripping to CD recording or conversely from CD recording to CD ripping can be performed at an arbitrary timing in response to an operation of the recording button 23 or the high speed recording button 24 by the user.

Figures 70A, 70B:
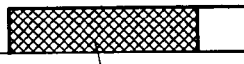
FIG. 70A is a view showing an example of display of a display unit 15 when a tune to be recorded is set.
FIG. 70B is a view showing an example of display of the display unit 15 during recording.

Here, examples of display of the display unit 15 when CD ripping is executed are shown in FIGS. 70A and 70B. FIG. 70A shows an example of display of information relating to recording setting which is displayed immediately before recording is started. In this instance, display areas 261 to 267 are provided on the display unit 15. In the present display example, information representative of a recording source and a recording destination is displayed in the display area 261. In the display area 262, a representation that information regarding recording setting is displayed is displayed. In the display area 263, a folder name representative of a storage place is displayed. In the display area 264, an album name and an artist name of an album to be recorded are displayed. In the display area 265, a bit rate upon the recording is displayed. In the display area 266, a recording level upon recording is displayed. In the display area 267, a representation that recording is started in response to depression of the reproduction/pause button 26. A recording level upon recording is displayed.

FIG. 70B shows an example of display while recording is being executed. In this instance, display areas 271 to 278 are provided on the display unit 15. In the present display example, information representative of a recording source and a recording destination is displayed in the display area 271. In the display area 272, characters "High speed recording" representing that CD ripping is proceeding is displayed by blinking display. In the display area 273, an album name of a tune being recorded and an artist name are displayed. In the display area 274, a tune number in the music CD 3 of the tune being recorded is displayed. In the display area 275, a period of time elapsed for reproduction of the tune being recorded is displayed. In the display area 276, a reproduction remaining time period of the music CD 3 is displayed. In the display area 277, a progress bar 279 whose length varies in proportion to the advancing situation of recording with respect to the total number of tunes to be recorded is displayed. In the display area 278, the total number of the tunes to be recorded and the number of tunes which have been recorded or are being recorded are shown.

For example, where CD ripping for all tunes of an album whose reproduction time period is 60 minutes is performed, since recording is performed at a substantially fivefold speed, the length of the progress bar 279 displayed in the display area 277 gradually increases after the recording is started, and increases to such a length that it occupies the entire display area 277 in approximately 12 minutes.

It is to be noted that the length of the progress bar 279 in the display area 277 may be varied not in accordance with the advancing situation of recording but in accordance with the period of time elapsed for reproduction of tunes.

Now, a method of reproducing contents data recorded in the HDD 58 is described with reference to FIGS. 71 to 77. As described hereinabove, the audio server 1 encodes a tune recorded on the music CD 3 and records contents data as a file into the HDD 58. However, when a tune to be reproduced is to be designated, the audio server 1 urges the user to designate not a file but objects of a folder, an album and a track which form a hierarchical structure.

It is also possible to designate a plurality of tunes collectively as tunes to be reproduced by designating the entire HDD, an arbitrary folder or an arbitrary album as a reproduction area. Reproduction of a tune is realized by decoding contents data corresponding to a track included in a play list prepared based on a designated reproduction area.

Figure 71:
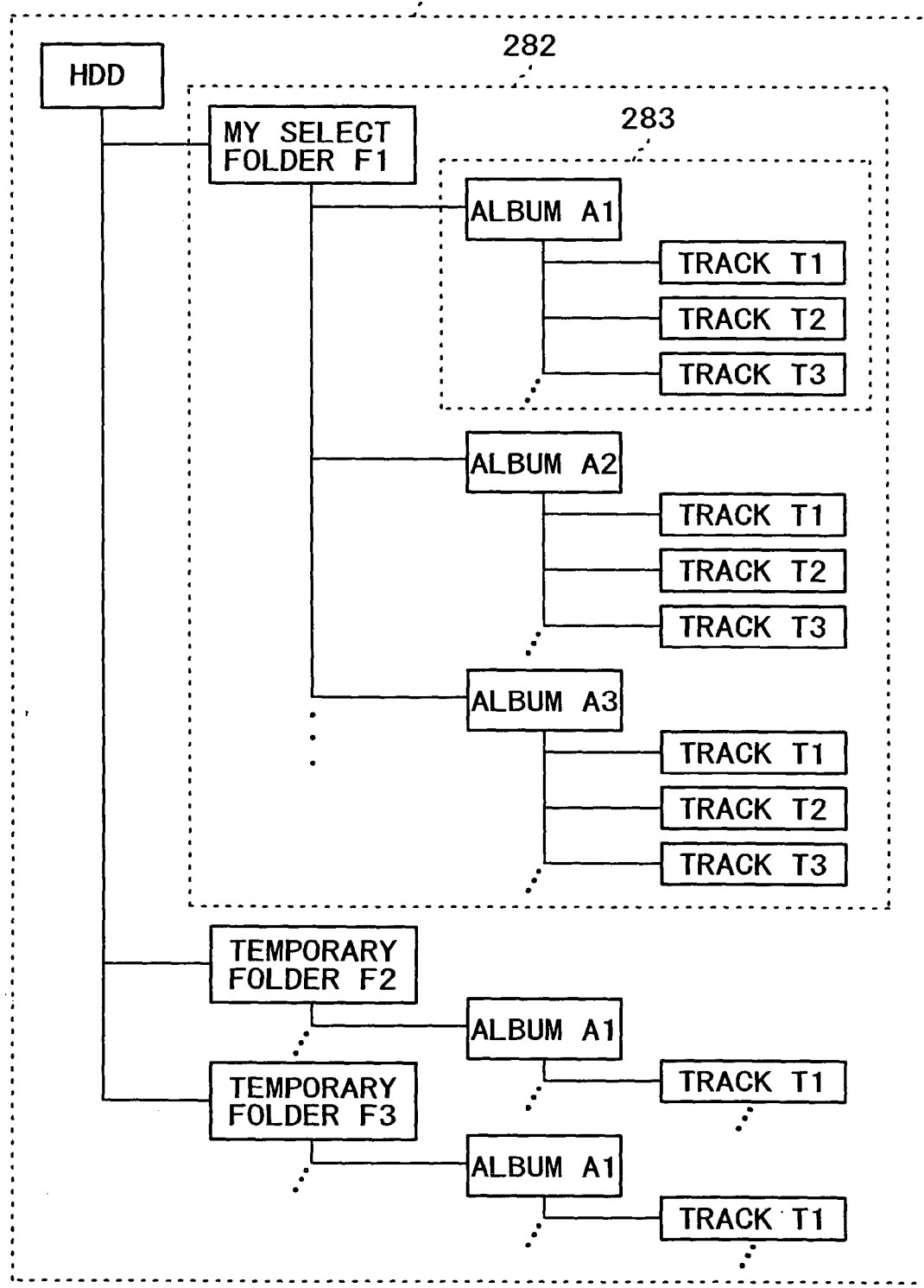
FIG. 71 is a view illustrating setting of a reproduction area.

FIG. 71 shows an example of the reproduction area. If the entire HDD surrounded by a broken line 281 is designated as the reproduction area, all of the track numbers in the HDD 58 are registered into a play list as shown in FIG. 72.

If a my select folder F1 surrounded by a broken line 282 is designated as the reproduction area, the album numbers of all of the albums which belong to the my select folder F1 are registered into the play list as shown in FIG. 73.

If an album A1 of the my select folder F1 surrounded by a broken line 283 is designated as the reproduction area, then the track numbers of all of the tracks which belong to the album A1 of the my select folder F1 are registered into the play list.

If a track T1 of the album A1 which belongs to a temporary folder F2 is designated as a tune to be reproduced, then the track T1 of the album A1 which belongs to the temporary folder F2 is registered into the play list.

Figure 76:
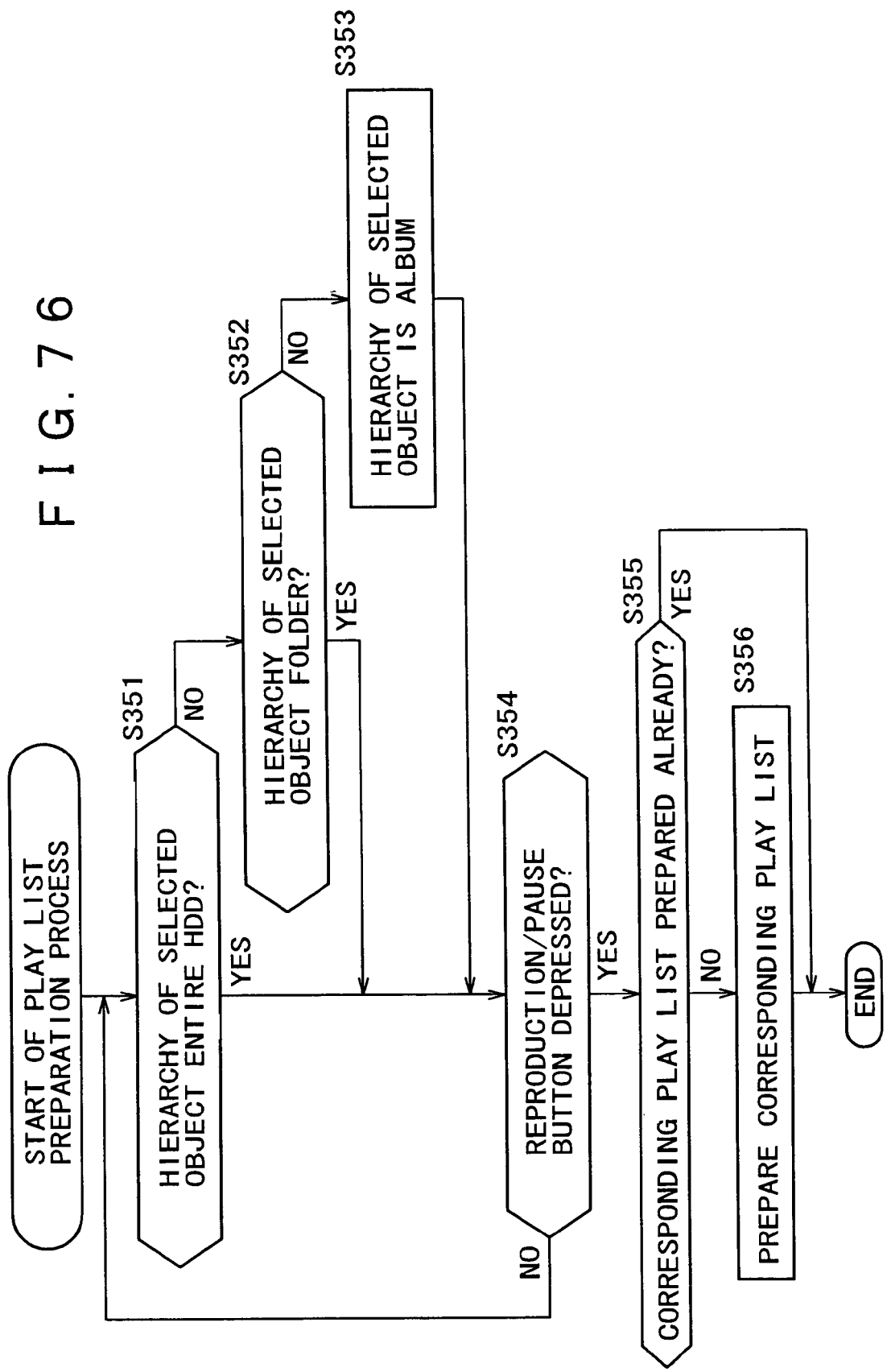
FIG. 76 is a flow chart illustrating a play list preparation process.

Now, a process of preparing a play list corresponding to a designated reproduction area is described with reference to a flow chart of FIG. 76.

This play list preparation process is a process controlled by the HD PLAY 85 included in the HD MW 82 and is started when the function button 12 is operated to set the sound source to the HDD.

At step S351, the HD PLAY 85 discriminates whether or not the hierarchy of the object representative of a reproduction area selected by the user is the entire HDD. If it is discriminated that the hierarchy of the selected object is not the entire HDD, then the processing advances to step S352. It is to be noted that, as a method of selecting a reproduction area, the user either operates a reproduction area changeover button (not shown) provided on the remote controller 7 or depresses the cursor button 17, enter button 20, menu/cancel button 21 and so forth provided on the lid 40 in a predetermined order.

At step S352, the HD PLAY 85 discriminates whether or not the hierarchy of the object selected by the user is a folder. If it is discriminated that the hierarchy of the selected object is not a folder, then the processing advances to step S353.

At step S353, the HD PLAY 85 discriminates that the hierarchy of the object selected by the user is an album and advances the processing to step S354.

At step S354, the HD PLAY 85 discriminates whether or not the reproduction/pause button 26 is operated. If it is discriminated that the reproduction/pause button 26 is operated, then the processing advances to step S355. At step S355, the HD PLAY 85 discriminates whether or not a play list corresponding to the hierarchy of the selected object is prepared already. If it is discriminated that such a play list is not prepared yet, then the processing advances to step S356. It is to be noted that, if it is discriminated that such a play list is prepared already, then the step S356 is skipped.

At step S356, the HD PLAY 85 prepares a play list based on the hierarchy of the selected object.

It is to be noted that, if it is discriminated at step S354 that the reproduction/pause button 26 is not operated, then the processing returns to step S351 so that the processes at steps beginning with step S351 are repeated.

On the other hand, if it is discriminated at step S351 that the hierarchy of the selected object is the entire HDD, or if it is discriminated at step S352 that the hierarchy of the selected object is a folder, the processing advances to step S354. The description of the play list preparation process is ended therewith.

It is to be noted that it is otherwise possible to prepare a plurality of play lists corresponding to variable possible reproduction areas and record the play lists at a suitable location in advance such that, when a reproduction area is designated by the user, a corresponding one of the play lists prepared and recorded in advance is read out.

Figure 77:
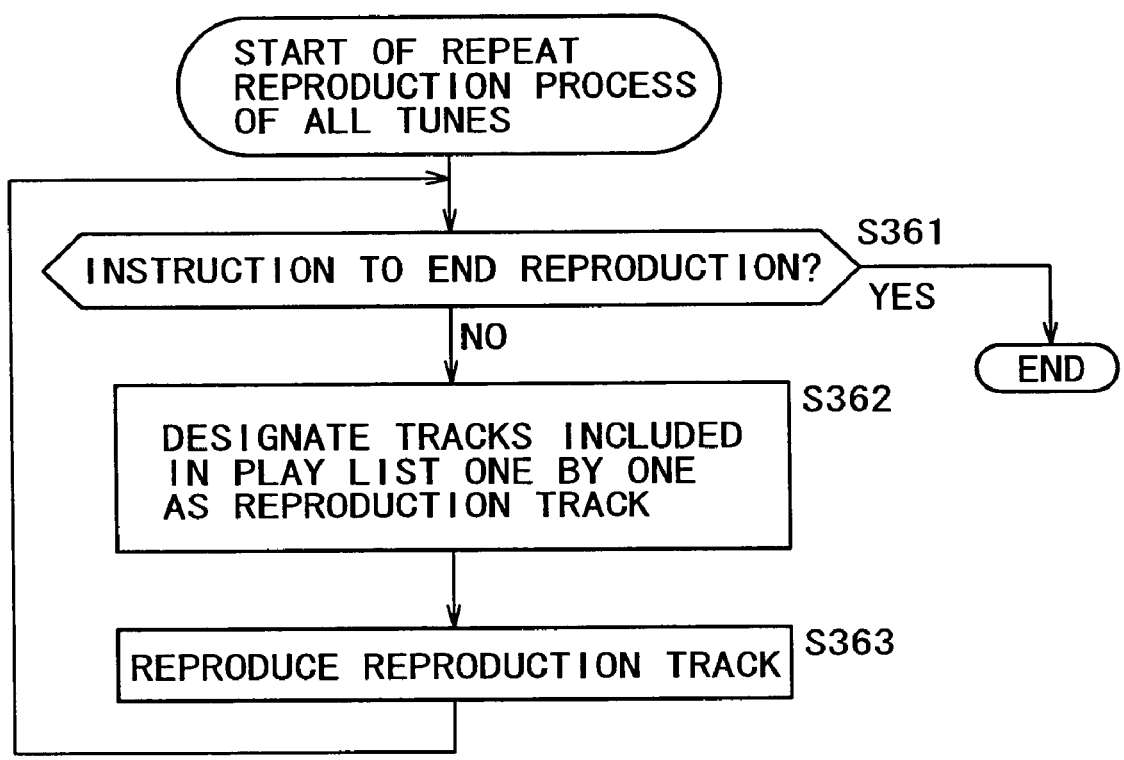
FIG. 77 is a flow chart illustrating a repeat reproduction process of all tunes.

Subsequently, a reproduction process which is executed subsequently to the end of the play list preparation process described above is described with reference to a flow chart of FIG. 77 taking a case wherein the play mode is set to the all tune repeat mode as an example.

At step S361, the HD PLAY 85 discriminates whether or not an instruction to end the reproduction is issued through an operation of the stop button 25. If it is discriminated that an instruction to end the reproduction is not issued, then the processing advances to step S362. At step S362, the HD PLAY 85 successively designates all of the tracks included in the play list one by one as a reproduction track.

At step S363, the HD PLAY 85 reproduces contents data corresponding to the reproduction track. More particularly, a track object corresponding to the reproduction track is specified based on CC data, and the file identifier of corresponding contents data is specified based on the value of the file identifier recording area 203 of the specified track object, and then the contents data are read out based on the specified file identifier (=cluster number of the file recording area 121). Then, the contents data read out are decoded and outputted.

After the reproduction of the contents data corresponding to the reproduction track is ended, the processing returns to step S361 so that the processes at the steps beginning with step S361 are repeated. Thereafter, when it is discriminated at step S361 that an instruction to end the reproduction is issued through an operation of the stop button 25, the reproduction process where the reproduction mode is the all tune repeat mode is ended.

It is to be noted that the procedure in processing in any of the reproduction modes other than the all tune repeat mode is substantially similar except that it is different only in the reproduction area and the method of designating a reproduction track.

Subsequently, a process of moving out contents data recorded in the HDD 58 of the audio server 1 to the MS 4 is described with reference to FIGS. 78 to 81.

Here, the process of moving out contents data recorded in the HDD 58 to the MS 4 is a series of processes of copying contents data recorded in the HDD 58 into the MS 4 and then deleting the contents data recorded in the HDD 58.

The moveout process is described with reference to a flow chart of FIG. 78. It is to be noted that the moveout process is controlled by the MS MW 89.

The moveout process is started when, while the MS 4 is inserted in the MS slot 45, the user operates the menu/cancel button 21 to display a menu and operates the cursor button 17 to select "editing", and then operates the enter button 20 to display an edit menu and operates the cursor button 17 to select "moveout", whereafter the user operates the enter button 20 and operates the cursor button 17 and the select button 18 to select tracks to be moved out, and operates the enter key 20 to display a list of the tracks to be moved out and further operates the enter key 20.

At step S371, the MS MW 89 requests the C IN/C OUT 87 to copy the contents data, which are recorded in the HDD 58 and are to be moved out, as invalid right data (irreproducible data) into the MS 4. It is to be noted that, in order to change contents data into invalid right data, a flag included in attribute information of the contents data and representative of whether or not the right is available is placed into an off state. In other words, attribute information representing that the right is invalid and the contents data are copied into the MS 4.

At step S372, the C IN/C OUT 87 produces moveout history information representing that a moveout process is started and records the moveout history information into the HDD 58. The moveout history information includes information for specifying the tracks to be moved out. At step S373, the C IN/C OUT 87 places the flag recorded in the HDD 58 and representative of whether or not the right for the contents data is available into an off state to set the contents data of the HDD 58 as invalid right data.

At step S374, the MS MW 89 places the flag representative of whether or not the right for the contents data copied in the MS 4 is available to an on state to set the contents data of the MS 4 as valid right data.

At step S375, the C IN/C OUT 87 deletes the contents data recorded in the HDD 58. At step S376, the C IN/C OUT 87 deletes the moveout history information produced by the process at step S372.

The processes at steps S371 to S376 described above are a moveout process of one set of contents data corresponding to one track, and the processes at steps S371 to S376 are performed for all of the selected tracks.

Figure 87:
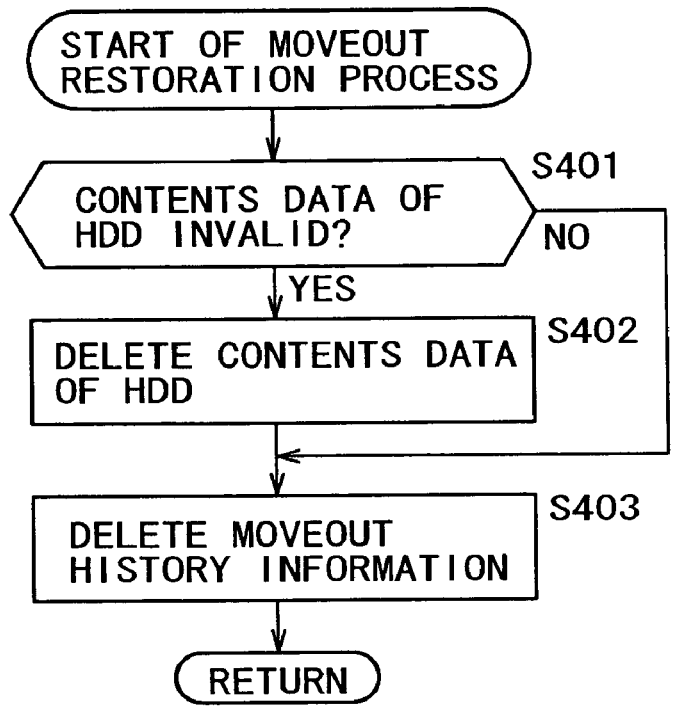
FIG. 87 is a flow chart illustrating a moveout restoration process.
Figure 88:
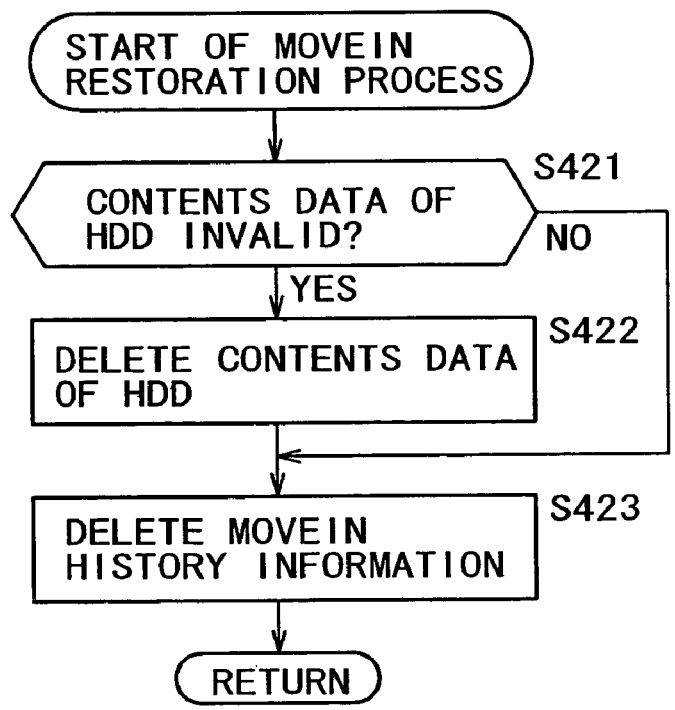
FIG. 88 is a flow chart illustrating a movein restoration process.

It is to be noted that, if the moveout process is interrupted by disconnection of the power supply or the like during the moveout process, then a restoration process is executed after restoration of the power supply in order to compensate for the interrupted moveout process. It is to be noted that the restoration process is hereinafter described with reference to FIGS. 86 to 88.

FIG. 79 illustrates a state transition in the moveout process. The state 1 is a state before the moveout process is started. In particular, in the state 1, contents data are recorded in the HDD 58 of the audio server 1, and the right of the contents data of the HDD 58 is valid.

The state 2 is a state after the process at step S371 is performed. In particular, in the state 2, since the contents data recorded in the HDD 58 of the audio server 1 have been copied into the MS 4, the contents data are recorded in both of the HDD 58 and the MS 4 and besides the right of the contents data of the HDD 58 is valid while the right of the contents data of the MS 4 is invalid.

The state 3 is a state after the process at step S373 is performed. In particular, in the state 3, the contents data are recorded in both of the HDD 58 and the MS 4, and besides the right of the contents data of the HDD 58 and the right of the contents data of the MS 4 are invalid.

The state 4 is a state after the process at step S374 is performed. In particular, in the state 4, the contents data are recorded in both of the HDD 58 and the MS 4, and besides the right of the contents data of the HDD 58 is invalid while the right of the MS 4 is valid.

The state 5 is a state after the process at step S375 is performed. In particular, in the state 5, the contents data of the HDD 58 have been erased, and consequently, the contents data are recorded only in the MS 4 and the right of the contents data of the MS 4 is valid.

FIG. 80 shows an example of display of the display unit 15 when the tracks to be moved out are selected. On the display unit 15, only those of the tracks which can be moved out are displayed.

FIG. 81 shows an example of display of the display unit 15 while the moveout process is being carried out. In a display area 291 of the display unit 15, the characters "Moveout" representing that moveout is being executed are displayed by blinking display. A check mark 292 is displayed alongside a track with regard to which the moveout is completed. In a display area 293, information representative of a proceeding situation of the moveout process (the number of tracks with regard to which moveout is proceeding or has been completed/total number of the tracks to be moved out) is displayed.

Figure 82:
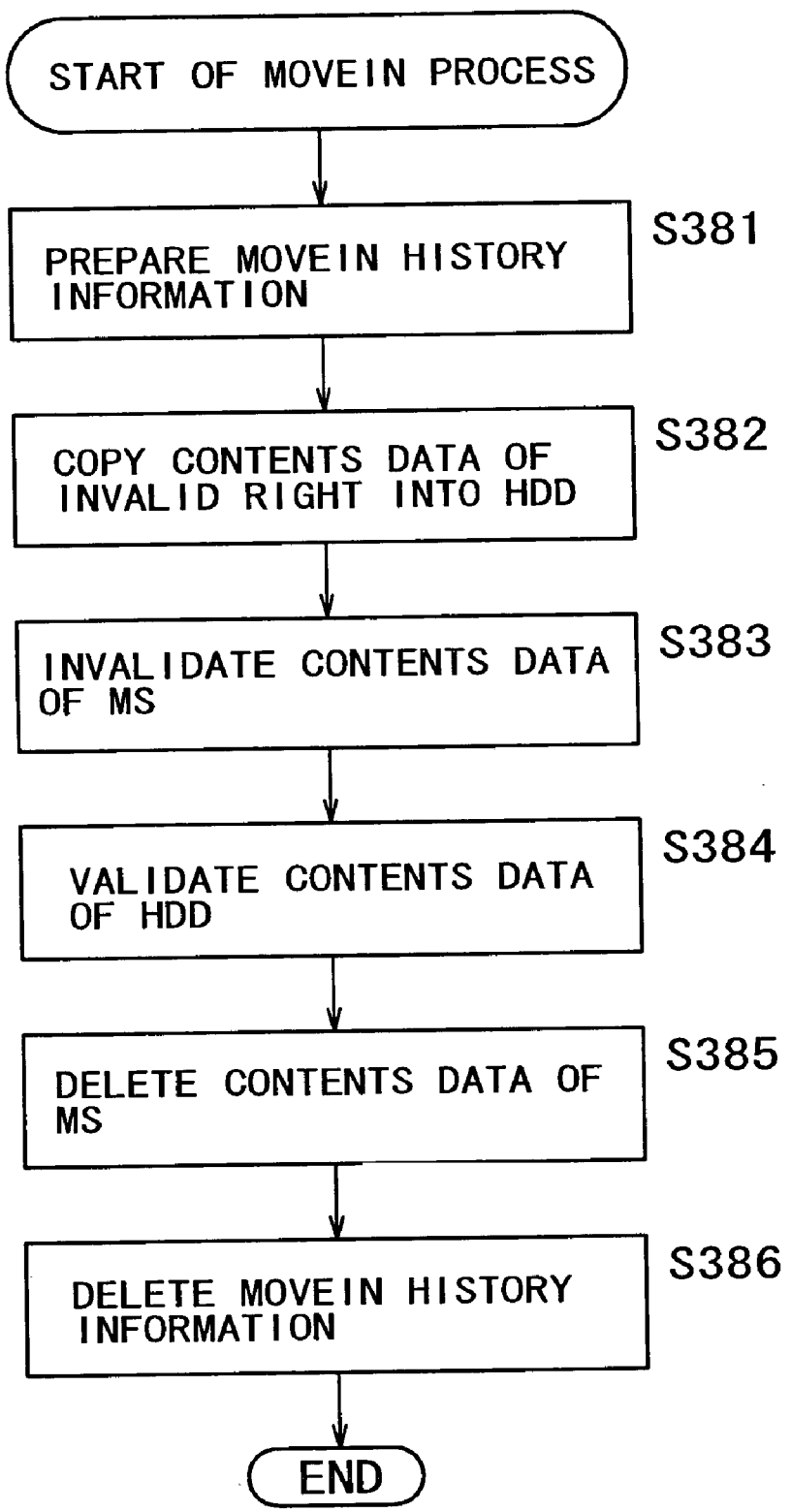
FIG. 82 is a flow chart illustrating a movein process.

Subsequently, a process of moving in contents data recorded in the MS 4 to the HDD 58 of the audio server 1 is described with reference to FIGS. 82 to 81.

Here, the process of moving in contents data recorded in the MS 4 to the HDD 58 is a series of processes of copying the contents data recorded in the MS 4 into the HDD 58 and then deleting the contents data recorded in the MS 4.

The movein process is described with reference to a flow chart of FIG. 82. It is to be noted that the movein process is controlled by the MS MW 89.

The movein process is started when, while the MS 4 is inserted in the MS slot 45, the user operates the menu/cancel button 21 to display a menu and operates the cursor button 17 to select "editing", and then operates the enter button 20 to display an edit menu and operates the cursor button 17 to select "movein", whereafter the user operates the enter button 20 and operates the cursor button 17 and the select button 18 to select tracks to be moved in from within the contents data recorded in the MS 4, and operates the enter key 20 to display a list of the contents data to be moved in and further operates the enter key 20 and operates the reproduction/pause button 26.

At step S381, the MS MW 89 requests the C IN/C OUT 87 to produce movein history information representing that a movein process is started and records the movein history information into the HDD 58. The movein history information includes information for specifying the contents data to be moved in.

At step S382, the C IN/C OUT 87 copies the contents data recorded in the MS 4 and to be moved in as invalid right data into the HDD 58. At step S383, the MS MW 89 sets the flag which represents whether or not the right of the contents data recorded in the MS 4 is available to an off state to set the contents data of the MS 4 as invalid right data.

At step S384, the C IN/C OUT 87 sets the flag which represents whether or not the contents data copied in the HDD 58 have the right to an on state to set the contents data of the HDD 58 as valid right data.

At step S385, the C IN/C OUT 87 requests the MS MW 89 to delete the contents data recorded in the MS 4. At step S386, the C IN/C OUT 87 deletes the movein history information produced by the process at step S382.

The processes at steps S381 to 386 described above are a movein process of one set of contents data corresponding to one track, and the processes at steps S381 to S386 are performed for all of the selected tracks.

It is to be noted that, if the movein process is interrupted by disconnection of the power supply or the like during the movein process, then a restoration process is executed after restoration of the power supply in order to compensate for the interrupted movein process.

FIG. 83 illustrates a state transition in the movein process. The state 11 is a state before the movein process is started. In particular, in the state 11, contents data are recorded in the MS 4, and the right of the contents data of the MS 4 is valid.

The state 12 is a state after the process at step S382 is performed. In particular, in the state 12, since the contents data recorded in the MS 4 have been copied into the HDD 58, the contents data are recorded in both of the MS 4 and the HDD 58 and besides the right of the contents data of the MS 4 is valid while the right of the contents data of the HDD 58 is invalid.

The state 13 is a state after the process at step S383 is performed. In particular, in the state 13, the contents data are recorded in both of the MS 4 and the HDD 58, and besides the right of the contents data of the MS 4 and the right of the contents data of the HDD 58 are invalid.

The state 14 is a state after the process at step S384 is performed. In particular, in the state 14, the contents data are recorded in both of the MS 4 and the HDD 58, and besides the right of the contents data of the MS 4 is invalid while the right of the HDD 58 is valid.

The state 15 is a state after the process at step S385 is performed. In particular, in the state 15, the contents data of the MS 4 have been erased, and consequently, the contents data are recorded only in the HDD 58 and the right of the contents data of the HDD 58 is valid.

FIG. 84 shows an example of display of the display unit 15 when contents data to be moved in are selected. On the display unit 15, only those of the contents data recorded in the MS 4 which can be moved in are displayed.

FIG. 85 shows an example of display of the display unit 15 while a movein process is being performed. In a display area 301 of the display unit 15, the characters "Movein" representing that a movein process is being executed are displayed by blinking display. A check mark 302 is displayed alongside contents data with regard to which the movein is completed. In a display area 303, information representative of a proceeding situation of the movein process (the number of contents data with regard to which movein is proceeding or has been completed/total number of the contents data to be moved in) is displayed.

While the movein process is described above, also a process of importing contents data from the MS 4 to the HDD 58 is carried out similarly. The difference between the movein process and the import process resides in handling of contents data recorded in the HDD 58 by the movein process or the import process.

The audio server 1 can move out contents data recorded in the HDD 58 through the movein process to another medium such as the MS 4 or the PD 5, and besides can check out the contents data. However, while the audio server 1 can check out contents data recorded in the HDD 58 through the import process to another medium such as the MS 4 or the PD 5, it is inhibited from moving out the contents data.

Subsequently, a restoration process for compensating for an interrupted process such as a moveout process or a movein process when the process is interrupted by disconnection of the power supply or the like during the process is described with reference to FIG. 86. This restoration process is started immediately by the MS MW 89 after the power supply is restored.

At step S391, the MS MW 89 discriminates whether or not moveout history information is present in the HDD 58. If it is discriminated that moveout history information is present in the HDD 58, then the processing advances to step S392 in order to compensate for the interrupted moveout process.

At step S392, the MS MW 89 executes a moveout restoration process. The moveout restoration process is described with reference to a flow chart of FIG. 87.

At step S401, the MS MW 89 discriminates whether or not the right of the contents data of the HDD 58 is invalid. If it is discriminated that the right of the contents data of the HDD 58 is invalid, then the processing advances to step S402. Since the right of the contents data of the HDD 58 is invalid, it indicates that the state then is the state 3 or the state 4 in FIG. 79.

At step S402, the MS MW 89 deletes the contents data present in the HDD 58. Here, if the state then is the state 4, the contents data present in the HDD 58 are deleted so that the state wherein the moveout process is completed, that is, the state 5, is restored. On the other hand, if the state then is the state 3, then the contents data present in the HDD 58 are deleted, and the contents data of the invalid right remain in the MS 4.

At this time, although the user loses the contents data, the copyright of the proprietor of the contents data is protected. Further, since the contents data of the invalid right in the MS 4 can be deleted by the user using a file editing application for universal use, the wasteful data, that is, the contents data of the invalid right, are not left in the MS 4 at all.

However, conversely if a restoration process is performed such that the contents data of the invalid right of the MS 4 are deleted while the contents data of the invalid right in the HDD 58 are left, then wasteful data, that is, the contents data of the invalid right, remain recorded in the HDD 58. Since contents data of the invalid right are not generated in normal operation, the audio server 1 which is a machine for exclusive use in the present embodiment does not have such a function as erases contents data of the invalid right in accordance with a user instruction.

Consequently, in order to protect the copyright of contents data and further prevent invalid data from being recorded in the audio server 1, it is preferable to delete contents data present in the HDD 58 as at step S402.

It is to be noted that, if it is discriminated at step S401 that the right of the contents data of the HDD 58 is not invalid, then the step S402 is skipped. In particular, since the right of the contents data of the HDD 58 is not invalid, it represents that the state then is the state 2 of FIG. 79. At this time, while the contents data of the invalid right are left in the MS 4, since the contents data of the invalid right in the MS 4 can be deleted by a file editing application for universal use by the user as described hereinabove, the wasteful data, that is, the contents data of the invalid right, are not left in the MS 4 at all.

At step S403, the MS MW 89 deletes the moveout history information of the HDD 58.

Figure 86:
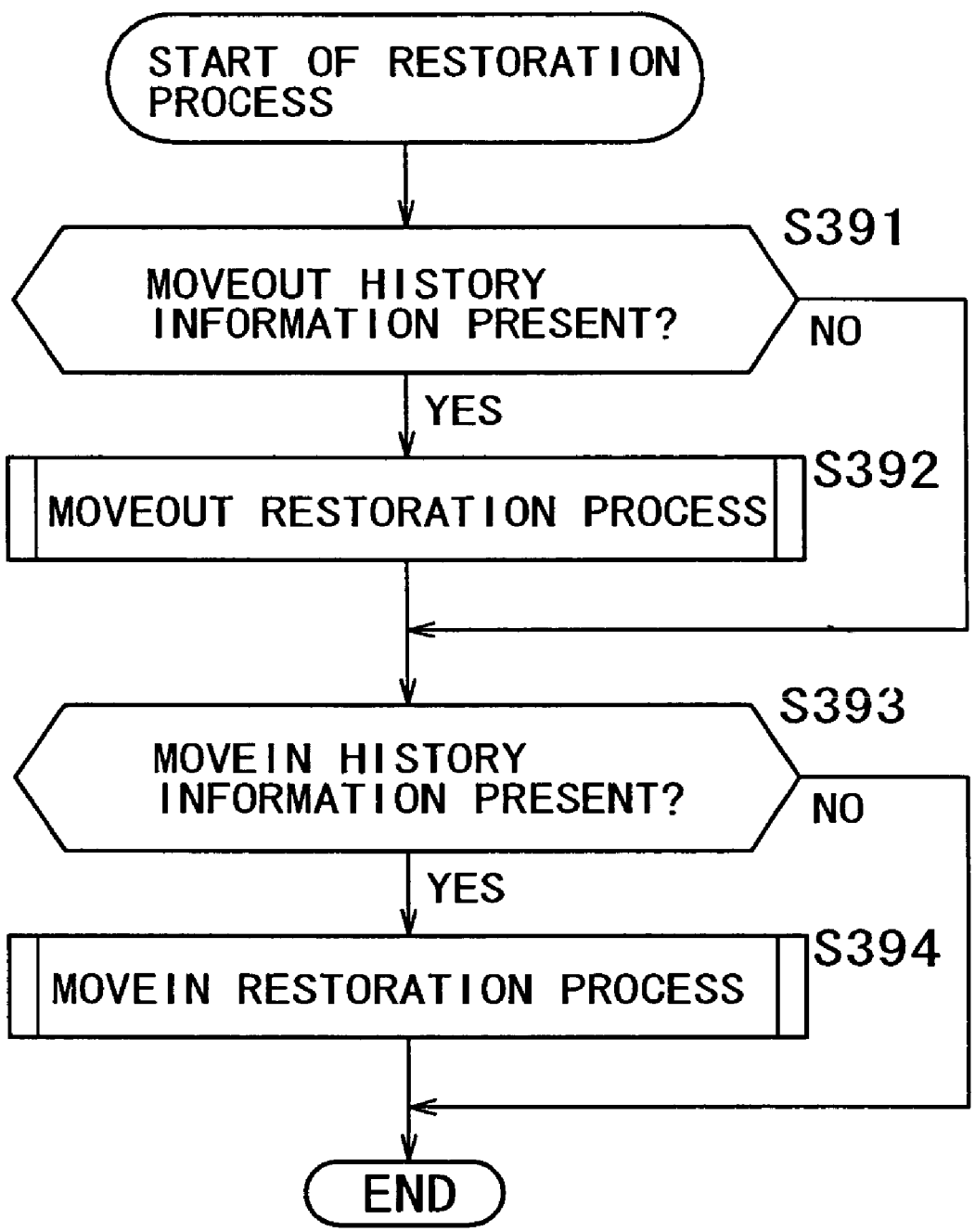
FIG. 86 is a flow chart illustrating a restoration process.

The processing returns to FIG. 86. At step S393, the MS MW 89 discriminates whether or not movein history information is present in the HDD 58. If it is discriminated that movein history information is present in the HDD 58, then the processing advances to step S394 in order to compensate for the interrupted movein process.

At step S394, the MS MW 89 executes a movein restoration process. The movein restoration process is described with reference to a flow chart of FIG. 88.

At step S421, the MS MW 89 discriminates whether or not the right of the contents data of the HDD 58 is invalid. If it is discriminated that the right of the contents data of the HDD 58 is invalid, then the processing advances to step S422. Since the right of the contents data of the HDD 58 is invalid, it represents that the state then is the state 12 or the state 13 in FIG. 83.

At step S422, the MS MW 89 deletes the contents data present in the HDD 58.

Here, if the state then is the state 12, then the contents data present in the HDD 58 are deleted so that the state before the movein process is performed, that is, the state 11, is restored. On the other hand, if the state then is the state 13, then the contents data present in the HDD 58 are deleted, and the contents data of the invalid right remain in the MS 4.

At this time, although the user loses the contents data, the copyright of the proprietor of the contents data is protected. Further, since the contents data of the invalid right in the MS 4 can be deleted using a file editing application for universal use by the user, the wasteful data, that is, the contents data of the invalid right, are not left at all in the MS 4.

However, conversely if a restoration process is performed such that the contents data of the invalid right of the MS 4 are deleted while the contents data of the invalid right in the HDD 58 are left, then the wasteful data, that is, the contents data of the invalid right, remain recorded in the HDD 58. Since contents data of the invalid right is not generated in normal operation, the audio server 1 which is a machine for exclusive use in the present embodiment does not have such a function as erases contents data of the invalid right in accordance with a user instruction.

Consequently, in order to protect the copyright of contents data and further prevent invalid data from being recorded in the audio server 1, it is preferable to delete contents data present in the HDD 58 as at step S422.

It is to be noted that, if it is discriminated at step S421 that the right of the contents data of the HDD 58 is not invalid, then the step S422 is skipped. In particular, since the right of the contents data of the HDD 58 is not invalid, it represents that the state then is the state 14 or the state 15 in FIG. 83. In the state 15, since the movein process is completed, there occurs no problem. However, while, in the state 14, the contents data of the invalid right are left in the MS 4, since contents data of the invalid right in the MS 4 can be deleted using a file editing application for universal use by the user as described hereinabove, the wasteful data, that is, the contents data of the invalid right, are not left in the MS 4 at all.

At step S423, the MS MW 89 deletes the movein history information of the HDD 58. The description of the movein restoration process is ended therewith. The processing returns to FIG. 86, and the restoration process is ended.

It is to be noted that, if it is discriminated at step S391 of FIG. 86 that moveout history information is not present in the HDD 58, then there is the possibility that either the moveout process has been ended normally or the state then is the state 1 or the state 2 in FIG. 79. In the case wherein the moveout process has been ended normally and the case wherein the state then is the state 1 which is a state before the moveout process is performed, the moveout restoration process may be skipped.

Also in the state 2, the contents data-of the invalid right of the MS 4 remain. However, since contents data of the invalid right can be deleted by the user using a file editing application for universal use, the wasteful data, that is, the contents data of the invalid right, are not left in the MS 4 at all. Consequently, the process at step S392 is skipped.

Further, if it is discriminated at step S393 that movein history information is not present in the HDD 58, then there is the possibility that either the movein process may have been ended normally or the state then may be the state 11 in FIG. 83. In the case wherein the movein process has been ended normally or the state then is the state 11 which is a state prior to the move process, the movein restoration process may be skipped, and therefore, the process at step S394 is skipped.

Further, even if the restoration process is interrupted after the power supply is disconnected, since the process beginning with step S391 is executed again after the power supply is restored, the interrupted restoration process is compensated for. The description of the restoration process is ended therewith.

Figure 89:
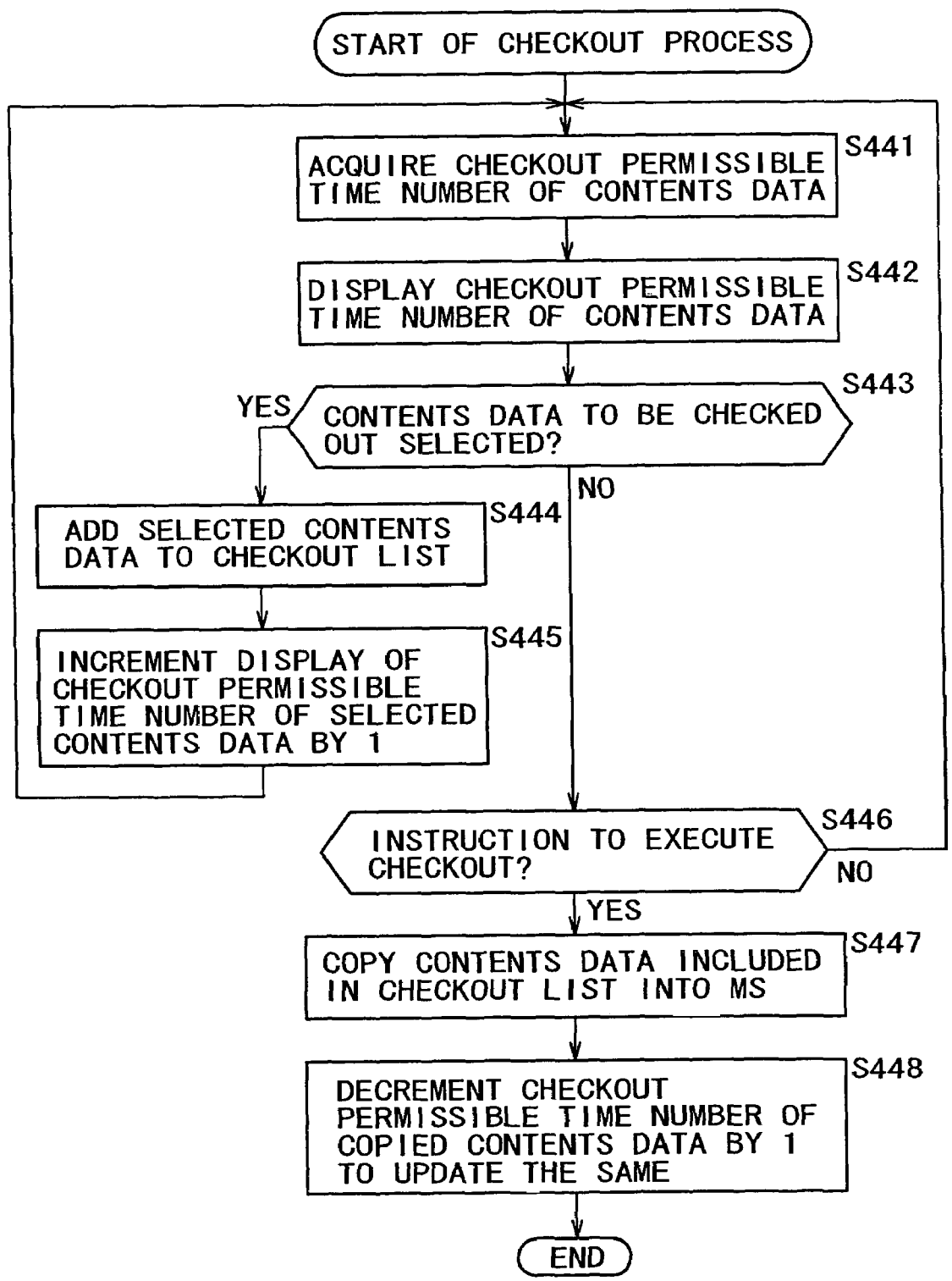
FIG. 89 is a flow chart illustrating a checkout process.
Figure 90:
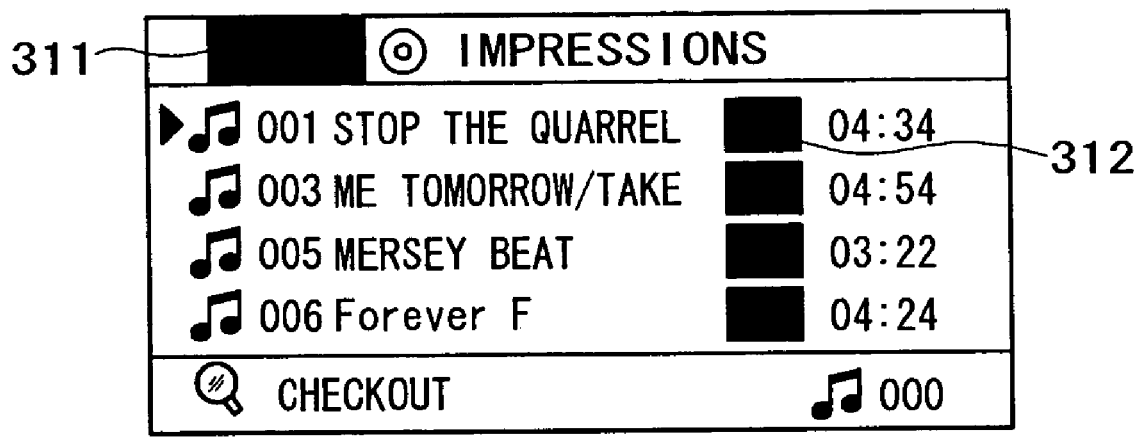
FIG. 90 is a view showing an example of display of the display unit 15 in the checkout process.

Now, a process of checking out contents data recorded in the HDD 58 of the audio server 1 to the MS 4 is described with reference to FIGS. 89 to 91.

Here, the process of checking out contents data recorded in the HDD 58 is a process for temporarily producing a copy of contents data recorded in the HDD 58 in the MS 4 or the like and utilizing the copy of the contents data. The number of times by which contents data can be checked out is set in advance, and the checkout permissible time number is decremented by one through a checkout process. However, if a checkin process hereinafter described is executed, then the decremented checkout permission time number is incremented by one.

The checkout process is described with reference to a flow chart of FIG. 89. It is to be noted that the checkout process is controlled by the C IN/C OUT 87 of the HD MW 82.

The checkout process is started when, while the MS 4 is inserted in the MS slot 45, the user operates the menu/cancel button 21 to display a menu and operates the cursor button 17 to select "editing", and then operates the enter button 20 to display an edit menu and operates the cursor button 17 to select "checkout", whereafter the user operates the enter button 20.

At step S441, the C IN/C OUT 87 controls the HS DB 91 to acquire the checkout permissible time numbers (checkout remaining time numbers) of contents data corresponding to all tracks which belong to an album selected at present. A checkout permissible time number of contents data is recorded in the CN included in the AC (FIG. 42) of a corresponding track object (FIG. 43).

At step S442, the C IN/C OUT 87 requests pertaining firmware to display information regarding those tracks which have a checkout permissible time number equal to or greater than 1 (information of the tune title, checkout permissible time number and so forth) on the display unit 15. FIG. 90 shows an example of display of the display unit 15. In a display area 311 of the display unit 15, "HDD" is displayed as information representative of a sound source for the checkout. The display in a display area 312 indicates a checkout permissible time number of contents data corresponding to the track.

At step S443, the C IN/C OUT 87 discriminates whether or not a track to be checked out is selected from among the displayed tracks, which can be checked out, through operations of the cursor button 17 and the select button 18 by the user. If it is discriminated that a track to be checked out is selected, then the processing advances to step S444.

At step S444, the C IN/C OUT 87 adds the selected track to the checkout list. At step S445, the C IN/C OUT 87 decrements the display of the checkout permissible time number of the contents data corresponding to the selected track by 1. The processing returns to step S441 so that the processes at the steps beginning with step S441 are repeated.

It is to be noted that, if it is discriminated at step S443 that a track to be checked out is not selected, then the processing advances to step S446. At step S446, the C IN/C OUT 87 discriminates whether or not the user issues an instruction to execute checkout by operating the enter key 20 so that the list of tracks to be checked out is displayed and then operating the enter key 20. If it is discriminated that an instruction to execute checkout is not issued, then the processing returns to step S441 so that the processes at the steps beginning with step S441 are repeated.

Thereafter, if it is discriminated at step S446 that an instruction to execute checkout is issued, then the processing advances to step S447. At step S447, the C IN/C OUT 87 reads out contents data corresponding to the tracks included in the checkout list from the HDD 58 and requests the MS MW 89 to copy the read out contents data into the MS 4. It is to be noted that the copy of the contents data includes information for specifying the HDD 58 which is the source of the checkout.

At step S448, the C IN/C OUT 87 decrements the checkout permission time number recorded in the CN of the AC of the track object corresponding to the copied contents data by one to update the value of the CN. Further, the C IN/C OUT 87 records information for specifying the MS 4 as the information of the checkout destination into the LCMLOG of the AC.

It is to be noted that, although description is omitted, also in the checkout process, a flag which indicates whether or not reproduction is permitted (whether the right is valid or invalid) is used for compensation upon disconnection of the power supply or the like and prevention of production of an illegal copy similarly as in the moveout process described hereinabove.

Figure 91:
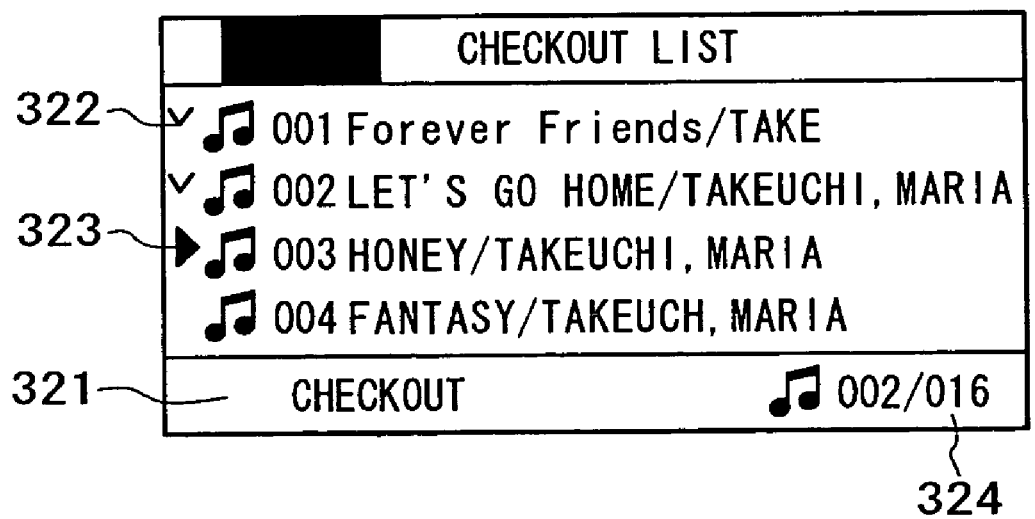
FIG. 91 is a view showing another example of display of the display unit 15 in the checkout process.

FIG. 91 shows an example of display of the display unit 15 while a checkout process is being executed. In a display area 321, the characters "Checkout" representing that checkout is proceeding are displayed by blinking display. A check mark 322 is displayed alongside a track with regard to which the checkout is completed. A pointer 323 is displayed alongside a track with which the checkout is currently proceeding. In a display area 324, information indicative of a proceeding situation of the checkout process (the number of sets of contents data with regard to which the checkout is proceeding or has been completed/total number of sets of contents data included in the checkout list). The description of the checkout process is ended therewith.

Figure 93:
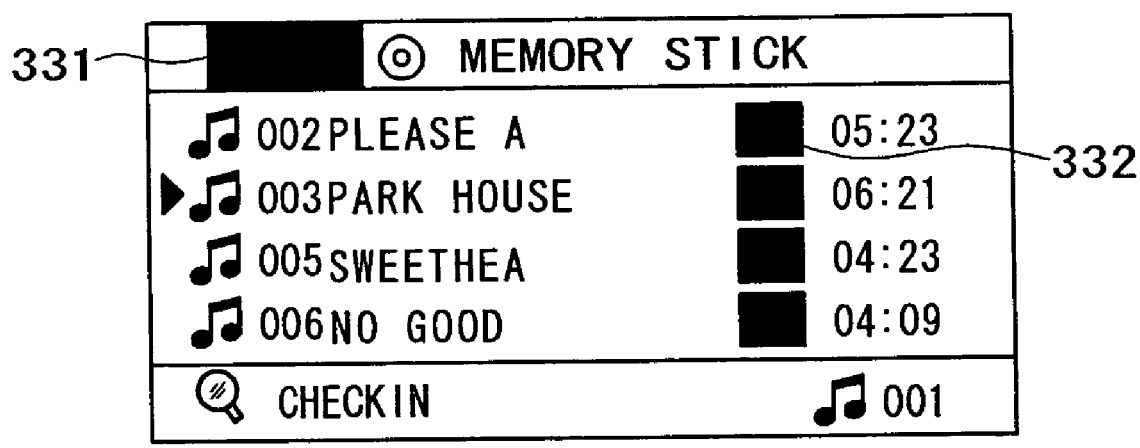
FIG. 93 is a view showing an example of display of the display unit 15 in the checkin process.
Figure 94:
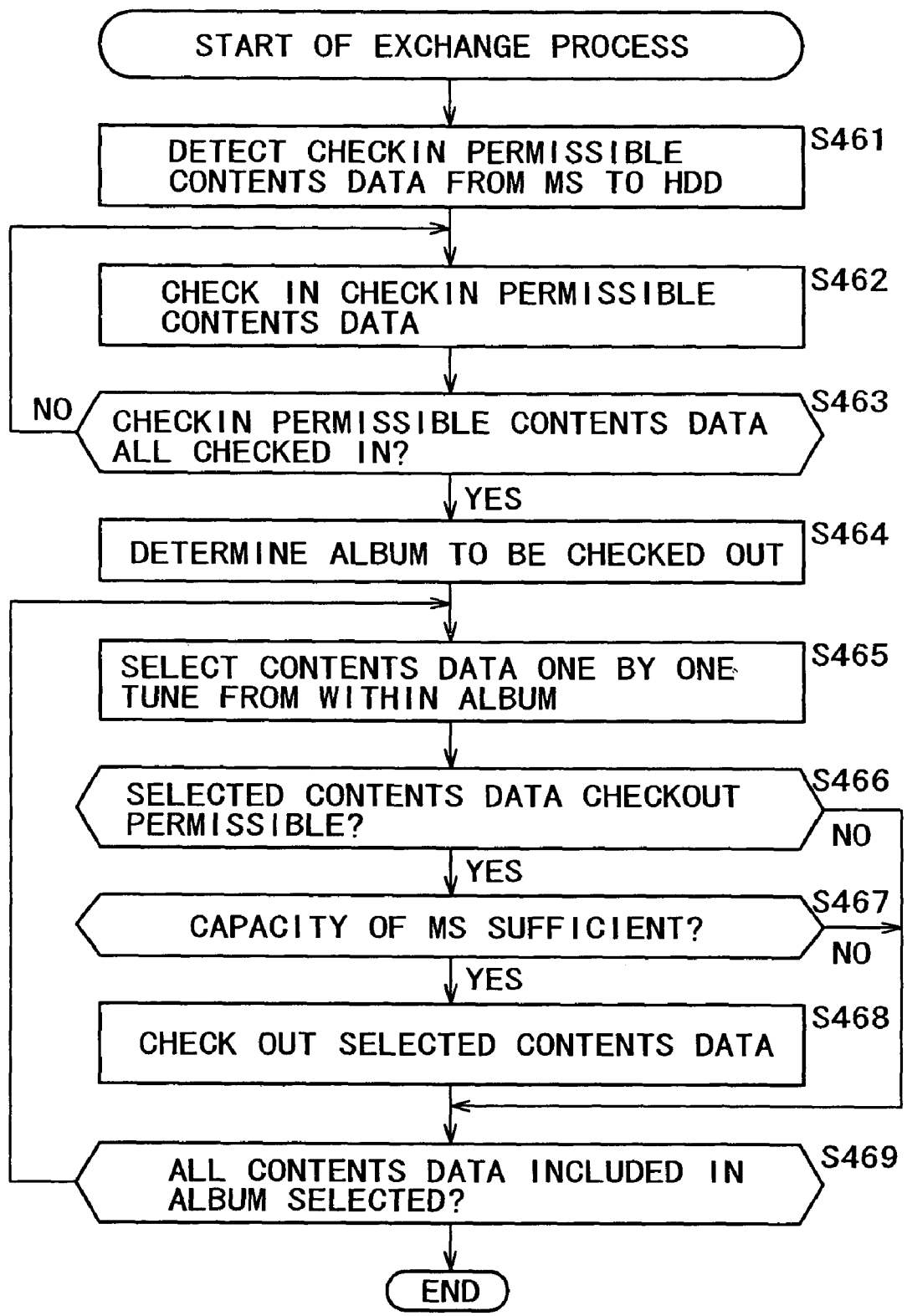
FIG. 94 is a flow chart illustrating an exchange process.

Now, a process of checking in contents data checked out to the MS 4 to the HDD 58 is described with reference to FIGS. 92 and 93.

Here, the process of checking out contents data recorded in the MS 4 is a process of erasing a copy of contents data temporarily reproduced in the MS 4 and incrementing the checkout permissible time number of the HDD 58 by 1 to return the checkout permissible time number to the original value.

The checkin process is described with reference to a flow chart of FIG. 92. It is to be noted that the checkin process is controlled by the C IN/C OUT 87 of the HD MW 82.

The checkin process is started when, while the MS 4 is inserted in the MS slot 45, the user operates the menu/cancel button 21 to display a menu and operates the cursor button 17 to select "editing", and then operates the enter button 20 to display an edit menu and operates the cursor button 17 to select "checkin", whereafter the user operates the enter button 20.

At step S451, the C IN/C OUT 87 requests the MS MW 89 to identify, from among the data recorded in the MS 4, those contents data which can be checked in (the contents data checked out from the HDD 58 of the audio server 1), and requests pertaining firmware to display the information of the contents data which can be checked in on the display unit 15.

At step S452, the C IN/C OUT 87 controls the display unit 15 to display the information regarding the tracks which can be checked in (information such as the tune title). FIG. 93 shows an example of display of the display unit 15. In a display area 331 of the display unit 15, "MS" is displayed as information indicative of the sound source of the checkin. An arrow mark 332 displayed next to the information of the tune title or the like of the contents data indicates that the contents data can be checked in.

At step S452, the C IN/C OUT 87 discriminates whether or not contents data to be checked in are selected from among the displayed contents data which can be checked in by the user operating the cursor button 17 and the select button 18. If it is discriminated that contents data to be checked in are selected, then the processing advances to step S453.

At step S453, the C IN/C OUT 87 adds the selected contents data to the checkin list. The processing returns to step S451 so that the processes at the steps beginning with step S451 are repeated.

It is to be noted that, if it is discriminated at step S452 that contents data to be checked in are not selected, then the processing advances to step S454. At step S454, the C IN/C OUT 87 discriminates whether or not an instruction to execute checkin is issued by the user operating the enter key 20 to display a list of contents data to be checked in and further operating the enter key 20. If it is discriminated that an instruction to execute checkin is not issued, then the processing returns to step S451 so that the processes at the steps beginning with step S451 are repeated.

Thereafter, if it is discriminated at step S454 that an instruction to execute checkin is issued, then the processing advances to step S455. At step S455, the C IN/C OUT 87 requests the MS MW 89 to erase the contents data of the MS 4 included in the checkin list (only the flag representative of whether or not reproduction is permitted may be set so that it represents inhibition of reproduction, that is, the right is invalidated).

At step S456, the C IN/C OUT 87 updates the checkout permissible time number recorded in the CN of the AC of the track object corresponding to the original contents data recorded in the HDD 58 by 1 to update the value of the CN. Further, the C IN/C OUT 87 deletes the information for specifying the MS 4 recorded as the information of the checkout destination from the LCMLOG of the AC. The description of the checkin process is ended therewith.

Now, an exchange process of successively executing a process of checking in contents data recorded in the MS 4 and another process of checking out a plurality of tracks belonging to an album in which a track reproduced last by an HD playing function collectively into the MS 4 is described with reference to FIGS. 94 to 97.

This exchange process is started when the user operates the exchange button 22 while the MS 4 is inserted in the MS slot 45.

At step S461, the C IN/C OUT 87 requests the MS MW 89 to identify contents data which can be checked in from among data recorded in the MS 4. At step S462, the C IN/C OUT 87 cooperates with the MS MW 89 to check in the contents data of the MS 4, which can be checked in, one by one set of contents data in a similar manner as in the checkin process described hereinabove with reference to FIG. 92.

FIG. 95 shows an example of display of the display unit 15 while the process at step S462 is being performed. In a display area 381 of the display unit 15, "MS" is displayed as information representative of the sound source of the checkin. In another display area 382, the characters "Now Checkin" representing that the checkin is being executed are displayed by blinking display. A "x" mark 383 displayed forwardly of the information of the tune title or the like of the contents data indicates that the contents data cannot be checked in. A check mark 384 indicates that the checkin of the contents data is completed. A pointer 385 indicates that the checkin of the contents data is being executed.

At step S463, the C IN/C OUT 87 discriminates whether or not all of the contents data of the MS 4 which can be checked in are checked in. If it is not discriminated that the contents data of the MS 4 which can be checked in are checked in, then the processing returns to step S462, at which next contents data are checked in. Thereafter, if it is discriminated at step S463 that all of the contents data of the MS 4 which can be checked in are checked in, then the processing advances to step S464.

At step S464, the C IN/C OUT 87 cooperates with the HS DB 91 to determine an album from which tracks which belong thereto should be checked out collectively. More particularly, the HS DB 91 discriminates the track reproduced last based on the last access date and hour (FIG. 42) of each of the track objects recorded in the object recording area 122 and determines an album to which the track belongs as an album to be checked out.

At step S465, the C IN/C OUT 87 selects one track (that is, contents data) from within the album to be checked out. At step S466, the C IN/C OUT 87 discriminates whether or not the selected contents data can be checked out. If it is discriminated that the selected contents data can be checked out, then the processing advances to step S467.

At step S467, the C IN/C OUT 87 requests the MS MW 89 to discriminate whether or not the MS 4 has a free capacity sufficient to check out the selected contents data. If it is discriminated that the MS 4 has a free capacity sufficient to check out the selected contents data, then the processing advances to step S468.

At step S468, the C IN/C OUT 87 checks out the selected contents data similarly as in the checkout process described hereinabove with reference to FIG. 89.

FIG. 96 shows an example of display of the display unit 15 while the process at step S468 is being performed. In a display area 391 of the display unit 15, "HDD" is displayed as information representative of the sound source of the checkout. In another display area 392, the characters "Now Checkout" indicating that the checkout is being executed are displayed by blinking display. A "x" mark displayed forwardly of the information of the tune title of contents data or the like indicates that the contents data cannot be checked out, and a check mark indicates that the checkout of the contents data is completed.

At step S469, the C IN/C OUT 87 discriminates whether or not all of the tracks (that is, contents data) included in the album to be checked out are selected at step S465. If it is discriminated that all contents data are not selected at step S465, then the processing returns to step S465 so that the processes at the steps beginning with step S465 are repeated.

Then, if it is discriminated at step S469 that all contents data are selected at step S465, then the exchange process is ended.

It is to be noted that, if it is discriminated at step S466 that the selected contents data cannot be checked out, then the steps S467 and S468 are skipped. Further, if it is discriminated-at step S467 that the MS 4 does not have a free capacity sufficient to check out the selected contents data, then the step S468 is skipped.

FIG. 97 shows an example of display of the display unit 15 immediately after the exchange process is completed. In a display area 401 of the display unit 15, the characters "COMPLETE" indicating that the exchange process is completed are displayed.

As described above, only if the user operates the exchange button 22, then a checkin process from the MS 4 to the HDD 58 and a checkout process from the HDD 58 to the MS 4 can be executed automatically. The description of the exchange process is ended therewith.

Incidentally, the moveout process, movein process, import process, checkout process and checkin process described above can be executed not only between the HDD 58 and the MS 4 but also between the HDD 58 and the PD 5 connected to the connector 43.

Figure 98:
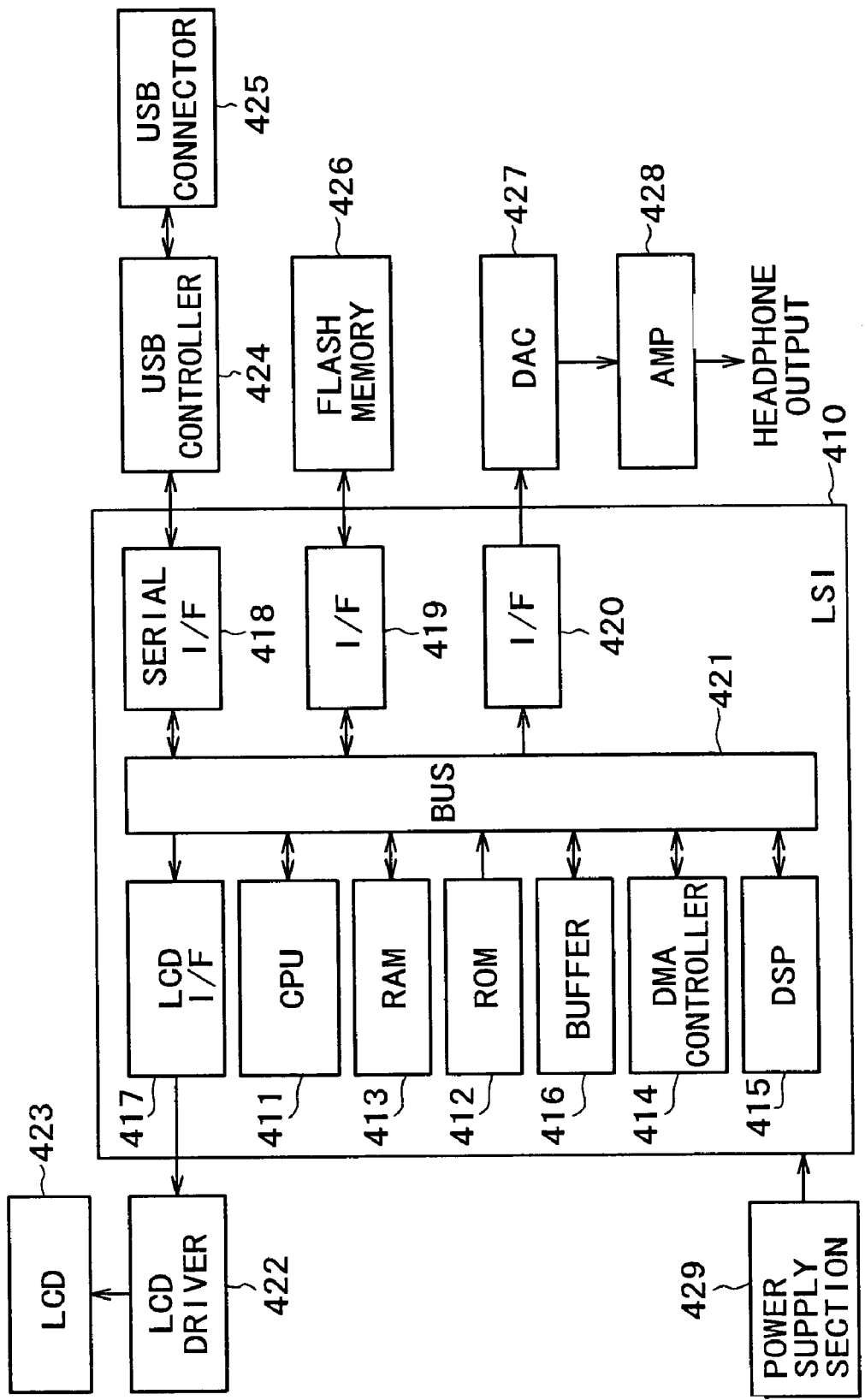
FIG. 98 is a block diagram showing an example of a configuration of hardware of a PD 5.

FIG. 98 shows an example of a hardware configuration of the PD 5. An LSI (Large Scale Integration) 410 which implements the PD 5 includes a built-in CPU 411 for controlling the entire LSI 410. To the CPU 411, a ROM 412, a RAM 413, a DMA controller 414, a DSP (Digital Signal Processor) 415, a buffer 416, an LCD interface (I/F) 417, a serial interface (I/F) 418, and interfaces 419 and 420 are connected by a bus 421.

The ROM 412 stores programs for implementing various functions of the PD 5, an apparatus ID, a cryptographic key and so forth. The RAM 413 temporarily stores predetermined data and programs when the CPU 411 executes various processes. The DMA controller 414 controls data transfer between the buffer 416 and a flash memory 426 and a USB controller 424 with the serial interface 418 interposed therein. The DSP 415 decodes contents data recorded in the flash memory 426 and so forth. Further, the DSP 415 has a DES engine and performs encryption/decryption of contents data using a cryptographic key. The buffer 416 temporarily buffers data whose transfer is controlled by the DMA controller 417.

An LCD driver 422 and an LCD unit 423 are connected in the next stage to the LCD interface 417. The USB controller 424 and a USB connector 425 are connected in the next stage to the serial interface 418. The USB controller 424 controls data communication with the audio server 1 connected through the USB connector 425. In the flash memory 426 connected through the interface 419, contents data moved out from the audio server 1 or the like and additional information to the contents data such as a tune title are recorded. A DAC 427 and an amplifier (AMP) 428 are connected in the next stage to the interface 420. A power supply section 429 feeds power to the LSI 410.

Audio data obtained by decoding of the DSP 415 are outputted to a headphone or the like through the interface 420, DAC 427 and amplifier (AMP) 428.

Such processes as a moveout process between the HDD 58 and the MS 4 and such processes as a moveout process between the HDD 58 and the PD 5 are substantially similar to each other, and therefore, only differences between them are described.

Encryption of contents data to be recorded into the MS 4 is performed using a cryptographic key same as that used in encryption of the contents data recorded in the HDD 58 of the audio server 1. Consequently, encrypted contents data can be moved out between the HDD 58 and the MS 4 as they are without decrypting them.

In contrast, encryption of contents data to be recorded into the PD 5 is performed using a cryptographic key different from that used in encryption of the contents data recorded in the HDD 58 of the audio server 1. Consequently, as described hereinabove with reference to FIG. 56, between the HDD 58 and the PD 5, contents obtained by decrypting encrypted contents data recorded on the HDD 58 and then encrypting the decrypted contents data using the different cryptographic key for the PD 5 are moved out.

The description of the moveout process, movein process, import process, checkout process and checkin process between the HDD 58 and the PD 5 is ended therewith.

Subsequently, a store (STORE) function and a restore (RESTORE) function of the audio server 1 are described with reference to FIGS. 99 to 107.

The store function is a function of temporarily storing, where the recording capacity of the MS 4 is short because of presence of data (for example, a still picture file or a voice file) which cannot be reproduced by the audio server 1 other than contents data recorded already in the MS 4, the data recorded already in the MS 4 other than the contents data as a single archive file which includes files of the same type recorded simultaneously into the HDD 58.

The restore function is a function of restoring, using an archive file prepared in the HDD 58 using the store function, a corresponding directory and files which belong to the directory on the MS 4.

FIG. 99 illustrates types of directories and data files which may possibly be recorded in the MS 4.

The file MEMSTICK.ind indicates that the recording medium in which the file is recorded is a memory stick. The directory CDIM is a directory in which still picture files prepared using a digital still camera or the like are stored. The directory VOICE is a directory in which voice files prepared by an IC recorder or the like are stored. The directory HIFI is a directory in which contents data checked out or moved out from the audio server 1 or the like and having copyright information annexed thereto are stored. The directory CONTROL is a directory in which control information files are stored. The directory TEL is a directory in which telephone and facsimile information files are stored. The directory OPEN-R is a directory in which entertainment robot information files are stored. The directory POSITION is a directory in which position information files are stored. The directory PALM is a directory in which PALM OS data files are stored. The directory MP3 is a directory in which MP3 files are stored. The directory MSxxxxxx is a directory in which information files unique to a vendor are stored ("xxxxxx" is information for identifying the vendor).

Figure 100:
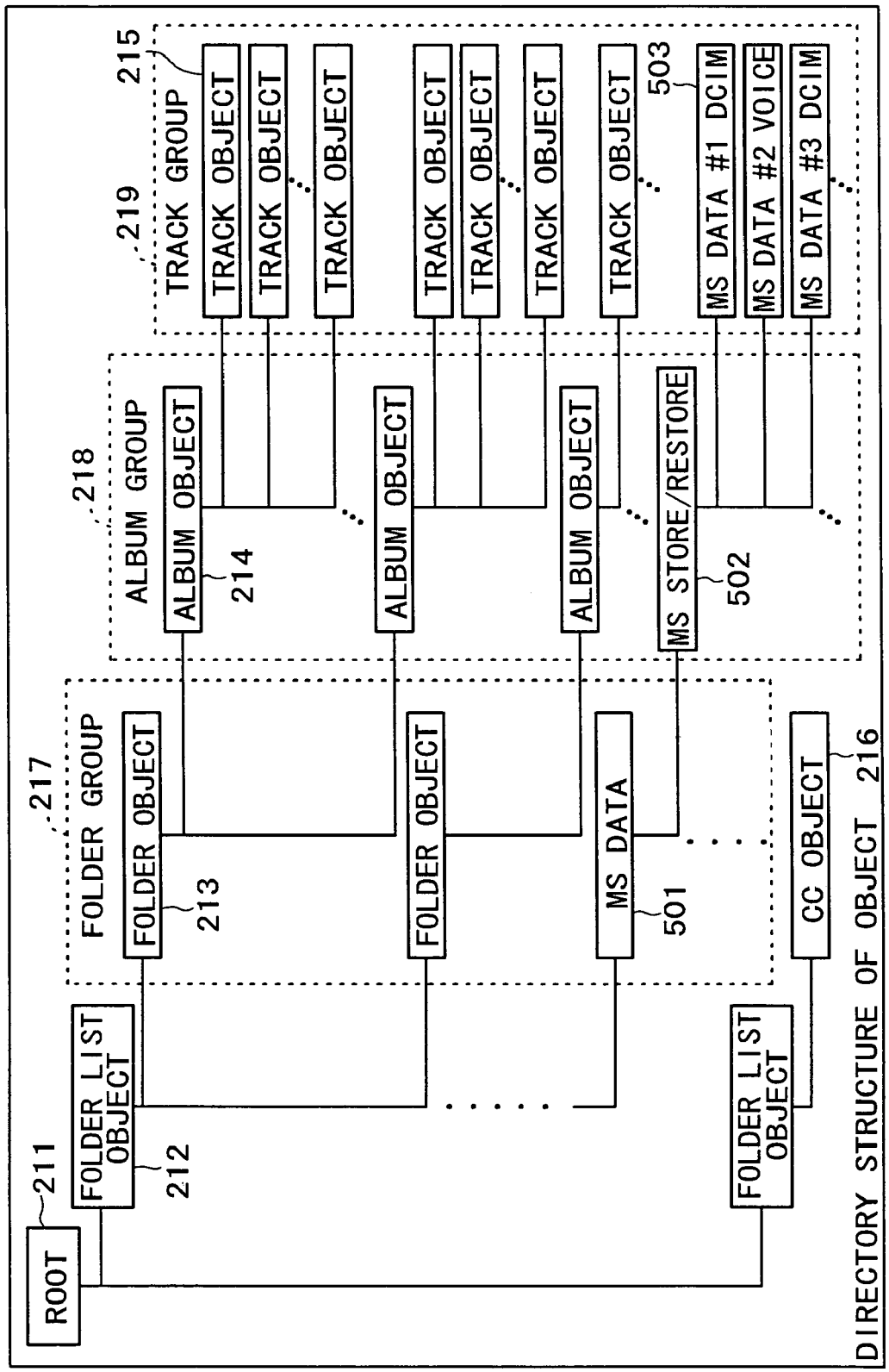
FIG. 100 is a view illustrating a position at which an archive file is recorded.

FIG. 100 shows a recorded position of an archive file produced under the directory structure of the object recording area 122 of the HDD 58 by the store function. In the same hierarchy as that of the folder objects 217, an MS data object 501 is prepared. In the hierarchy below that of the MS data object 501, an MS store/restore object 502 is produced. Archive files (in the case of FIG. 100, MSdata#1.DCIM, MSdata#2.VOICE, and MSdata#3.DCIM) are recorded in the hierarchy below that of the MS store/restore object 502.

It is to be noted that such a name of an archive file as "MSdata#1" can be set arbitrarily by the user.

Figure 101:
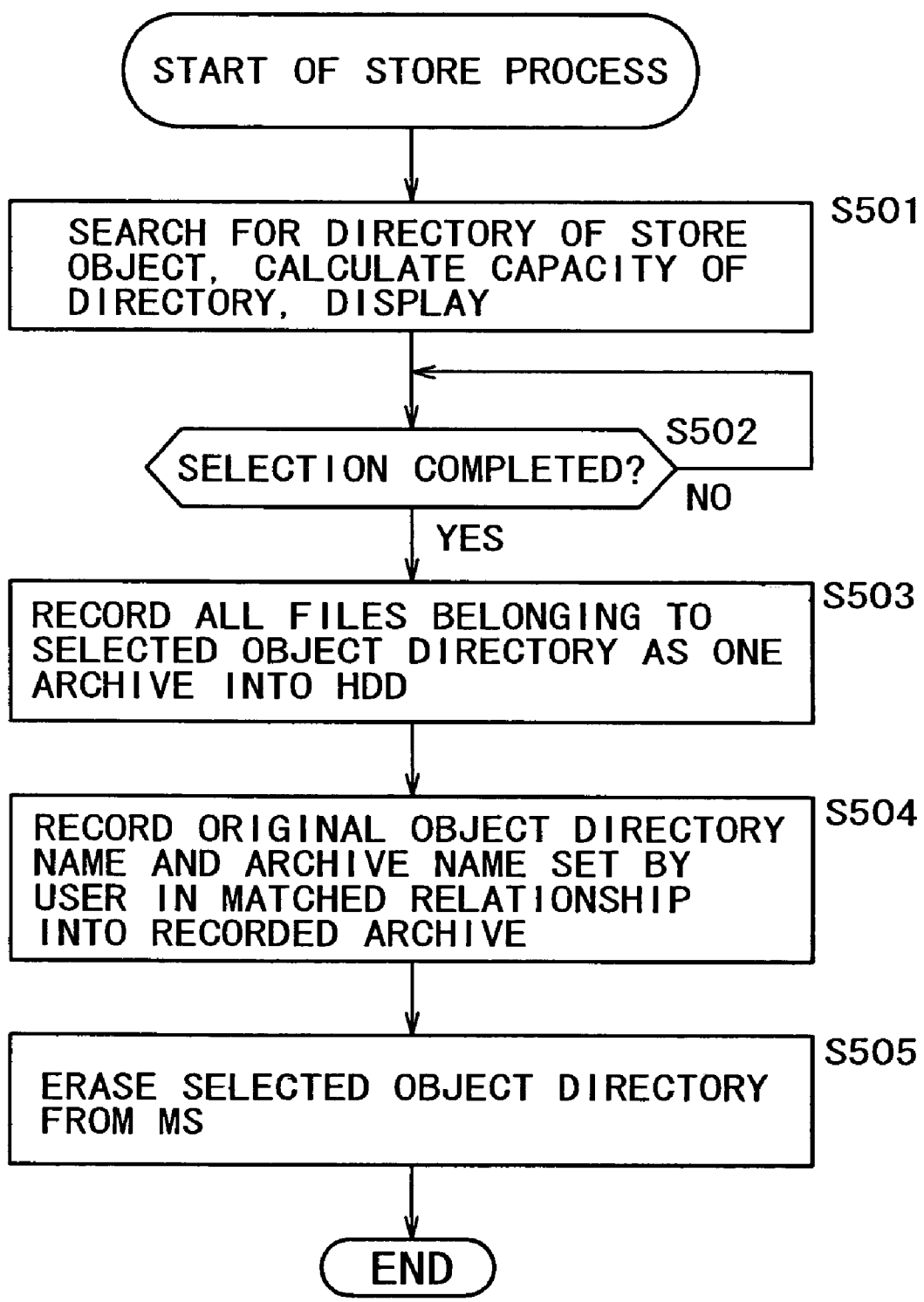
FIG. 101 is a flow chart illustrating a store process.

Subsequently, a store process by the HD MW 82 which implements the store function is described with reference to a flow chart of FIG. 101. This store process is started when the user depresses the function button 12 repetitively to select the MS 4 as the sound source, depresses the menu/cancel button 21, selects "editing" by means of the cursor button 17, depresses the enter button 20, further selects "Store (MS→HDD)" by means of the cursor button 17 and depresses the enter button 20.

At step S501, the HD MW 82 requests the MS MW 89 to search the directories recorded in the MS 4 for a directory of a store object, that is, for a directory other than the directory HIFI, calculates the capacity of the searched out directory and displays the capacity on the display unit 15.

Figure 102:
FIG. 102 is a view showing an example of display of the display unit 15 in the store process.

FIG. 102 shows an example of display of the display unit 15 when the MS 4 is selected as the sound source. In display areas 511 and 512, characters "MS" and "Memory Stick" representative of the sound source are displayed. A display mark 513 indicates a directory for storage of still picture files, and in the present case, it is shown that the capacity of the directory is 8 MB. A display mark 514 indicates a directory for voice files, and in the present case, it is shown that the capacity of the directory is 1 MB.

Figure 103:
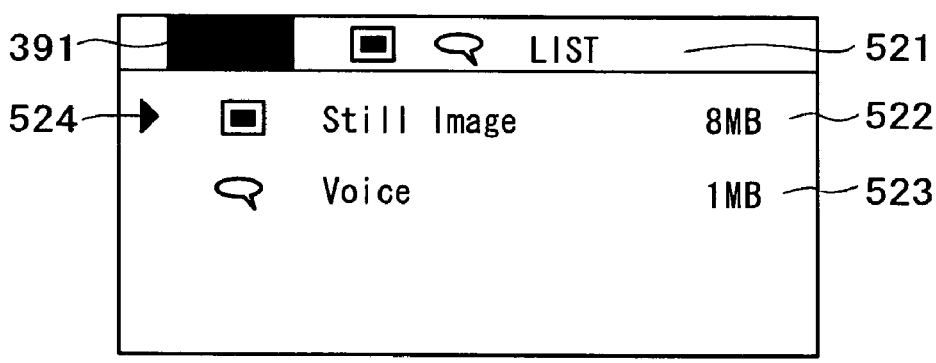
FIG. 103 is a view showing another example of display of the display unit 15 in the store process.

Referring back to FIG. 101, at step S502, the HD MW 82 accepts an operation of the user to select a directory of a store object and waits that an operation of the user is performed. FIG. 103 illustrates an example of display of the display unit 15 wherein a list of storable directories is displayed. In a display area 521, information representing that a list of storable directories is displayed is displayed. In another display area 522, it is displayed that a storable directory for storage of still picture files is present and the capacity of the directory is 8 MB. In a further display area 524, it is displayed that a storable directory for storage of voice files is present and the capacity of the directory is 1 MB. A cursor 524 indicates the directory for storage of still picture files or the directory for storage of voice files in response to an operation for the cursor button 17.

Referring back to FIG. 101, if an operation of the user to select a directory of a store object is performed at step 502, then the processing advances to step S503. At step S503, the HD MW 82 requests the MS MW 89 to read out all files which belong to the directory selected as a store object and record the files as a single archive file into the hierarchy under that of the MS store/restore object 502 of the object recording area 122 of the HDD 58. At step S504, the HD MW 82 records the original object directory (for example, the directory DCIM) and the file name of the archive file (for example, "2001/08/11") in a matching relationship with each other into the recorded archive file.

It is to be noted that, while the file name of the archive file can be set arbitrarily by the user, if setting of the file name is not performed, then the date on which the store process is performed is automatically set as the file name of the archive file like, for example, the file name "2001/08/11".

Figure 104:
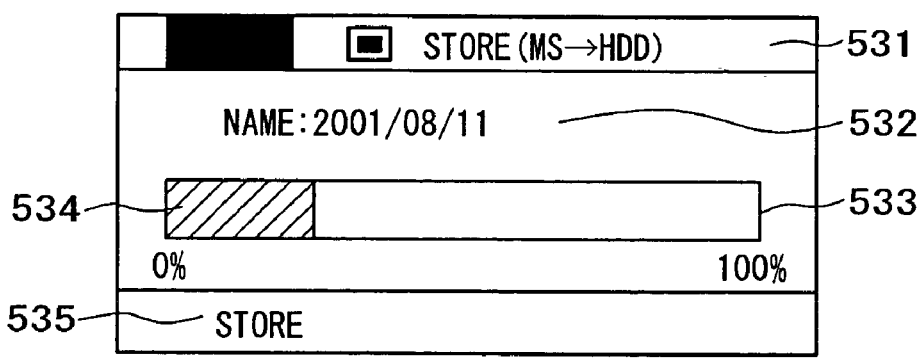
FIG. 104 is a view showing a further example of display of the display unit 15 in the store process.

FIG. 104 shows an example of display of the display unit 15 while an archive file is being prepared. In a display area 531, information representing that a directory for storage of still picture files of the MS 4 is stored in the HDD 58. In another display area 532, the file name of the archive file being prepared (in the present case, "2001/08/11") is displayed. In a further display area 533, a variable length bar 534 which extends in proportion to an advancing situation of the storing process is displayed. In a still further display area 535, a character train "Store" representing that the store process is being executed is displayed by blinking display.

Referring back to FIG. 101, at step 505, the HD MW 82 requests the MS MW 89 to erase the directory on the MS 4 in which the archive file is prepared in the HDD 58 from the MS 4. The description of the store process is ended therewith.

It is to be noted that it is otherwise possible not to wait for an operation of the user to select a directory of a store object as in the process at step 502 but automatically select a storable directory searched out to execute the succeeding processes.

As described above, in the store process, a storable directory can be searched out from among directories and files recorded in the MS 4. Further, a directory in which files prepared by a particular electronic apparatus are stored can be selected and stored. Furthermore, in the store process, since the HIFI directory on the MS 4 in which files having copyright information are stored is not used as an object of the process, the store function can be prevented from being utilized by an ill-minded user who wants to illegally copy contents data stored in the HIFI directory.

Figure 105:
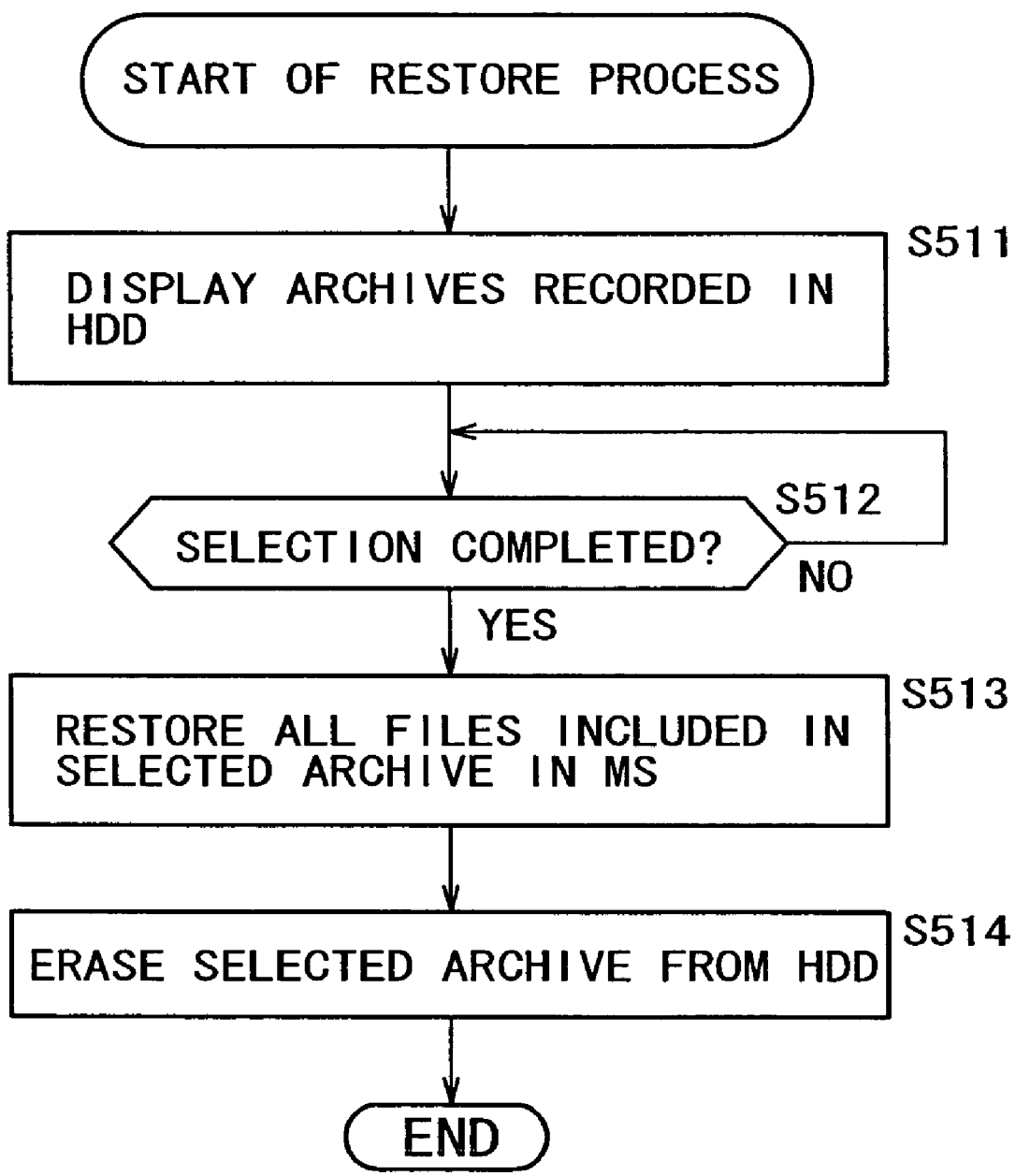
FIG. 105 is a flow chart illustrating a restoration process.

Subsequently, the restore process by the HD MW 82 of restoring a directory equivalent to an archive file stored in the HDD 58 into the MS 4 is described with reference to a flow chart of FIG. 105.

This restore process is started when the user depresses the function button 12 repetitively to select the HDD 58 as the sound source, depresses the menu/cancel button 21, selects "editing" by means of the cursor button 17, depresses the enter button 20, further selects "Restore (MS→HDD)" by means of the cursor button 17 and depresses the enter button 20.

At step 501, the HD MW 82 displays a list of archive files which belong to the hierarchy under that of the MS store/restore object 502 of the object recording area 122 of the HDD 58 on the display unit 15.

Figures 106, 107:
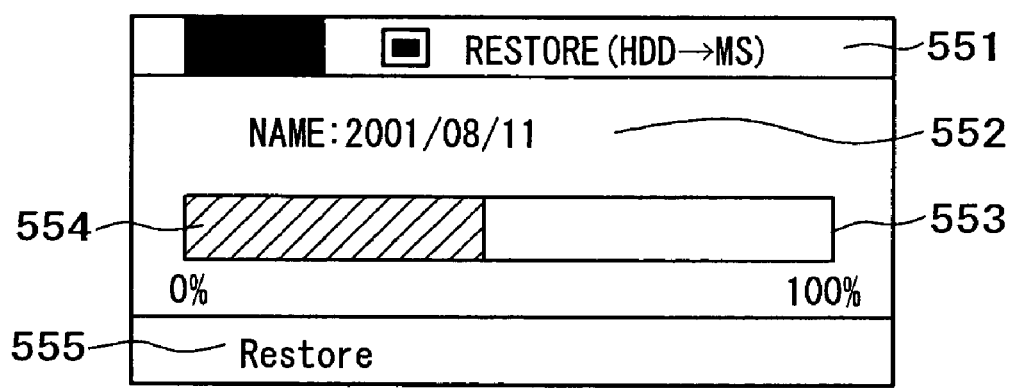
FIG. 106 is a view showing an example of display of the display unit 15 in the restoration process.
FIG. 107 is a view showing another example of display of the display unit 15 in the restoration process.

FIG. 106 shows an example of display of the display unit 15 on which a list of archive files is displayed. In a display area 541, the character string "HDD" representative of a sound source is displayed. In another display area 542, the character string "Restore List" is displayed. In a further display area 543, information of restorable archive files (a mark representative of the type of the file, the file name and the data capacity) is displayed. A cursor 544 indicates the directory for storage of still picture files or the directory for storage of voice files in response to an operation of the cursor button 17.

Referring back to FIG. 105, at step S512, at step S502, the HD MW 82 accepts an operation of the user to select an archive file to be restored, and waits until the operation by the user is performed. More particularly, the HD MW 82 waits until an operation for the cursor button 17 to move the cursor 544 upwardly or downwardly to select an archive file and another operation for the enter button 20 to finally determine the selection are performed. If such operation is performed, then the processing advances to step S513.

FIG. 107 shows an example of display of the display unit 15 while an original directory and files belonging to the original directory are being restored based on an archive file. In a display area 551, information "Restore (HDD→MS)" representing that the directory for storage of still picture files is being restored from the HDD 58 to the MS 4 is displayed. In another display area 552, the file name (in the present case, "2001/08/11") of the archive file being restored is displayed. In a further display area 553, a variable length bar 554 which extends in proportion to an advancing situation of the restore process is displayed. In a still further display area 555, the character string "Restore" indicating that the restore process is being executed is displayed by blinking display.

Referring back to FIG. 105, at step 513, the HD MW 82 requests the MS MW 89 to restore the original directory and all files belonging to the original directory on the MS 4 based on the archive file selected as an object of the restore. At step S514, the HD MW 82 deletes the selected archive file from the hierarchy under that of the MS store/restore object 502 of the object recording area 122 of the HDD 58. The description of the restore process is ended therewith.

It is to be noted that it is otherwise possible not to wait for an operation of the user to select an archive file of a restore object as in the process at step 512 but automatically select an archive file to be restored and execute the succeeding processes.

Figure 108:
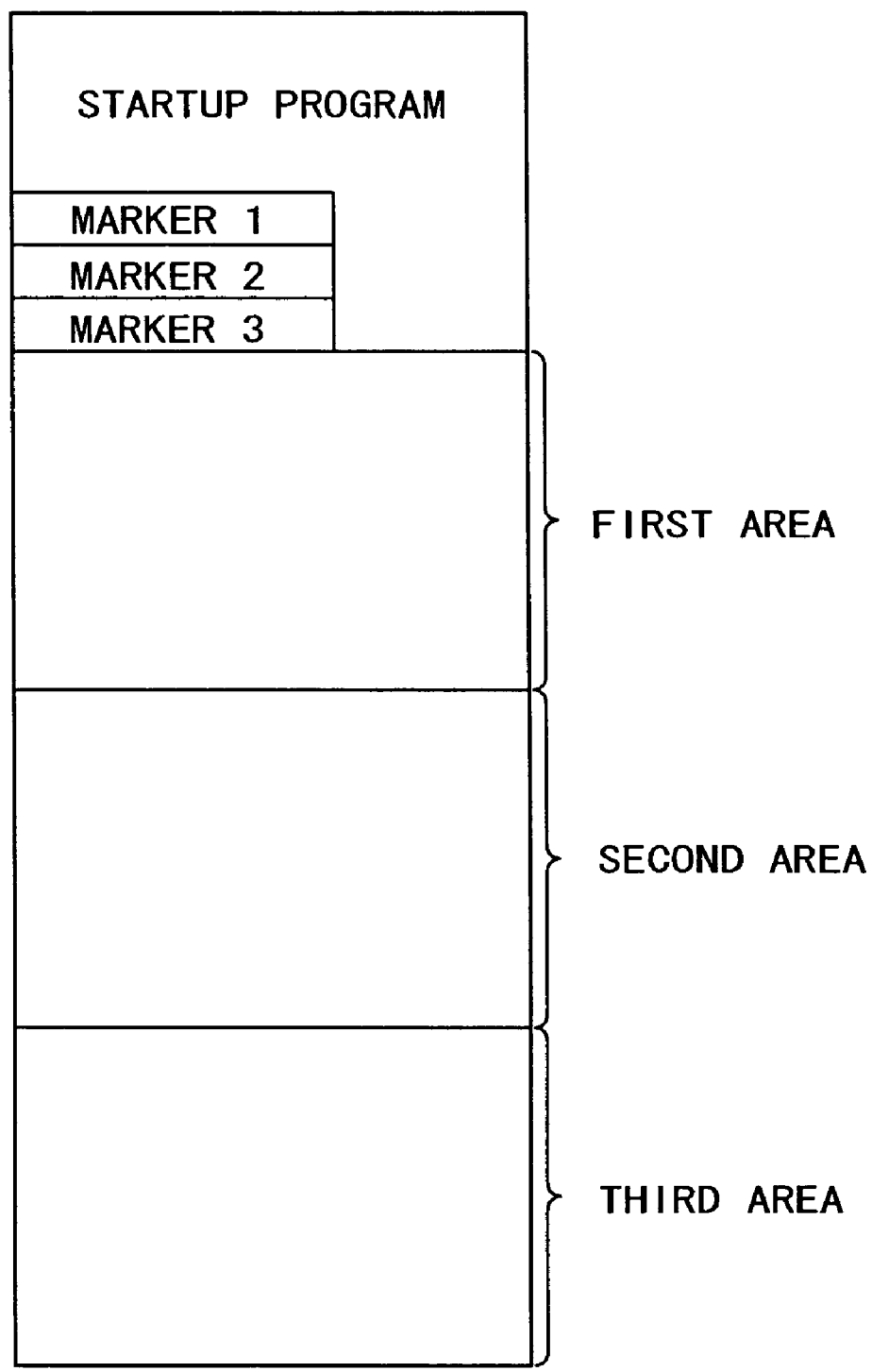
FIG. 108 is a view showing an area configuration of a flash ROM shown in FIG. 6.

FIG. 108 shows an example of a configuration of the flash ROM 52. A startup program which is hereinafter described is stored in the flash ROM 52.

Figure 7:
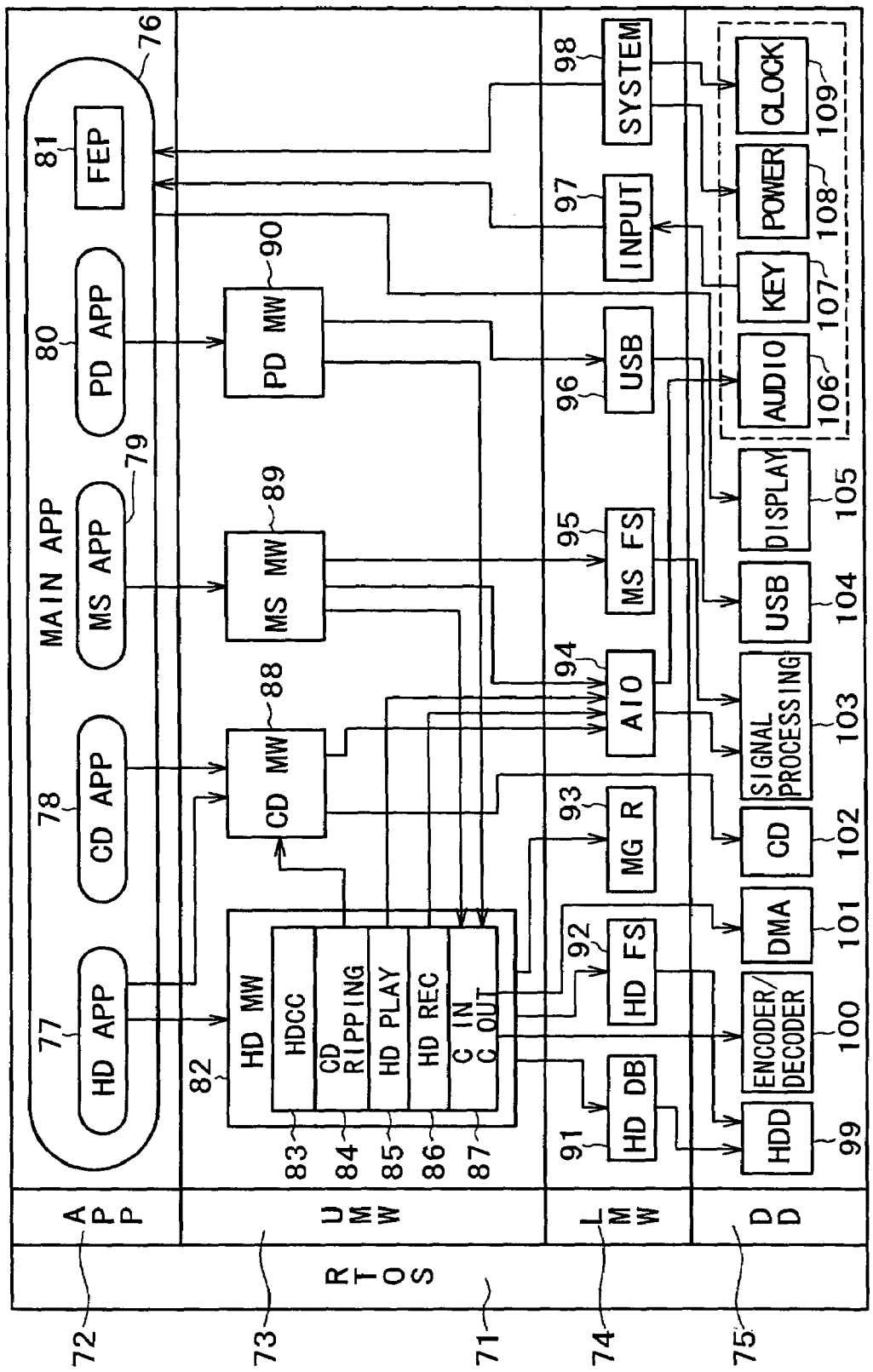
FIG. 7 is a view showing firmware executed by the audio server 1.

Further, the flash ROM 52 includes, for example, three first to third storage areas in which the firmware shown in FIG. 7 is stored for individual versions. In particular, in the case of the present example, versions of the firmware for three generations can be stored.

A marker 1 indicating the version of the firmware stored in the first storage area, a marker 2 indicating the version of the firmware stored in the second storage area and a marker 3 indicating the version of the firmware stored in the third storage area are included in the startup program.

It is to be noted that, although details are hereinafter described, a marker is incremented by 1 every time version up of the firmware is performed. Further, if the firmware is not stored in a corresponding area, then the marker has a value representative of "INVALID".

Figure 109:
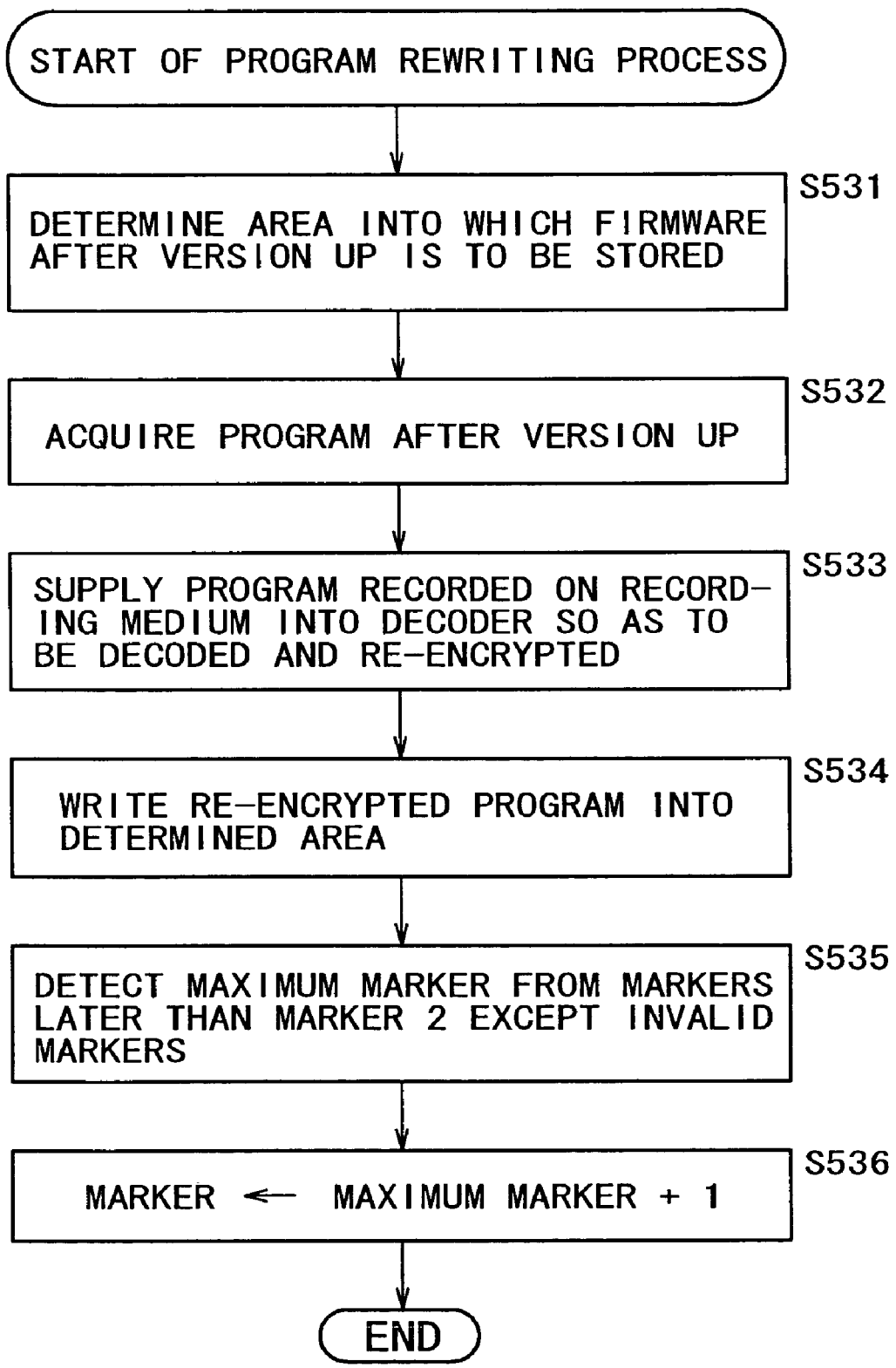
FIG. 109 is a flow chart illustrating a program rewriting process.

A processing procedure when version up of the firmware is performed (when the program is rewritten) is described with reference to a flow chart of FIG. 109.

It is to be noted that the process for performing version up of the firmware is executed by firmware designated by the startup program, which is hereinafter described, when a predetermined operation is performed for the audio server 1 by the user. However, for example, where firmware of a new version with which the firmware of an object of the version up is to be rewritten are stored in a CD-ROM, the CD MW 88 executes this process. Where the firmware of a new version is stored in the MS 4, the MS MW 89 executes this process. Here, it is assumed that the CD MW 88 executes the version up process.

At step S531, the CD MW 88 determines an area into which the firmware after the version up is to be stored.

More particularly, from among the marker 2 and the markers following the marker 2 of the flash ROM 52 (in the example of FIG. 108, the marker 2 and the marker 3), one of those markers which are "INVALID" is detected, and the storage area corresponding to the detected marker is determined as a area into which the firmware after the version up is to be stored. Further, if a marker which is "INVALID" is not included in the marker 2 and the markers following the marker 2, the marker of the lowest number is detected, and the area corresponding to the detected marker is determined as a area into which the firmware after the version up is to be stored.

It is to be noted that, in the case of the present example, the firmware of the oldest version is stored in the storage area corresponding to the marker of the lowest number.

At step S532, the CD MW 88 acquires, from the CD-ROM loaded in the CD-ROM drive 57, the firmware of the newest version recorded in the CD-ROM. It is to be noted that it is otherwise possible to acquire the firmware of the new version not only from a CD-ROM but also from the MS 4 or another electronic apparatus which carries out data communication through the Ethernet controller/connector 67.

At step S533, the CD MW 88 supplies the firmware acquired at step S532 so that the firmware may be decoded by the encoder/decoder 59 and, in the case of the present example, re-encrypted using a cryptographic key stored in the flash ROM 52.

At step S534, the CD MW 88 writes the firmware re-encrypted at step S533 into the storage area determined at step S531.

At step S535, the CD MW 88 detects the marker of the highest number from among the marker 2 and the markers following the marker 2 (except those markers which are "INVALID"), and at step S536, the CD MW 88 determines a marker of a number obtained by adding 1 to the marker number as a marker corresponding to the storage area in which the firmware is stored at step S534. Thereafter, the present process is ended.

As described above, version up of firmware can be performed only if the user performs predetermined operation for the audio server 1.

Figure 110:
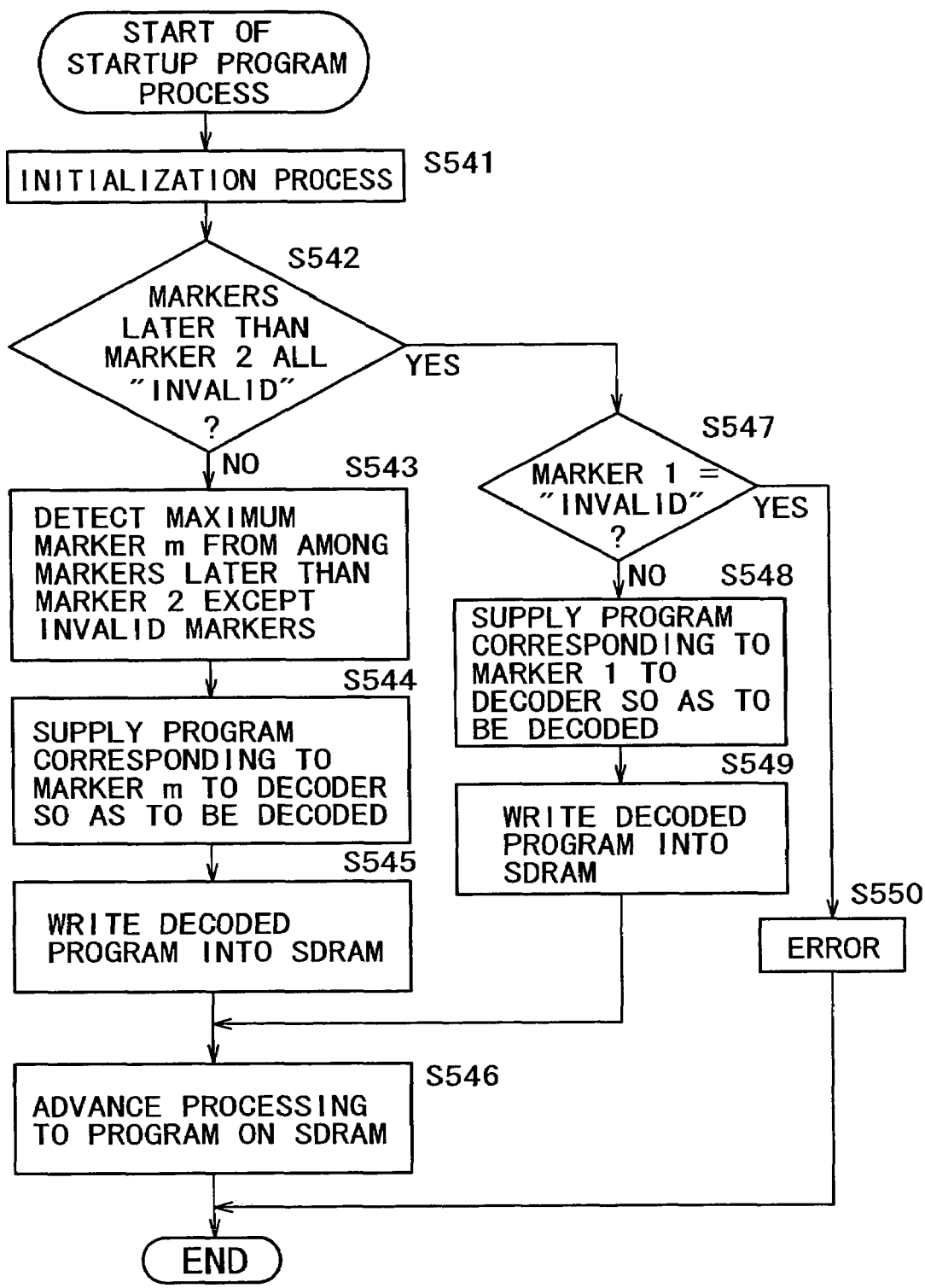
FIG. 110 is a flow chart illustrating a process of a startup program.

Subsequently, a processing procedure in the startup program is described with reference to a flow chart of FIG. 110. It is to be noted that the startup program is executed immediately after power supply to the components from the power supply section 65 is started (immediately after power supply).

At step S541, the startup program executes a predetermined initialization process such as, for example, initialization of registers.

At step S542, the startup program discriminates whether or not all of the marker 2 and the markers following the marker 2 (marker 2 and marker 3) of the flash ROM 52 are "INVALID". If it is discriminated that all of the marker 2 and the markers following the marker 2 of the flash ROM 52 are not "INVALID", then the processing advances to step S543.

At step S543, the startup program detects, from among those of the marker 2 and the markers following the marker 2 which are not "INVALID", that marker m which has the highest number. At step S544, the startup program supplies the firmware stored in the storage area corresponding to the marker m to the encoder/decoder 59 so that the firmware is decoded by the encoder/decoder 59, and at step S545, the startup program writes the decoded firmware into the SDRAM 53.

If it is discriminated at step S542 that all of the marker 2 and the markers following the marker 2 are "INVALID", then the processing advances to step S547, at which the startup program discriminates whether or not the marker 1 is "INVALID". If it is discriminated that the marker 1 is not "INVALID", then the processing advances to step S548.

At step S548, the startup program supplies the firmware in the storage area corresponding to the marker 1 to the encoder/decoder 59 so that the firmware is decoded by the encoder/decoder 59, and at step S549, the startup program writes the decoded firmware into the SDRAM 53.

When the firmware is written into the SDRAM 53 at step S545 or step S549, the processing advances to step S546, at which the startup program issues an instruction to the SDRAM 53 to execute the firmware thus written. Consequently, the firmware developed on the SDRAM 53 is executed.

If it is discriminated at step S547 that the marker 1 is "INVALID", that is, if the firmware is stored in no storage area and all markers are "INVALID", then the processing advances to step S550, at which an error determination is performed.

When the firmware is executed at step S546 or when an error determination is performed at step S550, the processing is ended.

It is to be noted that, while the foregoing description is given taking a case wherein three areas into which firmware is to be stored are provided in the flash ROM 52 as an example, there is no limitation to the number of such areas only if the number is equal to or greater than 2. Where two storage areas are involved, it is possible to set the marker of a storage area into which firmware is to be written to "INVALID" and perform writing into the storage area and then set the marker to "VALID" (accurately, a value different from that of INVALID) after the writing comes to an end. This can prevent the firmware, with which rewriting is proceeding, from being developed in the SDRAM 53 and executed.

Further, while the foregoing description is given taking a case wherein version up of firmware is performed as an example, the present invention can be applied also where version up of any other program is performed. Further, the present invention can be applied not only to version up but also where the form of a program (for example, a program for the Japanese language, a program for the English language) is to be changed.

Incidentally, while the series of processes described above can be executed by such an apparatus for exclusive use as the audio server 1, it may otherwise be implemented by such firmware as shown in FIG. 7 installed in and executed by a personal computer for universal use.

The firmware is configured not only from a package medium such as a magnetic disk (including a floppy disk), an optical disk (including a CD-ROM (Compact Disc-Read Only Memory) and a DVD (Digital Versatile Disc)), or a magneto-optical disk (including an MD (Mini Disc)), or a semiconductor memory, which has the firmware recorded therein and is distributed in order to provide programs separately from a computer for universal use, or else from a ROM or a hard disk in which the firmware is recorded and which is provided to a user in a state wherein it is incorporated in a computer in advance.

It is to be noted that, in the present specification, the steps which describe a program (firmware) may be but need not necessarily be processed in a time series in the order as described, and-include processes which are executed in parallel or individually without being processed in a time series.

INDUSTRIAL APPLICABILITY

As described above, according to the present invention, preparation of an illegal duplicate of contents data by intentional disconnection of the power supply or removal of a recording medium can be prevented.

The invention claimed is:

1. A recording apparatus for moving contents data between a first information storage medium and a second information storage medium, characterized in that it comprises:
   instruction means for issuing an instruction to move the contents data from said first information storage medium to said second information storage medium;
   moving means for copying, in response to the instruction from said instruction means, the contents data recorded on said first information storage medium onto said second information storage medium and deleting the contents data recorded on said first information storage medium; and restoration means, operable when a series of processes by said moving means is interrupted, for substantially restoring a state before the series of processes by said moving means is executed or substantially completing the series of interrupted processes by said moving means; and that said moving means includes:

copying means for copying the contents data which is recorded on said first information storage medium and whose reproduction is permitted as contents data whose reproduction is not permitted onto said second information storage medium;

production means for producing history information which indicates a start of the series of processes after the copying by said copying means is completed;

first changing means for changing the contents data recorded on said first information storage medium into contents data whose reproduction is not permitted;

second changing means for changing the contents data copied on said second information storage medium by said copying means into contents data whose reproduction is permitted;

erasure means for erasing the contents data recorded on said first information storage medium; and deletion means for deleting the history information produced by said production means.

2. A recording apparatus according to claim 1, characterized in that said first information storage medium is a built-in hard disk drive, and said second information storage medium is a removable memory or a memory mounted in an electronic apparatus connected to said recording apparatus.

3. A recording apparatus according to claim 2, characterized in that, where said first information storage medium is a hard disk, said restoration means substantially restores, if the series of processes by said moving means is interrupted before a process of said first changing means is completed, the state before the series of processes by said moving means is executed, but said restoration means completes, if the series of processes by said moving means is interrupted after a process of said second changing means is completed, the series of interrupted processes by said moving means.

4. A recording apparatus according to claim 3, characterized in that, when the process of said first changing means is completed and the process of said second changing means is not completed, said restoration means deletes the contents data recorded on said first information storage medium.

5. A recording apparatus for moving contents data between a first information storage medium and a second information storage medium, characterized in that it comprises:

instruction means for issuing an instruction to move the contents data from said first information storage medium to said second information storage medium;

moving means for copying, in response to the instruction from said instruction means, the contents data recorded on said first information storage medium onto said second information storage medium and deleting the contents data recorded on said first information storage medium; and restoration means, operable when a series of processes by said moving means is interrupted, for substantially restoring a state before the series of processes by said moving means is executed or substantially completing the series of interrupted processes by said moving means; and that said moving means includes:

production means for producing history information which indicates a start of the series of processes;

copying means for copying, after the history information is produced by said production means, the contents data which is recorded on said first information storage medium and whose reproduction is permitted as contents data whose reproduction is not permitted onto said second information storage medium;

first changing means for changing the contents data recorded on said first information storage medium into contents data whose reproduction is not permitted;

second changing means for changing the contents data copied on said second information storage medium by said copying means into contents data whose reproduction is permitted;

erasure means for erasing the contents data recorded on said first information storage medium; and deletion means for deleting the history information produced by said production means.

6. A recording apparatus according to claim 5, characterized in that said first information storage medium is a removable memory or a memory mounted in an electronic apparatus connected to said recording apparatus, and said second information storage medium is a built-in hard disk drive.

7. A recording apparatus according to claim 6, characterized in that, where said second information storage medium is a hard disk, said restoration means substantially restores, if the series of processes by said moving means is interrupted before a process of said first changing means is completed, the state before the series of processes by said moving means is executed, but said restoration means completes, if the series of processes by said moving means is interrupted after a process of said second changing means is completed, the series of interrupted processes by said moving means.

8. A recording apparatus according to claim 7, characterized in that, when the process of said first changing means is completed and the process of said second changing means is not completed, said restoration means deletes the contents data recorded on said second information storage medium.

9. A recording apparatus wherein only an application program for exclusive use for moving contents data between a first information storage medium and a second information storage medium can be started and the application program for exclusive use is executed immediately after power supply is made available to said recording apparatus, characterized in that it comprises:

an instruction section for issuing an instruction to move the contents data from said first information storage medium to said second information storage medium;

a movement control section for copying, in response to the instruction from said instruction section, the contents data recorded on said first information storage medium onto said second information storage medium and deleting the contents data recorded on said first information storage medium;

a restoration control section, operable when a series of processes by said movement control section is interrupted, for substantially restoring a state before the series of processes by said movement control section is executed or substantially completing the series of interrupted processes by said movement control section;

a copy control section for copying the contents data which is recorded on said first information storage medium and whose reproduction is permitted as contents data whose reproduction is not permitted onto said second information storage medium;

a production section for producing history information which indicates a start of the series of processes after the copying by said copy control section is completed;

a first change control section for changing the contents data recorded on said first information storage medium into contents data whose reproduction is not permitted;

a second change control section for changing the contents data copied on said second information storage medium by said copy control section into contents data whose reproduction is permitted;

an erasure control section for erasing the contents data recorded on said first information storage medium; and a deletion control section for deleting the history information produced by said production section.

10. A recording apparatus according to claim 9, characterized in that, where said first information storage medium is a built-in hard disk, said restoration control section substantially restores, if the series of processes by said movement control section is interrupted before a process of said first change control section is completed, the state before the series of processes by said movement control section is executed, but said restoration control section completes, if the series of processes by said movement control section is interrupted after a process of said second change control section is completed, the series of interrupted processes by said movement control section.

11. A recording apparatus according to claim 10, characterized in that, when the process of said first change control section is completed and the process of said second change control section is not completed, said restoration control section deletes the contents data recorded on said first information storage medium.

12. A recording apparatus wherein only an application program for exclusive use for moving contents data between a first information storage medium and a second information storage medium can be started and the application program for exclusive use is executed immediately after power supply is made available to said recording apparatus, characterized in that it comprises:

an instruction section for issuing an instruction to move the contents data from said first information storage medium to said second information storage medium;

a movement control section for copying, in response to the instruction from said instruction section, the contents data recorded on said first information storage medium onto said second information storage medium and deleting the contents data recorded on said first information storage medium;

a restoration control section, operable when a series of processes by said movement control section is interrupted, for substantially restoring a state before the series of processes by said movement control section is executed or substantially completing the series of interrupted processes by said movement control section;

a production section for producing history information which indicates a start of the series of processes;

a copy control section for copying, after the history information is produced by said production section, the contents data which is recorded on said first information storage medium and whose reproduction is permitted as contents data whose reproduction is not permitted onto said second information storage medium;

a first change control section for changing the contents data recorded on said first information storage medium into contents data whose reproduction is not permitted;

a second change control section for changing the contents data copied on said second information storage medium by said copy control section into contents data whose reproduction is permitted;

an erasure control section for erasing the contents data recorded on said first information storage medium; and a deletion control section for deleting the history information produced by said production section.

13. A recording apparatus according to claim 12, characterized in that, where said second information storage medium is a built-in hard disk drive, said restoration control section restores, if the series of processes by said movement control section is interrupted before a process of said first change control section is completed, the state before the series of processes by said movement control section is executed, but said restoration control section substantially completes, if the series of processes by said movement control section is interrupted after a process of said second change control section is completed, the series of interrupted processes of said movement control section.

14. A recording apparatus according to claim 13, characterized in that, when the process of said first change control section is completed and the process of said second change control section is not completed, said restoration control section deletes the contents data recorded on said second information storage medium.

15. A communication apparatus for communicating data with a storage apparatus having an information storage medium, characterized in that it comprises:

a storage section capable of storing data therein;

an attribute information storage section for storing attribute information of the data stored in said storage section;

an instruction section for issuing an instruction to move the data stored in said storage section to said information storage medium;

a movement control section, operable in response to the instruction, for transferring the data of said storage section and the attribute information corresponding to the data and including an invalidated reproduction permission flag to said information storage medium, registering history information indicating that the data is being moved, changing the reproduction permission flag of the attribute information corresponding to the data of said storage section from valid to invalid, changing the reproduction permission flag of the attribute information corresponding to the data of said information storage medium from invalid to valid, deleting the data of said storage section, and deleting the registered history information; and a restoration control section, operable when the moving process of the data by said movement control section is interrupted, for substantially returning the data of said storage section and the data of said information storage medium to those in a state before the movement control or after completion of the movement by said movement control section.

16. A communication apparatus for communicating data with a storage apparatus having an information storage medium, characterized in that it comprises:

a storage section capable of storing data therein;

an attribute information storage section for storing attribute information of the data stored in said storage section;

an instruction section for issuing an instruction to move the data stored in said information storage medium to said storage section;

a movement control section, operable in response to the instruction, for registering history information indicating that the data is being moved, transferring the data of said information storage medium and the attribute information corresponding to the data and including an invalidated reproduction permission flag to said storage section, changing the reproduction permission flag of the attribute information corresponding to the data of said information storage medium from valid to invalid, changing the reproduction permission flag of the attribute information corresponding to the data of said storage section from invalid to valid, deleting the data of said storage medium, and deleting the registered history information; and a restoration control section, operable when the moving process of the data by said movement control section is interrupted, for substantially returning the data of said storage section and the data of said information storage medium to those in a state before the movement control or after completion of the movement by said movement control section.

17. A method for moving contents data between a first information storage medium and a second information storage medium comprising:

issuing an instruction to move the contents data from the first information storage medium to the second information storage medium;

copying, by a moving means, in response to the instruction, the contents data recorded on the first information storage medium onto the second information storage medium and deleting the contents data recorded in the first information storage medium; and when a series of processes by the moving means is interrupted, substantially restoring a state before the series of processes by the moving means is executed or substantially completing the series of interrupted processes by the moving means;

wherein the step of copying includes producing history information which indicates a start of the series of processes;

copying, after the history information is produced, the contents data which is recorded on the first information storage medium and whose reproduction is permitted as contents data whose reproduction is not permitted onto the second information storage medium; changing the contents data recorded on the first information storage medium into contents data whose reproduction is not permitted;

changing the contents data copied on the second information storage medium into contents data whose reproduction is permitted;

erasing the contents data recorded on the first information storage medium; and deleting the history information produced by the production means.

18. A computer readable medium on which a computer software program is stored such that when executed by a computer it will cause the computer to move contents data between a first information storage medium and a second information storage medium, with the following steps:

issuing an instruction to move the contents data from the first information storage medium to the second information storage medium;

copying, by a moving means, in response to the instruction, the contents data recorded on the first information storage medium onto the second information storage medium and deleting the contents data recorded in the first information storage medium; and when a series of processes by the moving means is interrupted, substantially restoring a state before the series of processes by the moving means is executed or substantially completing the series of interrupted processes by the moving means;

wherein the step of copying includes producing history information which indicates a start of the series of processes;

copying, after the history information is produced, the contents data which is recorded on the first information storage medium and whose reproduction is permitted as contents data whose reproduction is not permitted onto the second information storage medium; changing the contents data recorded on the first information storage medium into contents data whose reproduction is not permitted;

changing the contents data copied on the second information storage medium into contents data whose reproduction is permitted;

erasing the contents data recorded on the first information storage medium; and deleting the history information produced by the production means.

* * * * *